United States Patent
Esteves

(10) Patent No.: US 12,448,629 B2
(45) Date of Patent: Oct. 21, 2025

(54) rAAV VECTORS FOR THE TREATMENT OF GM1 AND GM2 GANGLIOSIDOSIS

(71) Applicant: University of Massachusetts, Boston, MA (US)

(72) Inventor: Miguel Sena Esteves, Westford, MA (US)

(73) Assignee: University of Massachusetts, Boston, MA (US)

( * ) Notice: Subject to any disclaimer, the term of this patent is extended or adjusted under 35 U.S.C. 154(b) by 1110 days.

(21) Appl. No.: 17/282,421

(22) PCT Filed: Oct. 4, 2019

(86) PCT No.: PCT/US2019/054649
§ 371 (c)(1),
(2) Date: Apr. 2, 2021

(87) PCT Pub. No.: WO2020/072873
PCT Pub. Date: Apr. 9, 2020

(65) Prior Publication Data
US 2021/0381004 A1 Dec. 9, 2021

Related U.S. Application Data

(60) Provisional application No. 62/848,858, filed on May 16, 2019, provisional application No. 62/840,359, (Continued)

(51) Int. Cl.
*C12N 15/86* (2006.01)
*A61K 48/00* (2006.01)
(Continued)

(52) U.S. Cl.
CPC ............... *C12N 15/86* (2013.01); *A61P 3/00* (2018.01); *C12N 9/2402* (2013.01);
(Continued)

(58) Field of Classification Search
CPC ....................................................... C12N 15/86
See application file for complete search history.

(56) References Cited

U.S. PATENT DOCUMENTS 5,475,095 A   12/1995 Myerowitz et al.
6,797,265 B2   9/2004 Amalfitano et al.
(Continued)

FOREIGN PATENT DOCUMENTS

AU   2013202568   5/2013
CN      1429905   7/2003
(Continued)

OTHER PUBLICATIONS

Kaytor et al., 2016 (Geneseq Accession No. BDJ35881, computer printout, pp. 1-3).*

(Continued)

*Primary Examiner* — Mark L Shibuya
(74) *Attorney, Agent, or Firm* — Fish & Richardson P.C.

(57) ABSTRACT

Aspects of the disclosure relate to compositions and methods for the treatment of lysosomal storage disorders, such as GM1 gangliosidosis, Tay Sachs disease, and Sandhoff disease. In some embodiments, the compositions comprise viral vectors encoding beta-galactosidase. In some embodiments, the compositions comprise viral vectors encoding beta-hexosaminidase subunits (e.g. HEXA, HEXB, or combinations thereof).

19 Claims, 80 Drawing Sheets

Specification includes a Sequence Listing.

Related U.S. Application Data filed on Apr. 29, 2019, provisional application No. 62/826,863, filed on Mar. 29, 2019, provisional application No. 62/815,996, filed on Mar. 8, 2019, provisional application No. 62/814,587, filed on Mar. 6, 2019, provisional application No. 62/741,848, filed on Oct. 5, 2018.

(51) Int. Cl.
    *A61P 3/00*      (2006.01)
    *C12N 9/24*      (2006.01)
(52) U.S. Cl.
    CPC ...... *C12Y 302/01052* (2013.01); *A61K 48/00* (2013.01); *C12N 2750/14143* (2013.01); *C12N 2830/42* (2013.01)

(56) References Cited

U.S. PATENT DOCUMENTS

| | | |
|---|---|---|
| 7,858,367 B2 | 12/2010 | Amalfitano et al. |
| 10,400,226 B2 | 9/2019 | Ito et al. |
| 11,020,443 B2 | 6/2021 | Esteves et al. |
| 2002/0164783 A1 | 11/2002 | Feldhaus |
| 2004/0192630 A1 | 9/2004 | Kyrkanides |
| 2008/0226615 A1 | 9/2008 | Kyrkanides |
| 2012/0309050 A1 | 12/2012 | Kumon et al. |
| 2013/0090374 A1 | 4/2013 | Sena-Esteves et al. |
| 2015/0065560 A1 | 3/2015 | Björklund et al. |
| 2015/0258180 A1 | 9/2015 | Mahuran et al. |
| 2016/0243260 A1 | 8/2016 | Blits |
| 2016/0331846 A1* | 11/2016 | Keimel et al. |
| 2018/0028685 A1 | 2/2018 | Walia et al. |
| 2018/0311290 A1 | 11/2018 | Esteves et al. |
| 2019/0111157 A1 | 4/2019 | Stanek et al. |
| 2021/0095314 A1 | 4/2021 | Esteves et al. |
| 2021/0228739 A1 | 7/2021 | Esteves |
| 2021/0393714 A1 | 12/2021 | Sena-Esteves et al. |

FOREIGN PATENT DOCUMENTS

| | | |
|---|---|---|
| EP | 0669987 B1 | 8/2008 |
| EP | 1501465 B1 | 10/2009 |
| EP | 1620133 B1 | 12/2015 |
| EP | 2996475 A1 | 3/2016 |
| WO | WO 2003/092612 | 11/2003 |
| WO | WO 2008/154198 | 12/2008 |
| WO | WO 2010/027446 | 3/2010 |
| WO | WO 2012/145646 | 10/2012 |
| WO | WO 2012/177997 | 12/2012 |
| WO | WO 2014/061735 | 4/2014 |
| WO | WO 2016/172155 | 10/2016 |
| WO | WO 2017/136536 | 8/2017 |

OTHER PUBLICATIONS

Moskal et al., 2004 (Generseq Accession No. ADT79424, computer printout, pp. 1-3).*
Arfi et al., "Bicistronic lentiviral vector corrects β-hexosaminidase deficiency in transduced and cross-corrected human Sandhoff fibroblasts," Neurobiology of Disease, Nov. 1, 2005, 20(2):583-93.
Baek et al., "AAV-mediated gene delivery in adult GM1-gangliosidosis mice corrects lysosomal storage in CNS and improves survival," PloS one, Oct. 18, 2010, 5(10):e13468, 16 pages.
Bradbury et al., "Biomarkers for disease progression and AAV therapeutic efficacy in feline Sandhoff disease," Experimental Neurology, Jan. 1, 2015, 263:102-12.
Bradbury et al., "Therapeutic response in feline sandhoff disease despite immunity to intracranial gene therapy," Molecular Therapy, Jul. 1, 2013, 21(7):1306-15.
Cachón-González et al., "Effective gene therapy in an authentic model of Tay-Sachs-related diseases," Proceedings of the National Academy of Sciences, Jul. 5, 2006, 103(27):10373-8.
Cachón-González et al., "Gene transfer corrects acute GM2 gangliosidosis—potential therapeutic contribution of perivascular enzyme flow," Molecular Therapy, Aug. 1, 2012, 20(8):1489-500.
Cork et al., "GM2 ganglioside lysosomal storage disease in cats with beta-hexosaminidase deficiency," Science, May 27, 1977, 196(4293):1014-7.
Corti et al., "MM. B-cell depletion is protective against anti-AAV capsid immune response: a human subject case study," Molecular Therapy-Methods & Clinical Development, Jan. 1, 2014, 1:14033.
Davidoff et al., "Sex significantly influences transduction of murine liver by recombinant adeno-associated viral vectors through an androgen-dependent pathway," Blood, Jul. 15, 2003, 102(2):480-8.
D'Azzo et al., "Faulty association of alpha-and beta-subunits in some forms of beta-hexosaminidase A deficiency," Journal of Biological Chemistry, Sep. 10, 1984, 259(17):11070-4.
De et al., "High levels of persistent expression of α1-antitrypsin mediated by the nonhuman primate serotype rh. 10 adeno-associated virus despite preexisting immunity to common human adeno-associated viruses," Molecular Therapy, Jan. 1, 2006, 13(1):67-76.
Dekaban et al., "Changes in brain weights during the span of human life: relation of brain weights to body heights and body weights," Annals of Neurology: Official Journal of the American Neurological Association and the Child Neurology Society, Oct. 1978, 4(4):345-56.
Gao et al., "Clades of Adeno-associated viruses are widely disseminated in human tissues," Journal of Virology, Jun. 15, 2004, 78(12):6381-8.
Golebiowski et al., "Direct intracranial injection of AAVrh8 encoding monkey β-N-acetylhexosaminidase causes neurotoxicity in the primate brain," Human Gene Therapy, Jun. 1, 2017, 28(6):510-22.
Gray-Edwards et al., "Adeno-associated virus gene therapy in a sheep model of Tay-Sachs disease," Human Gene Therapy, Mar. 1, 2018, 29(3):312-26.
Gray-Edwards et al., "Novel biomarkers of human GM1 gangliosidosis reflect the clinical efficacy of gene therapy in a feline model," Molecular Therapy, Apr. 5, 2017, 25(4):892-903.
Guidotti et al., "Adenoviral gene therapy of the Tay-Sachs disease in hexosaminidase A-deficient knock-out mice," Human Molecular Genetics, May 1, 1999, 8(5):831-8.
Karumuthil-Melethil et al., "Novel vector design and hexosaminidase variant enabling self-complementary adeno-associated virus for the treatment of Tay-Sachs disease," Human Gene Therapy, Jul. 1, 2016, 27(7):509-21.
Lowe et al., "MRS reveals additional hexose N-acetyl resonances in the brain of a mouse model for Sandhoff disease," NMR in Biomedicine: An International Journal Devoted to the Development and Application of Magnetic Resonance In vivo, Dec. 2005, 18(8):517-26.
Maguire et al., "Mouse gender influences brain transduction by intravascularly administered AAV9," Molecular Therapy, Aug. 1, 2013, 21(8):1470-1.
Mahuran, "β-hexosaminidase: biosynthesis and processing of the normal enzyme, and identification of mutations causing Jewish Tay-Sachs disease," Clinical Biochemistry, Apr. 1, 1995, 28(2):101-6.
Mahuran, "Biochemical consequences of mutations causing the GM2 gangliosidoses," Biochimica et Biophysica Acta (BBA)-Molecular Basis of Disease, Oct. 8, 1999, 1455(2-3):105-38.
Matsuoka et al., "Therapeutic potential of intracerebroventricular replacement of modified human β-hexosaminidase B for GM2 gangliosidosis," Molecular Therapy, Jun. 1, 2011, 19(6):1017-24.
McCarty et al., "Self-complementary recombinant adeno-associated virus (scAAV) vectors promote efficient transduction independently of DNA synthesis," Gene therapy, Aug. 2001, 8(16):1248-54.
McCurdy et al., "Sustained normalization of neurological disease after intracranial gene therapy in a feline model," Science Translational Medicine, Apr. 9, 2014, 6(231):231ra48, 24 pages.
McCurdy et al., "Widespread correction of central nervous system disease after intracranial gene therapy in a feline model of Sandhoff disease," Gene Therapy, Feb. 2015, 22(2):181-9.

(56) References Cited

OTHER PUBLICATIONS

Mendell et al., "Single-dose gene-replacement therapy for spinal muscular atrophy," New England Journal of Medicine, Nov. 2, 2017, 377(18):1713-22.
Myerowitz et al., "Human beta-hexosaminidase alpha chain: coding sequence and homology with the beta chain," Proceedings of the National Academy of Sciences, Dec. 1, 1985, 82(23):7830-4.
Okada et al., "Generalized gangliosidosis: beta-galactosidase deficiency," Science, May 31, 1968, 160(3831):1002-4.
Passini et al., "Combination brain and systemic injections of AAV provide maximal functional and survival benefits in the Niemann-Pick mouse," Proceedings of the National Academy of Sciences, May 29, 2007, 104(22):9505-10.
PCT International Preliminary Report on Patentability in International Appln. No. PCT/US2019/054649, dated Mar. 23, 2021, 10 pages.
PCT International Search Report and Written Opinion in International Appln. No. PCT/US2019/054649, dated Feb. 14, 2020, 15 pages.
Pfeifer et al., "Adeno-associated virus serotype 9-mediated pulmonary transgene expression: effect of mouse strain, animal gender and lung inflammation," Gene Therapy, Nov. 2011, 18(11):1034-42.
Proia et al., "Association of alpha-and beta-subunits during the biosynthesis of beta-hexosaminidase in cultured human fibroblasts," Journal of Biological Chemistry, Mar. 10, 1984, 259(5):3350-4.
Regier et al., "GLB1-Related Disorders," GeneReviews [Internet]. Seattle (WA): University of Washington, Seattle; 1993-2016, 42 pages.
Regier et al., "The GMI and GM2 gangliosidoses: natural history and progress toward therapy," Pediatric Endocrinology Reviews: PER, Jun. 1, 2016, 13:663-73.
Rockwell et al., "AAV-mediated gene delivery in a feline model of Sandhoff disease corrects lysosomal storage in the central nervous system," ASN Neuro, Apr. 1, 2015, 7(2), 13 pages.
Sango et al., "Mice lacking both subunits of lysosomal β-hexosaminidase display gangliosidosis and mucopolysaccharidosis," Nature Genetics, Nov. 1996, 14(3):348-52.
Sango et al., "Mouse models of Tay-Sachs and Sandhoff diseases differ in neurologic phenotype and ganglioside metabolism," Nature Genetics, Oct. 1995, 11(2):170-6.
Sinici et al., "In cellulo examination of a beta-alpha hybrid construct of beta-hexosaminidase A subunits, reported to interact with the GM2 activator protein and hydrolyze GM2 ganglioside," PLoS One, Mar. 4, 2013, 8(3):e57908, 8 pages.
Suzuki, "β-Galactosidase deficiency (-galactosidosis): GMI gangliosidosis and Morquio B disease," The Metabolic and Molecular Bases of Inherited Disease, 1995, 2785-823.
Tardieu et al., "Intracerebral gene therapy in children with mucopolysaccharidosis type IIIB syndrome: an uncontrolled phase 1/2 clinical trial," The Lancet Neurology, Sep. 1, 2017, 16(9):712-20.
Tropak et al., "Construction of a hybrid β-hexosaminidase subunit capable of forming stable homodimers that hydrolyze GM2 ganglioside in vivo," Molecular Therapy—Methods & Clinical Development, Jan. 1, 2016, 3:15057, 9 pages.
Walia et al., "Long-term correction of Sandhoff disease following intravenous delivery of rAAV9 to mouse neonates," Molecular Therapy, Mar. 1, 2015, 23(3):414-22.
Wilken et al., "MRS of a child with Sandhoff disease reveals elevated brain hexosamine," European Journal of Paediatric Neurology, Jan. 1, 2008. 12(1):56-60.
Worgall et al., "Treatment of late infantile neuronal ceroid lipofuscinosis by CNS administration of a serotype 2 adeno-associated virus expressing CLN2 cDNA," Human Gene Therapy, May 1, 2008, 19(5):463-74.
Yamanaka et al., "Targeted disruption of the Hexa gene results in mice with biochemical and pathologic features of Tay-Sachs disease," Proceedings of the National Academy of Sciences, Oct. 11, 1994, 91(21):9975-9.
Cheng, "Gene therapy for the neurological manifestations in lysosomal storage disorders," Journal of Lipid Research, Sep. 2014, 55(9):1827-38.
EP Office Action in European Appln. No. 16783726.9, dated Mar. 14, 2023, 5 pages.
Halder et al., "Structure of neurotropic adeno-associated virus AAVrh. 8," Journal of Structural Biology, Oct. 2015, 192(1):21-36.
Sato et al., "Usefulness of double gene construct for rapid identification of transgenic mice exhibiting tissue-specific gene expression," Molecular Reproduction and Development: Incorporating Gamete Research, Dec. 2001, 60(4):446-56.
CN Office Action in Chinese Appln. No. 201980080425.9, mailed on Dec. 28, 2023, 39 pages (with English translation).
CN Office Action in Chinese Appln. No. 201980034667.4, dated Oct. 10, 2022, 13 pages (English translation).
Bera et al., "Bicistronic AAV Gene Therapy Vectors for Tay-Sachs Disease," Molecular Therapy, May 1, 2008, 16:S42.
CA Office Action in Canadian Appln. No. 3,019,315, dated Aug. 10, 2022, 6 pages.
Cachón-González et al., "Reversibility of neuropathology in Tay-Sachs-related diseases," Human Molecular Genetics, Feb. 1, 2014, 23(3):730-48.
Curtin et al., "Bidirectional promoter interference between two widely used internal heterologous promoters in a late-generation lentiviral construct," Gene Therapy, Mar. 2008, 15(5):384-90.
EP European Search Report in European Appln. No. 16783726.9, dated Nov. 7, 2018, 11 pages.
EP Extended Search Report in European Appln. No. 1978280.0, dated Jan. 21, 2022, 6 pages.
EP Office Action in European Appln. No. 16783726.9, dated Aug. 7, 2020, 7 pages.
EP Office Action in European Appln. No. 16783726.9, dated Dec. 6, 2019, 7 pages.
Golebiowski et al., "Optimization of AAV Vector Design for Safe Expression of β-N-Acetylhexosaminidase in the Brain for Tay-Sachs Disease Gene Therapy," Molecular Therapy, May 1, 2015, 23:S283.
Lahey et al., "Pronounced therapeutic benefit of a single bidirectional AAV vector administered systemically in Sandhoff mice," Molecular Therapy, Oct. 7, 2020, 28(10):2150-60.
Martin-Duque et al., "Direct comparison of the insulating properties of two genetic elements in an adenoviral vector containing two different expression cassettes," Human Gene Therapy, Oct. 1, 2004 Oct 1;15(10):995-1002.
PCT International Preliminary Report on Patentability in International Appln. No. PCT/US2016/028367, dated Oct. 24, 2017, 8 pages.
PCT International Preliminary Report on Patentability in International Appln. No. PCT/US2019/027271, dated Oct. 13, 2020, 8 pages.
PCT International Search Report and Written Opinion in International Application No. PCT/US2018/27271, in Sep. 11, 2019, 7 pages.
PCT International Search Report and Written Opinion in International Appln. No. PCT/US2016/028367, dated Aug. 31, 2016, 24 pages.
PCT Invitation to Pay Additional Fees in International Appln. No. PCT/US2019/27271, dated Jun. 27, 2019, 3 pages.
Seo et al., "Evaluation of combinatorial cis-regulatory elements for stable gene expression in chicken cells," BMC Biotechnology, Dec. 1, 2010, 10(1):69, 8 pages.
Solovyeva et al., "New approaches to tay-sachs disease therapy," Frontiers in Physiology, Nov. 20, 2018, 9:1663, 11 pages.
Sondhi et al., "AAV2-mediated CLN2 gene transfer to rodent and non-human primate brain results in long-term TPP-I expression compatible with therapy for LINCL," Gene Therapy, Nov. 2005, 12(22):1618-32.
Weismann et al., "Systemic AAV9 gene transfer in adult GM1 gangliosidosis mice reduces lysosomal storage in CNS and extends lifespan," Human Molecular Genetics, Aug. 1, 2015, 24(15):4353-64.
Weissman, "Approaches and Considerations Towards a Safe and Effective Adena-Associated Virus Mediated Therapeutic Interven-

(56) References Cited

OTHER PUBLICATIONS tion for GM 1-Gangliosidosis: A Dissertation," University Massachusetts Medical School. Aug. 5, 2014.

Woodley et al., "Efficacy of a bicistronic vector for correction of sandhoff disease in a mouse model," Molecular Therapy-Methods & Clinical Development, Mar. 15, 2019, 12:47-57.

Xu et al., "CMV-β-actin promoter directs higher expression from an adeno-associated viral vector in the liver than the cytomegalovirus or elongation factor 1α promoter and results in therapeutic levels of human factor X in mice," Human Gene Therapy, Mar. 20, 2001, 12(5):563-73.

Yang et al., "Intravascular Delivery of RAAVRH.8 Generates Widespreading Transduction of Neuronal and Glial Cell Types in Adult Mouse Central Nervous System, Abstract 626," Molecular Therapy, May 2012, Supplement 1, 1 page.

EP Extended Search Report in European Appln. No. 19868896.2, dated Jul. 27, 2022, 6 pages.

Sargeant et al., "Adeno-associated virus-mediated expression of β-hexosaminidase prevents neuronal loss in the Sandhoff mouse brain," Human Molecular Genetics, Nov. 15, 2011, 20(22):4371-80.

Extended European Search Report in European Appln. No. 24214639.7, mailed on Feb. 19, 2025, 10 pages.

Maguire et al., "Gene Therapy for the Nervous System: Challenges and New Strategies," Neurotherapeutics, Aug. 27, 2014, 11(4):817-839.

Yang et al., "Global CNS Transduction of Adult Mice by Intravenously Delivered rAAVrh.8 and rAAVrh.10 and Nonhuman Primates by rAAVrh.10," Molecular Therapy, Jun. 24, 2014, 22(7):1299-1309.

\* cited by examiner

A

- 30-month-old child with Tay-Sachs disease
- AAVrh8-HexA & AAVrh8-HexB
- 1E14 vg

- 14 mL of CSF was removed by passive flow, followed by administration of 9 ml of AAVrh8 vector at ~1 mL/min at cisterna magna level.

- 3ml of AAVrh8 vector was infused at L2 level.

Final Placement

Arrow: Final position of the microcatheter tip

SEQUENCE LISTING

```
<160> NUMBER OF SEQ ID NOS: 23

<210> SEQ ID NO 1
<211> LENGTH: 260
<212> TYPE: DNA
<213> ORGANISM: Artificial Sequence
<220> FEATURE:
<223> OTHER INFORMATION: Synthetic Polynucleotide

<400> SEQUENCE: 1
ccacgttctg cttcactctc cccatctccc cccctcccc accccaatt ttgtatttat      60 ttatttttta attatttgt gcagcgatgg gggcggggg gggggcgcg cgccaggcgg     120 ggcggggcgg ggcgaggggc ggggcggggc gaggcggaga ggtgcggcgg cagccaatca    180
gagcggcgcg ctccgaaagt ttcctttat ggcgaggcgg cggcggcggc ggccctataa     240
aaagcgaagc gcgcggcggg                                                260

<210> SEQ ID NO 2
<211> LENGTH: 110
<212> TYPE: DNA
<213> ORGANISM: Artificial Sequence
<220> FEATURE:
<223> OTHER INFORMATION: Synthetic Polynucleotide

<400> SEQUENCE: 2
tcgactctga cggttcacta aacgagctct gcttatatag caacctgagt gatggctccg     60
cccacgcgtg cacgtcaccg ttaccggagc aacctgacac cggctccagc                110

<210> SEQ ID NO 3
<211> LENGTH: 5964
<212> TYPE: DNA
<213> ORGANISM: Artificial Sequence
<220> FEATURE:
<223> OTHER INFORMATION: Synthetic Polynucleotide

<400> SEQUENCE: 3
agcttaaaaa ctagcgctag caacaacccc cggaggtgca gcggctggcc agagcgccca     60
ctgcctaacg gagagacccc atcgtggcgc gatcatgctc cgggtccccc tgtgtacgcc    120
gctcccgctc ctggcactgc tgcaactgct gggcgctgcg cacggcatct ataatgtcac    180
ccagaggaca tttaagctcg actacagccg ggaccgcttc ctcaaggatg acagccatt     240 ccgatacatc tcgggaagca ttcattactt ccggataccc gcttctact gggaggaccg    300 gctgctgaag atgaagatgg ctgggctgaa tgctatccag atgtacgtgc cctggaactt    360
ccatgaaccc caaccaggac aatatgagtt ttctggggac cgtgatgtgg agcatttcat    420
ccagctggct catgagctgg gactcctggt gatcctgagg cctgggccct acatctgtgc    480
agagtgggac atgggggggct tacctgcttg gctactagag aaacaatcta tcgttctccg    540
```

-continued

```
gtcttctgac ccagactacc ttgtagctgt ggataaatgg ctggcagtcc ttctgcccaa    600
gatgaagccc ctgctctacc agaacggagg accgatcata accgtgcagg ttgagaatga    660
gtacgggtcc tactttgcct gcgattacga ctacctacgc ttcctggtgc accgcttccg    720
ctaccatctg ggtaatgacg tcattctctt caccaccgac ggagcaagtg aaaaaatgct    780
gaagtgtggg accctgcagg acctgtacgc cacagtggat tttggaacag gcaacaatat    840
cacacaagct ttcctggtcc agaggaagtt tgaacctaaa ggacctttga tcaattctga    900
gttctatact ggctggctag accactgggg taaacccat tccacggtga aaactaaaac    960
actggctacc tccctctata acctgcttgc ccgtggggcc aacgtgaact tgtacatgtt   1020
tataggtggg accaattttg cctattggaa tggtgccaac acgccctatg agccacagcc   1080
caccagctat gactacgacg ccccactgag cgaggctggg gacctcacta agaagtattt   1140
tgctcttcga gaagtcattc agatgtttaa agaagtccca gaaggcccta tccctccgtc   1200
tacacccaaa tttgcatatg aaaagttgc tctgagaaag ttcaagacag tggctgaagc   1260
tctgggtatc ctgtgtccca atgggccagt gaaaagcctc tatcccctga cattcactca   1320
ggtaaaacag tattttgggt atgtgctgta ccgaacaacg cttcctcaag attgcagtaa   1380
cccgaaaccc attttctctt cacccttcaa tggtgtccgt gatcgggctt acgtctctgt   1440
ggacggggtc ccccaaggaa tccttgatcg aaacctcatg acagctctga acatacgggg   1500
gaaggctgga gccacgctgg acatcctggt ggagaacatg gggcgtgtga actatggcag   1560
attcatcaat gacttcaagg gtttgatttc caacatgact atcaactcca ctgtcctcac   1620
caactggacg tcttcccac tgaacactga ggccatggta cgcaaccatc tctggggccg   1680
ggaggccagt gatgagggtc accttgacgg acggtcgacc tccaattctt cggacctcat   1740
actccccacc ttttacgtgg gcaacttctc catcccctcg ggcatcccag acctgccaca   1800
ggacaccttc atccagtttc ctgggtggtc caagggtcaa gtatggatca atggctttaa   1860
cctcggccga tactggccca caatgggccc acaaaagacc ttgttcgtgc caaggaacat   1920
cctgaccact tcagccccaa acaacatcac agtgttggag ctagagtttg caccctgcag   1980
cgaggggacc ccagagctgt gtacagtaga gtttgttgac actccggtca tttcctgacg   2040
ctagcggccg cagagatcca gacatgataa gatacattga tgagtttgga caaaccacaa   2100
ctagaatgca gtgaaaaaaa tgctttattt gtgaaatttg tgatgctatt gctttatttg   2160
taaccattat aagctgcaat aaacaagtta acaacaacaa ttgcattcat tttatgtttc   2220
aggttcaggg ggaggtgtgg gaggtttttt agtcgactag agctcgctga tcagcctcga   2280
ctgtgccttc tagttgccag ccatctgttg tttgcccctc ccccgtgcct tccttgaccc   2340
tggaaggtgc cactcccact gtcctttcct aataaaatga ggaaattgca tcgcattgtc   2400
tgagtaggtg tcattctatt ctgggggtg gggtgggca ggacagcaag ggggaggatt   2460
gggaagacaa tagcaggcat gctggggaga gatctaggaa cccctagtga tggagttggc   2520
cactccctct ctgcgcgctc gctcgctcac tgaggccgcc cgggcaaagc ccgggcgtcg   2580
ggcgaccttt ggtcgcccgg cctcagtgag cgagcgagcg cgcagagagg gagtggccat   2640
gcagccagct ggcgtaatag cgaagaggcc cgcaccgatc gcccttccca acagttgcgt   2700
agcctgaatg gcgaatggcg cgacgcgccc tgtagcggcg cattaagcgc ggcgggtgtg   2760
gtggttacgc gcagcgtgac cgctacactt gccagcgccc tagcgcccgc tcctttcgct   2820
ttcttccctt cctttctcgc cacgttcgcc ggctttcccc gtcaagctct aaatcggggg   2880
ctccctttag ggttccgatt tagtgcttta cggcacctcg accccaaaaa acttgattag   2940
```

```
ggtgatggtt cacgtagtgg gccatcgccc tgatagacgg ttttccgccc tttgacgttg    3000
gagtccacgt tctttaatag tggactcttg ttccaaactg gaacaacact caaccctatc    3060
tcggtctatt cttttgattt ataagggatt ttgccgattt cggcctattg gttaaaaaat    3120
gagctgattt aacaaaaatt taacgcgaat tttaacaaaa tattaacgtt tacaatttcc    3180
tgatgcggta ttttctcctt acgcatctgt gcggtatttc acaccgcata tggtgcactc    3240
tcagtacaat ctgctctgat gccgcatagt taagccagcc ccgacacccg caacacccg    3300 ctgacgcgcc ctgacgggct tgtctgctcc cggcatccgc ttacagacaa gctgtgaccg    3360
tctccgggag ctgcatgtgt cagaggtttt caccgtcatc accgaaacgc gcgagacgaa    3420
agggcctcgt gatacgccta ttttatagg ttaatgtcat gataataatg gtttcttaga    3480
cgtcaggtgg cacttttcgg ggaaatgtgc gcggaacccc tatttgttta ttttctaaa    3540 tacattcaaa tatgtatccg ctcatgagac aataaccctg ataaatgctt caataatatt    3600
gaaaaaggaa gagtatgagt attcaacatt tccgtgtcgc ccttattccc ttttttgcgg    3660
cattttgcct tcctgttttt gctcacccag aaacgctggt gaaagtaaaa gatgctgaag    3720
atcagttggg tgcacgagtg ggttacatcg aactggatct caacagcggt aagatccttg    3780
agagttttcg ccccgaagaa cgttttccaa tgatgagcac ttttaaagtt ctgctatgtg    3840
gcgcggtatt atcccgtatt gacgccgggc aagagcaact cggtcgccgc atacactatt    3900
ctcagaatga cttggttgag tactcaccag tcacagaaaa gcatcttacg gatggcatga    3960
cagtaagaga attatgcagt gctgccataa ccatgagtga taacactgcg gccaacttac    4020
ttctgacaac gatcggagga ccgaaggagc taaccgcttt tttgcacaac atggggggatc    4080 atgtaactcg ccttgatcgt tgggaaccgg agctgaatga agccatacca aacgacgagc    4140
gtgacaccac gatgcctgta gcaatggcaa caacgttgcg caaactatta actggcgaac    4200
tacttactct agcttcccgg caacaattaa tagactggat ggaggcggat aaagttgcag    4260
gaccacttct gcgctcggcc cttccggctg gctggtttat tgctgataaa tctggagccg    4320
gtgagcgtgg gtctcgcggt atcattgcag cactggggcc agatggtaag ccctcccgta    4380
tcgtagttat ctacacgacg gggagtcagg caactatgga tgaacgaaat agacagatcg    4440
ctgagatagg tgcctcactg attaagcatt ggtaactgtc agaccaagtt tactcatata    4500
tactttagat tgatttaaaa cttcattttt aatttaaaag gatctaggtg aagatccttt    4560
ttgataatct catgaccaaa atcccttaac gtgagttttc gttccactga gcgtcagacc    4620
ccgtagaaaa gatcaaagga tcttcttgag atcctttttt tctgcgcgta atctgctgct    4680
tgcaaacaaa aaaaccaccg ctaccagcgg tggtttgttt gccggatcaa gagctaccaa    4740 ctcttttttcc gaaggtaact ggcttcagca gagcgcagat accaaatact gtccttctag    4800
tgtagccgta gttaggccac cacttcaaga actctgtagc accgcctaca tacctcgctc    4860
tgctaatcct gttaccagtg gctgctgcca gtggcgataa gtcgtgtctt accgggttgg    4920
actcaagacg atagttaccg gataaggcgc agcggtcggg ctgaacgggg ggttcgtgca    4980
cacagcccag cttggagcga acgacctaca ccgaactgag atacctacag cgtgagcatt    5040
gagaaagcgc cacgcttccc gaagggagaa aggcggacag gtatccggta agcggcaggg    5100
tcggaacagg agagcgcacg agggagcttc caggggggaaa cgcctggtat ctttatagtc    5160
ctgtcgggtt tcgccacctc tgacttgagc gtcgattttt gtgatgctcg tcaggggggc    5220
ggagcctatg gaaaaacgcc agcaacgcgg cctttttacg gttcctggcc tttgctggc    5280
```

| | | |
|---|---|---|
| cttttgctca catgttcttt cctgcgttat ccccctgattc tgtggataac cgtattaccg | 5340 | |
| cctttgagtg agctgatacc gctcgccgca gccgaacgac cgagcgcagc gagtcagtga | 5400 | |
| gcgaggaagc ggaagagcgc ccaatacgca aaccgcctct ccccgcgcgt tggccgattc | 5460 | |
| attaatgcag ctgggctgca gggggggggg gggggggtg gggggggggg ggggggttg | 5520 | |
| gccactccct ctctgcgcgc tcgctcgctc actgaggccg ggcgaccaaa ggtcgcccga | 5580 | |
| cgcccgggct tgcccgggc ggcctcagtg agcgagcgag cgcgcagaga gggagtggcc | 5640 | |
| aactccatca ctaggggttc ctagatctga attctctagt ccacgttctg cttcactctc | 5700 | |
| cccatctccc cccctcccc acccccaatt ttgtatttat ttattttta attattttgt | 5760 | |
| gcagcgatgg gggcggggg gggggcgcg cgccaggcgg ggcggggcgg ggcgagggc | 5820 | |
| ggggcggggc gaggcggaga ggtgcggcgg cagccaatca gagcggcgcg ctccgaaagt | 5880 | |
| ttccttttat ggcgaggcgg cggcggcggc ggccctataa aaagcgaagc gcgcggcggg | 5940 | |
| gggccgcggg ccgatccacc ggta | 5964 | |

<210> SEQ ID NO 4
<211> LENGTH: 594
<212> TYPE: DNA
<213> ORGANISM: Artificial Sequence
<220> FEATURE:
<223> OTHER INFORMATION: Synthetic Polynucleotide

<400> SEQUENCE: 4

| | | |
|---|---|---|
| ccacgttctg cttcactctc cccatctccc cccctcccc acccccaatt ttgtatttat | 60 | |
| ttatttttta attattttgt gcagcgatgg gggcggggg gggggcgcg cgccaggcgg | 120 | |
| ggcggggcgg ggcgagggc ggggcggggc gaggcggaga ggtgcggcgg cagccaatca | 180 | |
| gagcggcgcg ctccgaaagt ttccttttat ggcgaggcgg cggcggcggc ggccctataa | 240 | |
| aaagcgaagc gcgcggcggg gggccgcggg gagtcgctgc gacgctgcct tcgccccgtg | 300 | |
| ccccgctccg ccgccgcctc gcgccgcccg ccccggctct gactgaccgc gttactccca | 360 | |
| caggtgagcg gcgggacgg cccttctcct ccgggctgta attagcgctt ggtttaatga | 420 | |
| cggcttgttt cttttctgtg gctgcgtgaa agccttgagg ggctccggga gctagagcct | 480 | |
| ctgctaacca tgttcatgcc ttcttctttt tcctacagct cctgggcaac gtgctggtta | 540 | |
| ttgtgctgtc tcatcatttt ggcaaagaat tcctcgaaga tccgaagggg ttca | 594 | |

<210> SEQ ID NO 5
<211> LENGTH: 408
<212> TYPE: DNA
<213> ORGANISM: Artificial Sequence
<220> FEATURE:
<223> OTHER INFORMATION: Synthetic Polynucleotide

<400> SEQUENCE: 5

| | | |
|---|---|---|
| ctggagccgg tgtcaggttg ctccggtaac ggtgacgtgc acgcgtgggc ggagccatca | 60 | |
| cgcaggttgc tatataagca gagctcgttt agtgaaccgt cagaggagtc gctgcgacgc | 120 | |
| tgccttcgcc ccgtgccccg ctcgccgcc gcctcgcgcc gcccgccccg gctctgactg | 180 | |
| accgcgttac tcccacaggt gagcgggcgg gacggccctt ctcctccggg ctgtaattag | 240 | |
| cgcttggttt aatgacggct tgtttctttt ctgtggctgc gtgaaagcct tgagggctc | 300 | |
| cgggagctag agcctctgct aaccatgttc atgccttctt ctttttccta cagctcctgg | 360 | |
| gcaacgtgct ggttattgtg ctgtctcatc attttggcaa agaattcc | 408 | |

<210> SEQ ID NO 6
<211> LENGTH: 5688
<212> TYPE: DNA
<213> ORGANISM: Artificial Sequence
<220> FEATURE:
<223> OTHER INFORMATION: Synthetic Polynucleotide

<400> SEQUENCE: 6

| | | | | | |
|---|---|---|---|---|---|
| ttggccactc | cctctctgcg | cgctcgctcg | ctcactgagg | ccgggcgacc | aaaggtcgcc | 60 |
| cgacgcccgg | gctttgcccg | ggcggcctca | gtgagcgagc | gagcgcgcag | agagggagtg | 120 |
| gccaactcca | tcactagggg | ttcctagatc | tgaattcggt | accctggagc | cggtgtcagg | 180 |
| ttgctccggt | aacggtgacg | tgcacgcgtg | ggcggagcca | tcacgcaggt | tgctatataa | 240 |
| gcagagctcg | tttagtgaac | cgtcagagga | gtcgctgcga | cgctgccttc | gccccgtgcc | 300 |
| ccgctccgcc | gccgcctcgc | gccgcccgcc | cggctctga | ctgaccgcgt | tactcccaca | 360 |
| ggtgagcggg | cgggacggcc | cttctcctcc | gggctgtaat | tagcgcttgg | tttaatgacg | 420 |
| gcttgtttct | tttctgtggc | tgcgtgaaag | ccttgagggg | ctccgggagc | tagagcctct | 480 |
| gctaaccatg | ttcatgcctt | cttctttttc | ctacagctcc | tgggcaacgt | gctggttatt | 540 |
| gtgctgtctc | atcattttgg | caaagaattc | ctcgaagatc | cgaaggggtt | caagcttaaa | 600 |
| aactagtgga | gcaccatggc | aagctccagg | ctttggtttt | cgctgctgct | ggcggcagcg | 660 |
| ttcgcaggac | gggcgaccgc | cctctggccc | tggcctcaga | acatccaaac | ctccgaccag | 720 |
| cgctacgtcc | tttatccgaa | caactttcaa | ttccagtacg | atatcagctc | cgccgcgcag | 780 |
| cctggctgct | cagtcctcga | cgaggccttc | cagcgctatc | gtgacctgct | tttcggttcc | 840 |
| gggtcttggc | cccgtcctta | ccgcacagga | aaacggcata | cacctgagaa | gaatgtgttg | 900 |
| gttgtctctg | tagtcacacc | tggatgtaac | cagcttccta | ctttggagtc | ggtagagaat | 960 |
| tataccctga | ccataaatga | tgaccagtgt | ttactcctct | ctgagactgt | ctggggagct | 1020 |
| ctccgaggtc | tggagacttt | tagccagctt | gtttggaaat | ctgctgaggg | cacattcttt | 1080 |
| atcaacaaga | ctgagatcga | ggactttccc | cgctttcctc | accggggctt | gctgttggat | 1140 |
| acatctcgcc | attacctacc | actctctagc | atcctggaca | cactggatgt | catggcgtac | 1200 |
| aataaattga | acgtgttcca | ctggcatctg | gtagatgatc | cttccttccc | atatgagagc | 1260 |
| ttcactttc | cagagctcat | gagaaagggg | tcctacaacc | tgtcaccca | catttacaca | 1320 |
| gcacaggatg | tgaaggaggt | cattgaatac | gcacggctcc | ggggtatccg | tgtgcttgca | 1380 |
| gagtttgaca | ctcctggcca | cactttgtct | tggggaccag | gtatccctgg | attactgact | 1440 |
| ccttgctact | ctgggtctga | gccctctggc | acctttggac | cagtgaatcc | cagtctcaac | 1500 |
| aatacctatg | agttcatgag | cacattcttc | ttggagatca | gctctgtctt | cccagatttt | 1560 |
| tatcttcatc | ttggaggaga | tgaggttgat | ttcacctgct | ggaagtccaa | cccagatatc | 1620 |
| caagacttta | tgaggaagaa | aggcttcggt | gaggacttca | gcagttgga | gtccttctac | 1680 |
| atccagacgc | tgctggacat | cgtctcttct | tatggcaagg | ctatgtggt | gtggcaggag | 1740 |
| gtgtttgata | ataaagtaaa | gattcggcca | gacacaatca | tacaggtgtg | gcgagaagag | 1800 |
| attccagtga | actatatgaa | ggagctggaa | ctggtcacca | aggccggctt | ccgggccctt | 1860 |
| ctctccgccc | cctggtacct | gaaccgtata | tcctacggcc | ctgactggaa | ggatttctac | 1920 |
| atagtggaac | ccctggcatt | tgaaggtacc | cctgagcaga | aggctctcgt | gattggtgga | 1980 |
| gaggcttgta | tgtggggaga | atatgtggac | aacacaaacc | tggtcccag | gctctggccc | 2040 |
| agagcagggg | ctgttgccga | aaggctgtgg | agcaacaagt | tgacatctga | cctgacattt | 2100 |

```
gcctatgaac gtttgtcaca cttccgctgt gagttgctga ggcgaggtgt ccaggcccaa    2160
cccctccatg taggctactg tgagcaggag tttgaacaga cctgactcga gctagcggcc    2220
gcagagatcc agacatgata agatacattg atgagtttgg acaaaccaca actagaatgc    2280
agtgaaaaaa atgctttatt tgtgaaattt gtgatgctat tgcttta ttt gtaaccatta    2340 taagctgcaa taaacaagtt aacaacaaca attgcattca ttttatgttt caggttcagg    2400
gggaggtgtg ggaggttttt tagtcgacta gagctcgctg atcagcctcg actgtgcctt    2460
ctagttgcca gccatctgtt gtttgcccct cccccgtgcc ttccttgacc ctggaaggtg    2520
ccactcccac tgtcctttcc taataaaatg aggaaattgc atcgcattgt ctgagtaggt    2580
gtcattctat tctgggggg t ggggtggggc aggacagcaa gggggaggat tgggaagaca    2640
atagcaggca tgctggggag agatctagga acccctagtg atggagttgg ccactccctc    2700
tctgcgcgct cgctcgctca ctgaggccgc ccgggcaaag cccgggcgtc gggcgacctt    2760
tggtcgcccg gcctcagtga gcgagcgagc gcgcagagag ggagtggcca tgcagccagc    2820
tggcgtaata gcgaagaggc ccgcaccgat cgcccttccc aacagttgcg tagcctgaat    2880
ggcgaatggc gcgacgcgcc ctgtagcggc gcattaagcg cggcgggtgt ggtggttacg    2940
cgcagcgtga ccgctacact tgccagcgcc ctagcgcccg ctccttt cgc tttcttccct    3000 tccttt ctcg ccacgttcgc cggctttccc cgtcaagctc taaatcgggg gctcccttta    3060
gggttccgat ttagtgcttt acggcacctc gaccccaaaa aacttgatta gggtgatggt    3120
tcacgtagtg ggccatcgcc ctgatagacg gttttt cgcc ctttgacgtt ggagtccacg    3180
ttctttaata gtggactctt gttccaaact ggaacaacac tcaaccctat ctcggtctat    3240
tcttttgatt tataagggat tttgccgatt tcggcctatt ggttaaaaaa tgagctgatt    3300
taacaaaaat ttaacgcgaa ttttaacaaa atattaacgt ttacaatttc ctgatgcggt    3360
attttctcct tacgcatctg tgcggtattt cacaccgcat atggtgcact ctcagtacaa    3420
tctgctctga tgccgcatag ttaagccagc cccgacaccc gccaacaccc gctgacgcgc    3480
cctgacgggc ttgtctgctc ccggcatccg cttacagaca agctgtgacc gtctccggga    3540
gctgcatgtg tcagaggttt tcaccgtcat caccgaaacg cgcgagacga aagggcctcg    3600
tgatacgcct atttttatag gttaatgtca tgataataat ggtttcttag acgtcaggtg    3660
gcacttttcg gggaaatgtg cgcggaaccc ctatttgttt attttt ctaa atacattcaa    3720 atatgtatcc gctcatgaga caataacccct gataaatgct tcaataatat tgaaaaagga    3780
agagtatgag tattcaacat ttccgtgtcg cccttattcc cttttt tgcg cattttgcc    3840 ttcctgtttt tgctcaccca gaaacgctgg tgaaagtaaa agatgctgaa gatcagttgg    3900
gtgcacgagt gggttacatc gaactggatc tcaacagcgg taagatcctt gagagttttc    3960
gccccgaaga acgttttcca atgatgagca cttttaaagt tctgctatgt ggcgcggtat    4020
tatcccgtat tgacgccggg caagagcaac tcggtcgccg catacactat tctcagaatg    4080
acttggttga gtactcacca gtcacagaaa agcatcttac ggatggcatg acagtaagag    4140
aattatgcag tgctgccata accatgagtg ataacactgc ggccaactta cttctgacaa    4200
cgatcggagg accgaaggag ctaaccgctt ttttgcacaa catgggggat catgtaactc    4260
gccttgatcg ttgggaaccg gagctgaatg aagccatacc aaacgacgag cgtgacacca    4320
cgatgcctgt agcaatggca acaacgttgc gcaaactatt aactggcgaa ctacttactc    4380
tagcttcccg gcaacaatta atagactgga tggaggcgga taaagttgca ggaccacttc    4440
tgcgctcggc ccttccggct ggctggttta ttgctgataa atctggagcc ggtgagcgtg    4500
```

```
ggtctcgcgg tatcattgca gcactggggc cagatggtaa gccctcccgt atcgtagtta    4560
tctacacgac ggggagtcag gcaactatgg atgaacgaaa tagacagatc gctgagatag    4620
gtgcctcact gattaagcat tggtaactgt cagaccaagt ttactcatat atactttaga    4680
ttgatttaaa acttcatttt taatttaaaa ggatctaggt gaagatcctt tttgataatc    4740
tcatgaccaa atcccttaa cgtgagtttt cgttccactg agcgtcagac cccgtagaaa     4800
agatcaaagg atcttcttga gatcctttt ttctgcgcgt aatctgctgc ttgcaaacaa     4860
aaaaaccacc gctaccagcg gtggtttgtt tgccggatca agagctacca actctttttc    4920
cgaaggtaac tggcttcagc agagcgcaga taccaaatac tgtccttcta gtgtagccgt    4980
agttaggcca ccacttcaag aactctgtag caccgcctac atacctcgct ctgctaatcc    5040
tgttaccagt ggctgctgcc agtggcgata agtcgtgtct taccgggttg gactcaagac    5100
gatagttacc ggataaggcg cagcggtcgg gctgaacggg gggttcgtgc acacagccca    5160
gcttggagcg aacgacctac accgaactga gatacctaca gcgtgagcat tgagaaagcg    5220
ccacgcttcc cgaagggaga aaggcggaca ggtatccggt aagcggcagg gtcggaacag    5280
gagagcgcac gagggagctt ccaggggaa acgcctggta tctttatagt cctgtcgggt     5340
ttcgccacct ctgacttgag cgtcgatttt tgtgatgctc gtcaggggg cggagcctat     5400
ggaaaaacgc cagcaacgcg gccttttac ggttcctggc cttttgctgg ccttttgctc     5460
acatgttctt tcctgcgtta ccctgatt ctgtggataa ccgtattacc gcctttgagt      5520
gagctgatac cgctcgccgc agccgaacga ccgagcgcag cgagtcagtg agcgaggaag    5580
cggaagagcg cccaatacgc aaaccgcctc tccccgcgcg ttggccgatt cattaatgca    5640
gctgggctgc agggggggg gggggggggt ggggggggg gggggggg                   5688

<210> SEQ ID NO 7
<211> LENGTH: 26
<212> TYPE: DNA
<213> ORGANISM: Artificial Sequence
<220> FEATURE:
<223> OTHER INFORMATION: Synthetic Polynucleotide

<400> SEQUENCE: 7
aaacgtctca ctagtccgcg gaattc                                          26

<210> SEQ ID NO 8
<211> LENGTH: 26
<212> TYPE: DNA
<213> ORGANISM: Artificial Sequence
<220> FEATURE:
<223> OTHER INFORMATION: Synthetic Polynucleotide

<400> SEQUENCE: 8
aaacgtctca ctgagaattg atcaaa                                          26

<210> SEQ ID NO 9
<211> LENGTH: 25
<212> TYPE: DNA
<213> ORGANISM: Artificial Sequence
<220> FEATURE:
<223> OTHER INFORMATION: Synthetic Polynucleotide

<400> SEQUENCE: 9
aaaggtctcc ggccgctagc gtcag                                           25

<210> SEQ ID NO 10
```

```
<211> LENGTH: 26
<212> TYPE: DNA
<213> ORGANISM: Artificial Sequence
<220> FEATURE:
<223> OTHER INFORMATION: Synthetic Polynucleotide

<400> SEQUENCE: 10
aaaggtctca tcagttctat actggc                                        26

<210> SEQ ID NO 11
<211> LENGTH: 36
<212> TYPE: DNA
<213> ORGANISM: Artificial Sequence
<220> FEATURE:
<223> OTHER INFORMATION: Synthetic Polynucleotide

<400> SEQUENCE: 11 agcattttt tcactgcatt ctagttgtgg tttgtc                              36

<210> SEQ ID NO 12
<211> LENGTH: 4260
<212> TYPE: DNA
<213> ORGANISM: Artificial Sequence
<220> FEATURE:
<223> OTHER INFORMATION: Synthetic Polynucleotide

<400> SEQUENCE: 12
ttggccactc cctctctgcg cgctcgctcg ctcactgagg ccgggcgacc aaaggtcgcc     60
cgacgcccgg gctttgcccg ggcggcctca gtgagcgagc gagcgcgcag agagggagtg    120
gccaactcca tcactagggg ttcctagatc tgaattcggt accgagggcc ctgcgtatga    180
gtgcaagtgg gttttaggac caggatgagg cggggtgggg gtgcctacct gacgaccgac    240
cccgacccca tggacaagca cccaaccccc attcccaaa ttgcgcatcc cctatcagag    300
agggggaggg gaaacaggat gcggcgaggc gcgtgcgcac tgccagcttc agcaccgcgg    360
acagtgcctt cgccccgcc tggcggcgcg cgccaccgcc gcctcagcac tgaaggcgcg    420
ctgacgtcac tcgccggtcc cccgcaaact ccccttcccg gccaccttgg tcgcgtccgc    480
gccgccgccg gcccagccgg accgcaccac gcgaggcgcg agatagggggg gcacgggcgc    540 gaccatctgc gctgcggcgc cggcgactca gcgctgcctc agtctgcggt gggcagcgga    600
ggagtcgtgt cgtgcctgag agcgcagtcg agaactagat taattaaacc ggtaagcttg    660
ccaccatggt gagcaagggc gaggagctgt tcaccggggt ggtgcccatc ctggtcgagc    720
tggacggcga cgtaaacggc cacaagttca gcgtgtccgg cgagggcgag ggcgatgcca    780
cctacggcaa gctgaccctg aagttcatct gcaccaccgg caagctgccc gtgccctggc    840
ccaccctcgt gaccaccctg acctacggcg tgcagtgctt cagccgctac cccgaccaca    900
tgaagcagca cgacttcttc aagtccgcca tgcccgaagg ctacgtccag gagcgcacca    960
tcttcttcaa ggacgacggc aactacaaga cccgcgccga ggtgaagttc gagggcgaca   1020 cccctggtgaa ccgcatcgag ctgaagggca tcgacttcaa ggaggacggc aacatcctgg   1080
ggcacaagct ggagtacaac tacaacagcc acaacgtcta tatcatggcc gacaagcaga   1140
agaacggcat caaggtgaac ttcaagatcc gccacaacat cgaggacggc agcgtgcagc   1200
tcgccgacca ctaccagcag aacacccca tcggcgacgg ccccgtgctg ctgcccgaca   1260
accactacct gagcacccag tccgccctga gcaaagaccc caacgagaag cgcgatcaca   1320
tggtcctgct ggagttcgtg accgccgcgg ggatcactct cggcatggac gagctgtaca   1380
agtccggact cagatcctac tgaactagtc ggcgacggtg ctagcgtcga ccagtggatc   1440
```

```
ctggaggctt gctgaaggct gtatgctgat gaacatggaa tccatgcagg ttttggccac   1500
tgactgacct gcatggtcca tgttcatcag gacacaaggc ctgttactag cactcacatg   1560
gaacaaatgg cccagatcct ggaggcttgc tgaaggctgt atgctgatga acatggaatc   1620
catgcaggtt ttggccactg actgacctgc atggtccatg ttcatcagga cacaaggcct   1680
gttactagca ctcacatgga acaaatggcc cagatctggc cgcactcgaa acgggcccg    1740 cggccgcaga gatccagaca tgataagata cattgatgag tttggacaaa ccacaactag   1800
aatgcagtga aaaaaatgct ttatttgtga aatttgtgat gctattgctt tatttgtaac   1860
cattataagc tgcaataaac aagttaacaa caacaattgc attcatttta tgtttcaggt   1920 tcaggggag gtgtgggagg tttttttagtc gacaacatat cctggtgtgg agtaggggac   1980
gctgctctga cagaggctcg ggggcctgag ctggctctgt gagctgggga ggaggcagac   2040
agccaggcct tgtctgcaag cagacctggc agcattgggc tggccgcccc ccagggcctc   2100
ctcttcatgc ccagtgaatg actcaccttg gcacagacac aatgttcggg gtgggcacag   2160
tgcctgcttc ccgccgcacc ccagcccccc tcaaatgcct tccgagaagc ccattgagca   2220 ggggcttgc attgcacccc agcctgacag cctggcatct tgggataaaa gcagcacagc   2280
cccctagggg ctgcccttgc tgtgtggcgc caccggcggt ggagaacaag gctctattca   2340
gcctgtgccc aggaaagggg atcaggggat gcccaggcat ggacagtggg tgcagggg   2400 ggagaggagg gctgtctgct tcccagaagt ccaaggacac aaatgggtga ggggagagct   2460
ctccccatag ctgggctgcg gcccaacccc acccctcag gctatgccag gggtgttgc    2520 caggggcacc cgggcatcgc cagtctagcc cactccttca taaagccctc gcatcccagg   2580
agcgagcaga gccagagcag gttggagagg agacgcatca cctccgctgc tcgcttggtc   2640
gtgaggcact gggcaggtaa gtatcaaggt tacaagacag gtttaaggag accaatagaa   2700
actgggcttg tcggatccac ggcgacggtg ctagcgtcga ccagtggatc ctggaggctt   2760
gctgaaggct gtatgctgat gaacatggaa tccatgcagg ttttggccac tgactgacct   2820
gcatggtcca tgttcatcag gacacaaggc ctgttactag cactcacatg gaacaaatgg   2880
cccagatcct ggaggcttgc tgaaggctgt atgctgatga acatggaatc catgcaggtt   2940
ttggccactg actgacctgc atggtccatg ttcatcagga cacaaggcct gttactagca   3000
ctcacatgga acaaatggcc cagatctggc cgcactcgaa acgggccca tcgatagaga   3060 cagagaagac tcttgcgttt ctgataggca cctattggtc ttactgacat ccactttgcc   3120
tttctctcca caggtgtcca ctcgctagcg ccaccatggt gagcaagggc gaggaggata   3180
acatggccat catcaaggag ttcatgcgct tcaaggtgca catggagggc tccgtgaacg   3240
gccacgagtt cgagatcgag ggcgagggcg agggccgccc ctacgagggc acccagaccg   3300
ccaagctgaa ggtgaccaag ggtggcccc tgcccttcgc ctgggacatc ctgtcccctc    3360
agttcatgta cggctccaag gcctacgtga agcaccccgc cgacatcccc gactacttga   3420
agctgtcctt ccccgagggc ttcaagtggg agcgcgtgat gaacttcgag gacggcggcg   3480
tggtgaccgt gacccaggac tcctcccctgc aggacggcga gttcatctac aaggtgaagc   3540
tgcgcggcac caacttcccc tccgacgcc ccgtaatgca gaagaagacc atgggctggg    3600
aggcctcctc cgagcggatg taccccgagg acggcgccct gaagggcgag atcaagcaga   3660
ggctgaagct gaaggacggc ggccactacg acgctgaggt caagaccacc tacaaggcca   3720
agaagcccgt gcagctgccc ggcgcctaca acgtcaacat caagttggac atcacctccc   3780
```

| | |
|---|---|
| acaacgagga ctacaccatc gtggaacagt acgaacgcgc cgagggccgc cactccaccg | 3840 |
| gcggcatgga cgagctgtac aagtgacgta cggtcgacta gagctcgctg atcagcctcg | 3900 |
| actgtgcctt ctagttgcca gccatctgtt gtttgcccct ccccgtgcc ttccttgacc | 3960 |
| ctggaaggtg ccactcccac tgtcctttcc taataaaatg aggaaattgc atcgcattgt | 4020 |
| ctgagtaggt gtcattctat tctgggggt ggggtggggc aggacagcaa ggggaggat | 4080 |
| tgggaagaca atagcaggca tgctggggag agatctagga accctagtg atggagttgg | 4140 |
| ccactccctc tctgcgcgct cgctcgctca ctgaggccgc ccgggcaaag cccgggcgtc | 4200 |
| gggcgacctt tggtcgcccg gcctcagtga gcgagcgagc gcgcagagag ggagtggcca | 4260 |

<210> SEQ ID NO 13
<211> LENGTH: 470
<212> TYPE: DNA
<213> ORGANISM: Artificial Sequence
<220> FEATURE:
<223> OTHER INFORMATION: Synthetic Polynucleotide

<400> SEQUENCE: 13

| | |
|---|---|
| gagggccctg cgtatgagtg caagtgggtt ttaggaccag gatgaggcgg ggtgggggtg | 60 |
| cctacctgac gaccgacccc gacccactgg acaagcaccc aaccccatt ccccaaattg | 120 |
| cgcatcccct atcagagagg gggaggggaa acaggatgcg gcgaggcgcg tgcgcactgc | 180 |
| cagcttcagc accgcggaca gtgccttcgc ccccgcctgg cggcgcgcgc caccgccgcc | 240 |
| tcagcactga aggcgcgctg acgtcactcg ccggtccccc gcaaactccc cttcccggcc | 300 |
| accttggtcg cgtccgcgcc gccgccggcc cagccggacc gcaccacgcg aggcgcgaga | 360 |
| taggggggca cgggcgcgac catctgcgct gcggcgccgg cgactcagcg ctgcctcagt | 420 |
| ctgcggtggg cagcggagga gtcgtgtcgt gcctgagagc gcagtcgaga | 470 |

<210> SEQ ID NO 14
<211> LENGTH: 681
<212> TYPE: DNA
<213> ORGANISM: Artificial Sequence
<220> FEATURE:
<223> OTHER INFORMATION: Synthetic Polynucleotide

<400> SEQUENCE: 14

| | |
|---|---|
| aacatatcct ggtgtggagt aggggacgct gctctgacag aggctcgggg gcctgagctg | 60 |
| gctctgtgag ctggggagga ggcagacagc caggccttgt ctgcaagcag acctggcagc | 120 |
| attgggctgg ccgcccccca gggcctcctc ttcatgccca gtgaatgact cacccttggca | 180 |
| cagacacaat gttcggggtg ggcacagtgc ctgcttcccg ccgcacccca gccccctca | 240 |
| aatgccttcc gagaagccca ttgagcaggg ggcttgcatt gcaccccagc ctgacagcct | 300 |
| ggcatcttgg gataaaagca gcacagcccc ctaggggctg cccttgctgt gtggcgccac | 360 |
| cggcggtgga gaacaaggct ctattcagcc tgtgcccagg aaaggggatc aggggatgcc | 420 |
| caggcatgga cagtgggtgg caggggggga gaggagggct gtctgcttcc cagaagtcca | 480 |
| aggacacaaa tgggtgaggg gagagctctc cccatagctg ggctgcggcc caaccccacc | 540 |
| ccctcaggct atgccagggg gtgttgccag gggcacccgg gcatcgccag tctagcccac | 600 |
| tccttcataa agccctcgca tcccaggagc gagcagagcc agagcaggtt ggagaggaga | 660 |
| cgcatcacct ccgctgctcg c | 681 |

<210> SEQ ID NO 15
<211> LENGTH: 45

```
<212> TYPE: DNA
<213> ORGANISM: Artificial Sequence
<220> FEATURE:
<223> OTHER INFORMATION: Synthetic Polynucleotide

<400> SEQUENCE: 15
caggacacaa ggcctgttac tagcactcac atggaacaaa tggcc                    45

<210> SEQ ID NO 16
<211> LENGTH: 7071
<212> TYPE: DNA
<213> ORGANISM: Artificial Sequence
<220> FEATURE:
<223> OTHER INFORMATION: Synthetic Polynucleotide

<400> SEQUENCE: 16
tactcttcct ttttcaatat tattgaagca tttatcaggg ttattgtctc atgagcggat     60
acatatttga atgtatttag aaaaataaac aaataggggt tccgcgcaca tttccccgaa    120
aagtgccacc tgacgtctaa gaaaccatta ttatcatgac attaacctat aaaaataggc    180
gtatcacgag gccctttcgt ctcgcgcgtt tcggtgatga cggtgaaaac ctctgacaca    240
tgcagctccc ggagacggtc acagcttgtc tgtaagcgga tgccgggagc agacaagccc    300
gtcagggcgc gtcagcgggt gttggcgggt gtcggggctg gcttaactat gcggcatcag    360
agcagattgt actgagagtg caccataaaa ttgtaaacgt taatattttg ttaaaattcg    420
cgttaaattt ttgttaaatc agctcatttt ttaaccaata daccgaaatc ggcaaaatcc    480
cttataaatc aaaagaatag cccgagatag agttgagtgt tgttccagtt tggaacaaga    540
gtccactatt aaagaacgtg gactccaacg tcaagggcg aaaaaccgtc tatcagggcg    600
atggcccact acgtgaacca tcacccaaat caagtttttt ggggtcgagg tgccgtaaag    660
cactaaatcg gaaccctaaa gggagccccc gatttagagc ttgacgggga agccggcga    720 acgtggcgag aaaggaaggg aagaaagcga aggagcggg cgctaagcg ctggcaagtg    780 tagcggtcac gctgcgcgta accaccacac ccgccgcgct taatgcgccg ctacagggcg    840
cgtactatgg ttgctttgac gtatgcggtg tgaaataccg cacagatgcg taaggagaaa    900
ataccgcatc aggcgcccct gcaggcagct gcgcgctcgc tcgctcactg aggccgcccg    960
ggcaaagccc gggcgtcggg cgacctttgg tcgcccggcc tcagtgagcg agcgagcgcg   1020
cagagaggga gtggccaact ccatcactag gggttcctgc ggccagatct tcaatattgg   1080
ccattagcca tattattcat tggttatata gcataaatca atattggcta ttggccattg   1140
catacgttgt atctatatca taatatgtac atttatattg gctcatgtcc aatatgaccg   1200
ccatgttggc attgattatt gactagttat taatagtaat caattacggg gtcattagtt   1260
catagcccat atatggagtt ccgcgttaca aacttacgg taaatggccc gcctggctga   1320
ccgcccaacg accccgccc attgacgtca ataatgacgt atgttcccat agtaacgcca   1380
atagggactt tccattgacg tcaatgggtg gagtatttac ggtaaactgc ccacttggca   1440
gtacatcaag tgtatcatat gccaagtccg ccccctattg acgtcaatga cggtaaatgg   1500
cccgcctggc attatgccca gtacatgacc ttacgggact ttcctacttg gcagtacatc   1560
tacgtattag tcatcgctat taccatggtc gaggtgagcc ccacgttctg cttcactctc   1620
cccatctccc ccccctcccc accccaatt tgtatttat ttatttttta attatttgt      1680 gcagcgatgg gggcgggggg gggggggggg cgcgcgccag gcgggggggg gggggcgag   1740 gggcggggcg gggcgaggcg gagaggtgcg gcggcagcca atcagagcgg cgcgctccga   1800
```

```
aagtttcctt ttatggcgag gcggcggcgg cggcggccct ataaaaagcg aagcgcgcgg    1860
cgggcgggag tcgctgcgcg ctgccttcgc cccgtgcccc gctccgccgc cgcctcgcgc    1920
cgcccgcccc ggctctgact gaccgcgtta ctcccacagg tgagcgggcg ggacggccct    1980
tctcctccgg gctgtaatta gcgcttggtt taatgacggc ttgtttcttt tctgtggctg    2040
cgtgaaagcc ttgaggggct ccgggagggc cctttgtgcg gggggagcgg ctcggggggt    2100
gcgtgcgtgt gtgtgtgcgt ggggagcgcc gcgtgcggct ccgcgctgcc cggcggctgt    2160
gagcgctgcg ggcgcggcgc ggggctttgt gcgctccgca gtgtgcgcga ggggagcgcg    2220
gccgggggcg gtgccccgcg gtgcgggggg ggctgcgagg ggaacaaagg ctgcgtgcgg    2280
ggtgtgtgcg tgggggggtg agcaggggt gtgggcgcgt cggtcgggct gcaaccccccc    2340 ctgcacccccc ctccccgagt tgctgagcac ggcccggctt cgggtgcggg gctccgtacg    2400
gggcgtggcg cggggctcgc cgtgccgggc gggggtggc ggcaggtggg ggtgccgggc    2460
ggggcggggc cgcctcgggc cggggagggc tcggggagg ggcgcggcgg ccccccggagc    2520 gccggcggct gtcgaggcgc ggcgagccgc agccattgcc ttttatggta atcgtgcgag    2580
agggcgcagg gacttccttt gtcccaaatc tgtgcggagc cgaaatctgg gaggcgccgc    2640 cgcacccccct ctagcgggcg cggggcgaag cggtgcggcg ccggcaggaa ggaaatgggc    2700
ggggagggcc ttcgtgcgtc gccgcgccgc cgtcccctcc tccctctcca gcctcggggc    2760
tgtccgcggg gggacggctg ccttcggggg ggacggggca gggcggggtt cggcttctgg    2820
cgtgtgaccg gcggctctag agcctctgct aaccatgttc atgccttctt cttttttccta    2880 cagctcctgg gcaacgtgct ggttattgtg ctgtctcatc attttggcaa agaattcgat    2940
atcaagcttg ctagcgccac catgccgggg ttcctggttc gcatcctcct tctgctgctg    3000
gttctgctgc ttctgggccc tacgcgcggc ttgcgcaatg ccacccagag gatgtttgaa    3060
attgactata gccgggactc cttcctcaag gatggccagc catttcgcta catctcagga    3120
agcattcact actcccgtgt gccccgcttc tactggaagg accggctgct gaagatgaag    3180
atggctgggc tgaacgccat ccagacgtat gtgccctgga ctttcatga gccctggcca    3240 ggacagtacc agttttctga ggaccatgat gtggaatatt tcttcggct ggctcatgag    3300 ctgggactgc tggttatcct gaggcccggg ccctacatct gtgcagagtg ggaaatggga    3360
ggattacctg cttggctgct agagaaagag tctattcttc tccgctcctc cgacccagat    3420
tacctggcag ctgtggacaa gtggttggga gtccttctgc caagatgaa gcctctcctc    3480 tatcagaatg gagggccagt tataacagtg caggttgaaa atgaatatgg cagctacttt    3540
gcctgtgatt ttgactacct gcgcttcctg cagaagcgct ttcgccacca tctgggggat    3600
gatgtggttc tgtttaccac tgatggagca cataaaacat tcctgaaatg tggggccctg    3660
cagggcctct acaccacggt ggactttgga acaggcagca acatcacaga tgctttccta    3720
agccagagga agtgtgagcc caaaggaccc ttgatcaatt ctgaattcta tactggctgg    3780
ctagatcact ggggccaacc tcactccaca atcaagaccg aagcagtggc ttcctccctc    3840
tatgatatac ttgcccgtgg ggcgagtgtg aacttgtaca tgtttatagg tgggaccaat    3900
tttgcctatt ggaatgggc caactcaccc tatgcagcac agcccaccag ctacgactat    3960
gatgccccac tgagtgaggc tgggaccctc actgagaagt attttgctct gcgaaacatc    4020
atccagaagt ttgaaaaagt accagaaggt cctatccctc catctacacc aaagtttgca    4080
tatgaaaagg tcactttgga aaagttaaag acagtgggag cagctctgga cattctgtgt    4140
ccctctgggc ccatcaaaag cctttatccc ttgacattta tccaggtgaa acagcattat    4200
```

```
gggtttgtgc tgtaccggac aacacttcct caagattgca gcaacccagc acctctctct    4260
tcacccctca atggagtcca cgatcgagca tatgttgctg tggatgggat cccccaggga    4320
gtccttgagc gaaacaatgt gatcactctg aacataacag ggaaagctgg agccactctg    4380
gaccttctgg tagagaacat gggacgtgtg aactatggtg catatatcaa cgattttaag    4440
ggtttggttt ctaacctgac tctcagttcc aatatcctca cggactggac gatctttcca    4500
ctggacactg aggatgcagt gcgcagccac ctgggggget ggggacaccg tgacagtggc    4560
caccatgatg aagcctgggc ccacaactca tccaactaca cgctcccggc cttttatatg    4620
gggaacttct ccattcccag tgggatccca gacttgcccc aggacacctt tatccagttt    4680
cctggatgga ccaagggcca ggtctggatt aatggcttta accttggccg ctattggcca    4740
gcccggggcc ctcagttgac cttgtttgtg ccccagcaca tcctgatgac ctcggcccca    4800
aacaccatca ccgtgctgga actggagtgg gcaccctgca gcagtgatga tccagaacta    4860
tgtgctgtga cgttcgtgga caggccagtt attggctcat ctgtgaccta cgatcatccc    4920
tccaaacctg ttgaaaaaag actcatgccc ccaccccgc aaaaaaacaa agattcatgg    4980
ctggaccatg tatgactcga gtttttttt gcggccgctt cgagcagaca tgataagata    5040
cattgatgag tttggacaaa ccacaactag aatgcagtga aaaaaatgct ttatttgtga    5100
aatttgtgat gctattgctt tatttgtaac cattataagc tgcaataaac aagttaacaa    5160
caacaattgc attcatttta tgtttcaggt tcaggggag atgtgggagg tttttttaaag    5220 caagtaaaac ctctacaaat gtggtaaaat cgataggccg caggaacccc tagtgatgga    5280
gttggccact ccctctctgc gcgctcgctc gctcactgag gccgggcgac caaaggtcgc    5340
ccgacgcccg gcggcctca gtgagcgagc gagcgcgcag ctgcctgcag gacatgtgag    5400
caaaaggcca gcaaaggcc aggaaccgta aaaaggccgc gttgctggcg ttttccata    5460 ggctccgccc ccctgacgag catcacaaaa atcgacgctc aagtcagagg tggcgaaacc    5520
cgacaggact ataaagatac caggcgtttc cccctggaag ctccctcgtg cgctctcctg    5580
ttccgaccct gccgcttacc ggatacctgt ccgcctttct cccttcggga agcgtggcgc    5640
tttctcatag ctcacgctgt aggtatctca gttcggtgta ggtcgttcgc tccaagctgg    5700
gctgtgtgca cgaaccccc gttcagcccg accgctgcgc cttatccggt aactatcgtc    5760
ttgagtccaa cccggtaaga cacgacttat cgccactggc agcagccact ggtaacagga    5820
ttagcagagc gaggtatgta ggcggtgcta cagagttctt gaagtggtgg cctaactacg    5880
gctacactag aagaacagta tttggtatct gcgctctgct gaagccagtt accttcggaa    5940
aaagagttgg tagctcttga tccggcaaac aaaccaccgc tggtagcggt ggtttttttg    6000
tttgcaagca gcagattacg cgcagaaaaa aaggatctca agaagatcct ttgatctttt    6060
ctacggggtc tgacgctcag tggaacgaaa actcacgtta agggattttg gtcatgagat    6120
tatcaaaaag gatcttcacc tagatccttt taaattaaaa atgaagtttt aaatcaatct    6180
aaagtatata tgagtaaact tggtctgaca gttaccaatg cttaatcagt gaggcaccta    6240
tctcagcgat ctgtctattt cgttcatcca tagttgcctg actccccgtc gtgtagataa    6300
ctacgatacg ggagggctta ccatctggcc ccagtgctgc aatgataccg cgagacccac    6360
gctcaccggc tccagattta tcagcaataa accagccagc cggaagggcc gagcgcagaa    6420
gtggtcctgc aactttatcc gcctccatcc agtctattaa ttgttgccgg gaagctagag    6480
taagtagttc gccagttaat agtttgcgca acgttgttgc cattgctaca ggcatcgtgg    6540
```

```
tgtcacgctc gtcgtttggt atggcttcat tcagctccgg ttcccaacga tcaaggcgag    6600
ttacatgatc ccccatgttg tgcaaaaaag cggttagctc cttcggtcct ccgatcgttg    6660
tcagaagtaa gttggccgca gtgttatcac tcatggttat ggcagcactg cataattctc    6720
ttactgtcat gccatccgta agatgctttt ctgtgactgg tgagtactca accaagtcat    6780
tctgagaata gtgtatgcgg cgaccgagtt gctcttgccc ggcgtcaata cgggataata    6840
ccgcgccaca tagcagaact taaaagtgc tcatcattgg aaaacgttct cggggcgaa     6900 aactctcaag gatcttaccg ctgttgagat ccagttcgat gtaacccact cgtgcaccca    6960
actgatcttc agcatctttt actttcacca gcgtttctgg gtgagcaaaa acaggaaggc    7020
aaaatgccgc aaaaaaggga ataagggcga cacggaaatg ttgaatactc a            7071
```

<210> SEQ ID NO 17
<211> LENGTH: 6980
<212> TYPE: DNA
<213> ORGANISM: Artificial Sequence
<220> FEATURE:
<223> OTHER INFORMATION: Synthetic Polynucleotide

<400> SEQUENCE: 17

```
actcttcctt tttcaatatt attgaagcat ttatcagggt tattgtctca tgagcggata     60
catatttgaa tgtatttaga aaaataaaca aatagggggtt ccgcgcacat ttccccgaaa    120
agtgccacct gacgtctaag aaaccattat tatcatgaca ttaacctata aaaataggcg    180
tatcacgagg ccctttcgtc tcgcgcgttt cggtgatgac ggtgaaaacc tctgacacat    240
gcagctcccg gagacggtca cagcttgtct gtaagcggat gccgggagca gacaagcccg    300
tcagggcgcg tcagcgggtg ttggcgggtg tcggggctgg cttaactatg cggcatcaga    360
gcagattgta ctgagagtgc accataaaat tgtaaacgtt aatattttgt taaaattcgc    420
gttaaatttt tgttaaatca gctcattttt taaccaatag accgaaatcg caaaatccc     480 ttataaatca aaagaatagc ccgagataga ggttgagtgtt gttccagttt ggaacaagag    540
tccactatta agaacgtgg actccaacgt caaagggcga aaaccgtct atcagggcga     600 tggcccacta cgtgaaccat cacccaaatc aagttttttg gggtcgaggt gccgtaaagc    660
actaaatcgg aaccctaaag ggagcccccg atttagagct tgacggggaa agccggcgaa    720
cgtggcgaga aggaaggga agaaagcgaa aggagcgggc gctaaggcgc tggcaagtgt    780
agcggtcacg ctgcgcgtaa ccaccacacc cgccgcgctt aatgcgccgc tacagggcgc    840
gtactatggt tgctttgacg tatgcggtgt gaaataccgc acagatgcgt aaggagaaaa    900
taccgcatca ggcgcccctg caggcagctg cgcgctcgct cgctcactga ggccgcccgg    960
gcaaagcccg ggcgtcgggc gacctttggt cgcccggcct cagtgagcga gcgagcgcgc   1020
agagagggag tggccaactc catcactagg ggttcctgcg gccagatctt caatattggc   1080
cattagccat attattcatt ggttatatag cataaatcaa tattggctat ggccattgc    1140 atacgttgta tctatatcat aatatgtaca tttatattgg ctcatgtcca atatgaccgc   1200
catgttggca ttgattattg actagttatt aatagtaatc aattacgggg tcattagttc   1260
atagcccata tatggagttc cgcgttacat aacttacggt aaatggcccg cctggctgac   1320
cgcccaacga cccccgccca ttgacgtcaa taatgacgta tgttcccata gtaacgccaa   1380
tagggacttt ccattgacgt caatgggtgg agtatttacg gtaaactgcc cacttggcag   1440
tacatcaagt gtatcatatg ccaagtccgc ccctattga cgtcaatgac ggtaaatggc   1500
ccgcctggca ttatgcccag tacatgacct tacgggactt tcctacttgg cagtacatct   1560
```

```
acgtattagt catcgctatt accatggtcg aggtgagccc cacgttctgc ttcactctcc   1620
ccatctcccc cccctcccca cccccaattt tgtatttatt tattttttaa ttattttgtg   1680
cagcgatggg ggcggggggg gggggggggc gcgcgccagg cggggcgggg cggggcgagg   1740
ggcggggcgg ggcgaggcgg agaggtgcgg cggcagccaa tcagagcggc gcgctccgaa   1800
agtttccttt tatggcgagg cggcggcggc ggcggcccta taaaaagcga agcgcgcggc   1860
gggcgggagt cgctgcgcgc tgccttcgcc ccgtgccccg ctccgccgcc gcctcgcgcc   1920
gcccgccccg gctctgactg accgcgttac tcccacaggt gagcgggcgg gacggccctt   1980
ctcctccggg ctgtaattag cgcttggttt aatgacggct tgtttctttt ctgtggctgc   2040
gtgaaagcct tgaggggctc cgggagggcc ctttgtgcgg ggggagcggc tcgggggggtg   2100 cgtgcgtgtg tgtgtgcgtg gggagcgccg cgtgcggctc cgcgctgccc ggcggctgtg   2160
agcgctgcgg gcgcggcgcg gggctttgtg cgctccgcag tgtgcgcgag gggagcgcgg   2220 ccggggggcgg tgccccgcgg tgcgggggggg gctgcgaggg gaacaaaggc tgcgtgcggg   2280
gtgtgtgcgt ggggggggtga gcaggggggtg tgggcgcgtc ggtcgggctg caacccccccc   2340 tgcacccccc tccccgagtt gctgagcacg gcccggcttc gggtgcgggg ctccgtacgg   2400
ggcgtggcgc ggggctcgcc gtgccgggcg ggggggtggcg gcaggtgggg gtgccgggcg   2460
gggcggggcc gcctcgggcc ggggagggct cggggggaggg gcgcggcggc ccccggagcg   2520
ccggcggctg tcgaggcgcg gcgagccgca gccattgcct tttatggtaa tcgtgcgaga   2580
gggcgcaggg acttcctttg tcccaaatct gtgcggagcc gaaatctggg aggcgccgcc   2640
gcaccccctc tagcgggcgc ggggcgaagc ggtgcggcgc cggcaggaag gaaatgggcg   2700
gggagggcct tcgtgcgtcg ccgcgccgcc gtccccttct ccctctccag cctcggggct   2760
gtccgcgggg ggacggctgc cttcggggggg gacggggcag ggcggggttc ggcttctggc   2820
gtgtgaccgg cggctctaga gcctctgcta accatgttca tgccttcttc tttttcctac   2880
agctcctggg caacgtgctg gttattgtgc tgtctcatca ttttggcaaa gaattcgata   2940
tcaagcttgc tagcccacca tgctccgggt cccctgtgt acgccgctcc cgctcctggc   3000
actgctgcaa ctgctgggcg ctgcgcacgg catctataat gtcacccaga ggacatttaa   3060
gctcgactac agccgggacc gcttcctcaa ggatggacag ccattccgat acatctcggg   3120
aagcattcat tacttccgga taccccgctt ctactgggag gaccggctgc tgaagatgaa   3180
gatggctggg ctgaatgcta tccagatgta cgtgccctgg aacttccatg aaccccaacc   3240
aggacaatat gagttttctg gggaccgtga tgtggagcat ttcatccagc tggctcatga   3300
gctgggactc ctggtgatcc tgaggcctgg gccctacatc tgtgcagagt gggacatggg   3360
gggcttacct gcttggctac tagagaaaca atctatcgtt ctccggtctt ctgacccaga   3420
ctaccttgta gctgtggata aatggctggc agtccttctg cccaagatga agccctgct   3480 ctaccagaac ggaggaccga tcataaccgt gcaggttgag aatgagtacg gtcctactt   3540 tgcctgcgat tacgactacc tacgcttcct ggtgcaccgc ttccgctacc atctgggtaa   3600
tgacgtcatt ctcttcacca ccgacggagc aagtgaaaaa atgctgaagt gtgggacct   3660 gcaggacctg tacgccacag tggattttgg aacaggcaac aatatcacac aagctttcct   3720
ggtccagagg aagtttgaac ctaaaggacc tttgatcaat tctgagttct atactggctg   3780
gctagaccac tggggtaaac cccattccac ggtgaaaact aaaacactgg ctacctccct   3840
ctataacctg cttgcccgtg gggccaacgt gaacttgtac atgtttatag gtgggaccaa   3900
```

-continued

```
ttttgcctat tggaatggtg ccaacacgcc ctatgagcca cagcccacca gctatgacta   3960
cgacgcccca ctgagcgagg ctggggacct cactaagaag tattttgctc ttcgagaagt   4020
cattcagatg tttaaagaag tcccagaagg ccctatccct ccgtctacac ccaaatttgc   4080
atatggaaaa gttgctctga aaagttcaa gacagtggct gaagctctgg gtatcctgtg    4140
tcccaatggg ccagtgaaaa gcctctatcc cctgacattc actcaggtaa acagtatt    4200
tgggtatgtg ctgtaccgaa caacgcttcc tcaagattgc agtaacccga aacccatttt   4260
ctcttcaccc ttcaatggtg tccgtgatcg ggcttacgtc tctgtggacg gggtccccca   4320
aggaatcctt gatcgaaacc tcatgacagc tctgaacata cggggaagg ctggagccac    4380
gctggacatc ctggtggaga acatggggcg tgtgaactat ggcagattca tcaatgactt   4440
caagggtttg atttccaaca tgactatcaa ctccactgtc ctcaccaact ggacggtctt   4500
cccactgaac actgaggcca tggtacgcaa ccatctctgg ggcgggagg ccagtgatga    4560
gggtcacctt gacggacggt cgacctccaa ttcttcggac ctcatactcc ccaccttta    4620
cgtgggcaac ttctccatcc cctcgggcat cccagacctg ccacaggaca ccttcatcca   4680
gtttcctggg tggtccaagg gtcaagtatg gatcaatggc tttaacctcg gccgatactg   4740
gcccacaatg ggcccacaaa agaccttgtt cgtgccaagg aacatcctga ccacttcagc   4800
cccaaacaac atcacagtgt tggagctaga gtttgcaccc tgcagcgagg ggaccccaga   4860
gctgtgtaca gtagagtttg ttgacactcc ggtcatttcc tgactcgagt tttttttgc    4920
ggccgcttcg agcagacatg ataagataca ttgatgagtt tggacaaacc acaactagaa   4980
tgcagtgaaa aaaatgcttt atttgtgaaa tttgtgatgc tattgcttta tttgtaacca   5040
ttataagctg caataaacaa gttaacaaca caattgcat tcattttatg tttcaggttc     5100
agggggagat gtgggaggtt ttttaaagca agtaaaacct ctacaaatgt ggtaaaatcg   5160
ataggccgca ggaaccccta gtgatggagt tggccactcc ctctctgcgc gctcgctcgc   5220
tcactgaggc cgggcgacca aaggtcgccc gacgcccggg cggcctcagt gagcgagcga   5280
gcgcgcagct gcctgcagga catgtgagca aaaggccagc aaaaggccag gaaccgtaaa   5340
aaggccgcgt tgctggcgtt tttccatagg ctccgccccc ctgacgagca tcacaaaaat   5400
cgacgctcaa gtcagaggtg gcgaaacccg acaggactat aaagatacca ggcgtttccc   5460
cctggaagct ccctcgtgcg ctctcctgtt ccgaccctgc cgcttaccgg atacctgtcc   5520
gcctttctcc cttcgggaag cgtggcgctt tctcatagct cacgctgtag gtatctcagt   5580
tcggtgtagg tcgttcgctc caagctgggc tgtgtgcacg aacccccgt tcagcccgac    5640
cgctgcgcct tatccggtaa ctatcgtctt gagtccaacc cggtaagaca cgacttatcg   5700
ccactggcag cagccactgg taacaggatt agcagagcga gtatgtagg cggtgctaca    5760
gagttcttga agtggtggcc taactacggc tacactagaa gaacagtatt tggtatctgc   5820
gctctgctga agccagttac cttcggaaaa agagttggta gctcttgatc cggcaaacaa   5880
accaccgctg gtagcggtgg ttttttgtt tgcaagcagc agattacgcg cagaaaaaaa    5940
ggatctcaag aagatccttt gatcttttct acggggtctg acgctcagtg aacgaaaac    6000
tcacgttaag ggattttggt catgagatta tcaaaaagga tcttcaccta gatccttta    6060
aattaaaaat gaagttttaa atcaatctaa agtatatatg agtaaacttg gtctgacagt   6120
taccaatgct taatcagtga ggcacctatc tcagcgatct gtctatttcg ttcatccata   6180
gttgcctgac tccccgtcgt gtagataact acgatacggg agggcttacc atctggcccc   6240
agtgctgcaa tgataccgcg agacccacgc tcaccggctc cagatttatc agcaataaac   6300
```

```
cagccagccg aagggccga gcgcagaagt ggtcctgcaa ctttatccgc ctccatccag    6360
tctattaatt gttgccggga agctagagta agtagttcgc cagttaatag tttgcgcaac    6420
gttgttgcca ttgctacagg catcgtggtg tcacgctcgt cgtttggtat ggcttcattc    6480
agctccggtt cccaacgatc aaggcgagtt acatgatccc ccatgttgtg caaaaaagcg    6540
gttagctcct tcggtcctcc gatcgttgtc agaagtaagt tggccgcagt gttatcactc    6600
atggttatgg cagcactgca taattctctt actgtcatgc catccgtaag atgcttttct    6660
gtgactggtg agtactcaac caagtcattc tgagaatagt gtatgcggcg accgagttgc    6720
tcttgcccgg cgtcaatacg ggataatacc gcgccacata gcagaacttt aaaagtgctc    6780
atcattggaa aacgttcttc ggggcgaaaa ctctcaagga tcttaccgct gttgagatcc    6840
agttcgatgt aacccactcg tgcacccaac tgatcttcag catcttttac tttcaccagc    6900
gtttctgggt gagcaaaaac aggaaggcaa aatgccgcaa aaaagggaat aagggcgaca    6960
cggaaatgtt gaatactcat                                                6980

<210> SEQ ID NO 18
<211> LENGTH: 5852
<212> TYPE: DNA
<213> ORGANISM: Artificial Sequence
<220> FEATURE:
<223> OTHER INFORMATION: Synthetic Polynucleotide

<400> SEQUENCE: 18
ttggccactc cctctctgcg cgctcgctcg ctcactgagg ccgggcgacc aaaggtcgcc      60
cgacgcccgg gctttgcccg gcggcctca gtgagcgagc gagcgcgcag agagggagtg     120
gccaactcca tcactagggg ttcctagatc tgaattctct agtccacgtt ctgcttcact     180
ctccccatct ccccccctc cccaccccca attttgtatt tatttatttt ttaattattt     240
tgtgcagcga tgggggcggg gggggggggc gcgcgccagg cggggcgggg cgggcgagg     300 ggcggggcgg ggcgaggcgg agaggtgcgg cggcagccaa tcagagcggc gcgctccgaa     360
agtttccttt tatggcgagg cggcggcggc ggcggcccta taaaaagcga agcgcgcggc     420
ggggtcggcc gcggggagtc gctgcgacgc tgccttcgcc ccgtgccccg ctccgccgcc     480
gcctcgcgcc gcccgccccg gctctgactg accgcgttac tcccacaggt gagcgggcgg     540
gacggccctt ctcctccggg ctgtaattag cgcttggttt aatgacggct tgtttctttt     600
ctgtggctgc gtgaaagcct tgaggggctc cgggagctag agcctctgct aaccatgttc     660
atgccttctt cttttttccta cagctcctgg caacgtgct ggttattgtg ctgtctcatc     720
attttggcaa agaattcctc gaagatccga aggggttcaa ctagtggagc accatgacaa     780
gttccaggct ttggttttcg ctgctgctgg cggcagcgtt cgcaggacgg gcgacggcc     840 tctggccctg gcctcagaac ttccaaacct ccgaccagcg ctacgtcctt taccccgaaca    900 actttcaatt ccagtacgat gtcagctcgg ccgcgcagcc cggctgctca gtcctcgacg    960
aggccttcca gcgctatcgt gacctgcttt tcggttccgg gtcttggccc cgtccttacc   1020
tcacagggaa acggcataca ctggagaaga atgtgttggt tgtctctgta gtcacacctg   1080
gatgtaacca gcttcctact ttggagtcag tggagaatta tacctgacc ataaatgatg    1140 accagtgttt actcctctct gagactgtct ggggagctct ccgaggtctg gagactttta   1200
gccagcttgt ttgaaatct gctgagggca cattctttat caacaagact gagattgagg    1260 actttcccg ctttcctcac cggggcttgc tgttggatac atctcgccat tacctgccac    1320
```

-continued

```
tctctagcat cctggacact ctggatgtca tggcgtacaa taaattgaac gtgttccact      1380
ggcatctggt agatgatcct tccttcccat atgagagctt cacttttcca gagctcatga      1440
gaaagggggtc ctacaaccct gtcacccaca tctacacagc acaggatgtg aaggaggtca     1500
ttgaatacgc acggctccgg ggtatccgtg tgcttgcaga gtttgacact cctggccaca     1560
cttttgtcctg gggaccaggt atccctggat tactgactcc ttgctactct gggtctgagc    1620
cctctggcac ctttggacca gtgaatccca gtctcaataa tacctatgag ttcatgagca     1680
cattcttctt agaagtcagc tctgtcttcc cagattttta tcttcatctt ggaggagatg     1740
aggttgattt cacctgctgg aagtccaacc cagagatcca ggactttatg aggaagaaag     1800
gcttcggtga ggacttcaag cagctggagt ccttctacat ccagacgctg ctggacatcg     1860
tctcttctta tggcaagggc tatgtggtgt ggcaggaggt gtttgataat aaagtaaaga     1920
ttcagccaga cacaatcata caggtgtggc gagaggatat tccagtgaac tatatgaagg     1980
agctggaact ggtcaccaag gccggcttcc gggcccttct ctctgccccc tggtacctga     2040
accgtatatc ctatggccct gactggaagg atttctacat agtggaaccc ctggcatttg     2100
aaggtacccc tgagcagaag gctctggtga ttggtggaga ggcttgtatg tggggagaat     2160
atgtggacaa cacaaacctg gtccccaggc tctggcccag agcaggggct gttgccgaaa     2220
ggctgtggag caacaagttg acatctgacc tgacatttgc ctatgaacgt ttgtcacact     2280
tccgctgtga gttgctgagg cgaggtgtcc aggcccaacc cctcaatgta ggcttctgtg     2340
agcaggagtt tgaacagacc tgactcgagc tagcggccgc agagatccag acatgataag     2400
atacattgat gagtttggac aaaccacaac tagaatgcag tgaaaaaaat gctttatttg     2460
tgaaatttgt gatgctattg ctttatttgt aaccattata agctgcaata aacaagttaa     2520
caacaacaat tgcattcatt ttatgtttca ggttcagggg gaggtgtggg aggtttttta     2580
gtcgactaga gctcgctgat cagcctcgac tgtgccttct agttgccagc catctgttgt     2640
ttgcccctcc cccgtgcctt ccttgaccct ggaaggtgcc actcccactg tcctttccta     2700
ataaaatgag gaaattgcat cgcattgtct gagtaggtgt cattctattc tggggggtgg     2760
ggtggggcag gacagcaagg gggaggattg gaagacaat agcaggcatg ctggggagag     2820
atctgaggaa cccctagtga tggagttggc cactccctct ctgcgcgctc gctcgctcac     2880
tgaggccgcc cggcaaagc ccgggcgtcg ggcgaccttt ggtcgcccgg cctcagtgag     2940
cgagcgagcg cgcagagagg gagtggccat gcagccagct ggcgtaatag cgaagaggcc     3000
cgcaccgatc gcccttccca acagttgcgc agcctgaatg gcgaatggac gcgacgcgcc     3060
ctgtagcggc gcattaagcg cggcgggtgt ggtggttacg cgcagcgtga ccgctacact     3120
tgccagcgcc ctagcgcccg ctcctttcgc tttcttccct tcctttctcg ccacgttcgc     3180
cggctttccc cgtcaagctc taaatcgggg gctcccttta gggttccgat ttagtgcttt     3240
acggcacctc gaccccaaaa aacttgatta gggtgatggt tcacgtagtg gccatcgcc     3300
ctgatagacg gtttttcgcc ctttgacgtt ggagtccacg ttctttaata gtggactctt     3360
gttccaaact ggaacaacac tcaaccctat ctcggtctat tcttttgatt tataagggat     3420
tttgccgatt tcggcctatt ggttaaaaaa tgagctgatt taacaaaaat ttaacgcgaa     3480
ttttaacaaa atattaacgc ttacaatttc ctgatgcggt attttctcct tacgcatctg     3540
tgcggtattt cacaccgcat atggtgcact ctcagtacaa tctgctctga tgccgcatag     3600
ttaagccagc cccgacaccc gccaacaccc gctgacgcgc cctgacgggc ttgtctgctc     3660
ccggcatccg cttacagaca agctgtgacc gtctccggga gctgcatgtg tcagaggttt     3720
```

```
tcaccgtcat caccgaaacg cgcgagacga aagggcctcg tgatacgcct attttatag    3780 gttaatgtca tgataataat ggtttcttag acgtcaggtg gcacttttcg gggaaatgtg   3840
cgcggaaccc ctatttgttt attttctaa atacattcaa atatgtatcc gctcatgaga    3900
caataaccct gataaatgct tcaataatat tgaaaaagga agagtatgag tattcaacat   3960
ttccgtgtcg cccttattcc cttttttgcg gcattttgcc ttcctgtttt tgctcaccca   4020
gaaacgctgg tgaaagtaaa agatgctgaa gatcagttgg gtgcacgagt gggttacatc   4080
gaactggatc tcaacagcgg taagatcctt gagagttttc gccccgaaga acgttttcca   4140
atgatgagca cttttaaagt tctgctatgt ggcgcggtat tatcccgtat tgacgccggg   4200
caagagcaac tcggtcgccg catacactat tctcagaatg acttggttga gtactcacca   4260
gtcacagaaa agcatcttac ggatggcatg acagtaagag aattatgcag tgctgccata   4320
accatgagtg ataacactgc ggccaactta cttctgacaa cgatcggagg accgaaggag   4380
ctaaccgctt ttttgcacaa catgggggat catgtaactc gccttgatcg ttgggaaccg   4440
gagctgaatg aagccatacc aaacgacgag cgtgacacca cgatgcctgt agcaatggca   4500
acaacgttgc gcaaactatt aactggcgaa ctacttactc tagcttcccg gcaacaatta   4560
atagactgga tggaggcgga taaagttgca ggaccacttc tgcgctcggc ccttccggct   4620
ggctggttta ttgctgataa atctggagcc ggtgagcgtg ggtctcgcgg tatcattgca   4680
gcactggggc cagatggtaa gccctcccgt atcgtagtta tctacacgac ggggagtcag   4740
gcaactatgg atgaacgaaa tagacagatc gctgagatag gtgcctcact gattaagcat   4800
tggtaactgt cagaccaagt ttactcatat atactttaga ttgatttaaa acttcatttt   4860
taatttaaaa ggatctaggt gaagatcctt tttgataatc tcatgaccaa aatcccttaa   4920
cgtgagtttt cgttccactg agcgtcagac cccgtagaaa agatcaaagg atcttcttga   4980 gatcctttttt ttctgcgcgt aatctgctgc ttgcaaacaa aaaaaccacc gctaccagcg   5040
gtggtttgtt tgccggatca agagctacca actctttttc cgaaggtaac tggcttcagc   5100
agagcgcaga taccaaatac tgttcttcta gtgtagccgt agttaggcca ccacttcaag   5160
aactctgtag caccgcctac atacctcgct ctgctaatcc tgttaccagt ggctgctgcc   5220
agtggcgata gtcgtgtct taccgggttg gactcaagac gatagttacc ggataaggcg   5280
cagcggtcgg gctgaacggg gggttcgtgc acacagccca gcttggagcg aacgacctac   5340
accgaactga gatacctaca gcgtgagcta tgagaaagcg ccacgcttcc cgaagggaga   5400
aaggcggaca ggtatccggt aagcggcagg gtcggaacag gagagcgcac gagggagctt   5460
ccagggggaa acgcctggta tctttatagt cctgtcgggt ttcgccacct ctgacttgag   5520
cgtcgatttt tgtgatgctc gtcagggggg cggagcctat ggaaaaacgc cagcaacgcg   5580
gcctttttac ggttcctggc cttttgctgg ccttttgctc acatgttctt tcctgcgtta   5640
tcccctgatt ctgtggataa ccgtattacc gcctttgagt gagctgatac cgctcgccgc   5700
agccgaacga ccgagcgcag cgagtcagtg agcgaggaag cggaagagcg cccaatacgc   5760
aaaccgcctc tccccgcgcg ttggccgatt cattaatgca ggctgggctg caggggggg    5820 gggggggggg gggtggggg gggggggggg gg                                  5852
```

<210> SEQ ID NO 19
<211> LENGTH: 5928
<212> TYPE: DNA
<213> ORGANISM: Artificial Sequence
<220> FEATURE:

<223> OTHER INFORMATION: Synthetic Polynucleotide

<400> SEQUENCE: 19

| | |
|---|---|
| ttggccactc cctctctgcg cgctcgctcg ctcactgagg ccgggcgacc aaaggtcgcc | 60 |
| cgacgcccgg gctttgcccg ggcggcctca gtgagcgagc gagcgcgcag agagggagtg | 120 |
| gccaactcca tcactagggg ttcctagatc tgaattctct agtccacgtt ctgcttcact | 180 |
| ctccccatct ccccccctc cccaccccca attttgtatt tatttatttt ttaattattt | 240 |
| tgtgcagcga tgggggcggg gggggggggc gcgcgccagg cggggcgggg cggggcgagg | 300 |
| ggcggggcgg ggcgaggcgg agaggtgcgc cggcagccaa tcagagcggc gcgctccgaa | 360 |
| agtttccttt tatggcgagg cggcggcggc ggcggcccta taaaaagcga agcgcgcggc | 420 |
| ggggtcggcc gcggggagtc gctgcgacgc tgccttcgcc ccgtgccccg ctccgccgcc | 480 |
| gcctcgcgcc gcccgccccg gctctgactg accgcgttac tcccacaggt gagcgggcgg | 540 |
| gacggcccct tctcctccggg ctgtaattag cgcttggttt aatgacggct tgtttctttt | 600 |
| ctgtggctgc gtgaaagcct tgaggggctc cgggagctag agcctctgct aaccatgttc | 660 |
| atgccttctt ctttttccta cagctcctgg gcaacgtgct ggttattgtg ctgtctcatc | 720 |
| attttggcaa agaattcctc gaagatccga aggggttcaa ctagtggagc accatggagc | 780 |
| tgtgcgggct ggggctgccc cggccgccca tgctgctggc gctgctgttg gcgacactgc | 840 |
| tggcggcgat gttggcgctg ctgactcagg tggcgctggt ggtgcaggtg gcggaggcgg | 900 |
| ctcgggcccc gagcgtctcg gccaagccgg ggccggcgct gtggcccctg ccgctctcgg | 960 |
| tgaagatgac cccgaacctg ctgcatctcg ccccggagaa cttctacatc agccacagcc | 1020 |
| ccaattccac ggcgggcccc tcctgcaccc tgctggagga agcgtttcga cgatatcatg | 1080 |
| gctatatttt tggtttctac aagtggcatc atgaacctgc tgaattccag gctaaaaccc | 1140 |
| aggttcagca acttcttgtc tcaatcaccc ttcagtcaga gtgtgatgct ttccccaaca | 1200 |
| tatcttcaga tgagtcttat actttacttg tgaaagaacc agtggctgtc cttaaggcca | 1260 |
| acagagtttg gggagcatta cgaggtttag agacctttag ccagttagtt tatcaagatt | 1320 |
| cttatggaac tttcaccatc aatgaatcca ccattattga ttctccaagg tttttctcaca | 1380 |
| gaggaatttt gattgataca tccagacatt atctgccagt taagattatt cttaaaactc | 1440 |
| tggatgccat ggcttttaat aagtttaatg ttcttcactg gcacatagtt gatgaccagt | 1500 |
| ctttcccata tcagagcatc acttttcctg agttaagcaa taaggaagc tattctttgt | 1560 |
| ctcatgttta tacaccaaat gatgtccgta tggtgattga atatgccaga ttacgaggaa | 1620 |
| ttcgagtcct gccagaattt gatacccctg gcatacact atcttgggga aaaggtcaga | 1680 |
| aagacctcct gactccatgt acagtagac aaaacaagtt ggactctttt ggacctataa | 1740 |
| accctactct gaatacaaca tacagcttcc ttactacatt tttcaaagaa attagtgagg | 1800 |
| tgtttccaga tcaattcatt catttgggag gagatgaagt ggaatttaaa tgttgggaat | 1860 |
| caaatccaaa aattcaagat ttcatgaggc aaaaaggctt tggcacagat tttaagaaac | 1920 |
| tagaatcttt ctacattcaa aaggttttgg atattattgc aaccataaac aagggatcca | 1980 |
| ttgtctggca ggaggttttt gatgataaag caaagcttgc gccgggcaca atagttgaag | 2040 |
| tatggaaaga cagcgcatat cctgaggaac tcagtagagt cacagcatct ggcttccctg | 2100 |
| taatcctttc tgctccttgg tacttagatt tgattagcta tggacaagat tggaggaaat | 2160 |
| actataaagt ggaacctctt gatttttggcg gtactcagaa acagaaacaa cttttcattg | 2220 |
| gtggagaagc ttgtctatgg ggagaatatg tggatgcaac taacctcact ccaagattat | 2280 |

```
ggcctcgggc aagtgctgtt ggtgagagac tctggagttc caaagatgtc agagatatgg    2340
atgacgccta tgacagactg acaaggcacc gctgcaggat ggtcgaacgt ggaatagctg    2400
cacaacctct ttatgctgga tattgtaacc atgagaacat gtaactcgag ctagcggccg    2460
cagagatcca gacatgataa gatacattga tgagtttgga caaaccacaa ctagaatgca    2520
gtgaaaaaaa tgctttattt gtgaaatttg tgatgctatt gctttatttg taaccattat    2580
aagctgcaat aaacaagtta acaacaacaa ttgcattcat tttatgtttc aggttcaggg    2640
ggaggtgtgg gaggtttttt agtcgactag agctcgctga tcagcctcga ctgtgccttc    2700
tagttgccag ccatctgttg tttgcccctc cccgtgcct tccttgaccc tggaaggtgc     2760
cactcccact gtccttcct aataaaatga ggaaattgca tcgcattgtc tgagtaggtg     2820
tcattctatt ctgggggtg gggtgggca ggacagcaag gggaggatt gggaagacaa       2880 tagcaggcat gctggggaga gatctgagga accctagtg atggagttgg ccactccctc    2940
tctgcgcgct cgctcgctca ctgaggccgc ccgggcaaag cccggcgtc gggcgacctt    3000 tggtcgcccg gcctcagtga gcgagcgagc gcgcagagag ggagtggcca tgcagccagc    3060
tggcgtaata gcgaagaggc ccgcaccgat cgcccttccc aacagttgcg cagcctgaat    3120
ggcgaatgga cgcgacgcgc cctgtagcgg cgcattaagc gcggcgggtg tggtggttac    3180
gcgcagcgtg accgctacac ttgccagcgc cctagcgccc gctcctttcg ctttcttccc    3240
ttcctttctc gccacgttcg ccggctttcc ccgtcaagct ctaaatcggg ggctcccttt    3300
agggttccga tttagtgctt tacggcacct cgaccccaaa aaacttgatt agggtgatgg    3360
ttcacgtagt gggccatcgc cctgatagac ggttttcgc cctttgacgt tggagtccac     3420
gttctttaat agtggactct tgttccaaac tggaacaaca ctcaaccccta tctcggtcta    3480 ttcttttgat ttataaggga ttttgccgat ttcggcctat tggttaaaaa atgagctgat    3540
ttaacaaaaa tttaacgcga attttaacaa aatattaacg cttacaattt cctgatgcgg    3600
tattttctcc ttacgcatct gtgcggtatt tcacaccgca tatggtgcac tctcagtaca    3660
atctgctctg atgccgcata gttaagccag ccccgacacc cgccaacacc cgctgacgcg    3720
ccctgacggg cttgtctgct cccggcatcc gcttacagac aagctgtgac cgtctccggg    3780
agctgcatgt gtcagaggtt ttcaccgtca tcaccgaaac gcgcgagacg aaagggcctc    3840
gtgatacgcc tatttttata ggttaatgtc atgataataa tggtttctta cgtcaggt     3900 ggcacttttc ggggaaatgt gcgcggaacc cctatttgtt tatttttcta atacattca     3960 aatatgtatc cgctcatgag acaataaccc tgataaatgc ttcaataata ttgaaaaagg    4020
aagagtatga gtattcaaca tttccgtgtc gcccttattc ccttttttgc ggcattttgc    4080
cttcctgttt ttgctcaccc agaaacgctg gtgaaagtaa aagatgctga agatcagttg    4140
ggtgcacgag tgggttacat cgaactggat ctcaacagcg gtaagatcct tgagagtttt    4200
cgccccgaag aacgttttcc aatgatgagc acttttaaag ttctgctatg tggcgcggta    4260
ttatcccgta ttgacgccgg gcaagagcaa ctcggtcgcc gcatacacta ttctcagaat    4320
gacttggttg agtactcacc agtcacagaa aagcatctta cggatggcat gacagtaaga    4380
gaattatgca gtgctgccat aaccatgagt gataacactg cggccaactt acttctgaca    4440
acgatcggag gaccgaagga gctaaccgct ttttgcaca acatggggga tcatgtaact    4500
cgccttgatc gttgggaacc ggagctgaat gaagccatac caaacgacga gcgtgacacc    4560
acgatgcctg tagcaatggc aacaacgttg cgcaaactat taactggcga actacttact    4620
```

-continued

```
ctagcttccc ggcaacaatt aatagactgg atggaggcgg ataaagttgc aggaccactt    4680
ctgcgctcgg cccttccggc tggctggttt attgctgata atctggagc cggtgagcgt     4740 gggtctcgcg gtatcattgc agcactgggg ccagatggta agccctcccg tatcgtagtt    4800
atctacacga cggggagtca ggcaactatg gatgaacgaa atagacagat cgctgagata    4860
ggtgcctcac tgattaagca ttggtaactg tcagaccaag tttactcata tatactttag    4920
attgatttaa aacttcattt ttaatttaaa aggatctagg tgaagatcct ttttgataat    4980
ctcatgacca aaatccctta acgtgagttt tcgttccact gagcgtcaga ccccgtagaa    5040
aagatcaaag gatcttcttg agatcctttt tttctgcgcg taatctgctg cttgcaaaca    5100
aaaaaaccac cgctaccagc ggtggtttgt ttgccggatc aagagctacc aactcttttt    5160
ccgaaggtaa ctggcttcag cagagcgcag ataccaaata ctgttcttct agtgtagccg    5220
tagttaggcc accacttcaa gaactctgta gcaccgccta catacctcgc tctgctaatc    5280
ctgttaccag tggctgctgc cagtggcgat aagtcgtgtc ttaccgggtt ggactcaaga    5340
cgatagttac cggataaggc gcagcggtcg ggctgaacgg ggggttcgtg cacacagccc    5400
agcttggagc gaacgaccta caccgaactg agatacctac agcgtgagct atgagaaagc    5460
gccacgcttc ccgaagggag aaaggcggac aggtatccgg taagcggcag ggtcggaaca    5520
ggagagcgca cgagggagct tccaggggga acgcctggt atctttatag tcctgtcggg    5580
tttcgccacc tctgacttga gcgtcgattt tgtgatgct cgtcagggg gcggagccta    5640 tggaaaaacg ccagcaacgc ggcctttta cggttcctgg cctttgctg gccttttgct     5700 cacatgttct ttcctgcgtt atcccctgat tctgtggata accgtattac cgcctttgag    5760
tgagctgata ccgctcgccg cagccgaacg accgagcgca gcgagtcagt gagcgaggaa    5820
gcggaagagc gcccaatacg caaaccgcct ctccccgcgc gttggccgat tcattaatgc    5880
aggctgcagg ggggggggg ggggggggt gggggggggg gggggggg                    5928
```

<210> SEQ ID NO 20
<211> LENGTH: 529
<212> TYPE: PRT
<213> ORGANISM: Artificial Sequence
<220> FEATURE:
<223> OTHER INFORMATION: Synthetic Polypeptide

<400> SEQUENCE: 20

```
Met Thr Ser Ser Arg Leu Trp Phe Ser Leu Leu Ala Ala Ala Phe
1               5                   10                  15

Ala Gly Arg Ala Thr Ala Leu Trp Pro Trp Pro Gln Asn Phe Gln Thr
            20                  25                  30

Ser Asp Gln Arg Tyr Val Leu Tyr Pro Asn Asn Phe Gln Phe Gln Tyr
        35                  40                  45

Asp Val Ser Ser Ala Ala Gln Pro Gly Cys Ser Val Leu Asp Glu Ala
    50                  55                  60

Phe Gln Arg Tyr Arg Asp Leu Leu Phe Gly Ser Gly Ser Trp Pro Arg
65                  70                  75                  80

Pro Tyr Leu Thr Gly Lys Arg His Thr Leu Glu Lys Asn Val Leu Val
                85                  90                  95

Val Ser Val Val Thr Pro Gly Cys Asn Gln Leu Pro Thr Leu Glu Ser
            100                 105                 110

Val Glu Asn Tyr Thr Leu Thr Ile Asn Asp Asp Gln Cys Leu Leu Leu
        115                 120                 125

Ser Glu Thr Val Trp Gly Ala Leu Arg Gly Leu Glu Thr Phe Ser Gln
```

```
              130                 135                 140
Leu Val Trp Lys Ser Ala Glu Gly Thr Phe Phe Ile Asn Lys Thr Glu
145                 150                 155                 160

Ile Glu Asp Phe Pro Arg Phe Pro His Arg Gly Leu Leu Leu Asp Thr
                165                 170                 175

Ser Arg His Tyr Leu Pro Leu Ser Ser Ile Leu Asp Thr Leu Asp Val
                    180                 185                 190

Met Ala Tyr Asn Lys Leu Asn Val Phe His Trp His Leu Val Asp Asp
                    195                 200                 205

Pro Ser Phe Pro Tyr Glu Ser Phe Thr Phe Pro Glu Leu Met Arg Lys
                210                 215                 220

Gly Ser Tyr Asn Pro Val Thr His Ile Tyr Thr Ala Gln Asp Val Lys
225                 230                 235                 240

Glu Val Ile Glu Tyr Ala Arg Leu Arg Gly Ile Arg Val Leu Ala Glu
                    245                 250                 255

Phe Asp Thr Pro Gly His Thr Leu Ser Trp Gly Pro Gly Ile Pro Gly
                260                 265                 270

Leu Leu Thr Pro Cys Tyr Ser Gly Ser Glu Pro Ser Gly Thr Phe Gly
                275                 280                 285

Pro Val Asn Pro Ser Leu Asn Asn Thr Tyr Glu Phe Met Ser Thr Phe
                290                 295                 300

Phe Leu Glu Val Ser Ser Val Phe Pro Asp Phe Tyr Leu His Leu Gly
305                 310                 315                 320

Gly Asp Glu Val Asp Phe Thr Cys Trp Lys Ser Asn Pro Glu Ile Gln
                    325                 330                 335

Asp Phe Met Arg Lys Lys Gly Phe Gly Glu Asp Phe Lys Gln Leu Glu
                340                 345                 350

Ser Phe Tyr Ile Gln Thr Leu Leu Asp Ile Val Ser Ser Tyr Gly Lys
                355                 360                 365

Gly Tyr Val Val Trp Gln Glu Val Phe Asp Asn Lys Val Lys Ile Gln
370                 375                 380

Pro Asp Thr Ile Ile Gln Val Trp Arg Glu Asp Ile Pro Val Asn Tyr
385                 390                 395                 400

Met Lys Glu Leu Glu Leu Val Thr Lys Ala Gly Phe Arg Ala Leu Leu
                405                 410                 415

Ser Ala Pro Trp Tyr Leu Asn Arg Ile Ser Tyr Gly Pro Asp Trp Lys
                420                 425                 430

Asp Phe Tyr Ile Val Glu Pro Leu Ala Phe Glu Gly Thr Pro Glu Gln
                435                 440                 445

Lys Ala Leu Val Ile Gly Gly Glu Ala Cys Met Trp Gly Glu Tyr Val
                450                 455                 460

Asp Asn Thr Asn Leu Val Pro Arg Leu Trp Pro Arg Ala Gly Ala Val
465                 470                 475                 480

Ala Glu Arg Leu Trp Ser Asn Lys Leu Thr Ser Asp Leu Thr Phe Ala
                485                 490                 495

Tyr Glu Arg Leu Ser His Phe Arg Cys Glu Leu Leu Arg Arg Gly Val
                500                 505                 510

Gln Ala Gln Pro Leu Asn Val Gly Phe Cys Glu Gln Glu Phe Glu Gln
                515                 520                 525

Thr

<210> SEQ ID NO 21
<211> LENGTH: 556
```

```
<212> TYPE: PRT
<213> ORGANISM: Artificial Sequence
<220> FEATURE:
<223> OTHER INFORMATION: Synthetic Polypeptide

<400> SEQUENCE: 21
```

| | | | | | | | | | | | | | | |
|---|---|---|---|---|---|---|---|---|---|---|---|---|---|---|
| Met | Glu | Leu | Cys | Gly | Leu | Gly | Leu | Pro | Arg | Pro | Pro | Met | Leu | Ala |
| 1 | | | | 5 | | | | | 10 | | | | | 15 |
| Leu | Leu | Leu | Ala | Thr | Leu | Leu | Ala | Ala | Met | Leu | Ala | Leu | Thr | Gln |
| | | | | 20 | | | | | 25 | | | | | 30 |
| Val | Ala | Leu | Val | Val | Gln | Val | Ala | Glu | Ala | Ala | Arg | Ala | Pro | Ser | Val |
| | | | 35 | | | | | 40 | | | | | 45 | | |
| Ser | Ala | Lys | Pro | Gly | Pro | Ala | Leu | Trp | Pro | Leu | Pro | Leu | Ser | Val | Lys |
| | 50 | | | | | 55 | | | | | 60 | | | | |
| Met | Thr | Pro | Asn | Leu | Leu | His | Leu | Ala | Pro | Glu | Asn | Phe | Tyr | Ile | Ser |
| 65 | | | | | 70 | | | | | 75 | | | | | 80 |
| His | Ser | Pro | Asn | Ser | Thr | Ala | Gly | Pro | Ser | Cys | Thr | Leu | Leu | Glu | Glu |
| | | | | 85 | | | | | 90 | | | | | 95 | |
| Ala | Phe | Arg | Arg | Tyr | His | Gly | Tyr | Ile | Phe | Gly | Phe | Tyr | Lys | Trp | His |
| | | | 100 | | | | | 105 | | | | | 110 | | |
| His | Glu | Pro | Ala | Glu | Phe | Gln | Ala | Lys | Thr | Gln | Val | Gln | Gln | Leu | Leu |
| | | | 115 | | | | | 120 | | | | | 125 | | |
| Val | Ser | Ile | Thr | Leu | Gln | Ser | Glu | Cys | Asp | Ala | Phe | Pro | Asn | Ile | Ser |
| | 130 | | | | | 135 | | | | | 140 | | | | |
| Ser | Asp | Glu | Ser | Tyr | Thr | Leu | Leu | Val | Lys | Glu | Pro | Val | Ala | Val | Leu |
| 145 | | | | | 150 | | | | | 155 | | | | | 160 |
| Lys | Ala | Asn | Arg | Val | Trp | Gly | Ala | Leu | Arg | Gly | Leu | Glu | Thr | Phe | Ser |
| | | | | 165 | | | | | 170 | | | | | 175 | |
| Gln | Leu | Val | Tyr | Gln | Asp | Ser | Tyr | Gly | Thr | Phe | Thr | Ile | Asn | Glu | Ser |
| | | | 180 | | | | | 185 | | | | | 190 | | |
| Thr | Ile | Ile | Asp | Ser | Pro | Arg | Phe | Ser | His | Arg | Gly | Ile | Leu | Ile | Asp |
| | | | 195 | | | | | 200 | | | | | 205 | | |
| Thr | Ser | Arg | His | Tyr | Leu | Pro | Val | Lys | Ile | Ile | Leu | Lys | Thr | Leu | Asp |
| | 210 | | | | | 215 | | | | | 220 | | | | |
| Ala | Met | Ala | Phe | Asn | Lys | Phe | Asn | Val | Leu | His | Trp | His | Ile | Val | Asp |
| 225 | | | | | 230 | | | | | 235 | | | | | 240 |
| Asp | Gln | Ser | Phe | Pro | Tyr | Gln | Ser | Ile | Thr | Phe | Pro | Glu | Leu | Ser | Asn |
| | | | | 245 | | | | | 250 | | | | | 255 | |
| Lys | Gly | Ser | Tyr | Ser | Leu | Ser | His | Val | Tyr | Thr | Pro | Asn | Asp | Val | Arg |
| | | | 260 | | | | | 265 | | | | | 270 | | |
| Met | Val | Ile | Glu | Tyr | Ala | Arg | Leu | Arg | Gly | Ile | Arg | Val | Leu | Pro | Glu |
| | | | 275 | | | | | 280 | | | | | 285 | | |
| Phe | Asp | Thr | Pro | Gly | His | Thr | Leu | Ser | Trp | Gly | Lys | Gly | Gln | Lys | Asp |
| | 290 | | | | | 295 | | | | | 300 | | | | |
| Leu | Leu | Thr | Pro | Cys | Tyr | Ser | Arg | Gln | Asn | Lys | Leu | Asp | Ser | Phe | Gly |
| 305 | | | | | 310 | | | | | 315 | | | | | 320 |
| Pro | Ile | Asn | Pro | Thr | Leu | Asn | Thr | Thr | Tyr | Ser | Phe | Leu | Thr | Thr | Phe |
| | | | | 325 | | | | | 330 | | | | | 335 | |
| Phe | Lys | Glu | Ile | Ser | Glu | Val | Phe | Pro | Asp | Gln | Phe | Ile | His | Leu | Gly |
| | | | 340 | | | | | 345 | | | | | 350 | | |
| Gly | Asp | Glu | Val | Glu | Phe | Lys | Cys | Trp | Glu | Ser | Asn | Pro | Lys | Ile | Gln |
| | | | 355 | | | | | 360 | | | | | 365 | | |
| Asp | Phe | Met | Arg | Gln | Lys | Gly | Phe | Gly | Thr | Asp | Phe | Lys | Lys | Leu | Glu |
| | 370 | | | | | 375 | | | | | 380 | | | | |

```
Ser Phe Tyr Ile Gln Lys Val Leu Asp Ile Ile Ala Thr Ile Asn Lys
385                 390                 395                 400

Gly Ser Ile Val Trp Gln Glu Val Phe Asp Asp Lys Ala Lys Leu Ala
                405                 410                 415

Pro Gly Thr Ile Val Glu Val Trp Lys Asp Ser Ala Tyr Pro Glu Glu
            420                 425                 430

Leu Ser Arg Val Thr Ala Ser Gly Phe Pro Val Ile Leu Ser Ala Pro
            435                 440                 445

Trp Tyr Leu Asp Leu Ile Ser Tyr Gly Gln Asp Trp Arg Lys Tyr Tyr
450                 455                 460

Lys Val Glu Pro Leu Asp Phe Gly Gly Thr Gln Lys Gln Lys Gln Leu
465                 470                 475                 480

Phe Ile Gly Gly Glu Ala Cys Leu Trp Gly Glu Tyr Val Asp Ala Thr
                485                 490                 495

Asn Leu Thr Pro Arg Leu Trp Pro Arg Ala Ser Ala Val Gly Glu Arg
            500                 505                 510

Leu Trp Ser Ser Lys Asp Val Arg Asp Met Asp Ala Tyr Asp Arg
            515                 520                 525

Leu Thr Arg His Arg Cys Arg Met Val Glu Arg Gly Ile Ala Ala Gln
530                 535                 540

Pro Leu Tyr Ala Gly Tyr Cys Asn His Glu Asn Met
545                 550                 555
```

```
<210> SEQ ID NO 22
<211> LENGTH: 260
<212> TYPE: DNA
<213> ORGANISM: Artificial Sequence
<220> FEATURE:
<223> OTHER INFORMATION: Synthetic Polynucleotide

<400> SEQUENCE: 22
ccacgttctg cttcactctc cccatctccc cccctcccc accccaatt ttgtatttat    60 ttattttta attattttgt gcagcgatgg gggcgggggg ggggggcgcg cgccaggcgg   120
ggcggggcgg ggcgaggggc ggggcggggc gaggcggaga ggtgcggcgg cagccaatca   180
gagcggcgcg ctccgaaagt ttccttttat ggcgaggcgg cggcggcggc ggccctataa   240
aaagcgaagc gcgcggcggg                                               260

<210> SEQ ID NO 23
<211> LENGTH: 7071
<212> TYPE: DNA
<213> ORGANISM: Artificial Sequence
<220> FEATURE:
<223> OTHER INFORMATION: Synthetic Polynucleotide

<400> SEQUENCE: 23
cctgcaggca gctgcgcgct cgctcgctca ctgaggccgc ccgggcaaag cccggcgtc    60 gggcgacctt tggtcgcccg gcctcagtga gcgagcgagc gcgcagagag ggagtggcca   120
actccatcac taggggttcc tgcggccaga tcttcaatat tggccattag ccatattatt   180
cattggttat atagcataaa tcaatattgg ctattggcca ttgcatacgt tgtatctata   240
tcataatatg tacatttata ttggctcatg tccaatatga ccgccatgtt ggcattgatt   300
attgactagt tattaatagt aatcaattac gggtcatta gttcatagcc catatatgga   360
gttccgcgtt acataactta cggtaaatgg cccgcctggc tgaccgccca acgacccccg   420
cccattgacg tcaataatga cgtatgttcc catagtaacg ccaatagggac ctttccattg   480
```

```
acgtcaatgg gtggagtatt tacggtaaac tgcccacttg gcagtacatc aagtgtatca    540
tatgccaagt ccgcccccta ttgacgtcaa tgacggtaaa tggcccgcct ggcattatgc    600
ccagtacatg accttacggg actttcctac ttggcagtac atctacgtat tagtcatcgc    660
tattaccatg gtcgaggtga gccccacgtt ctgcttcact ctccccatct cccccccctc    720 cccacccca attttgtatt tatttatttt ttaattattt tgtgcagcga tgggggcggg    780 ggggggggg gggcgcgcgc caggcggggc ggggcggggc gagggcgggg cggggcgag    840 gcggagaggt gcggcggcag ccaatcagag cggcgcgctc cgaaagtttc cttttatggc    900
gaggcggcgg cggcggcggc cctataaaaa gcgaagcgcg cggcgggcgg gagtcgctgc    960
gcgctgcctt cgccccgtgc cccgctccgc cgccgcctcg cgccgcccgc cccggctctg   1020
actgaccgcg ttactcccac aggtgagcgg gcgggacggc ccttctcctc cgggctgtaa   1080
ttagcgcttg gtttaatgac ggcttgtttc ttttctgtgg ctgcgtgaaa gccttgaggg   1140
gctccgggag ggccctttgt gcgggggag cggctcgggg ggtgcgtgcg tgtgtgtgtg   1200 cgtgggagc gccgcgtgcg gctccgcgct gcccggcggc tgtgagcgct gcgggcgcgg   1260
cgcggggctt tgtgcgctcc gcagtgtgcg cgaggggagc gcggccgggg gcggtgcccc   1320
gcggtgcggg ggggctgcg aggggaacaa aggctgcgtg cggggtgtgt gcgtgggggg   1380
gtgagcaggg ggtgtgggcg cgtcggtcgg gctgcaaccc cccctgcacc cccctccccg   1440
agttgctgag cacggcccgg cttcgggtgc ggggctccgt acggggcgtg gcgcggggct   1500
cgccgtgccg ggcggggggt ggcggcaggt gggggtgccg ggcggggcgg ggccgcctcg   1560
ggccggggag ggctcggggg aggggcgcgg cggcccccgg agcgccggcg gctgtcgagg   1620
cgcggcgagc cgcagccatt gcctttatg gtaatcgtgc gagagggcgc agggacttcc   1680
tttgtcccaa atctgtgcgg agccgaaatc tgggaggcgc cgccgcaccc cctctagcgg   1740
gcgcggggcg aagcggtgcg cgccggcag gaaggaaatg ggcgggagg gccttcgtgc   1800 gtcgccgcgc cgccgtcccc ttctccctct ccagcctcgg ggctgtccgc ggggggacgg   1860
ctgccttcgg gggggacggg gcagggcggg gttcggcttc tggcgtgtga ccggcggctc   1920
tagagcctct gctaaccatg ttcatgcctt ctttcttttc ctacagctcc tgggcaacgt   1980
gctggttatt gtgctgtctc atcattttgg caaagaattc gatatcaagc ttgctagcgc   2040
caccatgccg gggttcctgg ttcgcatcct ccttctgctg ctggttctgc tgcttctggg   2100
ccctacgcgc ggcttgcgca atgccaccca gaggatgttt gaaattgact atagccggga   2160
ctccttcctc aaggatggcc agccatttcg ctacatctca ggaagcattc actactcccg   2220
tgtgccccgc ttctactgga aggaccggct gctgaagatg aagatggctg gctgaacgc   2280 catccagacg tatgtgccct ggaactttca tgagccctgg ccaggacagt accagttttc   2340
tgaggaccat gatgtggaat attttcttcg gctggctcat gagctgggac tgctggttat   2400
cctgaggccc gggcccctaca tctgtgcaga gtgggaaatg ggaggattac ctgcttggct   2460
gctagagaaa gagtctattc ttctccgctc ctccgaccca gattacctgg cagctgtgga   2520
caagtggttg ggagtccttc tgcccaagat gaagcctctc ctctatcaga atggagggcc   2580
agttataaca gtgcaggttg aaaatgaata tggcagctac tttgcctgtg attttgacta   2640
cctgcgcttc ctgcagaagc gctttcgcca ccatctgggg gatgatgtgg ttctgtttac   2700
cactgatgga gcacataaaa cattcctgaa atgtgggggcc ctgcagggcc tctacaccac   2760
ggtggacttt ggaacaggca gcaacatcac agatgctttc ctaagccaga ggaagtgaa   2820 gcccaaagga cccttgatca attctgaatt ctatactggc tggctagatc actggggcca   2880
```

```
acctcactcc acaatcaaga ccgaagcagt ggcttcctcc ctctatgata tacttgcccg    2940
tggggcgagt gtgaacttgt acatgtttat aggtgggacc aattttgcct attggaatgg    3000
ggccaactca ccctatgcag cacagcccac cagctacgac tatgatgccc cactgagtga    3060
ggctggggac ctcactgaga agtattttgc tctgcgaaac atcatccaga agtttgaaaa    3120
agtaccagaa ggtcctatcc ctccatctac accaaagttt gcatatggaa aggtcacttt    3180
ggaaaagtta aagacagtgg gagcagctct ggacattctg tgtccctctg gcccatcaa     3240
aagcctttat cccttgacat ttatccaggt gaaacagcat tatgggtttg tgctgtaccg    3300
gacaacactt cctcaagatt gcagcaaccc agcacctctc tcttcacccc tcaatggagt    3360
ccacgatcga gcatatgttg ctgtggatgg gatcccccag ggagtccttg agcgaaacaa    3420
tgtgatcact ctgaacataa cagggaaagc tggagccact ctggaccttc tggtagagaa    3480
catgggacgt gtgaactatg gtgcatatat caacgatttt aagggtttgg tttctaacct    3540
gactctcagt tccaatatcc tcacggactg acgatctttc cactggaca ctgaggatgc     3600
agtgcgcagc cacctggggg gctggggaca ccgtgacagt ggccaccatg atgaagcctg    3660
ggcccacaac tcatccaact acacgctccc ggcttttat atggggaact tctccattcc     3720
cagtgggatc ccagacttgc cccaggacac ctttatccag tttcctggat ggaccaaggg    3780
ccaggtctgg attaatggct ttaacctggg ccgctattgg ccagcccggg ccctcagtt     3840
gaccttgttt gtgccccagc acatcctgat gacctcggcc ccaaacacca tcaccgtgct    3900
ggaactggag tgggcaccct gcagcagtga tgatccagaa ctatgtgctg tgacgttcgt    3960
ggacaggcca gttattggct catctgtgac ctacgatcat ccctccaaac ctgttgaaaa    4020
aagactcatg cccccacccc cgcaaaaaaa caaagattca tggctggacc atgtatgact    4080
cgagtttttt tttgcggccg cttcgagcag acatgataag atacattgat gagtttggac    4140
aaaccacaac tagaatgcag tgaaaaaaat gctttatttg tgaaatttgt gatgctattg    4200
ctttatttgt aaccattata agctgcaata aacaagttaa caacaacaat tgcattcatt    4260
ttatgtttca ggttcagggg gagatgtggg aggttttta aagcaagtaa aacctctaca    4320
aatgtggtaa aatcgatagg ccgcaggaac ccctagtgat ggagttggcc actccctctc    4380
tgcgcgctcg ctcgctcact gaggccgggc gaccaaaggt cgcccgacgc ccgggcggcc    4440
tcagtgagcg agcgagcgcg cagctgcctg caggacatgt gagcaaaagg ccagcaaaag    4500
gccaggaacc gtaaaaaggc cgcgttgctg gcgtttttcc ataggctccg cccccctgac    4560
gagcatcaca aaaatcgacg ctcaagtcag aggtggcgaa acccgacagg actataaaga    4620
taccaggcgt ttccccctgg aagctccctc gtgcgctctc ctgttccgac cctgccgctt    4680
accggatacc tgtccgcctt tctcccttcg ggaagcgtgg cgctttctca tagctcacgc    4740
tgtaggtatc tcagttcggt gtaggtcgtt cgctccaagc tgggctgtgt gcacgaaccc    4800
cccgttcagc ccgaccgctg cgccttatcc ggtaactatc gtcttgagtc aacccggta    4860
agacacgact tatcgccact ggcagcagcc actggtaaca ggattagcag agcgaggtat    4920
gtaggcggtg ctacagagtt cttgaagtgg tggcctaact acggctacac tagaagaaca    4980
gtatttggta tctgcgctct gctgaagcca gttaccttcg aaaaagagt tggtagctct     5040
tgatccggca acaaaccac cgctggtagc ggtggttttt tgtttgcaa gcagcagatt      5100
acgcgcagaa aaaaggatc tcaagaagat cctttgatct tttctacggg gtctgacgct    5160
cagtggaacg aaaactcacg ttaagggatt ttggtcatga gattatcaaa aaggatcttc    5220
```

-continued

```
acctagatcc ttttaaatta aaaatgaagt tttaaatcaa tctaaagtat atatgagtaa    5280
acttggtctg acagttacca atgcttaatc agtgaggcac ctatctcagc gatctgtcta    5340
tttcgttcat ccatagttgc ctgactcccc gtcgtgtaga taactacgat acgggagggc    5400
ttaccatctg gccccagtgc tgcaatgata ccgcgagacc cacgctcacc ggctccagat    5460
ttatcagcaa taaaccagcc agccggaagg gccgagcgca gaagtggtcc tgcaacttta    5520
tccgcctcca tccagtctat taattgttgc cgggaagcta gagtaagtag ttcgccagtt    5580
aatagtttgc gcaacgttgt tgccattgct acaggcatcg tggtgtcacg ctcgtcgttt    5640
ggtatggctt cattcagctc cggttcccaa cgatcaaggc gagttacatg atcccccatg    5700
ttgtgcaaaa aagcggttag ctccttcggt cctccgatcg ttgtcagaag taagttggcc    5760
gcagtgttat cactcatggt tatggcagca ctgcataatt ctcttactgt catgccatcc    5820
gtaagatgct tttctgtgac tggtgagtac tcaaccaagt cattctgaga atagtgtatg    5880
cggcgaccga gttgctcttg cccggcgtca atacggata ataccgcgcc acatagcaga    5940
actttaaaag tgctcatcat tggaaaacgt tcttcggggc gaaaactctc aaggatctta    6000
ccgctgttga gatccagttc gatgtaaccc actcgtgcac ccaactgatc ttcagcatct    6060
tttactttca ccagcgtttc tgggtgagca aaaacaggaa ggcaaaatgc cgcaaaaaag    6120
ggaataaggg cgacacggaa atgttgaata ctcatactct tcctttttca atattattga    6180
agcatttatc agggttattg tctcatgagc ggatacatat ttgaatgtat ttagaaaaat    6240
aaacaaatag gggttccgcg cacatttccc cgaaaagtgc cacctgacgt ctaagaaacc    6300
attattatca tgacattaac ctataaaaat aggcgtatca cgaggccctt tcgtctcgcg    6360
cgtttcggtg atgacggtga aaacctctga cacatgcagc tcccggagac ggtcacagct    6420
tgtctgtaag cggatgccgg gagcagacaa gcccgtcagg gcgcgtcagc gggtgttggc    6480
gggtgtcggg gctggcttaa ctatgcggca tcagagcaga ttgtactgag agtgcaccat    6540
aaaattgtaa acgttaatat tttgttaaaa ttcgcgttaa attttgtta aatcagctca    6600 ttttttaacc aatagaccga atcggcaaa atcccttata aatcaaaaga atagcccgag    6660
atagagttga gtgttgttcc agtttggaac aagagtccac tattaaagaa cgtggactcc    6720
aacgtcaaag ggcgaaaaac cgtctatcag ggcgatggcc cactacgtga accatcaccc    6780
aaatcaagtt ttttggggtc gaggtgccgt aaagcactaa atcggaaccc taaagggagc    6840
ccccgattta gagcttgacg gggaaagccg gcgaacgtgg cgagaaagga agggaagaaa    6900
gcgaaaggag cgggcgctaa ggcgctggca agtgtagcgg tcacgctgcg cgtaaccacc    6960
acacccgccg cgcttaatgc gccgctacag ggcgcgtact atggttgctt tgacgtatgc    7020
ggtgtgaaat accgcacaga tgcgtaagga gaaaataccg catcaggcgc c             7071
```

rAAV VECTORS FOR THE TREATMENT OF GM1 AND GM2 GANGLIOSIDOSIS

RELATED APPLICATIONS

This Application is a National Stage Application under 35 U.S.C. § 371 entitled, "RAAV VECTORS FOR THE TREATMENT OF GM1 AND GM2 GANGLIOSIDOSIS", PCT/US2019/054649, filed Oct. 4, 2019, which claims the benefit under 35 U.S.C. § 119(e) of the filing date of U.S. Provisional Application Ser. No. 62/741,848 filed Oct. 5, 2018, entitled "RAAV VECTORS FOR THE TREATMENT OF GM1 AND GM2 GANGLIOSIDOSIS", 62/814,587, filed Mar. 6, 2019, entitled "RAAV VECTORS FOR THE TREATMENT OF GM1 AND GM2 GANGLIOSIDOSIS", 62/815,996, filed Mar. 8, 2019, entitled "RAAV VECTORS FOR THE TREATMENT OF GM1 AND GM2 GANGLIOSIDOSIS", 62/826,863, filed Mar. 29,2019, entitled "RAAV VECTORS FOR THE TREATMENT OF GM1 AND GM2 GANGLIOSIDOSIS", 62/840,359, filed Apr. 29, 2019, entitled "RAAV VECTORS FOR THE TREATMENT OF GM1 AND GM2 GANGLIOSIDOSIS", and 62/848,858, filed May 16, 2019, entitled "RAAV VECTORS FOR THE TREATMENT OF GM1 AND GM2 GANGLIOSIDOSIS". The entire contents of each of the foregoing are incorporated herein by reference.

FEDERALLY SPONSORED RESEARCH

This invention was made with government support under grant number HD060576 awarded by the National Institutes of Health. The government has certain rights in the invention.

REFERENCE TO A SEQUENCE LISTING SUBMITTED ELECTRONICALLY VIA EFS-WEB

This application includes a Sequence Listing submitted electronically via EFS-Web (name: "Sequence Listing"; size: 80,237 bytes; and created on: Patent-In 3.5), which is hereby incorporated by reference in its entirety.

FIELD

The disclosure in some aspects provides recombinant adeno-associated viruses (rAAVs), compositions and kits useful for the treatment of lysosomal storage disorders. In some embodiments, the lysosomal storage disorder is GM1 or GM2 gangliosidosis (e.g., Tay Sachs disease).

BACKGROUND

GM1 gangliosidosis is an autosomal recessive neuronopathic lysosomal storage disease caused by mutations in the human gene GLB1. The human GLB1 gene encodes the enzyme β-D-galactosidase (βgal), which removes terminal galactose residues from numerous molecules in the central nervous system (e.g., GM1 ganglioside) and peripheral tissues (e.g., oligosaccharides, glycoproteins, and glycosaminoglycans). Deficiency in lysosomal βgal activity leads to accumulation of GM1 ganglioside and its asialoderivative GA1 predominantly in the central nervous system, where its rates of synthesis are highest. GM1 gangliosidosis is uniformly fatal and no effective therapy exists.

Tay Sachs disease (GM2 gangliosidosis) and Sandhoff disease are autosomal recessive lysosomal storage disorders caused by mutations in the HEXA and HEXB genes, respectively, leading to a deficiency in β-N-acetyl-D-hexosaminidase (Hex) enzyme activity. The Hex enzyme is a heterodimer comprising HexA and HexB protein subunits. Deficiency in Hex activity leads to the progressive accumulation of GM2 ganglioside in the central nervous system and ensuing neurodegeneration. Tay Sachs disease is characterized by a relentlessly progressive nervous system decline and eventual death. Symptoms of Tay Sachs disease include frequent seizures, swallowing difficulties, loss of motor control, and frequent respiratory infections. Sandhoff disease is also characterized by the progressive decline of the CNS, leading to gait abnormalities, swallowing and speech difficulties, peripheral neuropathy, psychiatric manifestations, and eventual death. There are currently no disease-modifying treatment options for either Tay Sachs or Sandhoff diseases, and only symptomatic treatment, including anticonvulsants and antispasmodics, are available.

SUMMARY

Aspects of the disclosure relate to recombinant AAV vectors for gene delivery. Some current AAV vectors deliver high levels of gene expression that result in adverse events (e.g., cytotoxicity) in a subject. The disclosure is based, in part, on the recognition that engineered regulatory elements can modulate transgene expression levels to provide therapeutic amounts of transgene without the induction of adverse events.

In some aspects the disclosure provides a recombinant AAV (rAAV) comprising a capsid containing a nucleic acid comprising a promoter operably linked via a chimeric intron to a transgene encoding a lysosomal storage disorder-associated protein (e.g., HEXA, HEXB, GLB1, etc.). In some aspects, the disclosure provides a recombinant AAV (rAAV) comprising a capsid containing nucleic acid comprising a promoter operably linked via a chimeric intron to a transgene, wherein the promoter and the transgene are separated by the chimeric intron, and wherein the nucleic acid does not contain an enhancer element, and wherein the transgene encodes a lysosomal storage disorder-associated protein (e.g., HEXA and/or HEXB and/or GLB1). In some embodiments, the promoter comprises a chicken beta-actin (CB) promoter. In some embodiments, the chimeric intron comprises chicken beta actin intron and/or rabbit beta globin intron. In some embodiments, the nucleic acid further comprises one or more untranslated sequences, for example untranslated sequences from rabbit beta-globulin exon 1 and/or exon 2. In some embodiments, the chimeric intron is flanked by two untranslated sequences (e.g., a first untranslated sequence is located between the promoter and the chimeric intron and a second untranslated region is located between the chimeric intron and the first codon of the transgene).

In some embodiments, the βgal is human βgal. In some embodiments, an rAAV described by the disclosure include a transgene encodes a beta-hexosaminidase subunit alpha (HexA). In some embodiments, HEXA is represented by the sequence set forth in SEQ ID NO: 20. In some embodiments, a transgene encodes a beta-hexosaminidase subunit beta (HexB). In some embodiments, HEXB is represented by the sequence set forth in SEQ ID NO: 21.

In some embodiments, at least one capsid protein of an rAAV described herein is AAV1, AAV2, AAV3, AAV4, AAV5, AAV6, AAV7, AAV8, AAVrh8, AAV9, AAV10, or AAVrh10 capsid protein. In some embodiments, at least one ITR of an rAAV described herein is selected from the group consisting of AAV1 ITR, AAV2 ITR, AAV3 ITR, AAV4 ITR, AAV5 ITR, or AAV6 ITR. In some embodiments, at least one ITR is a full length ITR.

In some embodiments, an rAAV comprises two ITRs, wherein the hybrid promoter and transgene are located between the two ITRs. In some embodiments, an rAAV described herein has one of the following serotypes: AAV1, AAV2, AAV3, AAV4, AAV5, AAV6, AAV7, AAV8, AAVrh8, AAV9, AAV10, or AAVrh10. In some embodiments, disclosure relates to nucleic acids encoding components of rAAVs described herein. For example, in some aspects, the disclosure provides an isolated nucleic acid comprising a sequence selected from SEQ ID NO: 1 to 6 or 16 to 19. In some aspects, the disclosure provides an isolated nucleic acid comprising a sequence encoding a peptide having an amino acid sequence as set forth in SEQ ID NO: 20 or 21.

In some embodiments, nucleic acids encoding components of an rAAV (e.g., nucleic acids comprising a sequence selected from SEQ ID NO: 1 to 6 or 16 to 19, or a portion of a sequence from SEQ ID NO: 1 to 6 or 16 to 19) are contained in a host cell. In some embodiments, the host cell is a eukaryotic cell. In some embodiments, the host cell is a mammalian cell. In some embodiments, the host cell is a prokaryotic cell. In some embodiments, the host cell is a bacterial cell.

In some embodiments, host cells further comprise an isolated nucleic acid encoding an AAV capsid protein (e.g., AAV1, AAV2, AAV3, AAV4, AAV5, AAV6, AAV7, AAV8, AAVrh8, AAV9, AAV10, or AAVrh10 capsid protein).

In some aspects, the disclosure provides a pharmaceutical composition comprising: (i) a first rAAV comprising a capsid containing a first nucleic acid comprising a promoter operably linked via a chimeric intron to a transgene encoding a beta-hexosaminidase subunit alpha (HexA); and (ii) a second rAAV comprising a capsid containing a second nucleic acid comprising a promoter operably linked via a chimeric intron to a transgene encoding a beta-hexosaminidase subunit beta (HexB). In some embodiments, the pharmaceutical composition further comprises a pharmaceutically acceptable carrier. In some embodiments, the first rAAV and the second rAAV are present in the composition in a ratio of 1:1.

In some aspects, the disclosure provides a method for treating a lysosomal storage disorder comprising administering a recombinant AAV (rAAV) or pharmaceutical composition as described herein to a subject having a lysosomal storage disorder (e.g., Tay Sachs disease, GM2 gangliosidosis, Sandhoff disease, Morquio syndrome B, etc.). In some embodiments, the lysosomal storage disorder is Tay Sachs disease or Sandhoff disease. In some embodiments, the rAAV or pharmaceutical composition is administered to the subject by intracranial injection, intracerebral injection, or injection into the CSF via the cerebral ventricular system, cisterna magna, or intrathecal space. In some embodiments, the disclosure provides a method for treating GM2 gangliosidosis comprising administering the rAAV or pharmaceutical composition as described herein to a subject having GM2 gangliosidosis.

In some aspects, the disclosure provides a kit comprising: a container housing a recombinant AAV (rAAV) as described herein; or, a composition comprising a recombinant AAV (rAAV) as described herein. In some embodiments, kits further comprise a container housing a pharmaceutically acceptable carrier. In some embodiments, the rAAV or composition comprising the rAAV and the pharmaceutically acceptable carrier are housed in the same container. In some embodiments, the container is a syringe.

In some aspects, the disclosure provides a recombinant AAV vector comprising a nucleic acid encoding a promoter operably linked to a transgene that encodes human GLB1 as set forth in SEQ ID NO: 23. In some aspects, the disclosure provides an isolated nucleic acid encoding a promoter operably linked to a transgene that encodes human GLB1 as set forth in SEQ ID NO: 23. In some embodiments, a pharmaceutical composition comprises the rAAV and a pharmaceutically acceptable carrier. In some embodiments, the disclosure provides a method for treating GM1 gangliosidosis comprising administering the rAAV or the pharmaceutical composition to a subject having GM1 gangliosidosis.

BRIEF DESCRIPTION OF DRAWINGS

FIG. 1A shows a schematic of the rAAV vector CBA-mβgal-WPRE. Two inverted terminal repeats (ITRs) from AAV2 flank the vector on each end. The CBA promoter is composed of a cytomegalovirus immediate early enhancer (CMV) fused to the chicken beta-actin promoter followed by a chimeric chicken beta-actin/rabbit beta globin intron (CBA), the mouse lysosomal acid β-galactosidase cDNA (mβgal), a woodchuck hepatitis virus post-transcriptional regulatory element (WPRE), and two polyA signals in tandem derived from the bovine growth hormone (BGH) and SV40. This vector was then packaged in an AAVrh8 capsid. FIG. 1B shows a recombinant AAV (rAAV) vector comprising a transgene encoding hGLB1 under a control of a CBA promoter.

FIGS. 2A-2B show 4e10 vg; FIGS. 2E-2F show 2.6e10 vg; FIGS. 2I-2J show 2.6e9 vg; FIGS. 2C-2D show naïve βgal$^{-/-}$ and FIGS. 2G-2H show naïve βgal$^{+/-}$ mice. Images are representative of N≥3 mice/group.

(FIG. 3B) 2.6e10 vg and (FIG. 3C) 2.6e9 vg all retained motor performance significantly better than naïve βgal$^{-/-}$ controls at 6 months post injection using non-parametric, unpaired Student T Test and Welsh-correction (P=0.006, 0.0009, 0.005 respectively). N=3-15 animals/group at each time point, and N=6-10 animals/group at 6 months post-treatment.

FIG. 5A shows coronal sections of mouse brain stained with Xgal for βgal enzyme presence and counterstained with Nuclear Fast Red at 12 weeks post injection in representative βgal$^{-/-}$ (KO+AAV) injected with 1 µl of AAVrh8-CBA-mβgal-WPRE (2.6e10 vg total dose) bilateral into the thalamus. FIG. 5B shows untreated βgal$^{-/-}$ mouse untreated (KO Untreated). Boxes represent location of images depicted in (FIG. 5C)-(FIG. 5F). Filipin staining on adjacent brain sections in βgal$^{-/-}$ animal treated with 2.6e10 vg of AAVrh8-CBA-mβgal-WPRE are shown in FIG. 5C and FIG. 5E. FIG. 5D and FIG. 5F show an untreated βgal$^{-/-}$ mouse (KO Untreated). Filipin images taken at 10× magnification. Images are representative of N≥3 mice/group.

FIG. 6A and FIG. 6B show injection of 4e10 vg at 621 days. FIG. 6C and FIG. 6D show injection of 2.6e10 vg at 547 days. FIG. 6E and FIG. 6F show injection of 2.6e9 vg at 495 days. FIG. 6G and FIG. 6H show injection of Naïve βgal$^{-/-}$ ~250 days with storage throughout. Images are representative of N≥2 mice/group.

FIG. 7A and FIG. 7B show injection of 4e10 vg at 2 weeks post-treatment. FIG. 7E and FIG. 7F show injection of 2.6e10 vg at 3 months post-treatment. FIG. 7I and FIG. 7J show injection of 2.6e9 vg at 3 months post-treatment. FIG. 7G and FIG. 7H show untreated Naïve βgal$^{-/-}$ at age of treated animals. FIG. 7C and FIG. 7D show untreated Naïve βgal$^{-/-}$ at age of treated animals. FIG. 7K shows a cerebrum injected with AAVrh8-mβgal. Red arrow indicates injection site in βgal animals and location of pictures shown here. Scale bar represents 100 um. Images are representative of N≥3 mice/group.

FIG. 8A and FIG. 8B show injection of 4e10 vg at 2 weeks post-treatment. FIG. 8E and FIG. 8F show injection of 2.6e10 vg at 3 months post-treatment. FIG. 8I and FIG. 8J show injection of 2.6e9 vg at 3 months post-treatment. FIG. 8G and FIG. 8H show untreated Naïve βgal$^{-/-}$ at age of treated animals. FIG. 8C and FIG. 8D show injection of Naïve βgal$^{-/-}$ at age of treated animals. FIG. 8K shows a DCN injected with AAVrh8-mβgal. Arrow indicates injection site in βgal animals and location of pictures shown here. Scale bar represents 100 um. Images are representative of N≥3 mice/group.

FIG. 9F, FIG. 9I and FIG. 9L show βgal$^{-/-}$ mouse untreated (KO Untreated) had no change in Filipin content. Filipin staining on brain sections taken at 10× magnification. Images are representative of N≥3 mice/group.

FIG. 10A shows βgal enzyme activity in 2 mm×2 mm biopsy punches in injected structures. 1 µl of AAVrh8-vector (total dose 3.4e9 vg, or 2.0e10 vg, CB6 High only) or mock treated PBS bilateral into the thalamus, as determined by 4-MU assay at ~6 weeks post injections. Enzyme activity is normalized to protein concentration by Bradford, and is reported as nmol/hour/mg protein. Error bars represent mean+SD, N=3/group, and * indicates significant difference of βgal$^{-/-}$+AAV (CA+vector name) vs. βgal$^{+/-}$ Untreated (CA Untreated) or as indicated by connecting line. P value calculated using unpaired multiple T tests (Holm-Sidak) where *=p<0.05, =p<0.01, and *=p<0.001. FIG. 10B shows endogenous βgal protein presence as determined by Western blot which appears at 67 kd, where transgene expression from the AAV vector appears as a higher weight band. Loading control is Actin appearing at 42 kd. Western blot shown is representative of N=3 blots ran.

FIG. 15E) or βgal$^{+/-}$ mice untreated (CA Untreated; FIG. 15F). N=2-3/group. Scale bar=10 mm. FIG. 15D shows KO mice treated with empty vector.

In FIG. 22A, mononuclear perivascular cuffs (arrow) and necrotic area in the white matter (*) are seen.

FIG. 22B shows a Luxol Fast Blue-stained section where arrows delineate one large area of necrosis, vascular proliferation, and white matter loss (note pallor compared to adjacent dark blue color). FIG. 22C shows a necrotic area in the thalamus with vacuolation (arrows). FIG. 22D is an example of a vascular cuff in the thalamus (40×). Similar neuropathology was seen in the lowest dose (1/30) (FIG. 22E). FIG. 22F shows a normal thalamus in PBS injected animal; (1× dose, FIGS. 22A-22D; 1/30 dose, FIG. 22E; PBS injected, FIG. 22F).

FIG. 25G shows the magnification of the boxed region in FIG. 25E. The arrows indicate eosinophilic material in neurons.

FIGS. 26A-2B present a panel of new AAV vectors with an expected gradient of HexA expression levels. FIG. 26A shows the systematic removal of expression elements from the current version (top) to its most basic from without a classical promoter element of ITR-flanked cDNA with a polyadenylation signal (bottom vector), while FIG. 26B shows ITR-expression based vectors that progressively incorporate more elements known to increase ITR-driven gene expression. Abbreviations: CMV Enh—cytomegalovirus immediate-early enhancer; CB—chicken beta-actin promoter; HexA/B—for each vector design a pair of vectors will be generated carrying cynomolgus macaque HexA and HexB cDNAs; pA—polyadenylation signal; ITR—AAV2 inverted terminal repeat; P1—Promoter 1 thought to increase ITR-mediated gene expression by ~10-fold; P2—promoter thought to increase ITR-mediated gene expression by ~50-fold.

In FIG. 38A, the pre- and post-surgical brain MRI are shown using different sequences. AAVrh8 vector formulations contained 2 mM gadolinium to analyze the distribution of the injected solution using T1-weighted MRI; the volume of the distribution of gadolinium in this animal (Gd-enhanced volume) was 1.67 mL. In FIG. 38B, the volume of distribution (Vd) for each NHP and average 1 SD are shown; the total infused volume in the thalamus (Vi) was 0.3 mL.

FIG. 40B shows an NHP in cohort 2 where bilateral hyperintensity signals were detected starting at d30 and remained unchanged until day 90. In FIG. 40C, an NHP in cohort 3 showed a hyperintense signal in the left thalamus from d30-d90.

FIG. 43A was taken at 4× magnification; FIG. 43B was taken at 10× magnification.

In FIGS. 48A-48C, the total Hex enzyme activity (HexA, B, and S) was measured using the artificial substrate MUG and then represented as fold-over wild type level (T, black bars, n=1). Asterisks (*) represent animals with no detectable Hex activity. FIGS. 48D and 48F are bar graphs of the qualitative LC-MS/MS used to measure GM2 ganglioside content.

FIG. 49A shows a structural rendering of a CB promoter, represented by SEQ ID NO: 1.

FIG. 49B shows a structural rendering of a CB(6)-I promoter, represented by SEQ ID NO: 4.

FIG. 49C shows a structural rendering of a P2-I promoter, represented by SEQ ID NO: 5.

FIG. 53D shows a Kaplan-Meier survival plot of SD mice treated with 4.68×$10^9$ vg of AAVrh8-mHexA/B intracranially showing that in combination with bilateral thalamic injections (TH), bilateral deep cerebellar nuclei (DCN) injections, or a single intracerebral ventricular (ICV) injection results in comparably survival outcomes.

FIG. 54A shows a Kaplan-Meier survival plot of a dose escalation experiment for AAVrhh8-mHexA/B injected intracranially into the TH/ICV of 1 month SD mice. The performance of SD mice treated intracranially with 4.68×$10^9$ vg and 1.17× $10^{10}$ vg of AAVrh8-mHexA/B vector formulation via TH/ICV delivery in (FIG. 54B) inverted screen, (FIG. 54C) rotarod, and (FIG. 54D) wire hang tests was evaluated at 60, 120, and 180 days of age.

FIG. 57A shows that the survival of untreated SD cates is 4.4+/-0.6 months. FIG. 57B shows that the clinical disease onset was delayed and clinical signs attenuated in the SD cats after AAV treatment. FIG. 57C is the gross image of the brain showing the locations of the sections (left). Coronal sections of the right hemisphere of the brain and spinal cord in situ, illustrating locations analyzed. FIG. 57D shows the histochemical naphthol staining showing distribution of Hex in normal, SD, and a representative cat AAV treated SD cat. FIG. 57E is the HexA enzyme activity in the brain and spinal cord of the SD cats.

FIG. 58A shows the 7T MRI of the SD cat brain showing an increase of the gray and white matter intensities, which is due to increased demyelination in the white matter and increased GM2 storage in the gray matter. After TH/ICV delivery of AAV gene therapy, there is complete normalization of gray and white matter intensities. Mild cortical atrophy is evident as is hyperintensities at the thalamic injection sites. FIG. 58B is MR spectroscopy of untreated SD cats shows an increase in N-acetyl hexosamine, a toxic metabolite that has been previously reported in SD patients. After TH/ICV delivery of AAV gene therapy, this is completely normalized. FIG. 58C is a representative SD MR spectra. FIG. 58D is the HexA activity in the cerebrospinal fluid (CSF) in SD+AAV TH/ICV SD cats. FIGS. 58E and 58F are the lactate dehydrogenase (FIG. 58E) and aspartate aminotransferase (FIG. 58F) levels in the CSF of normal (open circles), SD (black closed circles) and SD+AAV TH/ICV cats (shaded closed circles). FIGS. 58G and 58H are the serum antibody titers of SD+AAV TH/ICV cats 11-907 (FIG. 58G) and 7-760 (FIG. 58H).

FIG. 59A is a Kaplan-Meier curve showing untreated SD cats survival of 4.4+/-0.6 months. SD cats treated with AAV via the cisterna magna have increased survival to 9.9+/-0.5 months. FIG. 59B is the clinical rating score showing a sharp decline in untreated SD cats. The decline is attenuated in SD+AAV cats with a long plateau of phenotype. Cats were euthanized prior to loss of ambulation due to vision and hearing loss as well as musculoskeletal abnormalities. Clinical rating scores were based on the following clinical signs, with a normal score of 10 and subtraction of 1 point for each symptom acquired: slight tremors, overt tremors, hind limb weakness, wide-based stance, ataxia, occasional falling, limited ambulation, spastic front legs, spastic hind legs, and inability to ambulate. FIG. 59C shows the cat brain with lines show locations of brain sections (left), right hemisphere of the brain and the spinal cord en bloc, illustrating locations for biodistribution analyses. FIG. 59D is the HexA activity (MUGS) of the brain and spinal cord of SD+AAV long-term cats. The thick line at 1 indicates normal levels. FIGS. 59E and 59F show the expression of HexA in the various brain regions as measured by qPCR.

FIG. 62A is a 7T MRI of the SD cats showing cortical atrophy and hyperintesive white matter and hypointense gray matter consistent with demyelination of white matter and lipid storage in gray matter compared to normal cats. In SD+AAV CM cats, intensity alterations persisted, but cortical atrophy was ameliorated. MR spectroscopy of the thalamus of SD cats shows an increase in N-acetylhexosamine, which is corrected by CM delivery of AAV 16 weeks after treatment. In one CM cat at humane endpoint, NA Hex levels increased further. FIG. 62B shows myoinositol (INS), a marker of gliosis and glycerophosphocholine+phosphocholine (GPC+PCh) markers of demyelenination were also increased in the SD+AAV CM cat. FIG. 62C shows a representative MR spectra. FIG. 62D shows CSF HexA in SD+AAV CM cats over time. Normal levels are indicated by the dashed line. FIGS. 62E-H shows the markers of cytotoxicity in CSF aspartate aminotransferase (AST) activity in normal (open circles), SD cats (closed circles), and SD+AAV CM cats (light closed circles).

FIG. 63A shows the GM2 ganglioside content measured by LC-MS/MS in the CNS 8 weeks after injection. FIG. 63B shows the cerebrum hexosaminidase activity measured using MUG substrate 8 weeks after hexosaminidase activity using MUG substrate 8 weeks after injection. Dashed lines indicate average activity of untreated wild type animals. Results are shown as mean+/−SD, Tukey's multiple comparisons test, * ($P<0.05$),  ($P<0.01$), * ($P<0.0001$), n=4 PBS, n=4 original CBA-mHexA/B, n=6 $2.34 \times 10^{10}$ vg CB-CI-mHexA/B and $4.68 \times 10^9$ vg CB-CI-mHexA/B n.d. (not detected). FIG. 63C is the survival and symptom presentations of (5 months study endpoint) SD mice injected with $2.34 \times 10^{10}$ vg of AAVrh8-CB-CI-mHexA/B (n=8). Median survival of untreated Sandhoff disease mice was 125.5 days (n=6).

FIG. 7I shows a reduction of approximately 25% in GM2 ganglioside from baseline in the cerebral spinal fluid (CSF).

FIG. 75A shows Fluoroscopy guided advancement of the intravascular microcatheter. FIG. 75B shows the final placement of the microcatheter tip. FIG. 75C shows the gross picture of the post-mortem spinal cords. FIG. 75D shows the GFP expression in spinal cord sections by immunohistochemistry. FIGS. 75E-75G show GFP expression in brain sections by immunohistochemistry.

DETAILED DESCRIPTION

Figure 1A:
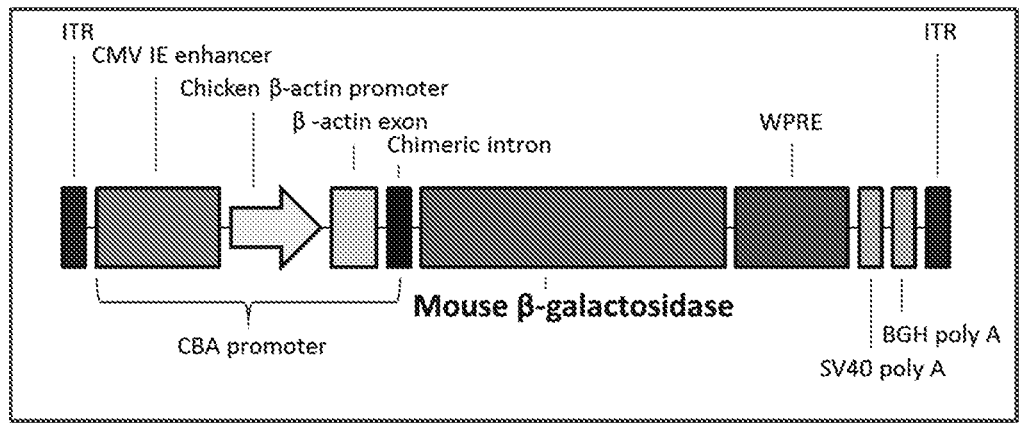
FIG. 1A-1B show designs of the rAAV vector CBA-mβgal-WPRE.

In some instances, delivery of transgenes with current rAAV vectors causes accumulation of un-degraded substrates or dysregulation of the lysosomal compartment, which leads to responses that upregulate lysosomal biogenesis, substrate reduction or exocytosis. Furthermore, introduction of supra-physiological levels of a therapeutic protein via rAAV vector-driven transgene expression can also trigger deleterious protection cascades which may be associated with unfolded protein response common in these disorders.

Accordingly, in some aspects, the disclosure provides compositions (e.g., isolated nucleic acids, rAAVs, rAAV vectors, etc.) for the expression of lysosomal enzymes in tissues such as CNS tissue. In some aspects, the disclosure relates methods for treating lysosomal storage disorders, such as GM1 gangliosidosis, Tay Sachs disease, or Sandhoff disease, using rAAVs described herein. The disclosure is based, in part, on the discovery that certain regulatory sequences and elements, for example promoter regions, can be engineered for use in rAAVs to provide levels of transgene expression that are therapeutically effective yet do not cause the vector-mediated genotoxicity associated with previously used rAAVs.

Isolated Nucleic Acids

In some aspects, the disclosure provides a nucleic acid comprising at least one transgene operably linked to a promoter, wherein the transgene encodes a protein associated with a lysosomal storage disorder (e.g., a lysosomal storage protein, for example HexA and/or HexB and GLB1).

In some embodiments, the GLB1 transgene is a human GLB1 gene (GeneID: 2720). The human GLB1 gene may comprise the nucleotide sequence of NM_000404.4, NM_001079811.2, NM_001135602.2, or NM_001317040.1. The human GLB1 gene encodes the β-galactosidase protein. The human β-galactosidase protein may comprise the amino acid sequence in NP_000395.3, NP_001073279.1, NP_001129074.1, or NP_001303969.1. In some embodiments, human GLB1 comprises the sequence as in SEQ ID NO: 23. In some embodiments, the human HexA transgene (GeneID: 3073) comprises the nucleotide sequence in NM_000520.5 or NM_001318825.1. In some embodiments, a HexA protein is represented by the sequence set forth in NCBI Reference Sequence No. NP_000511.2 (SEQ ID NO: 20) or NP_001305754.1. In some embodiments, the human HexB transgene (GeneID: 3074) comprises the nucleotide sequence in NM_000521.4 or NM_001292004.1. In some embodiments, a HexB protein is represented by the sequence set forth in NCBI Reference Sequence No. NP_000512.1 (SEQ ID NO: 21) or NP_001278933.1.

A transgene which encodes a protein associated with a lysosomal storage disorder may be operably linked to a promoter. As used herein, "operably linker" refers to a promoter that is linked to and promotes expression of a downstream transgene. In some embodiments, the promoter is a constitutive promoter, for example a chicken beta-actin (CBA) promoter, a retroviral Rous sarcoma virus (RSV) LTR promoter (optionally with the RSV enhancer), a cytomegalovirus (CMV) promoter (optionally with the CMV enhancer) [see, e.g., Boshart et al., Cell, 41:521-530 (1985)], a SV40 promoter, a dihydrofolate reductase promoter, a β-actin promoter, a phosphoglycerol kinase (PGK) promoter, and a EF1α promoter [Invitrogen]. In some embodiments, a promoter is an enhanced chicken β-actin promoter. In some embodiments, a promoter is a U6 promoter. In some embodiments, a chicken beta-actin promoter comprises the sequence set forth in SEQ ID NO: 22.

In some embodiments, a promoter is an inducible promoter. Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene (e.g., GLB1, HEXA, or HEXB) will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the promoter drives transgene expression in neuronal tissues. In some embodiments, the disclosure provides a nucleic acid operably comprising a tissue-specific promoter operably linked to a transgene, wherein the transgene encodes a lysosomal storage disease protein. As used herein, "tissue-specific promoter" refers to a promoter that preferentially regulates (e.g., drives or up-regulates) gene expression in a particular cell type relative to other cell types. A cell-type-specific promoter can be specific for any cell type, such as central nervous system (CNS) cells, liver cells (e.g., hepatocytes), heart cells, kidney cells, eye cells, muscle cells, etc. For example, the human synapsin 1 promoter (Syn1 promoter) preferentially drives gene expression in neurons and the GfaABC$_1$D (also referred to as GFAP) promoter preferentially drives expression in astrocytes. However, it should be appreciated that several cell-types may be resident within a particular type of tissue. For example, central nervous system tissue comprises neuronal cells and non-neuronal cells (e.g., glial cells, astrocytes, etc.).

In some embodiments, an isolated nucleic comprises at least two transgenes encoding proteins associated with a lysosomal storage disorder (e.g., HEXA and HEXB). The first transgene and the second transgene may be operably linked to at least one promoter. In some embodiments, the first transgene encodes HEXA and the second transgene encodes HEXB. The HEXA transgene and the HEXB transgene may be operably linked to the same promoter or they may be operably linked to a first promoter and a second promoter. The first promoter and/or the second promoter may be constitutive (e.g., CBA). Alternatively, the first promoter and/or the second promoter may be inducible. Additionally, the first promoter and/or the second promoter may be a tissue-specific promoter. In some embodiments, the first promoter is specific for neurons and optionally is a Synapsin 1 promoter (Syn1 promoter). In some embodiments, a Syn1 promoter is represented by SEQ ID NO: 13. In some embodiments, the second promoter is specific for astrocytes, and optionally is a GFAP promoter. In some embodiments, a GFAP promoter is represented by SEQ ID NO: 14.

Further examples of tissue-specific promoters include but are not limited to a liver-specific thyroxin binding globulin (TBG) promoter, an insulin promoter, a glucagon promoter, a somatostatin promoter, a pancreatic polypeptide (PPY) promoter, a synapsin-1 (Syn1) promoter, a creatine kinase (MCK) promoter, a mammalian desmin (DES) promoter, a α-myosin heavy chain (a-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

In some aspects, the disclosure relates to isolated nucleic acids comprising a transgene (e.g., a lysosomal storage protein, for example GLB1, HexA, HexB, and/or HexA and HexB) operably linked to a promoter via a chimeric intron. In some embodiments, a chimeric intron comprises a nucleic acid sequence from a chicken beta-actin gene, for example a non-coding intronic sequence from intron 1 of the chicken beta-actin gene. In some embodiments, the intronic sequence of the chicken beta-actin gene ranges from about 50 to about 150 nucleotides in length (e.g., any length between 50 and 150 nucleotides, inclusive). In some embodiments, the intronic sequence of the chicken beta-actin gene ranges from about 100 to 120 (e.g., 100, 101, 102, 103, 104, 105, 106, 107, 108, 109, 110, 111, 112, 113, 114, 115, 116, 117, 118, 119, or 120) nucleotides in length. In some embodiments, a chimeric intron is adjacent to one or more untranslated sequences (e.g., an untranslated sequence located between the promoter sequence and the chimeric intron sequence and/or an untranslated sequence located between the chimeric intron and the first codon of the transgene sequence). In some embodiments, each of the one or more untranslated sequences are non-coding sequences from a rabbit beta-globulin gene (e.g., untranslated sequence from rabbit beta-globulin exon 1, exon 2, etc.).

Recombinant AAVs

The isolated nucleic acids of the disclosure may be recombinant adeno-associated viruses (rAAVs). In some embodiments, an isolated nucleic acid as described by the disclosure comprises a region (e.g., a first region) comprising a first adeno-associated virus (AAV) inverted terminal repeat (ITR), or a variant thereof and a second region encoding a transgene associated with a lysosomal storage disorder (e.g., GLB1, HEXA, and/or HEXB). The isolated nucleic acid (e.g., the recombinant AAV vector) may be packaged into a capsid protein and administered to a subject and/or delivered to a selected target cell. The transgene may also comprise a region encoding, for example, a protein and/or an expression control sequence (e.g., a poly-A tail), as described elsewhere in the disclosure.

The instant disclosure provides a vector comprising a single, cis-acting wild-type ITR. In some embodiments, the ITR is a 5' ITR. In some embodiments, the ITR is a 3' ITR Generally, ITR sequences are about 145 bp in length. Preferably, substantially the entire sequences encoding the ITR(s) is used in the molecule, although some degree of minor modification of these sequences is permissible. The ability to modify ITR sequences is within the skill of the art. (See, e.g., texts such as Sambrook et al, "Molecular Cloning. A Laboratory Manual", 2d ed., Cold Spring Harbor Laboratory, New York (1989); and K. Fisher et al., J Virol., 70:520 532 (1996)). For example, an ITR may be mutated at its terminal resolution site (TR), which inhibits replication at the vector terminus where the TR has been mutated and results in the formation of a self-complementary AAV. Another example of such a molecule employed in the present disclosure is a "cis-acting" plasmid containing the transgene, in which the selected transgene sequence and associated regulatory elements are flanked by the 5' AAV ITR sequence and a 3' hairpin-forming RNA sequence. AAV ITR sequences may be obtained from any known AAV, including presently identified mammalian AAV types. In some embodiments, an ITR sequence is an AAV2, AAV3, AAV4, AAV5, AAV6, AAV7, AAV8, AAVrh8, AAV9, AAV10, and/or AAVrh10 ITR sequence.

The isolated nucleic acids and/or rAAVs of the present disclosure may be modified and/or selected to enhance the targeting of the isolated nucleic acids and/or rAAVs to a target tissue (e.g., CNS). Non-limiting methods of modifications and/or selections include AAV capsid serotypes (e.g., AAV8, AAV9), tissue-specific promoters (e.g., Syn1, GFAP), and/or targeting peptides. In some embodiments, the isolated nucleic acids and rAAVs of the present disclosure comprise AAV capsid serotypes with enhanced targeting to CNS tissues (e.g., AAV8, AAV9). In some embodiments, the isolated nucleic acids and rAAVs of the present disclosure comprise tissue-specific promoters (e.g., Syn1, GFAP). In some embodiments, the isolated nucleic acids and rAAVs of the present disclosure comprise AAV capsid serotypes with enhanced targeting to CNS tissues and tissue-specific promoters.

In some aspects, the disclosure provides isolated AAVs. As used herein with respect to AAVs, the term "isolated" refers to an AAV that has been artificially obtained or produced. Isolated AAVs may be produced using recombinant methods. Such AAVs are referred to herein as "recombinant AAVs". Recombinant AAVs (rAAVs) preferably have tissue-specific targeting capabilities, such that a transgene of the rAAV will be delivered specifically to one or more predetermined tissue(s). The AAV capsid is an important element in determining these tissue-specific targeting capabilities. Thus, an rAAV having a capsid appropriate for the tissue being targeted can be selected. In some embodiments, the rAAV comprises an AAV1, AAV2, AAV3, AAV4, AAV5, AAV6, AAV7, AAV8, AAVrh8, AAV9, AAV10 or AAVrh10 capsid protein, or a protein having substantial homology thereto. In some embodiments, the rAAV comprises an AAVrh8 capsid protein.

In some embodiments, the rAAVs of the disclosure are pseudotyped rAAVs. Pseudotyping is the process of producing viruses or viral vectors in combination with foreign viral envelope proteins. The result is a pseudotyped virus particle.

With this method, the foreign viral envelope proteins can be used to alter host tropism or an increased/decreased stability of the virus particles. In some aspects, a pseudotyped rAAV comprises nucleic acids from two or more different AAVs, wherein the nucleic acid from one AAV encodes a capsid protein and the nucleic acid of at least one other AAV encodes other viral proteins and/or the viral genome. In some embodiments, a pseudotyped rAAV refers to an AAV comprising an inverted terminal repeats (ITRs) of one AAV serotype and an capsid protein of a different AAV serotype. For example, a pseudotyped AAV vector containing the ITRs of serotype X encapsidated with the proteins of Y will be designated as AAVX/Y (e.g., AAV2/1 has the ITRs of AAV2 and the capsid of AAV1). In some embodiments, pseudotyped rAAVs may be useful for combining the tissue-specific targeting capabilities of a capsid protein from one AAV serotype with the viral DNA from another AAV serotype, thereby allowing targeted delivery of a transgene to a target tissue.

Methods for obtaining recombinant AAVs having a desired capsid protein are well known in the art. (See, for example, US Patent Application Publication Number US 2003/0138772, the contents of which are incorporated herein by reference in their entirety). Typically the methods involve culturing a host cell which contains a nucleic acid sequence encoding an AAV capsid protein or fragment thereof; a functional rep gene; a recombinant AAV vector composed of, AAV inverted terminal repeats (ITRs) and a transgene; and sufficient helper functions to permit packaging of the recombinant AAV vector into the AAV capsid proteins. Typically, capsid proteins are structural proteins encoded by the cap gene of an AAV. In some embodiments, AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, capsid proteins protect a viral genome, deliver a genome and/or interact with a host cell. In some aspects, capsid proteins deliver the viral genome to a host in a tissue specific manner.

In some embodiments, the AAV capsid protein is of an AAV serotype selected from the group consisting of AAV3, AAV4, AAV5, AAV6, AAV8, AAVrh8 AAV9, AAV10 and AAVrh10. In some embodiments, the AAV capsid protein is of an AAVrh8 or AAVrh10 serotype. In some embodiments, the AAV capsid protein is of an AAVrh8 serotype.

In some embodiments, components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a coding sequence selected from the group consisting of: SEQ ID NOs: 1-6 that is operably linked to a promoter. In some embodiments, the disclosure relates to a composition comprising the host cell described above. In some embodiments, the composition comprising the host cell above further comprises a cryopreservative.

The recombinant AAV vector, rep sequences, cap sequences, and helper functions useful for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al, Molecular Cloning: A Laboratory Manual, Cold Spring Harbor Press, Cold Spring Harbor, N.Y. Similarly, methods of generating rAAV virions are well known and the selection of a suitable method is not a limitation on the present disclosure. See, e.g., K. Fisher et al, J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an recombinant AAV vector (comprising a transgene) to be packaged into AAV particles, an AAV helper function vector, and an accessory function vector. An AAV helper function vector encodes the "AAV helper function" sequences (i.e., rep and cap), which function in trans for productive AAV replication and encapsidation. Preferably, the AAV helper function vector supports efficient AAV vector production without generating any detectable wild-type AAV virions (i.e., AAV virions containing functional rep and cap genes). Non-limiting examples of vectors suitable for use with the present disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (i.e., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpesvirus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced through the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

A "host cell" refers to any cell that harbors, or is capable of harboring, a substance of interest. Often a host cell is a mammalian cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation.

As used herein, the term "cell line" refers to a population of cells capable of continuous or prolonged growth and division in vitro. Often, cell lines are clonal populations derived from a single progenitor cell. It is further known in the art that spontaneous or induced changes can occur in karyotype during storage or transfer of such clonal populations. Therefore, cells derived from the cell line referred to may not be precisely identical to the ancestral cells or cultures, and the cell line referred to includes such variants.

As used herein, the term "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. Thus, the term includes cloning and expression vehicles, as well as viral vectors. In some embodiments, useful vectors are contemplated to be those vectors in which the nucleic acid segment to be transcribed is positioned under the transcriptional control of a promoter. A "promoter" refers to a DNA sequence recognized by the synthetic machinery of the cell, or introduced synthetic machinery, required to initiate the specific transcription of a gene. The phrases "operatively positioned," "under control" or "under transcriptional control" means that the promoter is in the correct location and orientation in relation to the nucleic acid to control RNA polymerase initiation and expression of the gene. The term "expression vector or construct" means any type of genetic construct containing a nucleic acid in which part or all of the nucleic acid encoding sequence is capable of being transcribed. In some embodiments, expression includes transcription of the nucleic acid, for example, to generate a biologically-active polypeptide product or inhibitory RNA (e.g., shRNA, miRNA, miRNA inhibitor) from a transcribed gene.

The foregoing methods for packaging recombinant vectors in desired AAV capsids to produce the rAAVs of the disclosure are not meant to be limiting and other suitable methods will be apparent to the skilled artisan.

Recombinant AAV Vectors

The isolated nucleic acids of the present disclosure may be recombinant AAV (rAAV) vectors. "Recombinant AAV (rAAV) vectors" of the disclosure are typically composed of, at a minimum, a transgene and its regulatory sequences, and 5' and 3' AAV inverted terminal repeats (ITRs). It is this recombinant AAV vector which is packaged into a capsid protein and delivered to a selected target cell. In some embodiments, the transgene is a nucleic acid sequence, heterologous to the vector sequences, which encodes a polypeptide, protein, functional RNA molecule (e.g., miRNA, miRNA inhibitor) or other gene product, of interest. The nucleic acid coding sequence is operatively linked to regulatory components in a manner which permits transgene transcription, translation, and/or expression in a cell of a target tissue.

Aspects of the disclosure relate to the discovery that modifying the regulatory sequences of rAAVs provides levels of transgene expression that are therapeutically effective yet do not cause the vector-mediated toxicity associated with previously used rAAVs. Accordingly, in some embodiments, the disclosure relates to a recombinant AAV (rAAV) comprising modified genetic regulatory elements. In some embodiments, the modified genetic regulatory element is a hybrid promoter.

As used herein, the term "hybrid promoter" refers to a regulatory construct capable of driving transcription an RNA transcript (e.g., a transcript comprising encoded by a transgene) in which the construct comprises two or more regulatory elements artificially arranged. Typically, a hybrid promoter comprises at least one element that is a minimal promoter and at least one element having an enhancer sequence or an intronic, exonic, or UTR sequence comprising one or more transcriptional regulatory elements. In embodiments in which a hybrid promoter comprises an exonic, intronic, or UTR sequence, such sequence(s) may encode upstream portions of the RNA transcript (e.g., as depicted in FIG. 1) while also containing regulatory elements that modulate (e.g., enhance) transcription of the transcript. In some embodiments, two or more elements of a hybrid promoter are from heterologous sources relative to one another. In some embodiments, two or more elements of a hybrid promoter are from heterologous sources relative to the transgene. In some embodiments, two or more elements of a hybrid promoter are from different genetic loci. In some embodiments, two or more elements of a hybrid promoter are from the same genetic locus but are arranged in a manner not found at the genetic locus. In some embodiments, the hybrid promoter comprises a first nucleic acid sequence from one promoter fused to one or more nucleic acid sequences comprises promoter or enhancer elements of a difference source. In some embodiments, a hybrid promoter comprises a first sequence from the chicken beta-actin promoter and a second sequence of the CMV enhancer. In some embodiments, a hybrid promoter comprises a first sequence from a chicken beta-actin promoter and a second sequence from an intron of a chicken-beta actin gene. In some embodiments, a hybrid promoter comprises a first sequence from the chicken beta-actin promoter fused to a CMV enhancer sequence and a sequence from an intron of the chicken-beta actin gene.

In some aspects, the rAAV comprises an enhancer element. As used herein, the term "enhancer element" refers to a nucleic acid sequence that when bound by an activator protein, activates or increases transcription of a gene or genes. Enhancer sequences can be upstream (i.e., 5') or downstream (i.e., 3') relative to the genes they regulate. Examples of enhancer sequences include cytomegalovirus (CMV) enhancer sequence and the Simian vacuolating virus 40 (SV40) enhancer sequence. In some embodiments, rAAVs comprise a CMV enhancer element or a portion thereof. As used herein, the term "a portion thereof" refers to a fragment of a nucleotide or amino acid sequence that retains the desired functional characteristic of the entire nucleotide or amino acid sequence from which it is derived. For example, a "CMV enhancer sequence or a portion thereof" refers to a nucleotide sequence derived from wild-type CMV enhancer that is capable of increasing transcription of a transgene.

In some aspects, the rAAV comprises a posttranscriptional response element. As used herein, the term "posttranscriptional response element" refers to a nucleic acid sequence that, when transcribed, adopts a tertiary structure that enhances expression of a gene. Examples of posttranscriptional regulatory elements include, but are not limited to, woodchuck hepatitis virus posttranscriptional regulatory element (WPRE), mouse RNA transport element (RTE), constitutive transport element (CTE) of the simian retrovirus type 1 (SRV-1), the CTE from the Mason-Pfizer monkey virus (MPMV), and the 5' untranslated region of the human heat shock protein 70 (Hsp70 5'UTR). In some embodiments, the rAAV vector comprises a woodchuck hepatitis virus posttranscriptional regulatory element (WPRE).

In some aspects, the disclosure provides rAAV vectors comprising a hybrid or chimeric intron. As used herein, the term "chimeric intron" refers an intron having sequences from two or more different sources. In some embodiments, a chimeric intron comprises a nucleic acid encoding a splice donor site from a first source (e.g., organism or species) and a splice acceptor site from a second source (e.g., organism or species). In some embodiments, a chimeric intron comprises one or more transcriptional regulatory elements and/or enhancer sequences. In some embodiments, a chimeric intron is positioned between an exon of a hybrid promoter and transgene. In some embodiments, the disclosure provides a rAAV comprising a promoter operably linked to a transgene, wherein the transgene encodes a lysosomal storage protein, and wherein the rAAV further comprises a chimeric intron.

In certain embodiments, the disclosure relates to rAAV vectors comprising artificial transcription elements. As used here, the term "artificial transcription element" refers, in some embodiments, to a synthetic sequence enabling the controlled transcription of DNA by an RNA polymerase to produce an RNA transcript. Transcriptionally active elements of the present disclosure are generally smaller than 500 bp, preferably smaller than 200 bp, more preferably smaller than 100, most preferably smaller than 50 bp. In some embodiments, an artificial transcription element comprises two or more nucleic acid sequences from transcriptionally active elements. Transcriptionally active elements are generally recognized in the art and include, for example, promoter, enhancer sequence, TATA box, G/C box, CCAAT box, specificity protein 1 (Sp1) binding site, Inr region, CRE (cAMP regulatory element), activating transcription factor 1 (ATF1) binding site, ATF1-CRE binding site, APBP box, APBa box, CArG box, CCAC box and those disclosed by U.S. Pat. No. 6,346,415. Combinations of the foregoing transcriptionally active elements are also contemplated.

In some embodiments, the artificial transcription element comprises promoter sequence. In some embodiments, the artificial transcription element comprises enhancer sequence. In some embodiments, the artificial transcription element comprises ATF1-CRE binding site. In some embodiments, the artificial transcription element comprises SP1 binding site. In some embodiments, the artificial transcription element comprises C box. In some embodiments, the artificial transcription element comprises TATA box. In some embodiments, the artificial transcription element comprises ATF1-CRE binding site, SP1 binding site and TATA box. In some embodiments, the artificial transcription element is represented by SEQ ID NO: 2.

Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability; and when desired, sequences that enhance secretion of the encoded product. A great number of expression control sequences, including promoters which are native, constitutive, inducible and/or tissue-specific, are known in the art and may be utilized.

As used herein, a nucleic acid sequence (e.g., coding sequence) and regulatory sequences are said to be "operably" linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly, two or more coding regions are operably linked when they are linked in such a way that their transcription from a common promoter results in the expression of two or more proteins having been translated in frame. In some embodiments, operably linked coding sequences yield a fusion protein. In some embodiments, operably linked coding sequences yield a functional RNA (e.g., shRNA, miRNA, miRNA inhibitor).

For nucleic acids encoding proteins, a polyadenylation sequence generally is inserted following the transgene sequences and before the 3' AAV ITR sequence. A rAAV construct useful in the present disclosure may also contain an intron, desirably located between the promoter/enhancer sequence and the transgene. One possible intron sequence is derived from SV-40, and is referred to as the SV-40 T intron sequence.

Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available [see, e.g., Sambrook et al, and references cited therein at, for example, pages 3.18 3.26 and 16.17 16.27 and Ausubel et al., Current Protocols in Molecular Biology, John Wiley & Sons, New York, 1989]. In some embodiments, a Foot and Mouth Disease Virus 2A sequence is included in polyprotein; this is a small peptide (approximately 18 amino acids in length) that has been shown to mediate the cleavage of polyproteins (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459). The cleavage activity of the 2A sequence has previously been demonstrated in artificial systems including plasmids and gene therapy vectors (AAV and retroviruses) (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459; de Felipe, P et al., Gene Therapy, 1999; 6: 198-208; de Felipe, P et al., Human Gene Therapy, 2000; 11: 1921-1931; and Klump, H et al., Gene Therapy, 2001; 8: 811-817).

The precise nature of the regulatory sequences needed for gene expression in host cells may vary between species, tissues or cell types, but shall in general include, as necessary, 5' non-transcribed and 5' non-translated sequences involved with the initiation of transcription and translation respectively, such as a TATA box, capping sequence, CAAT sequence, enhancer elements, and the like. Especially, such 5' non-transcribed regulatory sequences will include a promoter region that includes a promoter sequence for transcriptional control of the operably joined gene. Regulatory sequences may also include enhancer sequences or upstream activator sequences as desired. The vectors of the disclosure may optionally include 5' leader or signal sequences.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al, Cell, 41:521-530 (1985)], the SV40 promoter, the dihydrofolate reductase promoter, the β-actin promoter, the phosphoglycerol kinase (PGK) promoter, and the EF1a promoter [Invitrogen].

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al, Proc. Natl. Acad. Sci. USA, 93:3346-3351 (1996)), the tetracycline-repressible system (Gossen et al, Proc. Natl. Acad. Sci. USA, 89:5547-5551 (1992)), the tetracycline-inducible system (Gossen et al, Science, 268:1766-1769 (1995), see also Harvey et al, Curr. Opin. Chem. Biol., 2:512-518 (1998)), the RU486-inducible system (Wang et al, Nat. Biotech., 15:239-243 (1997) and Wang et al, Gene Ther., 4:432-441 (1997)) and the rapamycin-inducible system (Magari et al, J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

The AAV sequences of the vector typically comprise the cis-acting 5' and 3' inverted terminal repeat sequences (See, e.g., B. J. Carter, in "Handbook of Parvoviruses", ed., P. Tijsser, CRC Press, pp. 155 168 (1990)). The ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al, "Molecular Cloning. A Laboratory Manual", 2d ed., Cold Spring Harbor Laboratory, New York (1989); and K. Fisher et al., J Virol., 70:520 532 (1996)). An example of such a molecule employed in the present disclosure is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types.

In some embodiments, the rAAVs of the disclosure are pseudotyped rAAVs. For example, a pseudotyped AAV vector containing the ITRs of serotype X encapsidated with the proteins of Y will be designated as AAVX/Y (e.g., AAV2/1 has the ITRs of AAV2 and the capsid of AAV1). In some embodiments, pseudotyped rAAVs may be useful for combining the tissue-specific targeting capabilities of a capsid protein from one AAV serotype with the viral DNA from another AAV serotype, thereby allowing targeted delivery of a transgene to a target tissue.

In addition to the major elements identified above for the recombinant AAV vector, the vector also includes conventional control elements necessary which are operably linked to the transgene in a manner which permits its transcription, translation and/or expression in a cell transfected with the plasmid vector or infected with the virus produced by the disclosure. As used herein, "operably linked" sequences include both expression control sequences that are contiguous with the gene of interest and expression control sequences that act in trans or at a distance to control the gene of interest.

Recombinant AAV Vector: Transgene Coding Sequences

The composition of the transgene sequence of the rAAV vector will depend upon the use to which the resulting vector will be put. For example, one type of transgene sequence includes a reporter sequence, which upon expression produces a detectable signal. In another example, the transgene encodes a therapeutic protein or therapeutic functional RNA. In another example, the transgene encodes a protein or functional RNA that is intended to be used for research purposes, e.g., to create a somatic transgenic animal model harboring the transgene, e.g., to study the function of the transgene product. In another example, the transgene encodes a protein or functional RNA that is intended to be used to create an animal model of disease. Appropriate transgene coding sequences will be apparent to the skilled artisan.

In some aspects, the disclosure relates to rAAV vectors useful for the treatment of lysosomal storage disorders. Lysosomal storage disorders (also referred to as Lysosomal storage diseases) are a group of inherited metabolic disorders that result from defects in lysosomal function. Generally, lysosomal storage diseases are characterized by impaired function of a single protein (e.g., enzyme) involved in lysosomal metabolism. For example, Tay Sachs disease is caused by a genetic mutation in the hexosaminidase A (HEXA) gene and results in the inability of the HEXA enzyme to hydrolyze GM2 gangliosides. Other examples of lysosomal storage diseases and their associated proteins include but are not limited to Aspartylglucosaminuria (Aspartylglucosamininidase), Infantile Batten disease (Palmitoyl protein thioesterase), Late infantile Batten disease (tripeptidyl peptidase), Fabry disease (α-Galactosidase), Fucosidosis (α-Fucosidase), Galactosialidosis (Protective protein/cathepsin A), Gaucher disease (β-Glucosidase), Galactosialidosis (Protective Protein/Cathepsin A), Globoid-cell leukodystrophy (Galactosylceramidase), GM1 gangliosidosis (β-Galactosidase), α-Mannosidosis (α-Mannosidase), Metachromatic leukodystrophy (Arylsulfatase A), Mucopolysaccharidosis I (α-L-Iduronidase), Mucopolysaccharidosis II (iduronate sulfatase), Mucopolysaccharidosis IIIA (Heparin Sulfatase), Mucopolysaccharidosis IIIB (α-N-acetylglucosaminidase), Mucopolysaccharidosis IIIC (acetyl-CoA alpha glucosaminide acetyltransferase), Mucopolysaccharidosis HID (N-acetylglucosamine-6-sulfate sulfatase), Mucopolysaccharidosis IVA (N-acetylgalactosamine 6-sulfatase), Mucopolysaccharidosis IVB (β-Galactosidase), Mucopolysaccharidosis IX (hyaluronidase), Mucopolysaccharidosis VI (Arylsulfatase B), Mucopolysaccharidosis VII (β-Glucuronidase), Mucolipidosis type I (α-neuraminidase), Mucolipidosis type II (GlcNAc-1-phosphotransferase), Mucolipidosis type III (N-acetylglucosamine-1-phosphotransferase), Nieman-Pick disease (Acid sphingomyelinase), Pompe disease (α-Glucosidase), Sandhoff disease (β-Hexosaminidase A and B), Schindler disease (α-N-acetylgalactosaminidase), Tay Sachs disease (β-Hexosaminidase A/B), and Wolman disease (Acid lipase).

In some embodiments, the disclosure provides an rAAV comprising a transgene encoding a lysosomal storage disease-related protein. In some embodiments, the lysosomal storage disease-related protein is selected from the group consisting of HEXA, HEXB, and GLB1. In some embodiments, the lysosomal storage disease-related protein is HEXA and comprises the sequence as set forth in SEQ ID NO: 20. In some embodiments, the lysosomal storage disease-related protein is HEXB and comprises the sequence as set forth in SEQ ID NO: 21. In some embodiments, the lysosomal storage disease-related protein is GLB1 and comprises the sequence as set forth in SEQ ID NO: 23.

Also contemplated herein are methods of treating a lysosomal storage disease by delivering a transgene to a subject using the rAAVs described herein. In some embodiments, the disclosure relates to a method for treating a lysosomal storage disease, the method comprising administering a rAAV to a subject. In some embodiments, the rAAV comprises a hybrid promoter. In some embodiments, the rAAV comprises a chimeric intron. In some embodiments, the rAAV comprises an artificial transcription element. In some embodiments, the artificial transcription element comprises ATF1-CRE binding site, SP1 binding site and TATA box. In some embodiments, the promoter, chimeric intron or artificial transcription element is operably linked to a transgene. In some embodiments, the transgene is a lysosomal storage disease related transgene. In some embodiments, the transgene is selected from the group consisting of HEXA, HEXB and GLB1. In some embodiments, the lysosomal storage disease is GM2 gangliosidosis (Sandhoff Disease and Tay Sachs Disease) and rAAV comprises a transgene encoding HEXA and HEXB. In some embodiments, the lysosomal storage disease is GM1 gangliosidosis and the transgene encodes GLB1.

In some aspects, the disclosure provides an rAAV comprising a capsid containing a nucleic acid having a first cell-type-specific promoter operably linked to a first transgene and a second cell-type-specific promoter linked to a second transgene, wherein the first promoter and the second promoter are not specific for the same cell-type. Without wishing to be bound by any particular theory, such rAAV vectors are useful, in some embodiments for the treatment of diseases that affect multiple cell types within a given tissue (e.g., CNS tissue).

Thus, in some aspects, the disclosure relates to rAAV vectors useful for the treatment of CNS-associated diseases.

As used herein, "CNS-associated disease" refers to a disease or condition of the central nervous system. A CNS-associated disorder may affect the spinal cord (e.g., a myelopathy), brain (e.g., a encephalopathy) or tissues surrounding the brain and spinal cord. A CNS-related disorder may be of a genetic origin, either inherited or acquired through a somatic mutation. A CNS-related disorder may be a psychological condition or disorder, e.g., Attention Deficit Hyperactivity Disorder, Autism Spectrum Disorder, Mood Disorder, Schizophrenia, Depression, Rhett Syndrome, etc. A CNS-related disorder may be an autoimmune disorder. A CNS-related disorder may also be a cancer of the CNS, e.g., brain cancer. A CNS-related disorder that is a cancer may be a primary cancer of the CNS, e.g., an astrocytoma, glioblastomas, etc., or may be a cancer that has metastasized to CNS tissue, e.g., a lung cancer that has metastasized to the brain. Further non-limiting examples of CNS-related disorders, include Huntington's disease, Parkinson's Disease, Lysosomal Storage Disease, Ischemia, Neuropathic Pain, Amyotrophic lateral sclerosis (ALS), Multiple Sclerosis (MS), Canavan disease (CD), frontotemporal lobar degeneration (FTLD), spinocerebellar ataxias, spinal and bulbar muscular atrophy, dentatorubropallidoluysian atrophy, and Freiderich's ataxia.

In some embodiments, an rAAV vector described by the disclosure comprises a transgene encoding a CNS disease-associated gene. In some embodiments, a transgene encoding a CNS disease-associated gene encodes a protein or interfering RNA. Examples of interfering RNA include but are not limited to dsRNA, siRNA, shRNA, miRNA, and artificial miRNA (amiRNA). Examples of genes associated with CNS disease include but are not limited to DRD2, GRIA1, GRIA2,GRIN1, SLCIA1, SYP, SYT1, CHRNA7, 3Rtau/4rTUS, APP, BAX, BCL-2, GRIK1, GFAP, IL-1, AGER, associated with Alzheimer's Disease; UCH-L1, SKP1, EGLN1, Nurr-1, BDNF, TrkB,gstm1, S106β, associated with Parkinson's Disease; huntingtin (Htt), IT15, PRNP, JPH3, TBP, ATXN1, ATXN2, ATXN3, Atrophin 1, FTL, TITF-1, Xbp1s, CRAG, associated with Huntington's Disease; FXN, associated with Freidrich's ataxia; ASPA, associated with Canavan's Disease; DMD, associated with muscular dystrophy; SMN1, UBE1, DYNC1H1 associated with spinal muscular atrophy; ALS2, ANG, ATXN2, C9orf72, DCTN1, FIG4, FUS, NEFH, OPTN, PFN1, PRPH, SETX, SIGMAR1, SMN1, SOD1, SPG11, TARDBP, UBQLN2, VAPB, VCP, associated with amyotrophic lateral sclerosis (ALS); MAN2B1, MAN2B2, MAN2C1, associated with Alpha-Mannosidosis; AGA, associated with Aspartylglucosaminuria; CLN1, CLN2, CLN3, CLN5, CLN6, MFSD8, CLN8, CTSD, associated with Batten disease; MANBA, associated with Beta-Mannosidosis; CTNS, associated with cystinosis; LAMP2, associated with Danon disease; GLA, associated with Fabry disease; ASAH1, associated with Farber disease; FUCA1, associated with fucosidosis; CTSA, associated with Galactosialidosis; GBA, associated with Gaucher disease; GALC, associated with Krabbe disease; ARSA, associated with metachromic leukodystrophy; and IDUA, IDS, SGSH, NAGLU, HGSNAT, GNS, GALNS, ARSB, GUSB, HYAL1, SMPD1, NPC1, NPC2, GAA, NAGA, SLCA17A5, and LAL (LIPA), associated with Mucopolysaccharidosis disorders (e.g., Hurler syndrome, Hunter syndrome, Sanfilippo A-D, Morquio, hyaluronidase deficiency, Maroteaux-Lamy, Sly syndrome, sialidosis, I-cell disease, mucolipidosis types I-IV, multiple sulfatase deficiency, Niemann-Pick types A-C, Pompe disease, Pycnodysostosis, Sandhoff disease, Schlinder disease, Tay Sachs, Wolman disease).

Useful transgene products also include miRNAs. miRNAs and other small interfering nucleic acids regulate gene expression via target RNA transcript cleavage/degradation or translational repression of the target messenger RNA (mRNA). miRNAs are natively expressed, typically as final 19-25 non-translated RNA products. miRNAs exhibit their activity through sequence-specific interactions with the 3' untranslated regions (UTR) of target mRNAs. These endogenously expressed miRNAs form hairpin precursors which are subsequently processed into a miRNA duplex, and further into a "mature" single stranded miRNA molecule. This mature miRNA guides a multiprotein complex, miRISC, which identifies target site, e.g., in the 3' UTR regions, of target mRNAs based upon their complementarity to the mature miRNA. In some embodiments, an inhibitory RNA is a miRNA. In some embodiments, an rAAV described by the disclosure comprises a transgene encoding an inhibitory RNA targeting human SOD1 (e.g., SOD1$^{G93A}$) and comprises SEQ ID NO: 15.

Recombinant AAV Administration Methods

The rAAVs may be delivered to a subject in compositions according to any appropriate methods known in the art. The rAAV, preferably suspended in a physiologically compatible carrier (i.e., in a composition), may be administered to a subject, i.e., host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human.

Delivery of the rAAVs to a mammalian subject may be by, for example, intramuscular injection or by administration into the bloodstream of the mammalian subject. Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue. Moreover, in certain instances, it may be desirable to deliver the virions to the CNS of a subject. By "CNS" is meant all cells and tissue of the brain and spinal cord of a vertebrate. Thus, the term includes, but is not limited to, neuronal cells, glial cells, astrocytes, cerebrospinal fluid (CSF), interstitial spaces, bone, cartilage and the like. Recombinant AAVs may be delivered directly to the CNS or brain by injection into, e.g., the ventricular region, as well as to the striatum (e.g., the caudate nucleus or putamen of the striatum), spinal cord and neuromuscular junction, or cerebellar lobule, with a needle, catheter or related device, using neurosurgical techniques known in the art, such as by stereotactic injection (see, e.g., Stein et al., J Virol 73:3424-3429, 1999; Davidson et al., PNAS 97:3428-3432, 2000; Davidson et al., Nat. Genet. 3:219-223, 1993; and Alisky and Davidson, Hum. Gene Ther. 11:2315-2329, 2000).

In some embodiments, the rAAVs of the disclosure are administered to the CNS by lumbar intrathecal injection (LIT). In some embodiments, the rAAVs of the disclosure are administered directly to the thalamus of the brain by injection (e.g., thalamic injection). In some embodiments, two thalamic injections of the rAAVs are performed bilaterally. In some embodiments, the rAAVs of the disclosure are administered directly to the deep cerebellar nuclei (DCN) by injection. In some embodiments, the rAAVs of the disclosure are administered both bilaterally to the thalamus and to the DCN by injection. In some embodiments, the rAAV of the disclosure are administered directly by intracerebroventricular (ICV) injection. In some embodiments, the rAAVs of the disclosure are administered both bilaterally to the thalamus and to the ICV by injection. In some embodiments, the rAAVs of the disclosure are directly administered to the DCN and the ICV by injection.

In some embodiments, rAAV as described in the disclosure are administered by intravenous injection. In some embodiments, the rAAV are administered by intracerebral injection. In some embodiments, the rAAV are administered by intrathecal injection. In some embodiments, the rAAV are delivered by intracranial injection. In some embodiments, the rAAV are delivered by cisterna magna injection. In some embodiments, the rAAV are delivered by cerebral lateral ventricle injection. In some embodiments, the rAAVs of the disclosure are administered to the spinal canal through a fluoroscopic-guided lumbar intrathecal catheter. In some embodiments, the rAAVs of the disclosure are administered both to the cisterna magna and to the intrathecal space (e.g., the spinal canal). In some embodiments, the rAAVs of the disclosure are administered to the cisterna magna, the intrathecal space (e.g., the spinal canal), and the thalamus (e.g., by intrathalamic injection).

Aspects of the disclosure relate to compositions comprising a recombinant AAV comprising at least one modified genetic regulatory sequence or element. In some embodiments, the composition further comprises a pharmaceutically acceptable carrier.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

In some aspects, the disclosure relates to a composition (e.g., a pharmaceutical composition) comprising an rAAV comprising a nucleic acid encoding a HexA gene. In some aspects, the disclosure relates to a composition (e.g., a pharmaceutical composition) comprising an rAAV comprising a nucleic acid encoding a HexB gene. In some aspects, the disclosure relates to a composition (e.g., a pharmaceutical composition) comprising a first rAAV comprising a nucleic acid encoding a HexA gene and a second rAAV comprising a nucleic acid encoding a HexB gene.

The ratio of rAAV encoding HexA:rAAV encoding HexB in a pharmaceutical composition can vary, for example from about 1:10 to about 10:1. In some embodiments, the ratio of rAAV encoding HexA:rAAV encoding HexB is a 1:1 ratio. In some embodiments, the ratio of rAAV encoding HexA:rAAV encoding HexB is a 1:2 ratio. In some embodiments, the ratio of rAAV encoding HexA:rAAV encoding HexB is a 1:5 ratio. In some embodiments, the ratio of rAAV encoding HexA:rAAV encoding HexB is a 1:10 ratio. In some embodiments, the ratio of rAAV encoding HexA:rAAV encoding HexB is a 2:1 ratio. In some embodiments, the ratio of rAAV encoding HexA:rAAV encoding HexB is a 5:1 ratio. In some embodiments, the ratio of rAAV encoding HexA:rAAV encoding HexB is a 10:1 ratio.

In some embodiments, the ratio of rAAV encoding HexB:rAAV encoding HexA is a 1:2 ratio. In some embodiments, the ratio of rAAV encoding HexB:rAAV encoding HexA is a 1:5 ratio. In some embodiments, the ratio of rAAV encoding HexB:rAAV encoding HexA is a 1:10 ratio. In some embodiments, the ratio of rAAV encoding HexB:rAAV encoding HexA is a 2:1 ratio. In some embodiments, the ratio of rAAV encoding HexB:rAAV encoding HexA is a 5:1 ratio. In some embodiments, the ratio of rAAV encoding HexB:rAAV encoding HexA is a 10:1 ratio.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., injection into the CNS), oral, inhalation (including intranasal and intratracheal delivery), intraocular, intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art.

An effective amount of an rAAV is an amount sufficient to target infect an animal, target a desired tissue. In some embodiments, an effective amount of an rAAV is an amount sufficient to produce a stable somatic transgenic animal model. The effective amount will depend primarily on factors such as the species, age, weight, health of the subject, and the tissue to be targeted, and may thus vary among animal and tissue. For example, an effective amount of the rAAV is generally in the range from about 1 ml to about 100 ml of solution containing from about $10^6$ to $10^{16}$ genome copies (e.g., from $1 \times 10^6$ to $1 \times 10^{16}$, inclusive). In some cases, a dosage between about $10^6$ to $10^{12}$ rAAV genome copies is appropriate. In some embodiments, a dosage of between about $10^{11}$ to $10^{13}$ rAAV genome copies is appropriate. In some embodiments, a dosage of between about $10^{11}$ to $10^{14}$ rAAV genome copies is appropriate. In some embodiments, a dosage of between about $10^{11}$ to $10^{15}$ rAAV genome copies is appropriate. In some embodiments, a dosage of about $10^{12}$ to $10^{14}$ rAAV genome copies is appropriate. In some embodiments, a dosage of about $10^{13}$ to $10^{14}$ rAAV genome copies is appropriate. In some embodiments, a dosage of about $1 \times 10^{12}$, about $1.1 \times 10^{12}$, about $1.2 \times 10^{12}$, about $1.3 \times 10^{12}$, about $1.4 \times 10^{12}$, about $1.5 \times 10^{12}$, about $1.6 \times 10^{12}$, about $1.7 \times 10^{12}$, about $1.8 \times 10^{12}$, about $1.9 \times 10^{12}$, about $1 \times 10^{13}$, about $1.1 \times 10^{13}$, about $1.2 \times 10^{13}$, about $1.3 \times 10^{13}$, about $1.4 \times 10^{13}$, about $1.5 \times 10^3$, about $1.6 \times 10^{13}$, about $1.7 \times 10^{13}$, about $1.8 \times 10^{13}$, about $1.9 \times 10^{13}$, or about $2.0 \times 10^{14}$ vector genome (vg) copies per kilogram (kg) of body weight is appropriate. In some embodiments, a dosage of between about $4 \times 10^{12}$ to $2 \times 10^1 3$ rAAV genome copies is appropriate. In some embodiments, a dosage of $4.68 \times 10^7$ is appropriate. In some embodiments, a dosage of $4.68 \times 10^8$ genome copies is appropriate. In some embodiments, a dosage of $4.68 \times 10^9$ genome copies is appropriate. In some embodiments, a dosage of $1.17 \times 10^{10}$ genome copies is appropriate. In some embodiments, a dosage of $2.34 \times 10^{10}$ genome copies is appropriate. In some embodiments, a dosage of $3.20 \times 10^{11}$ genome copies is appropriate. In some embodiments, a dosage of about $4.2 \times 10^{12}$ genome copies is appropriate. In some embodiments, a dosage of $1.2 \times 10^3$ genome copies is appropriate. In some embodiments, a dosage of $1.3 \times 10^{13}$ genome copies is appropriate. In some embodiments, a dosage of $1.5 \times 10^{13}$ vector genome (vg) copies is appropriate. In some embodiments, a dosage of about $1 \times 10^{14}$ vector genome (vg) copies is appropriate. In some embodiments a dosage of about $1.5 \times 10^{13}$ vg/kg by intravenous administration is appropriate. In some embodiments, a dosage of about $1 \times 10^{14}$ vg/kg brain weight is appropriate. In certain embodiments, $10^2$-$10^{13}$ rAAV genome copies is effective to target tissues associated with lysosomal storage diseases, for example brain tissue or CNS tissue. In certain embodiments, $10^{13}$-$10^{14}$ rAAV genome copies is effective to target tissues associated with lysosomal storage diseases, for example brain tissue or CNS tissue. In some embodiments, the dose of rAAV administered to the subject intravenously is between about $10^{11}$ to $10^{14}$ rAAV vector genome (vg) copies per kilogram (kg) of body weight. In some embodiments, the dose delivered intravenously is between $1 \times 10^{13}$ to $1 \times 10^{14}$ vg/kg, $1 \times 10^{12}$ to $1 \times 10^{14}$ vg/kg, or $1 \times 10^{13}$ to $1 \times 10^{14}$ vg/kg. In some embodiments, the dose delivered intravenously is between about $1.2 \times 10^{13}$ to $1.8 \times 10^{13}$ vg/kg. In some embodiments, the dose delivered intravenously is about $1.5 \times 10^{13}$ vg/kg. In some embodiments, administration of the dosage comprises delivery to the cerebrospinal fluid (CSF). In some embodiments, the total dosage is delivered (i) to the CSF by injection via the cisterna magna and/or the intrathecal space (e.g., spinal canal), and/or (ii) to the thalamus by intrathalamic injection. In some embodiments, about 75% of the total dose is delivered to the cisterna magna. In some embodiments, about 25% of the total dose is delivered to the intrathecal space. In some embodiments, about 75% of the total dose to the CSF is delivered to the cisterna magna. In some embodiments, about 25% of the total dose to the CSF is delivered to the intrathecal space. In some cases, stable transgenic animals are produced by multiple doses of an rAAV.

In some embodiments, the dose delivered to the thalamus is about $1 \times 10^{11}$ to $1 \times 10^{14}$ vg, $1 \times 10^{12}$ to $1 \times 10^{14}$ vg, or $1 \times 10^{12}$ to $5 \times 10^{13}$ vg. In some embodiments, the dose delivered to the thalamus is about $2.8 \times 10^{12}$ to $1.1 \times 10^{13}$ vg. In some embodiments, the dose delivered to the thalamus is about $7.2 \times 10^{12}$ to $1.4 \times 10^{13}$ vg.

In some embodiments, the volume delivered to the thalamus is about 0.5 mL to about 1.5 mL, about 0.75 mL to about 1.25 mL, or about 0.8 mL to about 1.2 mL.

In some embodiments, the dose delivered to the cisterna magna and/or the intrathecal space (e.g., spinal canal) is $1 \times 10^{12}$ to $1 \times 10^{15}$ vg, $1 \times 10^{13}$ to $1 \times 10^{15}$ vg, or $1 \times 10^{13}$ to $1 \times 10^{14}$ vg. In some embodiments, the dose delivered to the cisterna magna and/or the intrathecal space (e.g., spinal canal) is about $2.0 \times 10^{13}$ to $9.0 \times 10^{13}$ vg. In some embodiments, the dose delivered to the intrathecal space (e.g., spinal canal) is about $2.0\times10^{13}$ to $8.13\times10^{13}$ vg.

In some embodiments, the volume delivered to the intrathecal space (e.g., spinal canal) is about 1 mL to about 10 mL, or about 2 mL to about 8 mL. In some embodiments, the volume delivered to the intrathecal space (e.g., spinal canal) is about 2 mL, 3 mL, 4 mL, 5 mL, 6 mL, 7 mL, or 8 mL.

In some embodiments, delivery to a subject (e.g. the CSF, intrathecal space, and/or cisterna magna of a subject) is performed by intravascular microcatheter. In some embodiments, a dosage of $1\times10^{14}$ vg is delivered via intravascular microcatheter. In some embodiments, the dose is delivered by inserting an intravascular microcatheter, removing 14 mL of CSF from the subject by passive flow, and subsequently administering 9 ml of rAAV to the subject at ~1 mL/min at cisterna magna level of the subject. In some embodiments. delivery to a subject is performed by lumbar infusion (e.g., administration to the intrathecal space in the lumbar region), for example by intravascular microcatheter. In some embodiments, the delivery is lumbar infusion to the L2 region of the subject. In some embodiments, a volume of 3 ml rAAV vector is administered to the subject.

In some embodiments, the disclosure relates to methods for administering rAAV compositions comprising transgenes encoding lysosomal storage disease proteins to subjects in need thereof (e.g., subjects having or suspected of having a lysosomal storage disorder, such as Tay Sachs or Sandhoff disease). In some embodiments, the subject has $\leq1.0\%$, $\leq0.5\%$, or $\leq0.1\%$ of normal β-Hexosaminidase A activity in the subject's CSF prior to administration of a rAAV or composition comprising the same as disclosed herein, e.g., as measured using an artificial substrate such as a MUG or MUGS. In some embodiments, the subject has infantile Tay-Sachs disease. In some embodiments, the subject is 5-36 months old. In some embodiments, the subject is 12-36 months old. In some embodiments, the subject is 18-30 months old.

In some aspects, the disclosure relates to the recognition that one potential side-effect for administering an AAV to a subject is an immune response in the subject to the AAV, including inflammation. In some embodiments, a subject is immunosuppressed prior to administration of one or more rAAVs as described herein.

As used herein, "immunosuppressed" or "immunosuppression" refers to a decrease in the activation or efficacy of an immune response in a subject. Immunosuppression can be induced in a subject using one or more (e.g., multiple, such as 2, 3, 4, 5, or more) agents, including, but not limited to, rituximab, methylprednisolone, prednisolone, sirolimus, immunoglobulin injection, prednisone, Solu-Medrol, Lansoprazole, trimethoprim/sulfamethoxazole, methotrexate, and any combination thereof. In some embodiments, the immunosuppression regimen comprises administering sirolimus, prednisolone, lansoprazole, trimethoprim/sulfamethoxazole, or any combination thereof.

In some embodiments, methods described by disclosure further comprise the step inducing immunosuppression (e.g., administering one or more immunosuppressive agents) in a subject prior to the subject being administered an rAAV (e.g., an rAAV or pharmaceutical composition as described by the disclosure). In some embodiments, a subject is immunosuppressed (e.g., immunosuppression is induced in the subject) between about 30 days and about 0 days (e.g., any time between 30 days until administration of the rAAV, inclusive) prior to administration of the rAAV to the subject.

In some embodiments, the subject is pre-treated with immune suppression (e.g., rituximab, sirolimus, and/or prednisone) for at least 7 days.

In some embodiments, the methods described in this disclosure further comprise co-administration or prior administration of an agent to a subject administered an rAAV or pharmaceutical composition comprising an rAAV of the disclosure. In some embodiments, the agent is selected from a group consisting of Miglustat, Keppra, Prevacid, Clonazepam, and any combination thereof.

In some embodiments, immunosuppression of a subject maintained during and/or after administration of a rAAV or pharmaceutical composition. In some embodiments, a subject is immunosuppressed (e.g., administered one or more immunosuppressants) for between 1 day and 1 year after administration of the rAAV or pharmaceutical composition.

In some embodiments, rAAV compositions are formulated to reduce aggregation of AAV particles in the composition, particularly where high rAAV concentrations are present (e.g., $\sim10^{13}$ GC/ml or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either subcutaneously, intrapancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500.ANG., containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 µm) should be designed using polymers able to be degraded in vivo. Biodegradable polyalkyl-cyanoacrylate nanoparticles that meet these requirements are contemplated for use.

In addition to the methods of delivery described above, the following techniques are also contemplated as alternative methods of delivering the rAAV compositions to a host. Sonophoresis (e.g., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S. Pat. Nos. 5,770,219 and 5,783,208) and feedback-controlled delivery (U.S. Pat. No. 5,697,899).

In some embodiments, the disclosure relates to administration of one or more additional therapeutic agents to a subject who has been administered an rAAV or pharmaceutical composition as described herein. For example, administration of wild-type isolated protein to mitigate decreased enzyme activity in enzyme replacement therapy (ERT) has been observed to effectively treat lysosomal storage disorders, including Gaucher Disease, Hunter Syndrome, Fabry Disease, Pompe Disease, Maroteaux-Lamy Syndrome, Morquio A Syndrome, and LAL deficiency. Thus, in some embodiments, a subject is administered one or more enzyme replacement therapy (ERT) in addition to an rAAV or pharmaceutical composition as described by the disclosure. ERTs are generally known and are described, for example by Li (2018) *Pediatr Ann.* 47(5):e191-e197.

The compositions described herein may, in some embodiments, further comprise isolated proteins. In some embodiments, the compositions comprise isolated wild-type HexA protein. In some embodiments, the compositions comprise isolated wild-type HexB protein. In some embodiments, the compositions comprise isolated wild-type HexA and HexB proteins. In some embodiments, the compositions comprise rAAVs and isolated wild-type HexA protein. In some embodiments, the compositions comprise rAAVs and isolated wild-type HexB protein. In some embodiments, the compositions comprise rAAVs and isolated wild-type HexA and HexB proteins.

Kits and Related Compositions

The agents described herein may, in some embodiments, be assembled into pharmaceutical or diagnostic or research kits to facilitate their use in therapeutic, diagnostic or research applications. A kit may include one or more containers housing the components of the disclosure and instructions for use. Specifically, such kits may include one or more agents described herein, along with instructions describing the intended application and the proper use of these agents. In certain embodiments agents in a kit may be in a pharmaceutical formulation and dosage suitable for a particular application and for a method of administration of the agents. Kits for research purposes may contain the components in appropriate concentrations or quantities for running various experiments.

In some embodiments, the disclosure relates to a kit for producing a rAAV, the kit comprising a container housing an isolated nucleic acid having a sequence of any one of SEQ ID NOs: 1-6 or 16-19. In some embodiments, the kit further comprises instructions for producing the rAAV. In some embodiments, the kit further comprises at least one container housing a recombinant AAV vector, wherein the recombinant AAV vector comprises a transgene.

In some embodiments, the disclosure relates to a kit comprising a container housing a recombinant AAV as described supra. In some embodiments, the kit further comprises a container housing a pharmaceutically acceptable carrier. For example, a kit may comprise one container housing a rAAV and a second container housing a buffer suitable for injection of the rAAV into a subject. In some embodiments, the container is a syringe.

The kit may be designed to facilitate use of the methods described herein by researchers and can take many forms. Each of the compositions of the kit, where applicable, may be provided in liquid form (e.g., in solution), or in solid form, (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. As used herein, "instructions" can define a component of instruction and/or promotion, and typically involve written instructions on or associated with packaging of the disclosure. Instructions also can include any oral or electronic instructions provided in any manner such that a user will clearly recognize that the instructions are to be associated with the kit, for example, audiovisual (e.g., videotape, DVD, etc.), Internet, and/or web-based communications, etc. The written instructions may be in a form prescribed by a governmental agency regulating the manufacture, use or sale of pharmaceuticals or biological products, which instructions can also reflect approval by the agency of manufacture, use or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The agents may be in the form of a liquid, gel or solid (powder). The agents may be prepared sterilely, packaged in syringe and shipped refrigerated. Alternatively, it may be housed in a vial or other container for storage. A second container may have other agents prepared sterilely. Alternatively the kit may include the active agents premixed and shipped in a syringe, vial, tube, or other container. The kit may have one or more or all of the components required to administer the agents to an animal, such as a syringe, topical application devices, or iv needle tubing and bag, particularly in the case of the kits for producing specific somatic animal models.

In some cases, the methods involve transfecting cells with total cellular DNAs isolated from the tissues that potentially harbor proviral AAV genomes at very low abundance and supplementing with helper virus function (e.g., adenovirus) to trigger and/or boost AAV rep and cap gene transcription in the transfected cell. In some cases, RNA from the transfected cells provides a template for RT-PCR amplification of cDNA and the detection of novel AAVs. In cases where cells are transfected with total cellular DNAs isolated from the tissues that potentially harbor proviral AAV genomes, it is often desirable to supplement the cells with factors that promote AAV gene transcription. For example, the cells may also be infected with a helper virus, such as an Adenovirus or a Herpes Virus. In a specific embodiment, the helper functions are provided by an adenovirus. The adenovirus may be a wild-type adenovirus, and may be of human or non-human origin, preferably non-human primate (NHP) origin. Similarly, adenoviruses known to infect non-human animals (e.g., chimpanzees, mouse) may also be employed in the methods of the disclosure (See, e.g., U.S. Pat. No. 6,083,716). In addition to wild-type adenoviruses, recombinant viruses or non-viral vectors (e.g., plasmids, episomes, etc.) carrying the necessary helper functions may be utilized. Such recombinant viruses are known in the art and may be prepared according to published techniques. See, e.g., U.S. Pat. Nos. 5,871,982 and 6,251,677, which describe a hybrid Ad/AAV virus. A variety of adenovirus strains are available from the American Type Culture Collection, Manassas, Va., or available by request from a variety of commercial and institutional sources. Further, the sequences of many such strains are available from a variety of databases including, e.g., PubMed and GenBank.

Cells may also be transfected with a vector (e.g., helper vector) which provides helper functions to the AAV. The vector providing helper functions may provide adenovirus functions, including, e.g., E1a, E1b, E2a, E40RF6. The sequences of adenovirus gene providing these functions may be obtained from any known adenovirus serotype, such as serotypes 2, 3, 4, 7, 12 and 40, and further including any of the presently identified human types known in the art. Thus, in some embodiments, the methods involve transfecting the cell with a vector expressing one or more genes necessary for AAV replication, AAV gene transcription, and/or AAV packaging.

In some cases, a novel isolated capsid gene can be used to construct and package recombinant AAV vectors, using methods well known in the art, to determine functional characteristics associated with the novel capsid protein encoded by the gene. For example, novel isolated capsid genes can be used to construct and package recombinant AAV (rAAV) vectors comprising a reporter gene (e.g., B-Galactosidase, GFP, Luciferase, etc.). The rAAV vector can then be delivered to an animal (e.g., mouse) and the tissue targeting properties of the novel isolated capsid gene can be determined by examining the expression of the reporter gene in various tissues (e.g., heart, liver, kidneys) of the animal. Other methods for characterizing the novel isolated capsid genes are disclosed herein and still others are well known in the art.

The kit may have a variety of forms, such as a blister pouch, a shrink wrapped pouch, a vacuum sealable pouch, a sealable thermoformed tray, or a similar pouch or tray form, with the accessories loosely packed within the pouch, one or more tubes, containers, a box or a bag. The kit may be sterilized after the accessories are added, thereby allowing the individual accessories in the container to be otherwise unwrapped. The kits can be sterilized using any appropriate sterilization techniques, such as radiation sterilization, heat sterilization, or other sterilization methods known in the art. The kit may also include other components, depending on the specific application, for example, containers, cell media, salts, buffers, reagents, syringes, needles, a fabric, such as gauze, for applying or removing a disinfecting agent, disposable gloves, a support for the agents prior to administration etc.

The instructions included within the kit may involve methods for detecting a latent AAV in a cell. In addition, kits of the disclosure may include, instructions, a negative and/or positive control, containers, diluents and buffers for the sample, sample preparation tubes and a printed or electronic table of reference AAV sequence for sequence comparisons.

Methods of Treating Lysosomal Storage Disorders

Aspects of the present disclosure provide methods for treating a lysosomal storage disorder. Lysosomal storage disorders (LSD) are a class of >50 disorders associated with malfunction of a resident enzyme which leads to accumulation of un-degraded substrates in lysosomes. Over time, this accumulation can lead to lysosomal malfunction which results in a cascade of events often resulting in cell death. LSDs with central nervous system (CNS) involvement require the intended therapy to cross or bypass the blood brain barrier in order to deliver functional enzyme to target cells to achieve disease resolution. One therapeutic delivery approach has been AAV-mediated target gene delivery.

In some embodiments of the present disclosure, a lysosomal storage disorder is GM1 gangliosidosis, an autosomal recessive disorder which is universally fatal. GM1 gangliosidosis (OMIM #230500) is caused by mutations in the GLB1 gene, which encodes the enzyme β-galactosidase. Types I-III GM1 gangliosidosis are described based on the amount of residual β-gal activity and the onset of the disease, with Type I presenting in the infantile stage, Type II presenting in either late-infantile or juvenile stages, and Type III presenting in adulthood. In some embodiments, the present disclosure provides methods and compositions for administration to subjects having or suspected of having Type II GM1. Patients with Type II GM1 and late-infantile onset generally develop symptoms between 1 and 3 years of age, with a life expectancy of five to ten years. These subjects meet developmental milestones within the first year, but then begin to lose previously-acquired skills, such as speech and mobility. Patients with Type II GM1 and juvenile onset develop symptoms between three and ten years of age and similarly show a regression of previously-attained skills, such as speech and mobility.

In some embodiments, GLB1 is human (GeneID: 2720) and comprises a sequence set forth in NM_000404.3, NM_001079811.2, NM_001135602.2, or NM_00137040.1. In some embodiments, GLB1 is human and comprises an amino acid sequence as forth in NP_000395.2, NP_001073279.1, NP_00129074.1, or NP_001303969.1. In some embodiments, GLB1 is mouse GLB1 (Gene ID: 12091) and comprises a sequence as set forth in NM_009752.2. In some embodiments, GLB1 is human and comprises an amino acid sequence as set forth in NP_033882.1. In some embodiments, GLB1 comprises a mutation such as P10L, R59C, R59H, R121S, G123R, M132T, G134V, P136S, R148S, D151V, D151Y, and/or any other mutation in GLB1 associated with decreased β-gal activity in lysosomes (e.g., as listed provided Uniprot-KB, P16278, the contents of which are incorporated here in their entirety).

In some aspects, the present disclosure provides a method for treating GM1 gangliosidosis. GM1 gangliosidosis may be Type I, Type II, or Type III GM1 gangliosidosis. Because GM1 gangliosidosis is caused by deficient β-galactosidase (0-gal) protein activity, methods of treating GM1 gangliosidosis provide increased β-gal activity. Non-limiting examples of methods to increase β-gal activity include expressing wild-type GLB1 in a cell or subject, decreasing expression of a mutant GLB1 gene in a cell or subject, or providing a cell or subject with wild-type GLB1 protein (e.g., enzyme replacement therapy). In some embodiments, GM1 can be treated by administering an isolated nucleic acid or a rAAV comprising transgene encoding GLB1 (e.g., wild-type GLB1). In some embodiments, the transgene comprises a wild-type GLB1 sequence as set forth in SEQ ID NO: 23.

GLB1 activity in a cell or subject having GM1 gangliosidosis may be increased by performing methods of the present disclosure. The GLB1 activity in a cell or subject having GM1 gangliosidosis may be increased by 50%-500%. The GLB1 activity in a cell or subject having GM1 gangliosidosis may be increased by at least 50%. The GLB1 activity in a cell or subject having GM1 gangliosidosis may be increased by at least 500%. The GLB1 activity in a cell or subject having GM1 gangliosidosis may be increased by 100%-400%. The GLB1 activity in a cell or subject having GM1 gangliosidosis may be increased by 200%. 500%. The GLB1 activity in a cell or subject having GM1 gangliosidosis may be increased by 50%, 60%, 70%, 80%, 90%, 100%, 125%, 150%, 175%, 200%, 225%, 250%, 275%, 300%, 325%, 350%, 375%, 400%, 425%, 450%, 475%, or 500%.

Methods for treating GM1 gangliosidosis in a subject may comprise administering an isolated nucleic acid, rAAV, or composition of the present claims that comprises a transgene encoding human GLB1. A subject may be a human, a mouse, a rat, a pig, a dog, a cat, or a non-human primate. Administering means contacting a cell or subject with an isolated nucleic acid, rAAV, or composition of the present disclosure. Non-limiting examples of administering including intravenous injection, intraarterial injection, intracranial injection, intrathecal injection, intracerebral injection, infusion, or inhalation.

In some embodiments, a lysosomal storage disorder is Tay Sachs disease (also known as GM2 gangliosidosis), an autosomal recessive caused by mutations in at least one of the genes HEXA, HEXB, and GM2A. Tay Sachs disease (TSD) (OMIM #272800) is a universally fatal disorder which presents in infants, juveniles, or adults, who develop symptoms such as developmental retardation, dementia, blindness, and death in the second or third year of life. Wild-type levels of all three of the enzymes hexosaminidase A (HexA), hexosaminidase B (HexB), and GM2 ganglioside activator (GM2A) are required for the breakdown of GM2 ganglioside, and decreased activity of any of these three enzymes is associated with increased storage of GM2 ganglioside in lysosomes. Patients with TSD develop a gray-white area around the fovea centralis of the retina due to lipid-laden ganglion cells, leaving a central "cherry red spot" which is a hallmark of the disorder. No treatment currently exists for patients with TSD.

In some embodiments of the present disclosure, a lysosomal storage disorder is Sandhoff disease (also known as GM2 gangliosidosis), an autosomal recessive disease cause by mutations in the HEXB gene. Sandhoff disease (SD) (OMIM #268800) is a universally fatal disorder. Patients with SD typically develop weakness in the first six months of life, followed by an exaggerated startle reaction, early blindness, progressive motor and mental deterioration, doll-like face, cherry red spots, and macrocephaly. Death typically occurs by age three years.

In some embodiments, HexA is human (GeneID: 3073) and comprises a sequence as set forth in NM_000520.5 or NM_001318825.1. In some embodiments, human HexA comprises an amino acid sequence as set forth in NP_000511.2 or NP_001305754.1. In some embodiments, HexA is mouse (GeneID: 15211) and comprises a sequence as set forth in NM_010421.5. In some embodiments, mouse HexA comprises an amino acid sequence as set forth in NP_034551.2. In some embodiments, HexB is human (GeneID: 3074) and comprises a sequence as set forth in NM_000521.3 or NM_001292004.1. In some embodiments, human HexB comprises an amino acid sequence as set forth in NP_000512.1 or NP_001278933.1. In some embodiments, HexB is mouse (GeneID: 15212) and comprises a sequence as set forth in NM_010422.2. In some embodiments, mouse HexB comprises an amino acid sequence as set forth in NP_034552.1. In some embodiments, GM2A is human (GeneID: 2760) and comprises a sequence as set forth in NM_000405.4 or NM_001167607.1. In some embodiments, human G2MA comprises an amino acid sequence as set forth in NP_000396.2 or NP_001161079.1. In some embodiments, GM2A is mouse (GeneID: 14667) and comprises a sequence as set forth in NM_010299.3. In some embodiments, mouse GM2A comprises an amino acid sequence as set forth in NP_034429.1.

In some embodiments, the present disclosure provides isolated nucleic acids and recombinant AAVs comprising transgenes encoding human GLB1, HexA, or HexB. In some embodiments, the present disclosure provides isolated nucleic acids and recombinant AAVs comprising transgenes encoding mouse GLB1, HexA, or HexB. In some embodiments, the GLB1, HexA, and/or HexB are operably linked to a promoter, optionally a tissue-specific promoter which drives expression of the transgenes in a specific tissue. In some embodiments, the specific tissue in the CNS. In some embodiments, the present disclosure provides methods of administering to a subject in need thereof compositions comprising the isolated nucleic acids or recombinant AAVs described above. In some embodiments, the subjects administered the compositions have or are suspected of having a lysosomal storage disorder including, but not limited to, GM1 gangliosidosis, Tay Sachs disease, or Sandhoff disease.

In some embodiments, the subject is administered a rAAV or pharmaceutical composition of the disclosure comprising a transgene encoding human HexA and/or human HexB, wherein the subject has an increase in β-Hexosaminidase A enzyme activity in the CSF that is at least 0.5%, at least 1.0%, or at least 1.4% of normal enzyme activity at three months after administration of the rAAV or the pharmaceutical composition. In some embodiments, the enzyme activity is measured using an artificial substrate such as a MUG or MUGS. In some embodiments, the subject is administered a rAAV or pharmaceutical composition of the disclosure comprising a transgene encoding human HexA and/or human HexB, wherein the subject's β-Hexosaminidase A enzyme activity in the CSF is at least 2-fold or at least 3-fold increased at three months relative to the subject's baseline enzyme activity prior to administration. In some embodiments, the subject suffers from Tay Sachs disease (e.g., infantile Tay Sachs disease).

In some embodiments, the GM2 ganglioside is reduced by at least 10%, at least 15%, at least 20%, at least 21%, at least 22%, at least 23%, at least 24%, or at least 25% from baseline in the cerebral spinal fluid (CSF) of a subject by or at about three months after administration of the rAAV or the pharmaceutical composition of the disclosure.

Accordingly, in some embodiments, the disclosure provides isolated nucleic acids, rAAVs, compositions, and methods useful in treating lysosomal storage disorders. In some embodiments, the isolated nucleic acids, rAAVs, compositions, and methods are for the treatment of GM1 gangliosidosis. In some embodiments, the isolated nucleic acids, rAAVs, compositions, and methods are useful in treating Tay Sachs disease. In some embodiments, the isolated nucleic acids, rAAVs, compositions, and methods are useful in treating Sandhoff disease.

In some aspects, the present disclosure provides a method for treating GM2 gangliosidosis. GM2 gangliosidosis may be either Tay Sachs disease or Sandhoff disease. Because GM2 gangliosidosis is caused by deficient HEXA and/or deficient HEXB enzyme activity, methods of treating GM2 gangliosidosis provide increased HEXA and/or HEXB activity. Non-limiting examples of methods to increase activity include expressing wild-type HEXA and/or HEXB in a cell or subject, decreasing expression of a mutant HEXA and/or HEXB gene in a cell or subject, or providing a cell or subject with wild-type HEXA and/or HEXB protein (e.g., enzyme replacement therapy). In some embodiments, GM2 can be treated by administering an isolated nucleic acid or a rAAV comprising at least one transgene encoding HEXA or HEXB (e.g., wild-type HEXA and/or HEXB). In some embodiments, the transgene comprises a wild-type HEXA sequence as set forth in SEQ ID NO: 20. In some embodiments, the transgene comprises a wild-type HEXB sequence as set forth in SEQ ID NO: 21.

HEXA and/or HEXB activity in a cell or subject having GM2 gangliosidosis may be increased by performing methods of the present disclosure. The HEXA and/or HEXB activity in a cell or subject having GM2 gangliosidosis may be increased by 50%-500%. The HEXA and/or HEXB activity in a cell or subject having GM2 gangliosidosis may be increased by at least 50%. The HEXA and/or HEXB activity in a cell or subject having GM2 gangliosidosis may be increased by at least 500%. The HEXA and/or HEXB activity in a cell or subject having GM2 gangliosidosis may be increased by 100%-400%. The HEXA and/or HEXB activity in a cell or subject having GM2 gangliosidosis may be increased by 200%-500%. The HEXA and/or HEXB activity in a cell or subject having GM2 gangliosidosis may be increased by 50%, 60%, 70%, 80%, 90%, 100%, 125%, 150%, 175%, 200%, 225%, 250%, 275%, 300%, 325%, 350%, 375%, 400%, 425%, 450%, 475%, or 500%.

Methods for treating GM2 gangliosidosis in a subject may comprise administering an isolated nucleic acid, rAAV, or composition of the present claims that comprises a transgene encoding human HEXA and/or HEXB. A subject may be a human, a mouse, a rat, a pig, a dog, a cat, or a non-human primate. Administering means contacting a cell or subject with an isolated nucleic acid, rAAV, or composition of the present disclosure. Non-limiting examples of administering including intravenous injection, intraarterial injection, intracranial injection, intrathecal injection, intracerebral injection, infusion, or inhalation.

EXAMPLES

Example 1: Materials and Methods

Vector Design, Construction and Viral Creation.

An AAV vector (SEQ ID NO: 3) was constructed and carries an expression cassette driven by a promoter composed of cytomegalovirus immediate early enhancer (CMV) fused to the chicken beta-actin promoter followed by a chimeric chicken beta-actin/rabbit beta globin intron (CBA), the mouse lysosomal acid β-galactosidase cDNA (mβgal), a woodchuck hepatitis virus post-transcriptional regulatory element (WPRE), and two polyA signals in tandem derived from the bovine growth hormone (BGH) and SV40. This vector is called AAV-CBA-mβgal-WPRE. AAV-CBA-mβgalE269Q-WPRE was generated by PCR mutagenesis with of the following primers: For 1: AAA CGT CTC ACT AGT CCG CGG AAT TC (SEQ ID NO: 7), Rev1: AAA CGT CTC ACT GAG AAT TGA TCA AA (SEQ ID NO: 8), For2: AAA GGT CTC CGG CCG CTA GCG TCA G (SEQ ID NO: 9), Rev2: AAA GGT CTC ATC AGT TCT ATA CTG GC (SEQ ID NO: 10). The resulting PCR product was digested with SpeI and Not I restriction enzymes and cloned in place of the wild type βgal cDNA. All other AAV vectors were generated by removal of different elements from AAV-CBA-mβgal-WPRE vector (SEQ ID NO: 3). All AAVrh8 vector stocks were produced by standard methods. Animal procedures GM1-gangliosidosis mice ($\beta gal^{-/-}$), a knock out version created by insertion of a neomycin cassette in exon 6 of the β-galactosidase gene, GLB1. $\beta gal^{-/-}$, $\beta gal^{+/-}$, and $\beta gal^{+/-}$ mice are generated by mating of male $\beta gal^{-/-}$ and female $\beta gal^{+/-}$ mice or $\beta gal^{+/-}$ males and females.

Intracranial Injections

Six to eight week-old $\beta gal^{-/-}$ or $\beta gal^{+/-}$ mice were anesthetized by intraperitoneal injection of ketamine (125 mg/kg) and xylazine (12.5 mg/kg) in 0.9% saline and placed in a rodent stereotaxic frame. The fur around the incision site was clipped, and the skin scrubbed with povidine-iodine pads and 70% EtOH. The skull was exposed by a small longitudinal incision (<1 cm) along the midline. The periosteum was removed from the surgical area with sterile cotton tipped applicators. Small burr holes (<1 mm) were made using a high-speed drill at the appropriate stereotaxic coordinates. AAV vectors, or PBS, were infused in $\beta gal^{-/-}$ or $\beta gal^{+/-}$ mice with 1 μl bilaterally into the thalamus (stereotaxic coordinates: AP −2.0 mm, ML+1.5 mm from bregma; DV −3.5 mm from brain surface) and in $\beta gal^{-/-}$ mice with 0.3 or 1 μl into the deep cerebellar nuclei (AP −6.0 mm, ML+1.5 mm from bregma; DV −3.5 mm from brain surface) at a rate of 0.2 μl/min using an Ultramicro Pump to drive a 10 A1 gastight glass syringe fitted with a 33G needle. Infusions were started 1 min after placement of the needle in the target structures and slowly withdrawn 2.5 min after conclusion of the infusion. The scalp was closed with sterile wound clips (9 mm).

Behavioral Assays

Rotarod testing was conducted on a Rotarod apparatus accelerating from 4 to 40 rpm over 5 minutes, with latency to fall recorded. Testing was conducted with one practice trial of 1 minute accelerating from 2 to 20 rpm at the beginning of the session followed by 3 trials with 15-20 minute resting in between. Latency to fall for each mouse in a testing session was recorded, and the longest time on the rotarod among the 3 trials was reported.

Tissue Processing

For biochemical studies in $\beta gal^{+/-}$ mice, the brain was removed and sliced into 2 mm coronal blocks using a brain matrix, and immediately frozen on dry ice. The block containing the thalamus was identified by morphology and the presence of needle entry points on the dorsal brain surface. A 2 mm diameter biopsy punch was used to sample the thalamus and the tissue plug placed in the appropriate buffer for analysis. For histological studies the brain and spinal cord were removed and placed in Neg 50 freezing medium and frozen in a dry ice/2-methylbutane bath. For biochemical studies in $\beta gal^{-/-}$ mice, cerebrum, cerebellum+brainstem, and spinal cord were removed and immediately frozen on dry ice.

Histological analysis 20 μm brain (sagittal and coronal) and spinal cord (transverse) sections were cut in a cryostat and stored at −80° C.

Brain sections were stained with X-gal to assess the distribution of βgal as described previously, with modifications. Briefly, slides were fixed in 0.5% glutaraldehyde in PBS, washed 3× in ice cold citrate phosphate buffer (CPB) (50 mM $C_6H_8O$, 50 mM $Na_2HPO_4$, 10 mM NaCl, pH=4.2) incubated overnight at 37° C. in X-gal staining solution [20 mM $K_4Fe(CN)_6$, 20 mM $K_3Fe(CN)_6$, 2 mM $MgCl_2$, 0.01% $C_{24}H_{39}NaO_4$, 0.02% $(C_2H_4O)_nC_{14}H_{22}O$ (IGEPAL CA-630, SigmaAldrich),97% CPB @pH=4.2, 2 mg/ml 5-bromo-4-chloro-3-indolyl-β-D-galactosidase (X-gal) in HCON $(CH_3)_2$). The next day, slides were rinsed in CPB then water, counterstained with Vector Nuclear Fast Red, dehydrated through a series of ethanol 50%-100%, cleared with Citri-Solv and mounted with Permount.

Brain and spinal cord sections were stained with Filipin to assess lysosomal storage as described previously, with modifications. Briefly, slides were fixed in 4% paraformaldehyde in phosphate buffered saline (PBS), washed with PBS, incubated with 1.5% glycine in water, washed with PBS, incubated with 100 μg/ml of Filipin and 1 μg/ml of ToPro3 Iodide (Life Technologies, Grand Island, NY) for 1-2 hours, washed with PBS and mounted with fluorescence mounting media, PermaFluor.

Brain sections were stained with Mayer's Hematoxylin and Eosin to assess morphological changes in the tissue. Briefly, slides were dried at room temperature, fixed in 4% paraformaldehyde in phosphate buffered saline (PBS), washed with water, incubated with Mayer's Hematoxylin, washed in running tap water, counterstained with Eosin, rinsed with deionized water, dehydrated through a series of ethanol 50%-100%, cleared with CitriSolv and mounted with Permount.

Whole brain slice images were captured using white light on a Nikon Super CoolScan 5000 ED with a medical slide holder. Microscope images were captured on a Leica DM550 B microscope, equipped with Leica DFC425 C and DFC365 FX digital cameras. Filipin was imaged at 405 nm and ToPro3 Iodide at 636 nm. H&E was imaged using brightfield.

All histological analysis was performed as non-blinded, qualitative analysis on an N≥2-3 animals with representative pictures shown in figures.

βgal enzymatic assays and Immunoblotting

Biopsy punches were homogenized in lysis buffer (0.1% Triton X-100 in 0.2M $CH_3COONa$, 0.1M NaCl, pH 4.3) and assayed for βgal enzymatic activity. Briefly, a reaction with βgal substrate=1 mM 4-Methylumbelliferyl-β-D-galactoside (4-MUG) was performed in a 96-well plate format and the amount of 4-methylumbelliferyl (4-MU) released was measured against a standard curve with fluorescence detection by excitation at 360 nm and emission at 460 nm using a BioTek Synergy HT plate reader. Enzymatic activity was normalized to protein content as determined by Bradford assay and reported as nmol (of substrate converted)/hour/mg protein. For immunoblotting injection site biopsy punches were homogenized in T-PER buffer supplemented with Complete Mini protease inhibitor cocktail, incubated on ice for 10 min and then centrifuged at 10,000×g for 5 min. The supernatant was collected and protein concentration determined using a Bradford assay. Total protein (20 μg) was separated by polyacrylamide gel electrophoresis using Mini-PROTEAN TGX precast gels, and protein transferred to NitroPure nitrocellulose membrane. Blots were blocked in Tris-buffered saline-Tween-20 (TBST) with 5% fat-free milk, and then incubated with primary antibodies to α-rabbit GLB1 (β-galactosidase antibody) (1:250) and α-mouse β-Actin (1:1000). HRP-conjugated anti-rabbit and anti-mouse secondary antibodies were used (1:4000) and signal detection was done with Pierce ECL Western Blotting Substrate and blots exposed to Amersham Hyperfilm ECL.

Genome Copies

Genomic DNA from injection site biopsy punches was isolated using Qiagen DNeasy Blood and Tissue Kit, and concentration determined using a Nanodrop spectrophotometer. The number of AAV vector genome copies in 100 ng of genomic DNA were determined by qPCR using the following primers and Taqman probe specific for BGH polyA in the vector genome: (TaqMan Probe, 6FAM-AGC ATT TTT TTC ACT GCA TTC TAG TTG TGG TTT GTC-TAMRA SEQ ID NO: 11). Samples with ≥100 vg genome copies per μg of DNA were deemed positive for vector genomes.

Microarray

Total RNA was isolated from biopsy punches using Trizol and further purified using RNeasy Plus Mini Kit, and its quality analyzed on an Agilent Bioanalyzer. Bioanalyzer RNA integrity number (RINs) values were 8.7-9.5, which indicates high quality RNA. Sample preparation and microarray hybridization was performed using Affymetrix Mouse Gene 2.0ST Arrays. Three independent samples were analyzed per group. Resulting data was processed and P values <0.05 and 1.5-fold change in relation to PBS controls were considered differentially expressed genes.

Quantification of GM1 Ganglioside Content

GM1 content in CNS was quantified by liquid chromatography tandem mass spectrometry(LC-MS/MS). Briefly, 25 ul of 0.01-0.04 mg/μl tissues were homogenized in 0.1M NaCl, 0.2M $CH_3COONa$ at pH=4.3, internal standard 3 μg of d3-GM1 added, and gangliosides isolated through a modified Folch extraction. Samples were then run through a C18 column, dried and reconstituted in running buffer to then be processed through the LC-MS/MS, Waters Quattro Premier XE. Samples were separated at mass/charge ratio (m/z) of 290 and each GM1 species differing in fatty acid composition was quantified. GM1 content was determined by calculating the ratio of the sum of all species over $d_3$-GM1, and plotted against the ratio of purified GM1/$d_3$-GM1 from a standard curve. Samples were normalized for protein content in the initial lysate determined by Bradford assay and were reported as ng GM1/μg protein.

Exemplary Construct

Figure 1B:
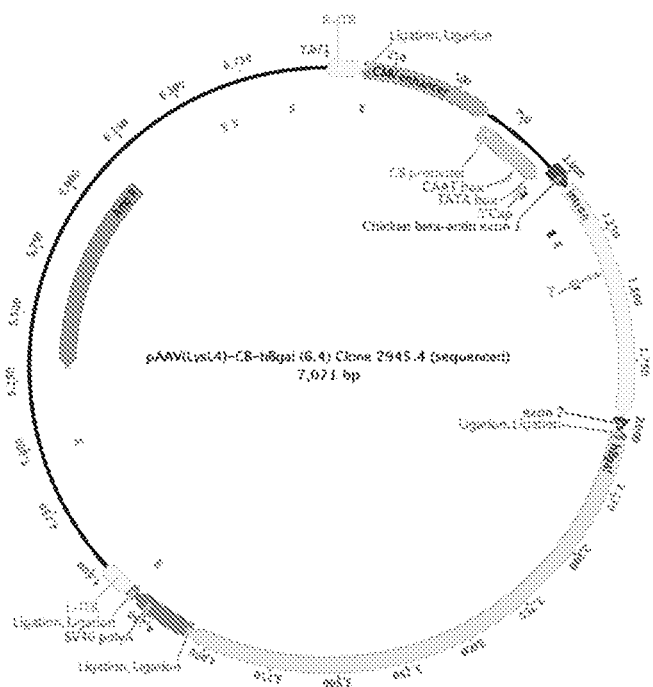

A recombinant AAV vector that encodes the human GLB1 gene was generated (rAAV9hGLB1) vector (SEQ ID NO: 23). This is a replication deficient adeno-associated virus gene transfer vector. The single stranded DNA genome consists of the inverted terminal repeats from AAV2 flanking an expression cassette comprised of the human β-galactosidase (βgal) cDNA driven by a cytomegalovirus immediate early enhancer fused to a chicken β-actin promoter with a rabbit β-globin intron containing splice donor and splice acceptor sites. The construct also contains a poly-adenylation signal from Simian Virus 40. The genome is packaged in the capsid of AAV serotype 9, a human-derived AAV (Gao 2004) (FIG. 1B). It is formulated in a buffered aqueous suspension for intravenous delivery.

C57BL/6 mice were injected with PBS (control), or AAV9-hGLB1 under operative control of a CAG promoter (FIG. 1B). Treated mice received $2.25 \times 10^{11}$ vg AAV9-hGLB1. Each cohort (n=5) was euthanized at 7 days, 30 days, and 30 months post-treatment. β-galactosidase enzyme activity was measured from samples using the fluorogenic substrate β-4-methylumbelliferone (4-MU), which fluoresces upon cleavage by β-galactosidase. Increases in β-galactosidase activity was observed in the AAV9-hGLB1 treated group relative to PBS-injection control mice (data not shown).

Example 2

AAV Dose Dependent Distribution of βGal in Brain

Figure 2:
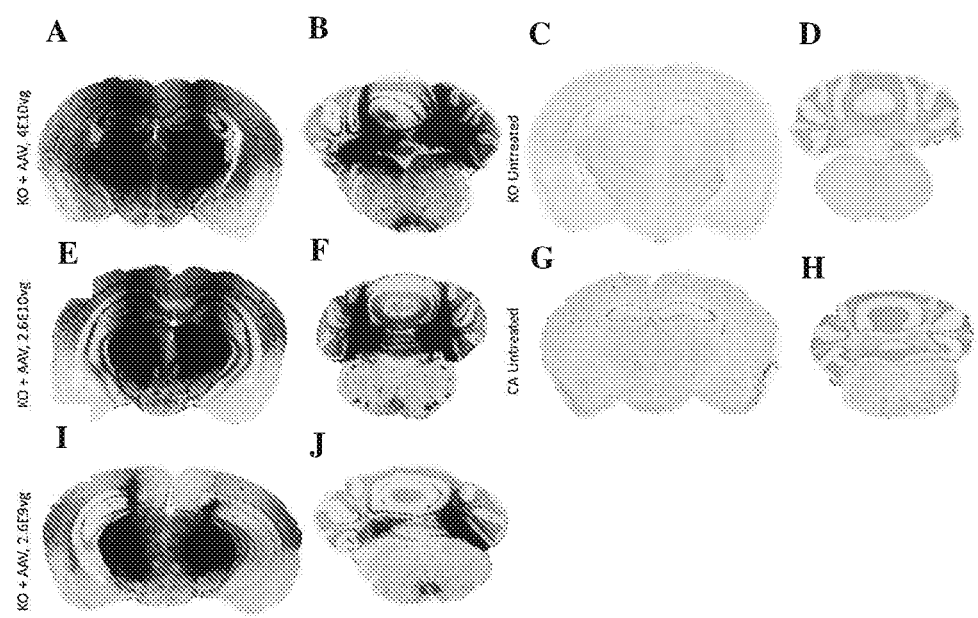
FIGS. 2A-2J show AAVrh8-mβgal intracranially injected in βgal$^{-/-}$ mice produces dose dependent enzyme distribution. βgal expression in the brain of representative AAVrh8-injected animals and age-matched controls was analyzed at 2 weeks (4e10 vg) or 3 months (2.6e10 vg and 2.6e9 vg) post-injection by histochemical staining of 20 μm coronal brain sections with X-gal and counterstaining with Nuclear Fast Red.
Figure 20:
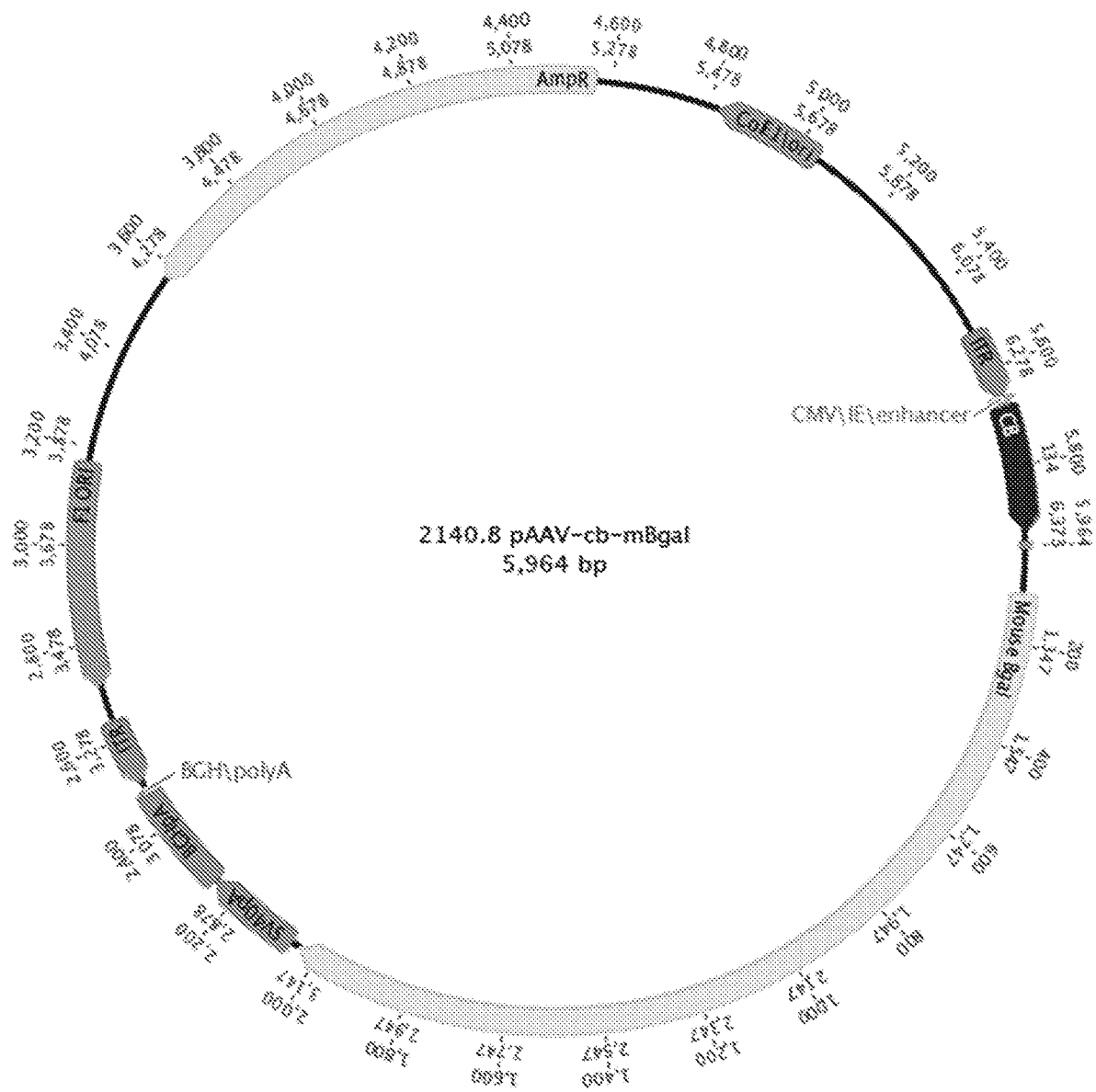
FIG. 20 shows a vector map of 2140.8 pAAV-cb-mβgal.
Figure 21:
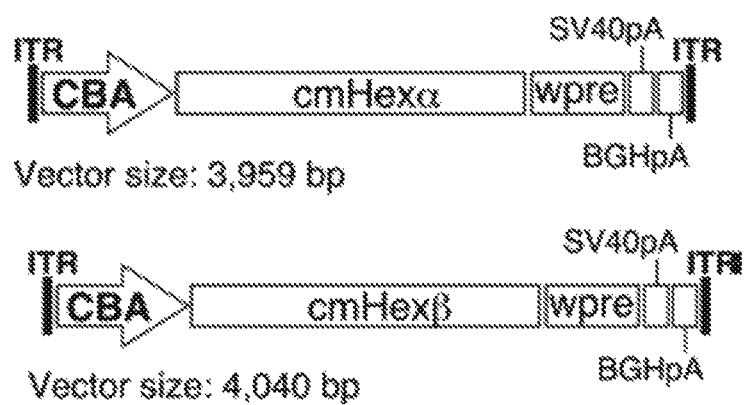
FIG. 21 shows the structure of monocistronic AAV vectors encoding HexA alpha- and beta-subunits.

AAVrh8-CBA-mβgal-WPRE vector (FIGS. 1 and 20) was infused into the brain of 6-8 week old GM1 gangliosidosis mice (βgal$^{-/-}$) by bilateral injections in the thalamus and deep cerebellar nuclei at total doses of 4e10 vg, 2.6e10 vg and 2.6e9 vg. Animals in the highest dose cohort received bilateral injections of 1 μl in thalamus and DCN, while animals in the other two cohorts received 1 μl in thalamus and 0.3 μl in DCN. The βgal distribution pattern in brain at 3 months post-injection appeared to be dose dependent with the highest intensity of βgal activity at the injection site (FIG. 2). The highest dose (4e10 vg) provided enzyme activity throughout much of the section in the cerebrum (FIG. 2A) and cerebellum (FIG. 2B). Middle dose, 2.6e10 vg had similar level of activity in the cerebrum (FIG. 2E), and the cerebellum (FIG. 2F) appeared to provide slightly less activity but still spread of enzyme throughout the structure. Low dose, 2.6e9 vg had less spread in both the cerebrum and cerebellum (FIG. 21 & 2J, respectively).

AAV Treated Animals Retain Motor Function in a Dose Dependent Manner

Figure 3:
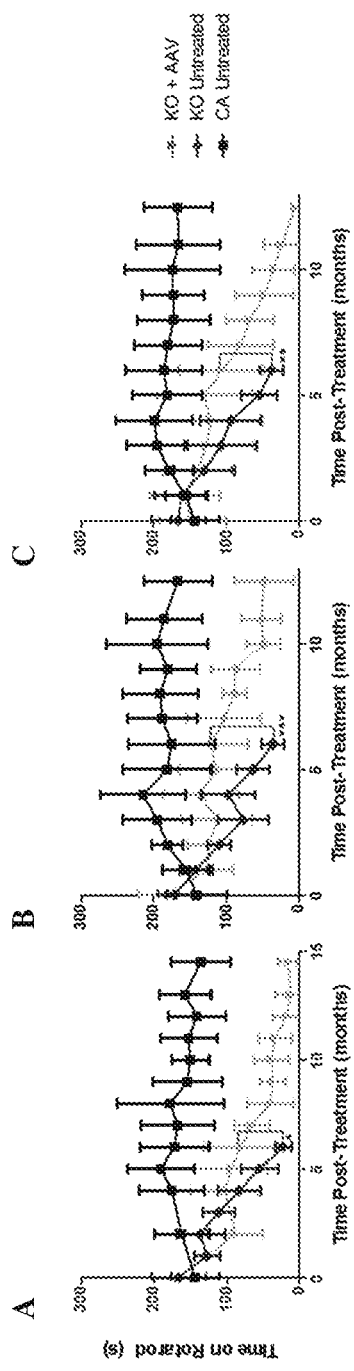
FIGS. 3A-3C show βgal$^{-/-}$ mice intracranially injected with AAV retain significant motor performance on the rotarod. Animals were assessed for motor function on an accelerating rotarod test (4-40 rpm over 5 minutes). Highest value from three trials was recorded. βgal$^{-/-}$ animals treated with a total dose of AAVrh8 vector of (FIG. 3A) 4e10 vg.

The motor function of AAVrh8-treated mice was assessed over time using the rotarod test (FIG. 3). All cohorts of AAVrh8-treated βgal$^{-/-}$ performed significantly better than untreated βgal$^{-/-}$ controls at the 6 month post-treatment time point (high dose 4e10 vg p=0.006, middle dose 2.6e10 vg p=0.0009, and low dose 2.6e9 vg p=0.005). N=6-10 animals/group at 6 months post-treatment.

47

Example 3

AAV Treatment Extends Lifespan

Figure 4:
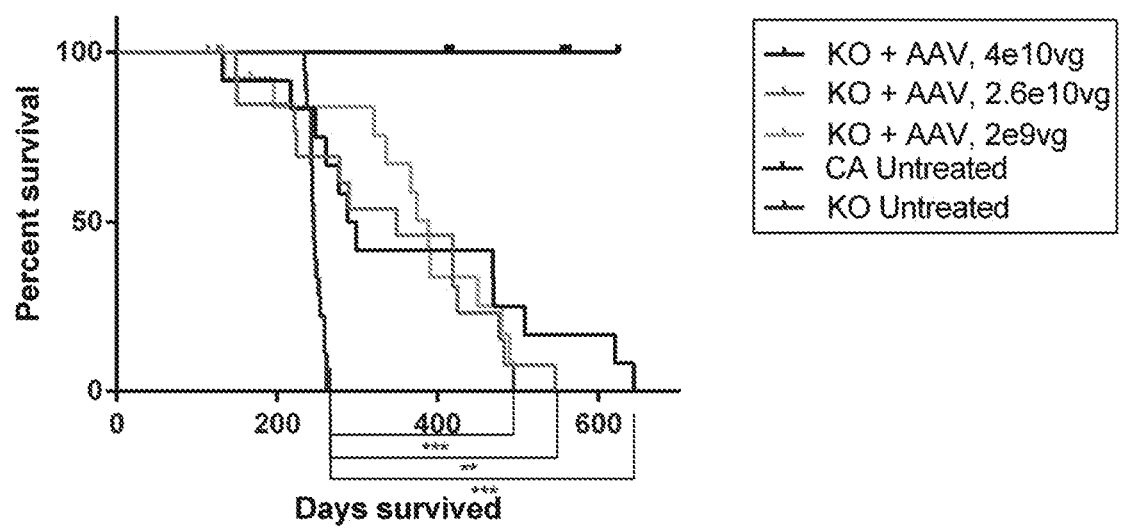
FIG. 4 shows AAV intracranially injected βgal$^{-/-}$ mice achieve significant extension in lifespan. Kaplan-Meier survival curves for intracranial AAVrh8 treated βgal$^{-/-}$ mice. Treated mice with a total dose of AAVrh8 vector of 4e10 vg, 2.6e10 vg and 2.6e9 vg all had a significant extension of life span vs. naïve βgal$^{-/-}$ controls using Log-rank (Mantel-Cox) test (p=0.0004, 0.002, <0.0001 respectively). Median survival was increased from naïve βgal$^1$ controls (245.5 days, N=13) to 4e10 vg cohort (293.5 days, N=12), 2.6e10 vg cohort (349.0 days, N=13) and 2.6e9 vg cohort (389.0 days, N=13).

The lifespan of AAVrh8-treated βgal$^{-/-}$ mice was significantly increased compared to naïve Pga$^{-/-}$ controls (FIG. 4). Median survival for naïve βgal$^{-/-}$ controls was 245.5 days (N=18), 293.5 days for the 4e10 vg cohort (N=12, p=0.0004), 349 days for the 2.6e10 vg cohort (N=13, p=0.002) and 389 days for the 2.6e9 vg cohort (N=12, p<0.0001).

Figure 5:
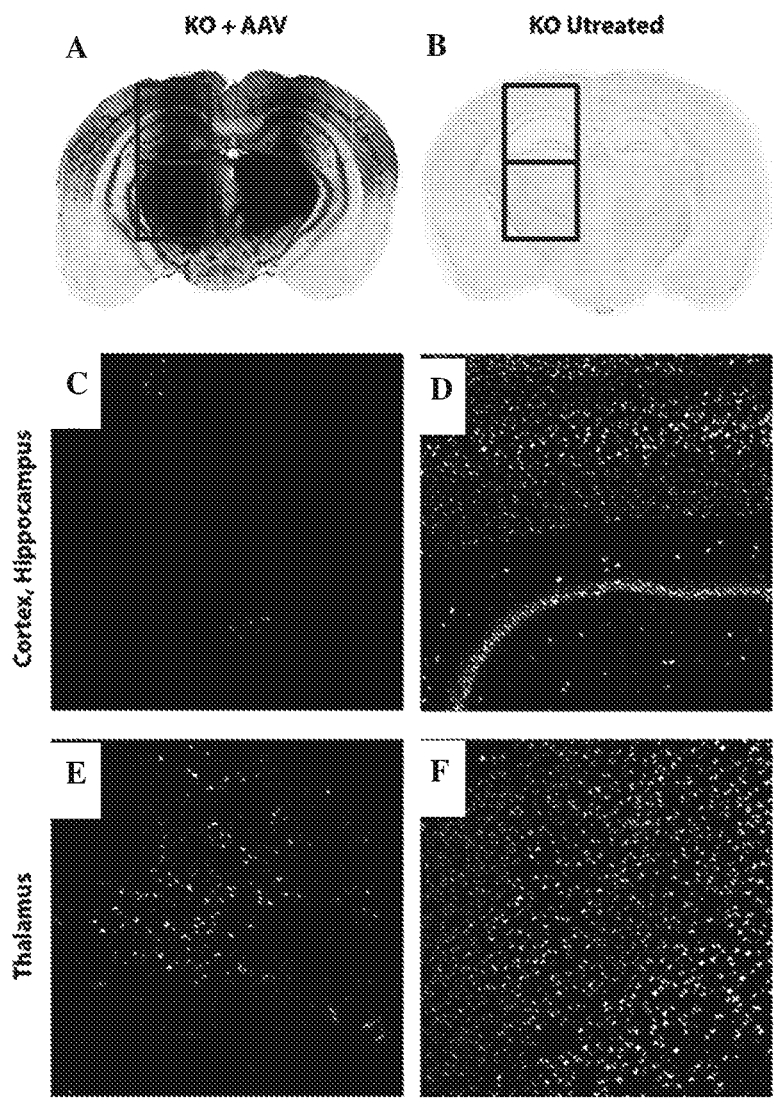
FIGS. 5A-5F show intracranial injections of AAV in βgal$^{-/-}$ mice result in abnormal Filipin staining in areas of highest enzyme expression.
Figure 6:
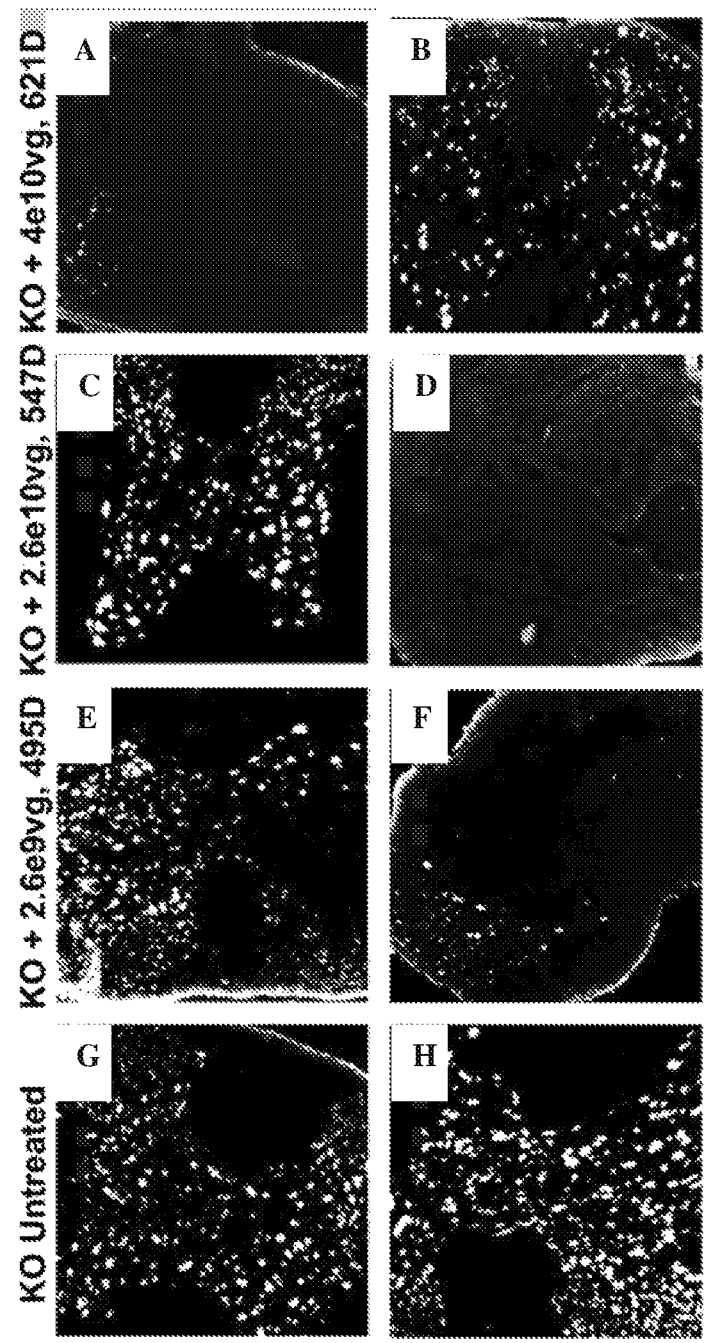
FIGS. 6A-6H show lysosomal storage persists in the spinal cords of long-lived AAV intracranial injected βgal$^{-/-}$ mice. Spinal cord sections cut at 20 µm were stained with Filipin for GM1-ganglioside storage. All long-lived animals showed some amount of clearance in the spinal cord, but also contained regions where clearance did not occur.

GM1-Ganglioside Storage Persists at the Injection Site and in the Spinal Cord of Long-Lived AAV Treated Animals Histological analysis of lysosomal storage by Filipin staining in the CNS of animals at 3 months post injection revealed nearly complete correction in the brain and cerebellum that was corresponding to enzyme presence as seen in Xgal staining at the same time point (FIG. 2). Surprisingly Filipin-positive cells were only found at the injection sites, or along the injection track (FIG. 5C, 5E).

The presence of Filipin-positive cells in the thalamus of AAVrh8-injected βgal$^{-/-}$ mice was surprising as it is also the brain region that displays the most intense X-gal histochemical staining in the brain (FIG. 5A, boxes), which is a semi-quantitative indicator of high βgal enzyme activity. In the spinal cord of long-lived AAV-treated mice (495-612 days) the impact on lysosomal storage was variable ranging from regions with very few remaining Filipin-positive cells to regions with no apparent change compared to untreated βgal$^{-/-}$ controls (FIGS. 6A, 6D, 6F, and 6B, 6C, 6E, respectively).

Example 4

Neuropathology at the Injection Sites

Animals were histologically assessed with Hematoxylin & Eosin (H&E) after early loss or at 3 months post injection. These animals were found to have morphological changes at the injection site that correlated with dose. βgal$^{-/-}$+AAV 4e10 vg at 2 weeks post injection demonstrated large amounts of changes in the thalamus such as vascular cuffing and the appearance of inflammation (FIG. 7A, 7B, thick and thin arrows, respectively), and in the DCN with vascular cuffing and apparent neuronal engulfment (FIG. 8A, thick arrow and 8B, arrow heads, respectively). In βgal$^{-/-}$+AAV 2e10 vg at 3 months post-treatment thalamic alterations were also seen with vascular cuffing and inflammation (FIG. 7E, 7F, thick and thin arrows, respectively). However, βgal$^{-/-}$+AAV 2e10 vg dose in the DCN had less vascular cuffing only (FIG. 8E, thick arrow). In the lowest dose representative animal, βgal$^{-/-}$+AAV 2e9 vg at 3 months post injection only very minimal inflammation was seen in the thalamus (FIG. 7J, thin arrow) and this effect was absent in the DCN (FIG. 8I, 8J). Neither vascular cuffing nor inflammation was seen in untreated βgal$^{-/-}$ controls (FIG. 7C, 7D and FIG. 8C, 8D) or in untreated βgal$^{+/-}$ controls (FIG. 7G, 7H and FIG. 8G, 8H).

High Levels of βGal Induce an Unexpected Response in Injected Brain Structure

Figure 9:
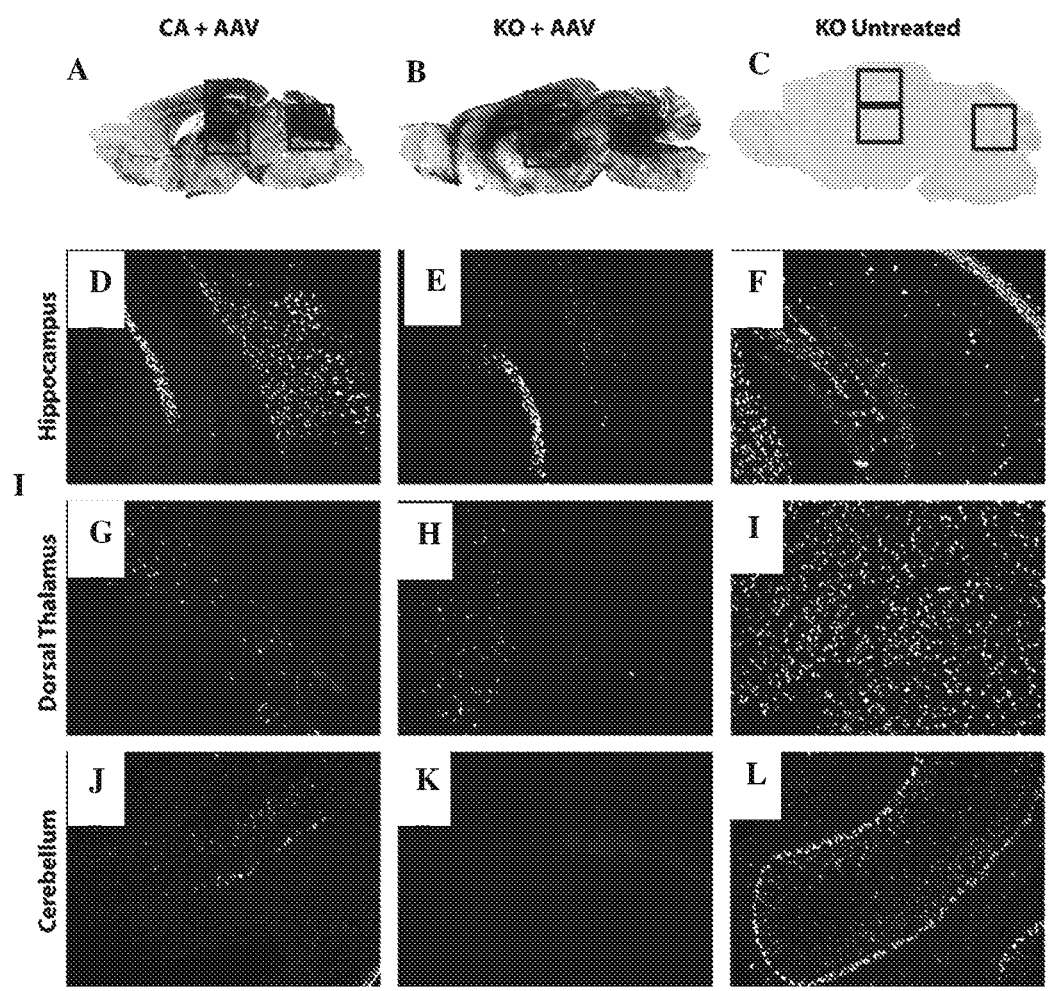
FIGS. 9A-9L show intracranial injections of AAV in βgal$^{-/-}$ and βgal$^{-/-}$ mice result in abnormal Filipin staining in areas of most intense enzyme expression. Sagittal sections of mouse brain stained with Xgal for βgal enzyme presence and counterstained with Nuclear Fast Red at 10 weeks post injection in representative (FIG. 9A) βgal$^{-/-}$ (CA+AAV) (FIG. 9B) βgal$^{-/-}$ (KO+AAV) injected with 1 µl of AAVrh8-CBA-mβgal-WPRE at 1.7×10$^{12}$ vg/µl bilateral into the thalamus, 2 ul into intracerebral ventricles and 0.3 ul in the deep cerebellar nuclei, and (FIG. 9C) βgal$^{-/-}$ mouse untreated (KO Untreated). Boxes represent location of images depicted in FIGS. 9D-9I. Filipin staining was positive in regions of most intense enzyme expression in both CA+AAV (FIG. 9D, FIG. 9G, and FIG. 9J βgal$^{+/-}$) and βgal$^{-/-}$ KO+AAV (FIG. 9E, FIG. 9H and FIG. 9K) injected animals.

The paradoxical presence of Filipin-positive cells at the injection sites (FIG. 5C, 5E) may be the result of an unexpected response to AAV gene transfer in βgal$^{-/-}$ mice. To understand this phenomenon, normal, unaffected βgal$^{-/-}$ littermates were injected intracranially with AAVrh8 vector. Similar to the results in βgal$^{-/-}$ mice (FIG. 5C, 5E), large numbers of Filipin-positive cells were present in brain regions with the highest βgal staining intensity (FIG. 9A, 9B) in AAVrh8-injected βgal$^{+/-}$ mice (FIG. 9D, 9G, 9J). This result indicates that the presence of Filipin-positive cells in the targeted brain structures is an unexpected adverse response to an aspect of AAV gene transfer.

Example 5

Figure 19:
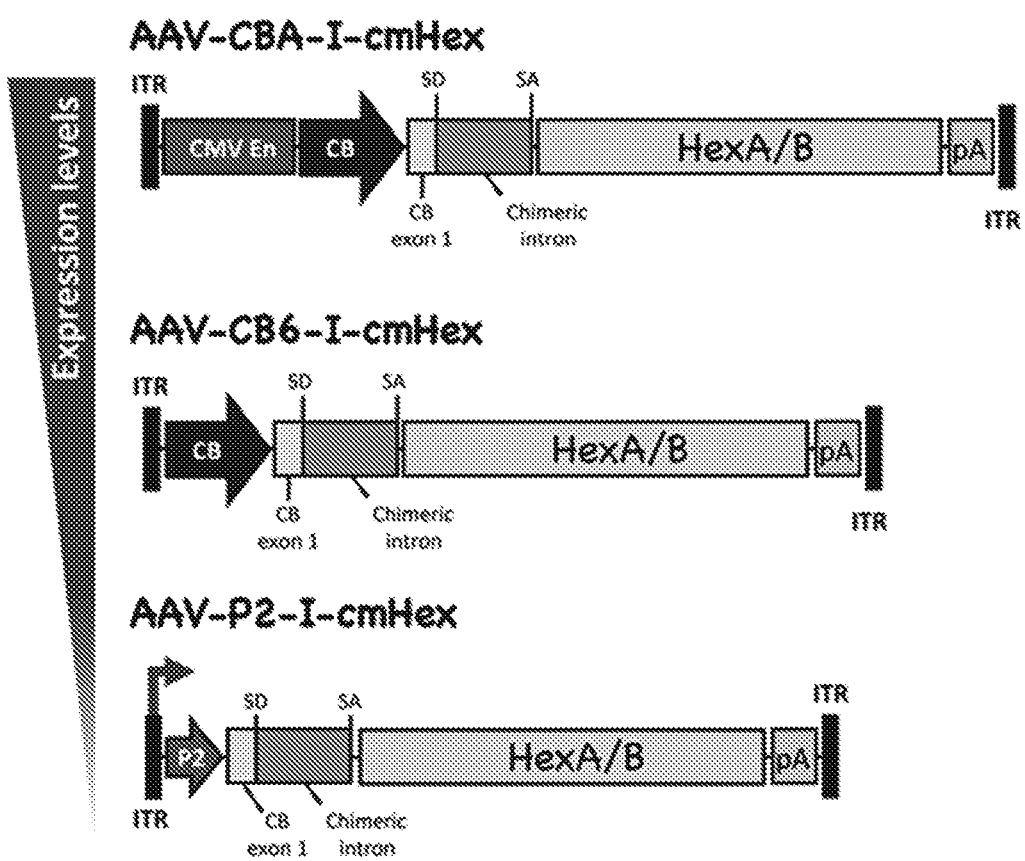
FIG. 19 depicts structures of AAVrh8 vectors.

Validation of AAVrh8 Vector Series to Assess Contribution of Enzyme Activity, Protein Levels, and AAVrh8 Capsid to Filipin-Detected Response A series of AAVrh8 vectors were designed to study the nature of the unexpected response at the injection sites (Table 1). Additional vectors that were designed are shown in FIG. 19. This series of AAVrh8 consisted in sequential removal of elements that influence transgene expression levels in the original vector, AAVrh8-CBA-mβgal-WPRE, which will be referred to as 'CBA-WPRE' from here on. In vector 2 'CBA', the woodchuck hepatitis virus post-transcriptional regulatory element (WPRE) was removed. Vector 3 'CBA-EI-WPRE' has the exact same backbone as vector 1 but encodes a βgal protein carrying an E269Q mutation in the putative active site. This vector was designed to assess whether the observed response was caused by enzymatic activity or protein production. Vector 4 'CB6' contained mβgal cDNA, but did not carry WPRE or the chimeric intron present in the other vectors. This vector was tested at two doses, 'CB6 Low' (same dose as all other vectors), and 'CB6 High' (2.0e10 vg). Vector 5 'transgene empty' or 'T. Empty' contained all components of vector 1, but lacked the mβgal cDNA.

Figure 10:
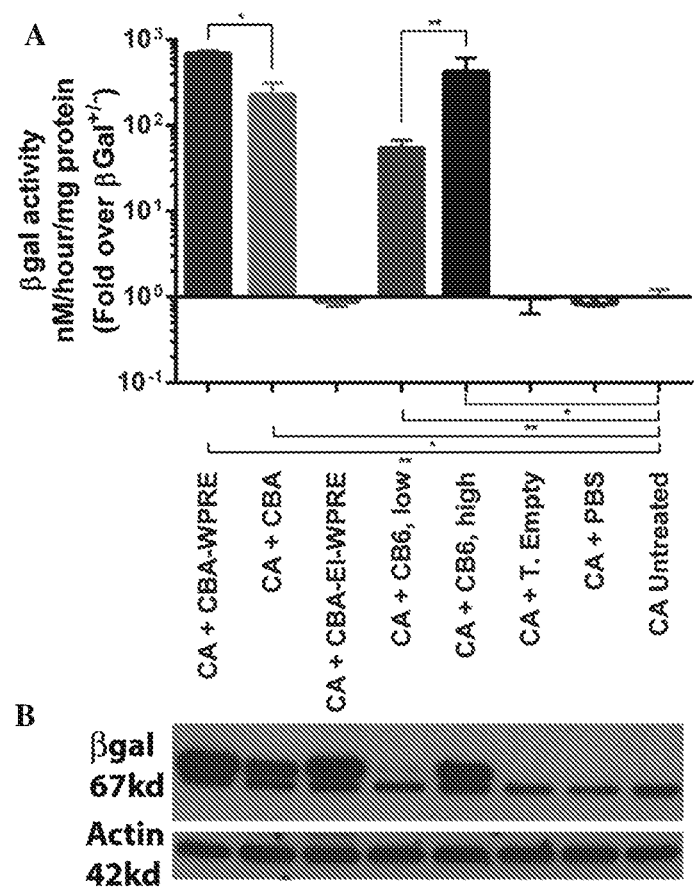
FIGS. 10A-10B show alterations in vector design lead to a decrease in βgal protein presence and/or enzyme activity in βgal$^{-/-}$ mice.

The newly constructed AAVrh8 vectors were injected bilaterally into the thalamus of normal βgal$^{+/-}$ mice (1 μl/site for total dose of 3.4e9 vg), except the CB6 vector, which was also injected at a higher dose (1 μl/site for total dose of 2.0e10 vg). Controls were βgal$^{-/-}$ mice injected with phosphate buffered saline (PBS), and naïve βgal$^{+/-}$ mice. Enzyme activity and protein production in the thalamus were measured by 4-methylumbelliferyl (4-MU) biochemical assay and western blot 6 weeks after injection (FIG. 10).

TABLE 1

Figure 11:
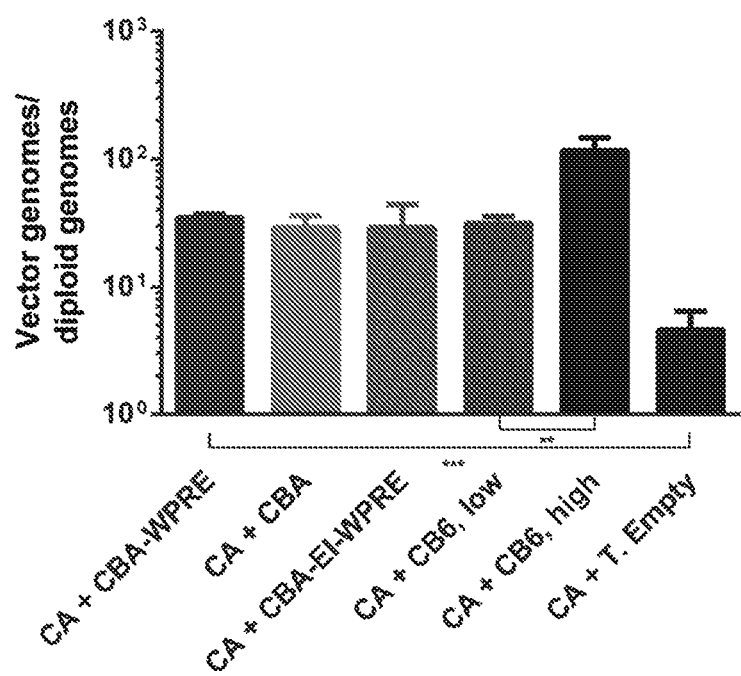
FIG. 11 shows vector genome presence in injected structure biopsy punches in βgal$^{+/-}$ mice. Vector genomes per diploid genome in a 2 mm×2 mm biopsy punches in injected structure where 1 µl of AAVrh8-vector (total dose 3.4e9 vg, or 2.0e10 vg, CBA High only) bilateral into the thalamus of βgal$^{+/-}$ mice (CA+vector name) as determined by qPCR to the SV40 poly A on the transgene. Samples were taken at 6 weeks post injection. Error bars represent mean+SD, N=3/group, and * indicates significant difference indicated by connecting line and using unpaired multiple T tests (Holm-Sidak) where *=p<0.05, =p<0.01 and *=p<0.001.
Figure 12:
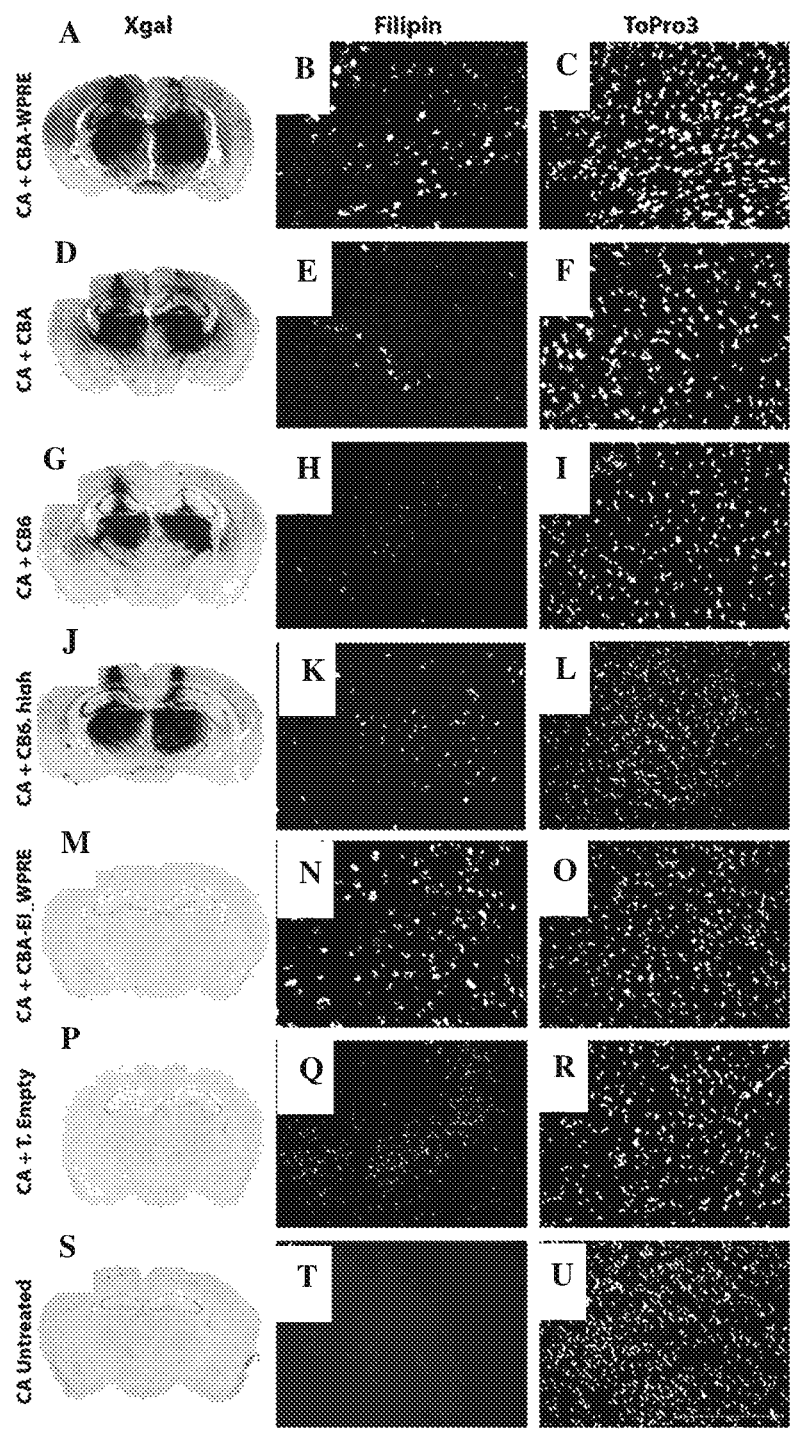
FIGS. 12A-12U show vectors with decreasing protein presence lead to decrease in Filipin positive regions in βgal$^{+/-}$ mice. Coronal sections of mouse brain stained with Xgal for βgal enzyme presence and counterstained with Nuclear Fast Red at 6 weeks post injection in (FIG. 12A, FIG. 12D, FIG. 12G, FIG. 12J, FIG. 12M and FIG. 12P) in representative βgal$^{+/-}$ (CA+vector name) injected with 1 µl of AAVrh8-vector (total dose 3.4e9 vg, or 2.0e10 vg in the CBA High only) bilaterally into the thalamus or βgal$^{+/-}$ un-injected (CA Untreated).
FIG. 12B, FIG. 12E, FIG. 12H, FIG. 12K, FIG. 12N and FIG. 12Q show Filipin staining in parallel sections of the same animals in (FIG. 12A, FIG. 12D, FIG. 12G, FIG. 12J, FIG. 12M and FIG. 12P).
FIG. 12C, FIG. 12F, FIG. 12I, FIG. 12L, FIG. 12O and FIG. 12R show ToPro3 nuclear stain in parallel sections of the same animals in (FIG. 12A, FIG. 12D, FIG. 12G, FIG. 12J, FIG. 12M and FIG. 12P). Boxes represent approximate location of Filipin and ToPro3 staining on brain sections taken at 20× magnification. Scale bar=250 μm. Images are representative of N≥2 mice/group.

List of alterations in vectors designed to evaluate storage biomarker Filipin persistence 1) GBA-mβgal-WPRE, CBA-WPRE - original vector
2) CBA-mβgal (no WPRE), CBA - decrease enzyme expression
3) CBA-enzyme inactive mβgal-WPRE, CBA-EI-WPRE - eliminate enzyme function
4) CB6-mβgal (no WPRE), CB6 - further decrease enzyme expression
5) Transgene empty, T. Empty - eliminate protein expression
6) PBS injection, PBS - control for surgery
7) Untreated βGal$^{+/-}$, CA Untreated The CBA-WPRE vector generated the highest enzyme activity at 686 fold above that in thalamus of naïve βgal$^{+/-}$ mice (FIG. 10A), and corresponding elevation in protein (FIG. 10B, lane 1). The CBA vector resulted in βgal activity 224 fold over βgal$^{-/-}$ level, which was significantly lower than that obtained with CBA-WPRE vector (FIG. 10A, p=0.001) and an apparent corresponding decrease in protein product (FIG. 10B, lane 2). In thalami of mice injected with CBA-EI-WPRE vector the βgal activity was comparable to that in naïve control mice (FIG. 10A), but the protein was expressed at comparable levels to those in CBA-WPRE injected thalami (FIG. 10B, lane 3 vs. lane 1). Therefore, the E269Q mutation abrogates enzyme activity but does not seem to affect protein expression levels. Injection of CB6 vector at the same dose as the other vectors (CB6-Low) resulted in βgal activity 54 fold above over βgal$^{-/-}$ level (FIG. 4A), and protein presence at a correspondingly lower amount that with the other vectors (FIG. 10B, lane 4). Injection of this vector at higher dose (CB6-High) resulted βgal activity 420 fold above over βgal$^{-/-}$ level, which is significantly higher than in the CB6-Low cohort (FIG. 10A, 10B, p=0.03). The βgal activity level in the CB6-High cohort was comparable to that measured in the CBA-WPRE cohort, and appeared similar in protein levels (FIG. 10A, 10B, lane 1 vs. lane 5). The thalami of animals injected with transgene empty vector (T. Empty) or PBS showed no change in βgal activity or protein level compared to naïve βgal$^{+/-}$ levels (FIG. 10A, 10B). The number of vector genome copies in AAV-injected thalami were shown to be comparable in most cohorts injected with a total dose of 3.4e9 vg, except in the T. empty cohort (FIG. 11). As expected, the CB6-High cohort infused with 2.0e10 vg showed significantly increased number of vector genome copies (FIG. 11).

Filipin-Detected Response Correlates with Protein Levels

The brains of AAVrh8-injected and control βgal$^{-/-}$ mice were analyzed for βgal enzymatic activity by Xgal staining (FIG. 12A,12D, 12G, 12J, 12M, 12P, 12S) and for presence or absence of Filipin-positive cells in the thalamus (FIG. 12B, 12E, 12H, 12K, 12N, 12Q, 12T). The thalamic regions with the most intense βgal staining (FIG. 11A, 11D) also contained Filipin-positive cells in CBA-WPRE and CBA injected animals, albeit at apparently lower numbers in the latter cohort (FIG. 11B, 11E). The thalami in the CBA-EI-WPRE cohort had large numbers of Filipin-positive cells, but no active βgal enzyme (FIG. 11K, 11J, respectively). Similar Filipin staining was apparent in the thalami of T-empty and CB6-low cohorts (FIG. 11K, 11Q), but it appeared as small puncta distinct from the pattern observed in the CBA-WPRE and CBA-EI-WPRE cohorts. Filipin staining was also observed in the thalami of CB6-High cohort and the pattern appeared a mix of that observed in the CBA-WPRE and CB6-Low cohorts (FIG. 11H). These results indicate the abnormal Filipin accumulation at the injection site is related to protein expression levels and not enzyme activity.

Figure 13:
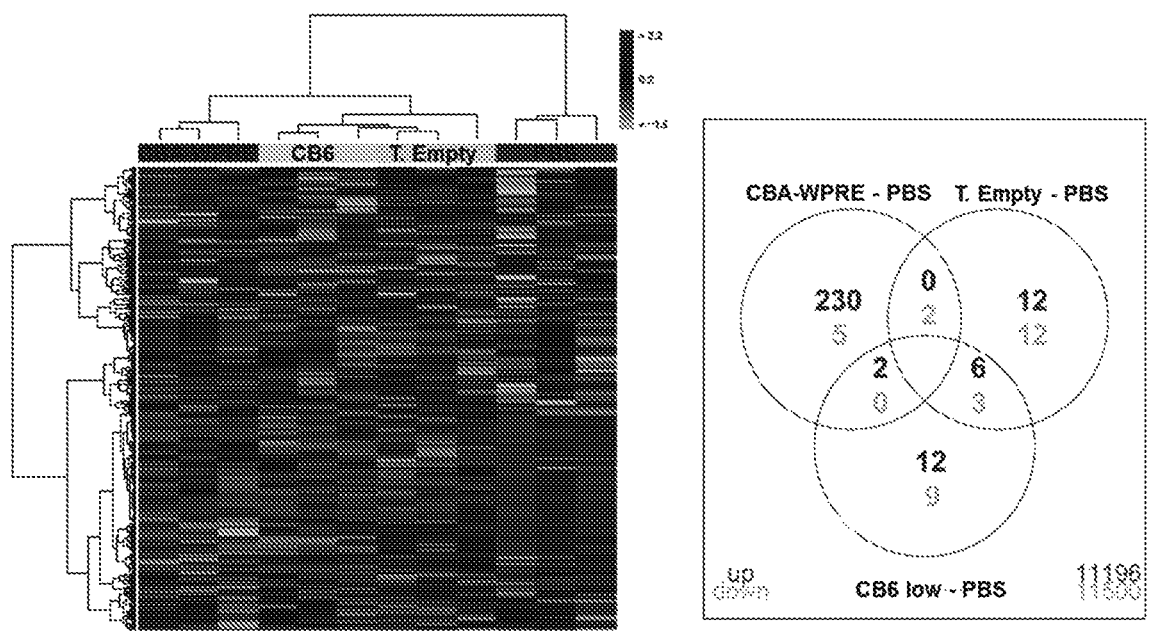
FIG. 13 shows a clustering heatmap and a Venn diagram of all differentially expressed genes in βGal$^{+/-}$ mice demonstrate transgene expression dependent variation. The Heatmap and Venn diagram of all differentially expressed genes was produced using data from a 2 mm×2 mm biopsy punch of thalamus injected with 1 μl of AAVrh8-vector (3.4e9 vg total dose) or mock treated with PBS bilaterally, at ~6 weeks post injection in βgal$^{+/-}$ mice (CA+vector name). Microarray results determined by Affymetrix Mouse Gene 2.0ST, N=3/group, P<0.05 and >1.8 fold change.

Transcriptomic Changes in Injected Thalami Correlate with Filipin-Detected Abnormal Response Microarray analysis was performed in the thalami to further characterize the tissue response to the physiological change induced by gene transfer. Total thalamic RNA was isolated from CBA-mβgal-WPRE, CB6-Low, T.Empty and PBS-injected cohorts. Transcriptomic changes (fold change >1.8-fold, p<0.05) for all samples analyzed are represented in a heat map (FIG. 13A). CB6-low and T.Empty samples cluster together with PBS, and are different from CBA-WPRE samples. The number of genes with >2-fold change in expression levels (p<0.05) is considerably larger in CBA-WPRE samples compared to CB6 and T.Empty with a few overlapping genes (FIG. 13B). A number of genes upregulated in the CBA-WPRE samples are characteristic of activated microglia and reactive astrocytes (Table 2). None of these genes showed significant changes in CB6 or T.Empty samples.

TABLE 2

Select genes upregulated in microarray analysis of CBA-WPRE vector. Fold change is CBA-WPRE vector over PBS.
Genes upregulated in CBA-WPRE

| Gene | Gene name | Function | Fold change | Reference |
|---|---|---|---|---|
| Serpina3n | serine (or cysteine) peptidase inhibitor, clade A | Peptidase inhibitor, response to cytokine, marker of reactive gliosis | 1.9 | Winkler et al, 2005; Zamanian et al, 2012 |
| Gbp3 | guanylate binding protein 3 | Response to interferon β, response to interferon γ, upregulated in LPS reactive astrocytes | 3.2 | Burckstummer et al, 2009; Degrandi et al, 2007; Zamanian et al, 2012 |
| B2m | beta-2-microglobulin | Antigen processing and presentation, cellular defense response, upregulated in LPS reactive astrocytes | 2.2 | Uginovic et al, 2005; Zijilstra et al, 1989; Zamanian et al, 2012 |
| Cd86 | Cd86 antigen | Costimulatory ligand, upreglated in SOD1$^{G93A}$ microglia | 2.3 | Chiu et al, 2013 |
| Trem2 | triggering receptor expressed on myeloid cells 2 | Transmembrane protein - triggers myeloid cells, increase phagocytic activity, supress cytokine production, upregulated in SOD1$^{G93A}$ microglia | 3.0 | Melchior et al, 2010; Trash et al, 2009; Chiu et al, 2013 |
| C1qa | complement component 1, subcomponent, alpha polypeptide | Complement activiation, upregulated in SOD1$^{G93A}$ microglia | 3.0 | Azeredo da Silveira et al, 2002; Chiu et al, 2013 |
| Gfap | glia fibrillary acidic protein | Marker of reactive gliosis, upregulated in SOD1$^{G93A}$ microglia | 3.6 | Jessen & Mirsky, 1980; Chiu et al, 2013 |
| Cybb | cytochrome b-245, beta polypeptide | Proinflammatory oxidase, upregulated in SOD1$^{G93A}$ microglia | 4.8 | Harraz et al, 2008; Chiu et al, 2013 |

Example 6

Therapeutic Impact of Different AAVrh8 Vectors in GM1-Gangliosidosis Mice

Figure 14:
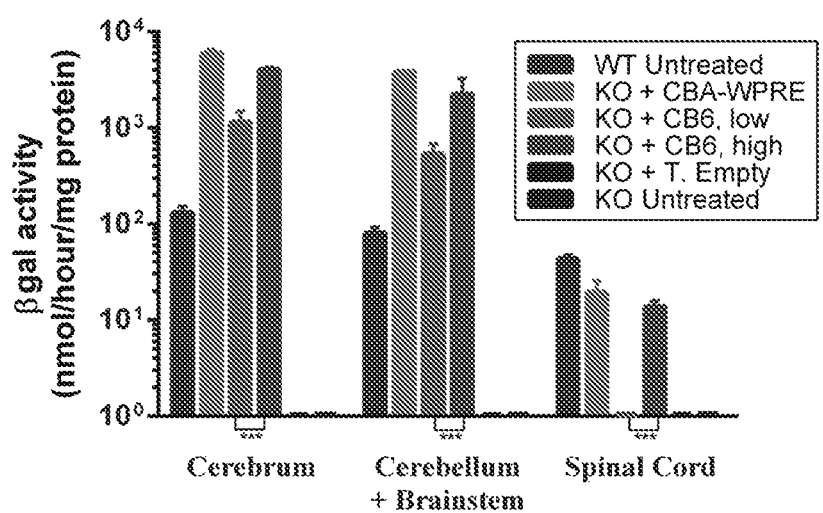
FIG. 14 shows βgal enzyme activity in the CNS of treated βgal$^{-/-}$ mice result in varied distribution of enzyme throughout structures. βgal enzyme activity in cerebrum, cerebellum+brainstem or spinal cord of βgal$^{-/-}$ injected bilaterally 1 μl into the thalamus and 0.3 ul in the DCN of AAVrh8-vector (total dose 3.4e9 vg, or 2.0e10 vg, CBA High only) or untreated (KO Untreated) or βgal$^{+/+}$ mice untreated (WT Untreated), as determined by 4-MU assay at ~6 weeks post injections. Enzyme activity is normalized to protein concentration by Bradford, and is reported as nmol/hour/mg protein. Values represent mean+SD, N=3/group, and * indicates significant difference of βgal$^{-/-}$+AAVrh8-CB6 vector (total dose 3.4e9 vg, KO+CB6 Low) vs. βgal$^{-/-}$+AAVrh8-CB6 vector (total dose 2.0e10 vg, KO+CB6 High). P value calculated using unpaired T tests (Holm-Sidak) where ***=p<0.001.

From the studies performed in βgal-mice above, a correlation was determined that reduced protein expression from the transgene could reduce the pathological transcription level changes in the injected structure. Whether the changes in AAV vector design translated into differences in therapeutic outcome in GM1-gangliosidosis mice (βgal$^{-/-}$) was then investigated. Six to eight week old βgal-/- mice received bilateral injections of AAV vector into thalamus (1 µl/side) and deep cerebellar nuclei (0.3 µl/side) and the outcomes measured at ~6 weeks post-injection. Study cohorts were βgal-/- mice injected with CBA-WPRE, CB6 (CB6-Low), and Transgene Empty vectors administered at a total dose of 4.4e9 vg. In addition, CB6 was injected at a total dose of 2.6e10 vg (CB6-High). Naïve untreated βgal-/- and βgal+/+ animals were used as controls. Evaluation of βgal activity by 4-MU assay of the CNS (FIG. 14) showed that in the cerebrum CBA-WPRE was 45-fold higher than wild type level (FIG. 14), where CB6 Low was 9-fold higher (FIG. 14) and CB6 High was 30-fold higher (FIG. 14). As expected T.Empty and untreated cohorts of βgal-/- mice had no detectable βgal activity in any CNS region analyzed (FIG. 14). In the cerebellum+brainstem the trend was the same, with CBA-WPRE at 47-fold (FIG. 14), CB6-Low at 6-fold (FIG. 14), and CB6-High at 27-fold above wild type level (FIG. 14). Interestingly, in the spinal cord CBA-WPRE was only 50% of wild type level (FIG. 14), CB6-High was 30% (FIG. 14), and CB6-Low had no detectable activity (FIG. 14). In all CNS tissues analyzed, CB6-High was significantly higher (p<0.001) in βgal activity than the same vector injected at the lower dose, CB6-Low.

Figure 15:
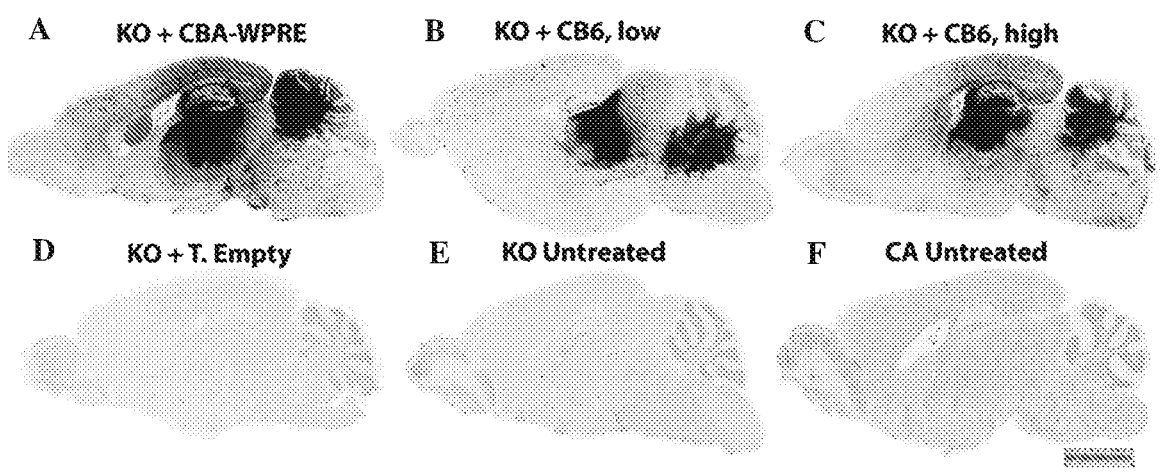
FIGS. 15A-15F show Xgal staining for βgal enzyme presence in βgal$^{-/-}$ mice demonstrates spread of enzyme throughout the brain in an expression and dose dependent manner. Sagittal sections of mouse brain stained with Xgal for βgal enzyme activity and counterstained with Nuclear Fast Redat ~6 weeks post injection in a representative βgal$^{-/-}$ injected bilaterally with 1 μl into the thalamus and 0.3 ul in the DCN of AAVrh8-vector (total dose 3.4e9 vg, or 2.0e10 vg for the CBA High only) (FIGS. 15A-15C), or untreated (KO Untreated.

The βgal distribution pattern in the brain as demonstrated by histological stain X-gal (FIG. 15) correlated with the activity levels in the cerebrum or cerebellum+brainstem determined by the 4-Mu assay (FIG. 14). The CBA-WPRE vector resulted in dark blue staining in thalamus and DCN and widespread distribution of detectable enzyme activity throughout the brain (FIG. 15A). In contrast, in the CB6-Low cohort (FIG. 15B) there was intense staining in thalamus and DCN but lower detectable levels throughout the cerebrum, cerebellum or brainstem. In CB6-High animals, the βgal pattern of distribution in brain appeared broader than in CB6-Low animals (FIG. 15C). As anticipated, there was no evidence of increased βgal activity in T.Empty (FIG. 15D) and naïve βgal$^{-/-}$ mouse cohorts (FIG. 15E).

Figure 16:
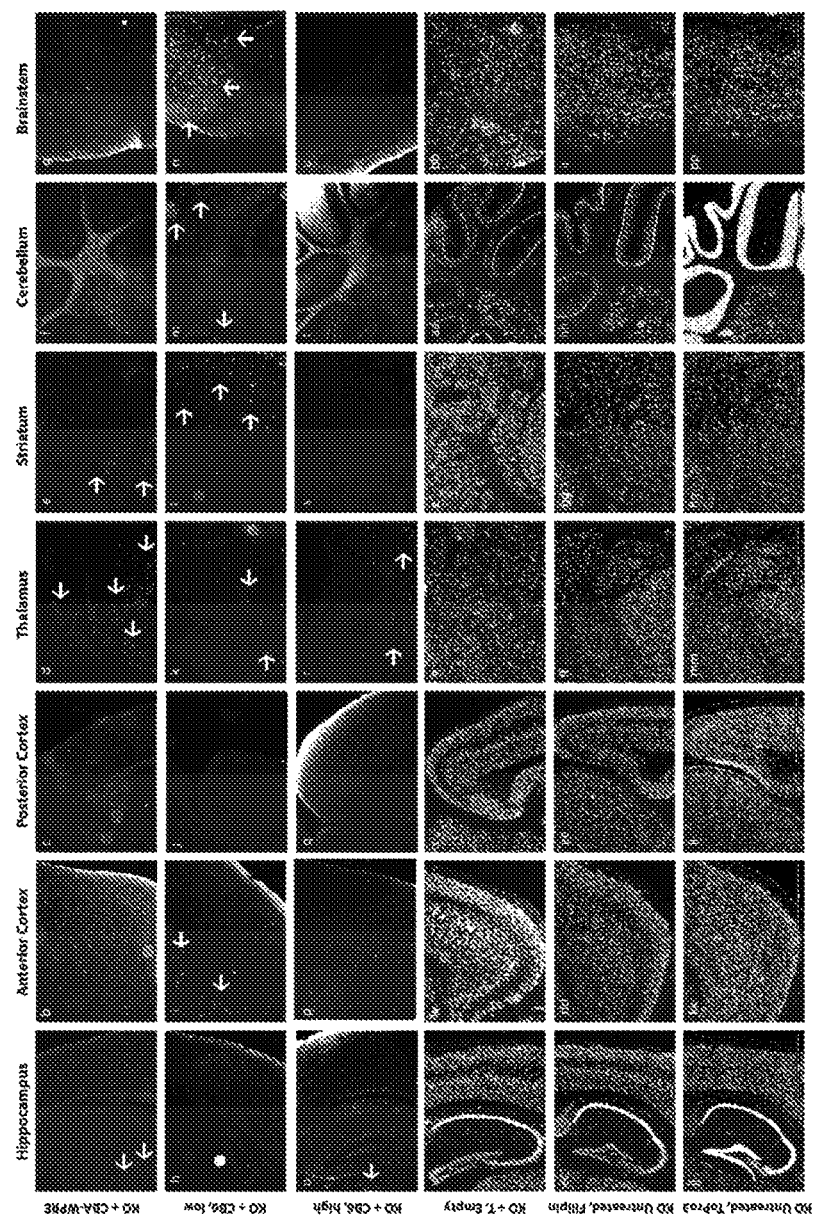
FIG. 16 shows Filipin staining for GM1-ganglioside content in the brain of βgal$^{-/-}$ mice after therapeutic AAVrh8 treatment. Sagittal sections of mouse brain stained with Filipin for GM1 content or nuclear stain ToPro3 (KO Untreated, ToPro3, bottom row) at 6 weeks post injection in a representative βgal$^{-/-}$ injected bilaterally with 1 μl into the thalamus and 0.3 ul in the DCN of AAVrh8-vector (total dose 3.4e9 vg, or 2.0e10 vg, CBA High only), or untreated (KO Untreated). N=2-3/group. Images taken at 5×, scale=100 mm.

Histological analysis of lysosomal storage in brain and spinal cord using Filipin staining (FIG. 16) correlated with the βgal activities (FIG. 14) and distribution patterns (FIG. 15) described above. In CBA-WPRE injected animals, there was nearly complete clearance of storage throughout the brain (FIG. 16), except at the injection site and track with Filipin-positive cells in ventral hippocampus and throughout the thalamus (FIG. 16; $1^{st}$ row, $4^{th}$ column). Storage clearance in the CB6-Low cohort appeared less efficient (FIG. 16; $2^{nd}$ row) as Filipin-positive cells were still present in anterior cortex, striatum and brainstem (FIG. 16; $2^{nd}$ row, column 2, 5, 7 respectively). At the higher dose (CB6-High) the efficiency of CB6 vector was very high with resolution of lysosomal storage throughout the brain (FIG. 16; $3^{rd}$ row). As before, Filipin-positive cells were present in ventral hippocampus and dorsal thalamus, however less than in CBA-WPRE (FIG. 16; $3^{rd}$ Row, $1^{st}$, $4^{th}$ columns). The T.Empty cohort (FIG. 16, 40 row) showed no change in lysosomal storage compared to βgal$^{-/-}$ untreated controls (FIG. 16; $5^{th}$ row).

Figure 17:
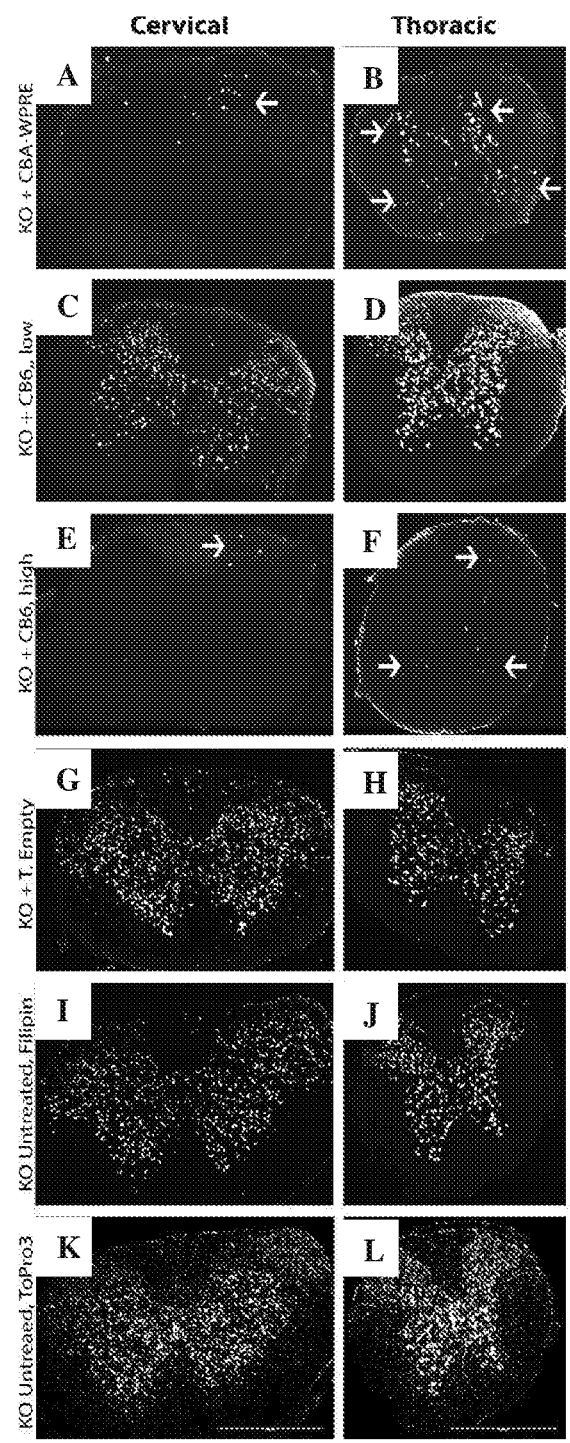
FIGS. 17A-17L show Filipin staining for GM1 content in spinal cords of βgal$^{-/-}$ mice after therapeutic treatment with AAVrh8 vectors. Cervical (FIG. 17A, FIG. 17C, FIG. 17E, FIG. 17G, FIG. 17I and FIG. 17K) and thoracic (FIG. 17B, FIG. 17D, FIG. 17F, FIG. 17H, FIG. 17J and FIG. 17L) sections of spinal cord stained with Filipin for GM1 content or nuclear stain ToPro (KO Untreated, ToPro3, bottom row) at 6 weeks post injection in representative βgal$^{-/-}$ injected bilaterally with 1 μl into the thalamus and 0.3 ul in the DCN of AAVrh8-vector (total dose 3.4e9 vg, or 2.0e10 vg, CBA High only), or untreated (KO Untreated). N=2-3/group. Images taken at 5×, scale=100 mm.

The spinal cords of AAV-treated animals were also evaluated for storage content by Filipin staining. Spinal cords in CBA-WPRE animals had almost no remaining storage in the cervical region however, the thoracic region only showed minimal reduction (FIG. 17A-17B, respectively, arrows). Spinal cords in CB6-Low animals had almost no distinguishable reduction in storage compared to untreated controls (FIG. 17C-17D). Spinal cords in CB6-High animals were nearly devoid of lysosomal storage in cervical and thoracic regions (FIG. 17E-17F, arrows). As anticipated, the spinal cords of T.Empty animals showed no change in lysosomal storage compared to untreated βgal$^{-/-}$ control. (FIG. 17G-17H; 17I-17J, respectively).

Figure 18:
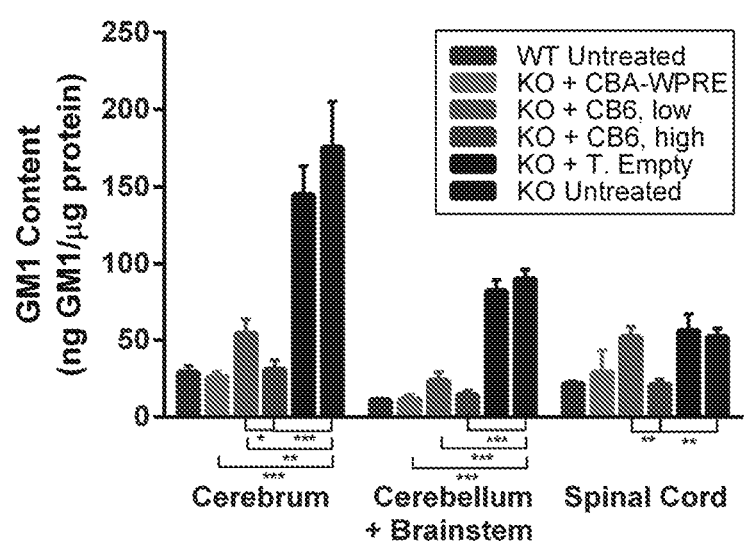
FIG. 18 shows therapeutic treatment using AAVrh8 in the CNS of 3 gal$^{-/-}$ mice results in normalization of GM1 content when treated with a lower expressing promoter at a higher dose. GM1 content as quantitated by LC-MS/MS in cerebrum, cerebellum+brainstem or spinal cord of mice at. 6 weeks post injection in βgal$^{-/-}$ injected bilaterally with 1 μl into the thalamus and 0.3 ul in the DCN of AAVrh8-vector (total dose 3.4e9 vg, or 2.0e10 vg for the CBA High group only), untreated (KO Untreated), or βgal$^{+/-}$ untreated (WT Untreated). GM1 content represented as ng GM1/g protein. Values represent mean+SD, N≥3/group and * indicates significant difference of KO+AAVrh8 vs. KO+PBS, or as indicated by connecting line, using multiple T tests (Holm-Sidak) where *=p<0.05, =p<0.01, and *=p<0.001.

GM1 ganglioside level in CNS was quantified by LC-MS/MS (FIG. 18). In CBA-WPRE and CB6-Low cohorts there was significant reduction in GM1 ganglioside content in comparison to untreated βgal$^{-/-}$ controls in cerebrum (p=0.0009 and p=0.002, respectively) and cerebellum+brainstem (p<0.0001 and p=0.0001, respectively). There was no significant change in GM1 ganglioside content in the spinal cord in either cohort. In the CB6-High cohort the GM1 ganglioside level was normalized in all CNS areas investigated cerebrum, cerebellum+brainstem, and spinal cord (FIG. 18, p=0.64, p=0.06 and p=0.79 respectively). As anticipated, there was no change in GM1 ganglioside content anywhere in CNS in the T.Empty cohort compared to naïve βgal$^{-/-}$ controls (FIG. 18).

Example 7

AAV-Mediated Gene Delivery to the CNS in Animal Models of GM2-Gangliosidoses

Prior to conducting a clinical trial in Tay Sachs disease patients, a final safety study was performed in non-human primates. This study was designed to be a single dose (based on the prior studies in GM2 mice and cats; total vector dose of 3.2E12 vg) study with different endpoints to demonstrate safety of the injection procedure consisting of bilateral injection of AAVrh8 vector formulation into the thalamus and one cerebral lateral ventricle.

Figure 22:
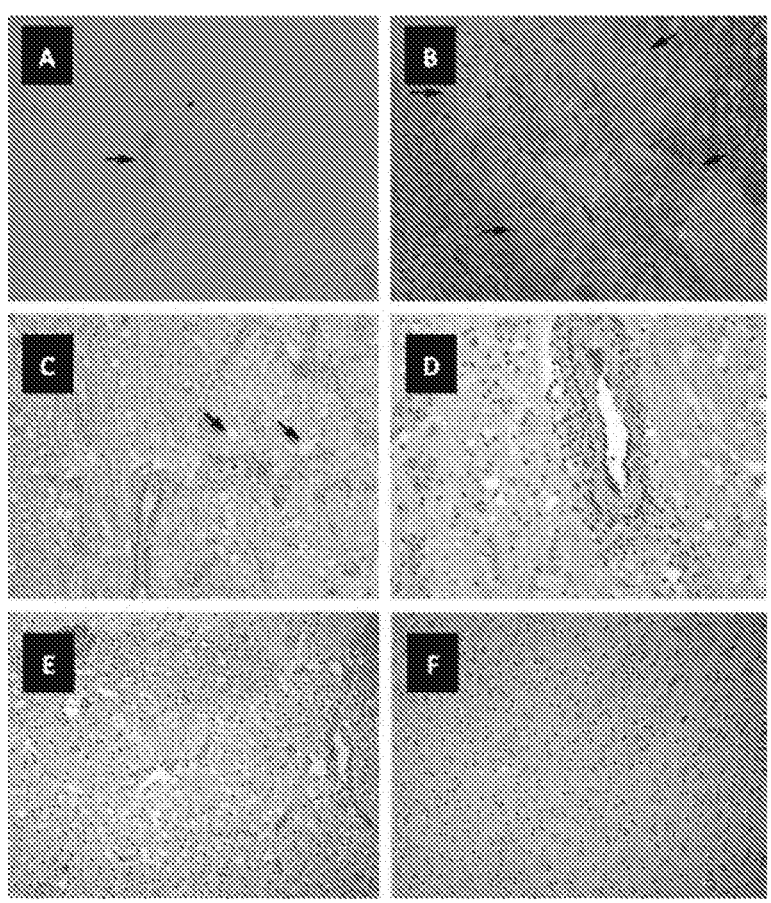
FIGS. 22A-22F show neuropathology in the monkey thalamus.
Figure 24:
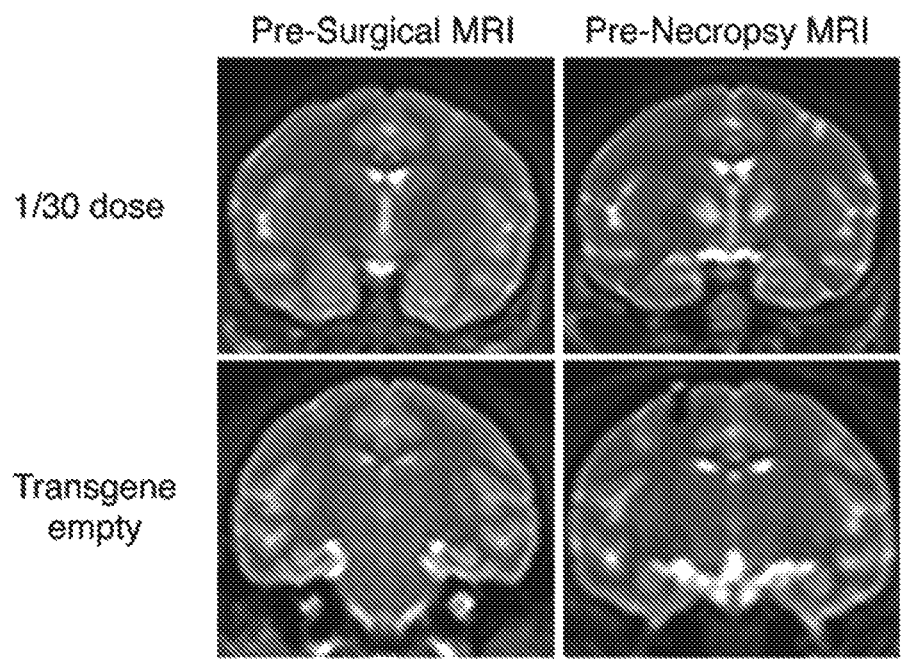
FIG. 24 is a pre-necropsy brain MRI revealing edema in the thalamus. Edema (arrows) in the thalami of an NHP injected with formulation of AAVrh8 vectors encoding cmHex-alpha and cmHex-beta at the 1/30$^{th}$ dose prior to necropsy. No changes were observed in NHP injected with transgene-empty AAVrh8 vector.

The first NHPs injected with the AAVrh8 formulation (N=3) developed moderate to severe neurological symptoms within 28 days post-injection. NHPs were euthanized and histological assessment of the CNS revealed large areas of necrosis and myelin loss in the thalamus along what appears to be the injection track (FIG. 22A-22D). In contrast, an NHP injected with saline showed no symptoms and there was no evidence of neuropathology at necropsy (>90 days post-injection) (FIG. 22F). In addition to histopathological assessment of the brain, Hexosaminidase activity was measured 6- to 48-fold above normal activity (FIG. 24).

Two additional cohorts of NHP (N=2 per cohort) were injected with AAVrh8 vector formulation at total doses 1/10th and 1/30th the original dose, respectively, 2E11 and 1.1E11 vg. Neurological symptoms developed in 3 out of 4 NHPs injected with the lower doses of AAVrh8 vector formulation expressing cmHexA subunits, but onset was progressively delayed with decreasing doses. Despite a delay in onset of symptoms (or absence of obvious symptoms in one NHP), neuropathological assessment of the brain revealed extensive areas of necrosis, neuronal loss and vascular cuffing in all 4 NHPs in the lower dose cohorts (FIG. 22E). Hexosaminidase activity in brain was also elevated in these NHPs compared to that in saline-injected animals (FIG. 23).

Figure 23:
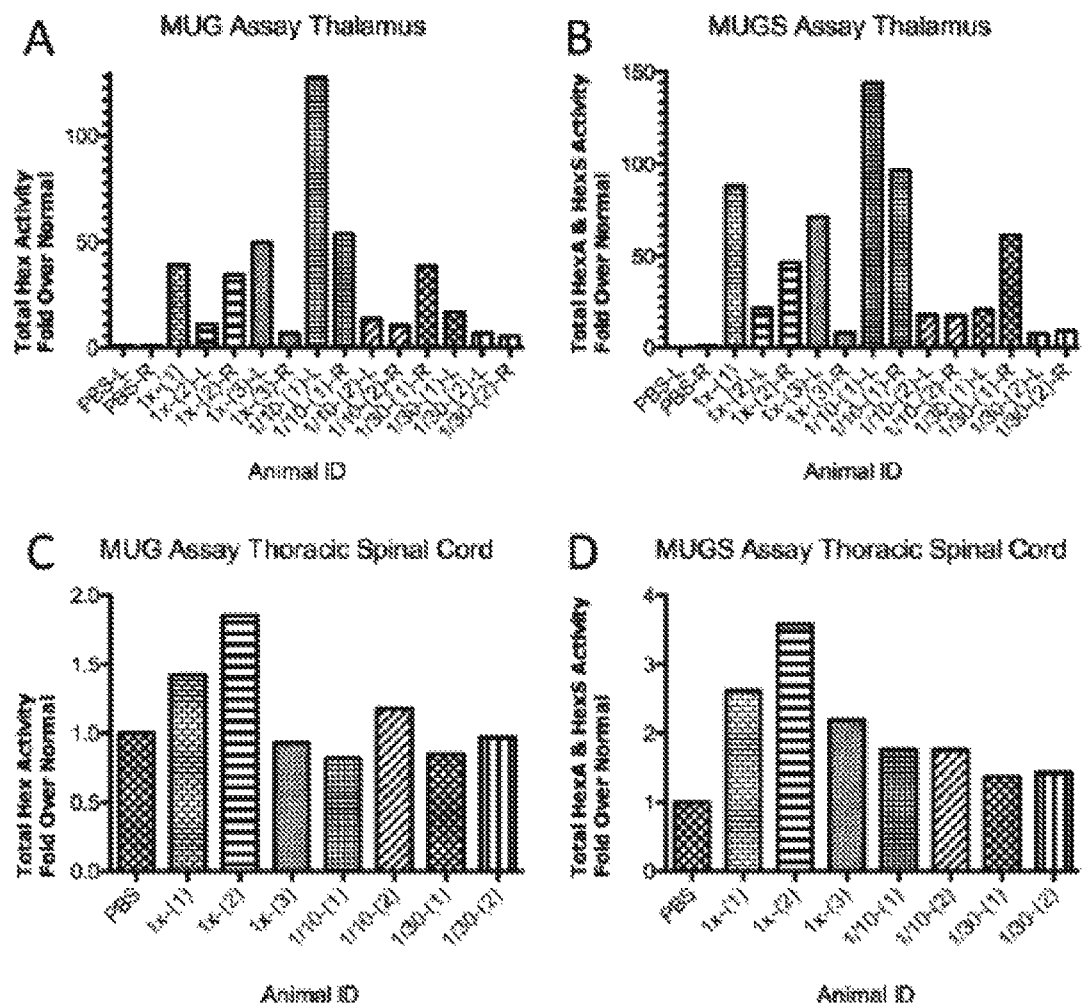
FIGS. 23A-23D show Hexosaminidase activity in the CNS. Hex activity was measured in the thalamus and thoracic spinal cord of NHP injected with different doses of 1:1 formulation of AAVrh8 vectors encoding cmHex-alpha and cmHex-beta. Two artificial substrates were used in the biochemical assays, namely MUG and MUGS. The first substrate is cleaved by all Hex isozymes (HexA, HexB, HexS), while the latter is cleaved only by HexA and HexS isozymes.

Increased Hex expression was also found in the spinal cord, which was more pronounced in the 1× dose animals (FIG. 23, bottom row).

As a control for potential toxicity associated with AAVrh8 capsids and/or preparation method, another cohort of NHPs (N=2) received 3.2E12 vg of a transgene-empty AAVrh8 vector, and both animals displayed normal behavior throughout the study (>90 days post-injection). Behavioral observations for all animals in the study are summarized in Table 3.

Prior to necropsy, brain MRIs were performed for some NHPs in the lower dose cohorts and bilateral signal alterations were found in the thalamus, presumably due to edema (top row, FIG. 24), but no changes in NHPs injected with transgene-empty AAVrh8 vector were observed (bottom row, FIG. 24).

Figure 25:
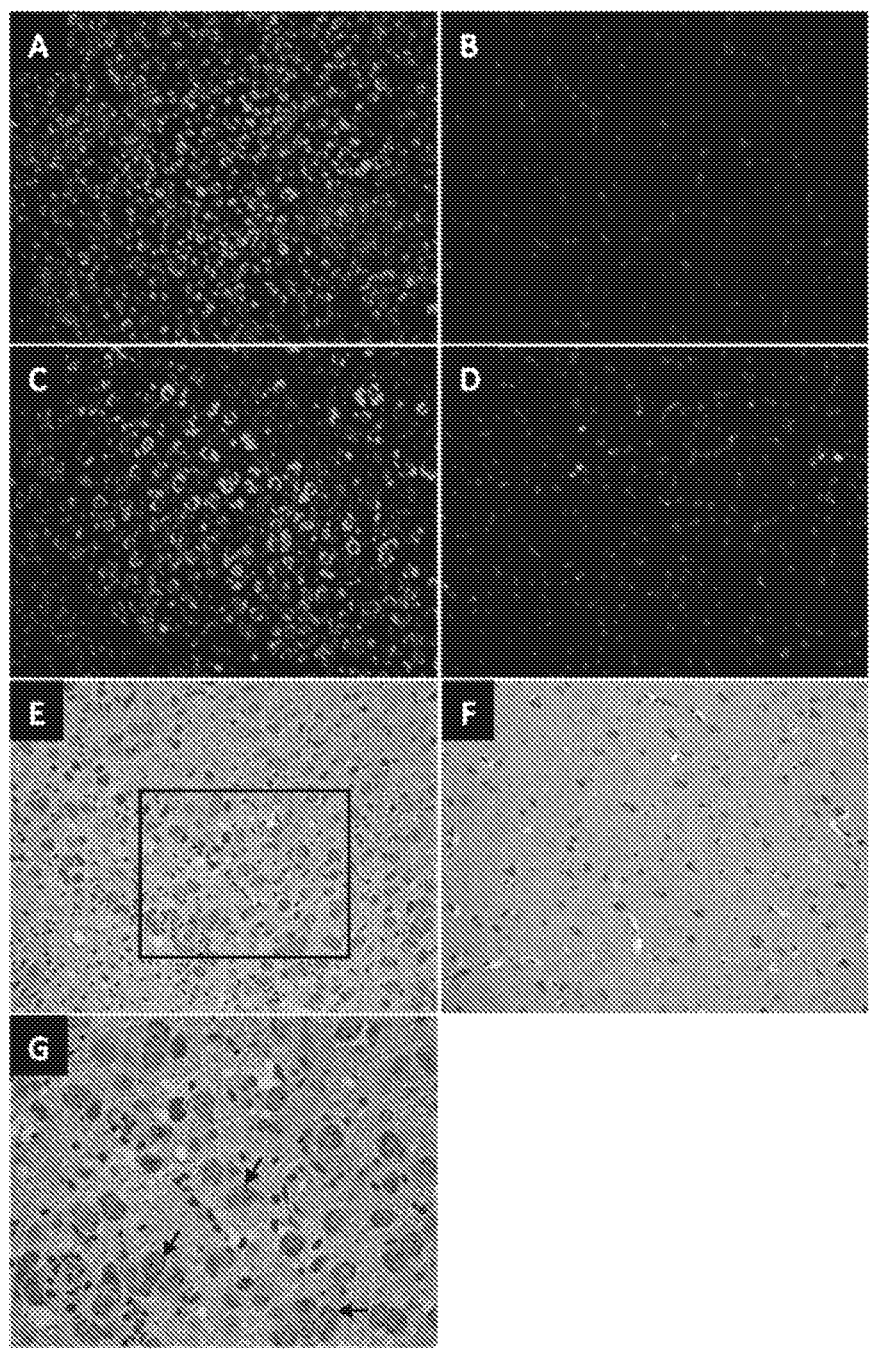
FIGS. 25A-25G show the protein expression in a monkey thalamus. Hex-β staining (green) (FIG. 25A) proximal and (FIG. 25B) distal to the injection site in the thalamus of a 1× dose animal is shown. Hex-α staining (green) (FIG. 25C) proximal and (FIG. 25D) distal to the injection site in the thalamus of 1/30 dose animal is shown. H&E staining (FIG. 25E) proximal and (FIG. 25F) distal to the injection site in the thalamus of 1/30 dose animal shown in FIGS. 25C-25D.

In addition to the neuronal loss in the thalamus along the injection tracks, large fields of neurons loaded with intracellular eosinophilic granules were observed in close proximity (FIGS. 25E, 25G), which was not apparent in other areas of the brain (FIG. 25F).

Immunofluorescence staining with antibodies specific to hexosaminidase alpha- or beta-subunits revealed that these granules are likely to contain these two proteins (FIGS. 25A, 25C). These cells loaded with HexA subunit-positive granules were only observed in the thalamus (FIGS. 25B, 25D), which correlates with the findings in H&E stained sections. These observations are reminiscent of the findings in a GUSB transgenic mouse model where protein lysosomal storage was apparent in several tissues (Vogler et al., 2003).

There are two key observations from this safety study in normal juvenile NHPs: first, that thalamic regions containing large numbers of HexA-positive neurons appear intact with no evidence of significant inflammatory infiltrates (FIGS. 25E and 25G), despite massive neuronal loss and inflammation along the injection track (FIG. 22), and second, that there is no evidence of toxicity associated with the transgene-empty AAVrh8 vector at the highest dose. Consequently, it is thought that neurotoxicity in NHP brain after AAVrh8-HexA-mediated gene transfer is caused by a massive overexpression of HexA in AAVrh8-transduced thalamic neurons that triggers cell death beyond an unknown threshold and leads to a secondary neuro-inflammatory response (vascular cuffing, etc.).

TABLE 3

Summary of neurological symptoms observed in study animals

| AAV dose cmHexA & cmHexB | Survival days post injection (90 = endpoint) | Clinical signs |
| --- | --- | --- |
| 1×-(1) | 28 | lethargy, non-responsive |
| 1×-(2) | 23 | ataxia, unable to perch |
| 1×-(3) | 20 | generalized weakness especially of right leg, anorexia |
| 1/10-(1) | 91 | dyskinesias, chorea |
| 1/10-(2) | 57 | dyskinesias, chorea, "star gazing" |
| 1/30-(1) | >90 | none |
| 1/30-(2) | 66 | Loss of voluntary use of right arm, eventual lethargy |
| PBS | 90 | none |
| Transgene empty-(1) | >90 | none |
| Transgene empty-(2) | >90 | none |

Example 8

Figure 26:
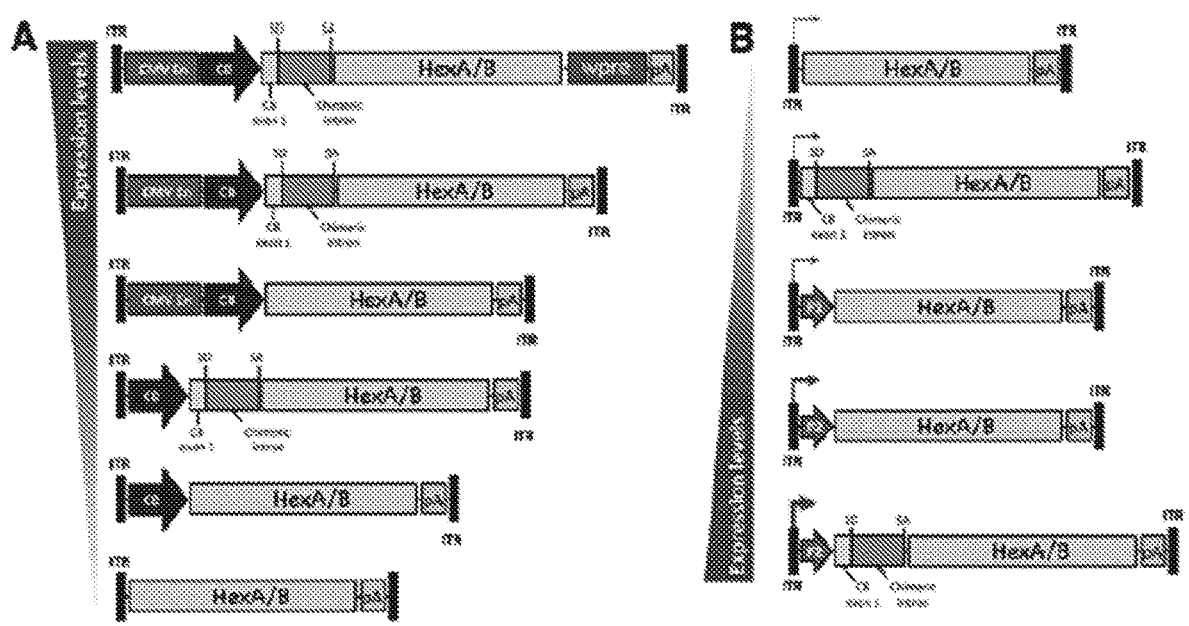
Figure 27:
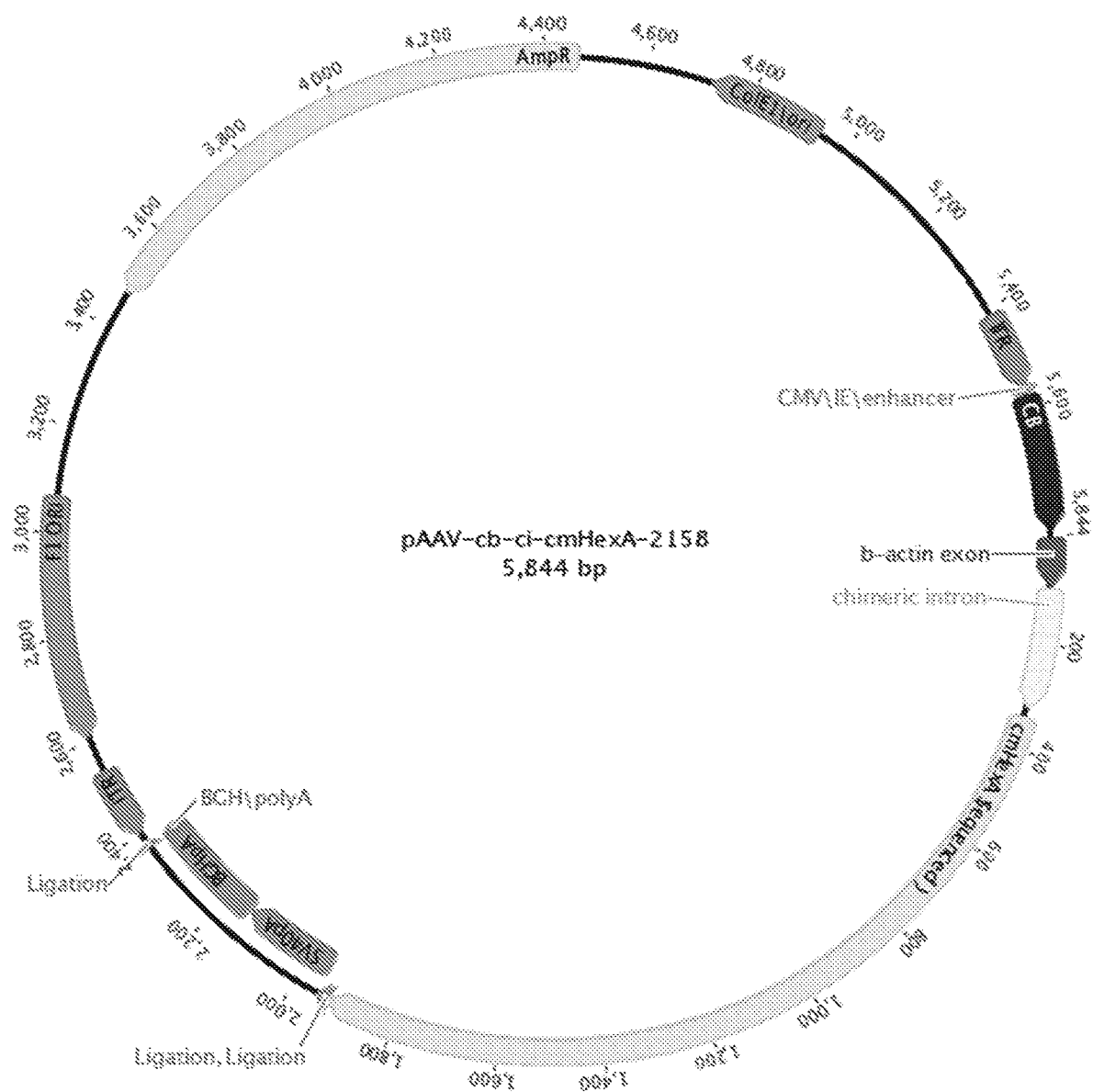
FIG. 27 shows a plasmid map of pAAV-cb-ci-cmHexA-2158 vector.
Figure 28:
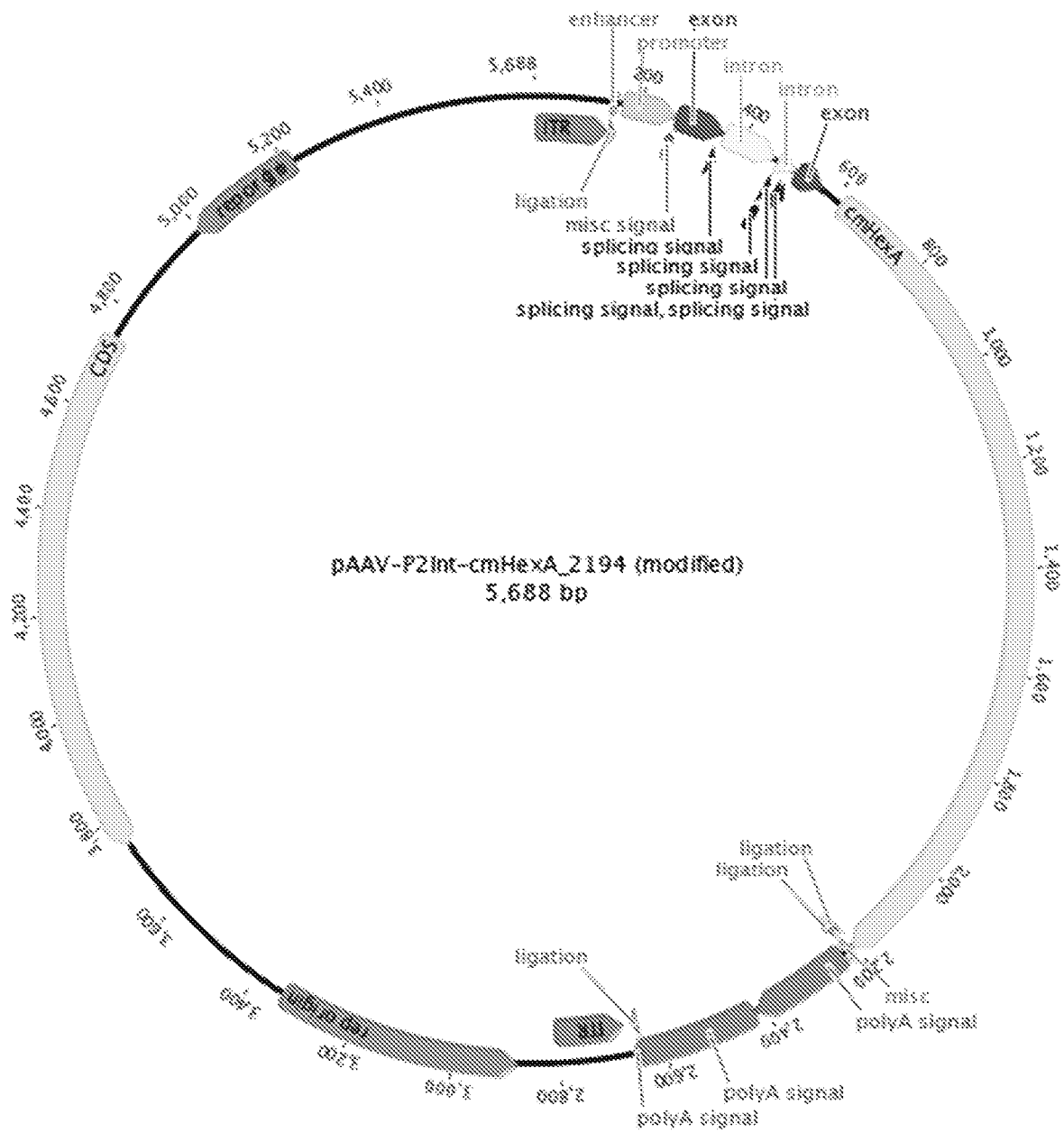
FIG. 28 shows a plasmid map of pAAV-P2Int-cmHexA_2194 (modified) vector.

New AAV vector plasmids (FIG. 26) were tested for the level of hexosaminidase (Hex) enzyme expression upon transient transfection of 293T cells. Two examples are shown in FIGS. 27 and 28.

Figure 29:
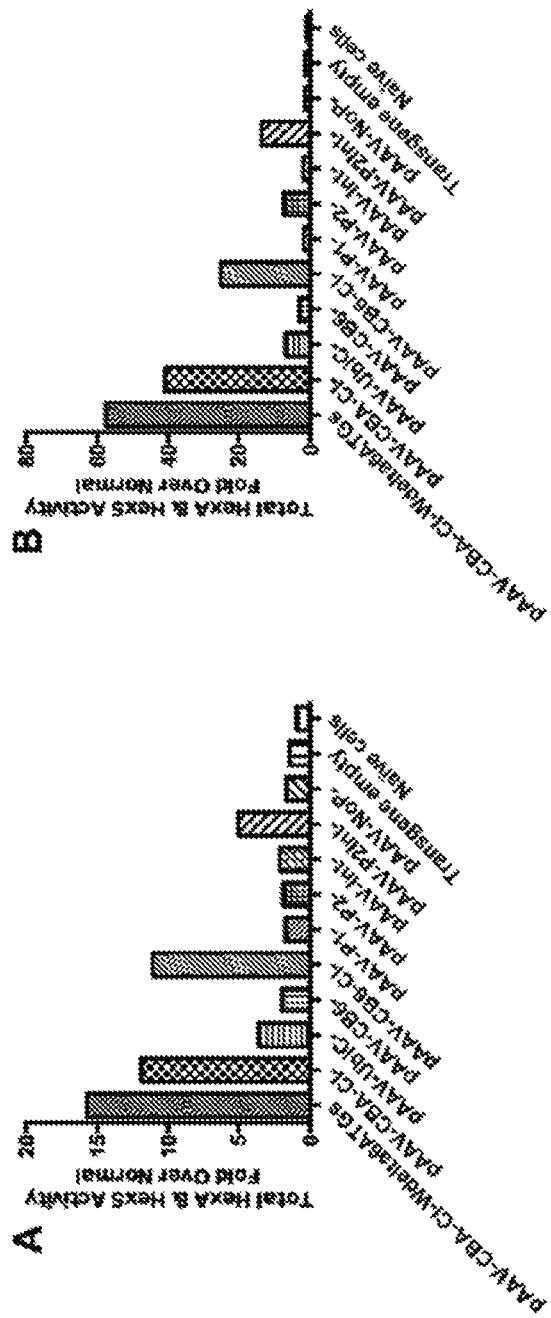
FIGS. 29A-29B show a gradient of hexosaminidase activity in transiently transfected 293T cells. Hexosaminidase activity was measured in cell lysates at 72 hrs post-transfection using the artificial substrates 4MUG (FIG. 29A) and 4MUGS (FIG. 29B), respectively cleaved by all beta-hexosaminidase isoforms (HexA, B and S), or alpha-subunit containing isoforms only (HexA, HexS).

The original AAV vector plasmid pair (pAAV-CBA-CI-Wdelta6ATGs) generated the highest levels of Hex activity, and the AAV vector plasmids without a promoter (pAAV-NoP) or transgene (transgene empty) did not yield any detectable increase in Hex activity over naïve non-transfected 293T cells (FIG. 29). The other AAV vector plasmid pairs generated a gradient of Hex activities. Six experimental AAV vector pairs were chosen for further testing in nude mice along with two AAV vector controls (no promoter and no transgene). A total of 15 vector stocks were produced for in vivo testing (Table 4).

Figure 30:
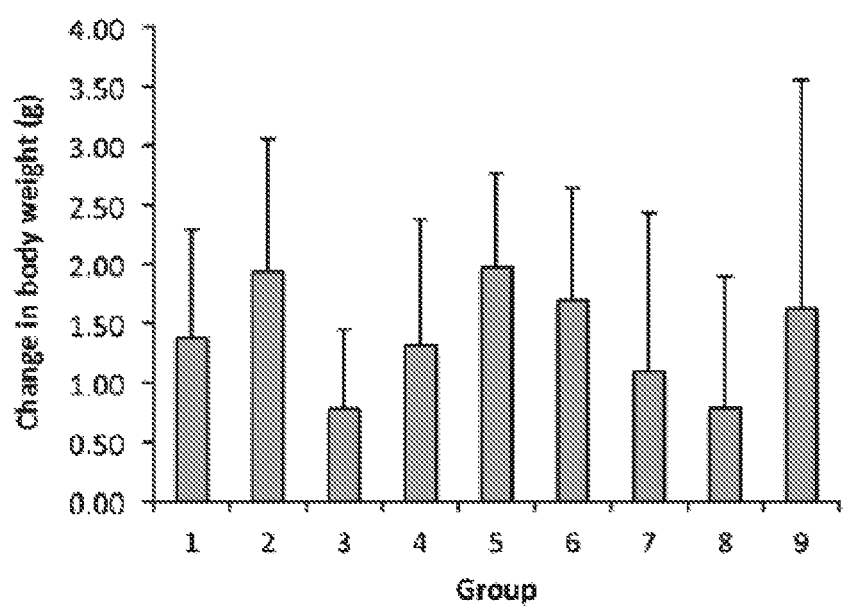
FIG. 30 shows the change in body weight over 1 month study period. Error bars represent 1 standard deviation.

AAV vectors were injected bilaterally into the thalamus and left cerebral lateral ventricle of 10-12 week-old male athymic nude mice (Charles River Labs) at a total dose of $1.32 \times 10^{10}$ vector genomes (vg). Control groups included mice injected with the AAV vector formulation without a promoter (AAV-NoP), an AAV vector without transgene (transgene empty), phosphate buffered saline (PBS), and finally non-injected mice (N=8 for all experimental and control groups) (Table 4). Mice were killed at 1 month post-injection for biochemical analysis of Hex expression and histological studies. All groups displayed identical increase in average body weight over the course of the experiment (FIG. 30), and there was no evidence of gross behavioral changes during this period, unlike in preliminary experiments with higher AAV vector dose where animals were euthanized because of significant body weight loss and in onset of neurological symptoms. The dose used in the current experiment ($1.32 \times 10^{10}$ vg) was determined by lowest titer of one of the vector pairs in order to normalize the total vector dose for all test articles and controls.

Figure 36:
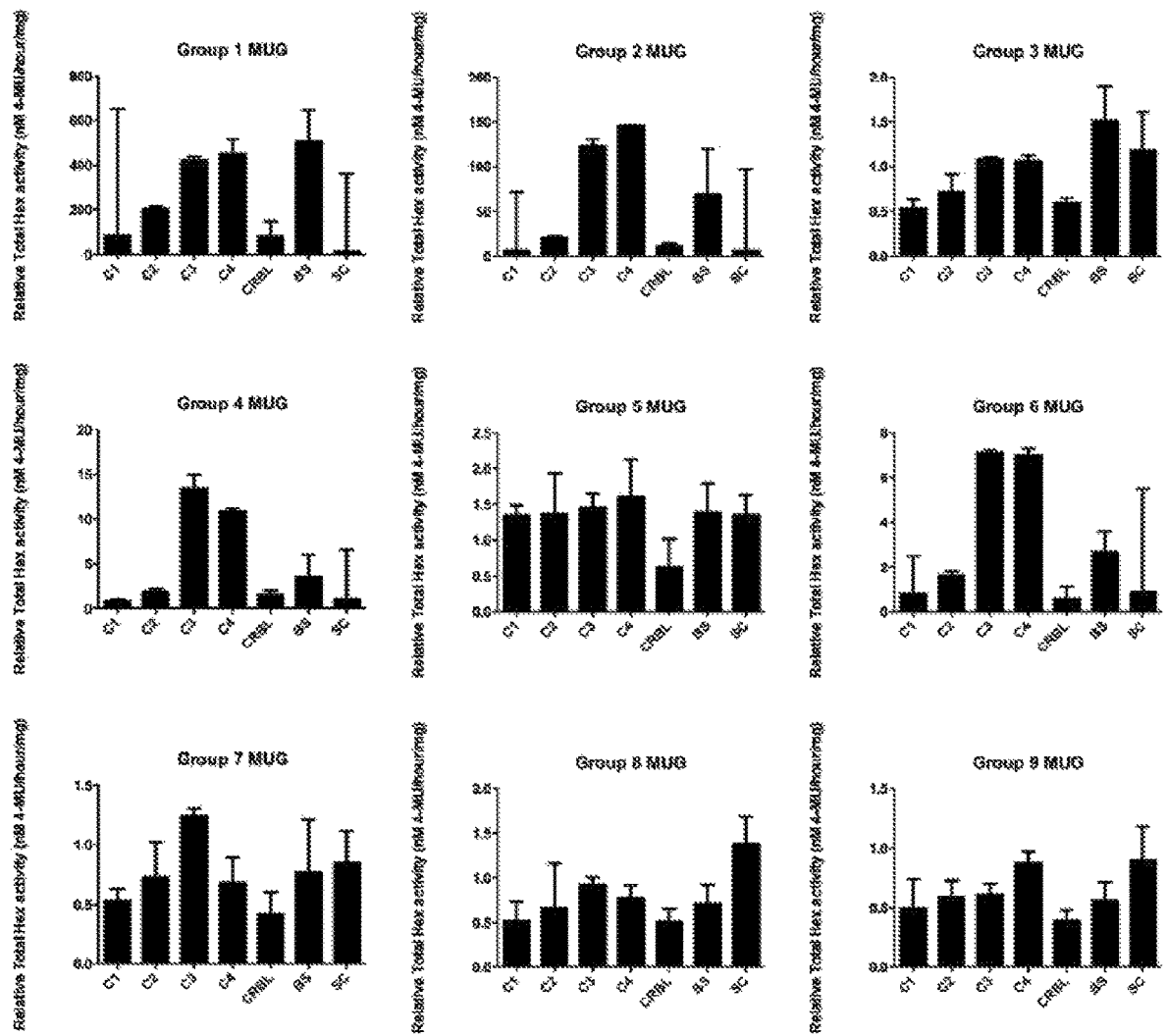
FIG. 36 shows the relative total Hex activity in athymic nude mice injected intracranially with AAV vectors encoding cynomolgus Hexa and Hexp. The in vitro enzymatic activity of HexB, HexA, and HexS measured by MUG substrate, normalized to naïve (C1: olfactory bulbs and first 3 mm coronal slice of cerebrum, C2: following 2 mm coronal slice of cerebrum, C3: following 3 mm coronal slice of cerebrum which contain injection sites, C4: following 2 mm coronal slice of cerebrum, CRBL: cerebellum, BS: brain stem, SC: spinal cord) is shown.
Figure 37:
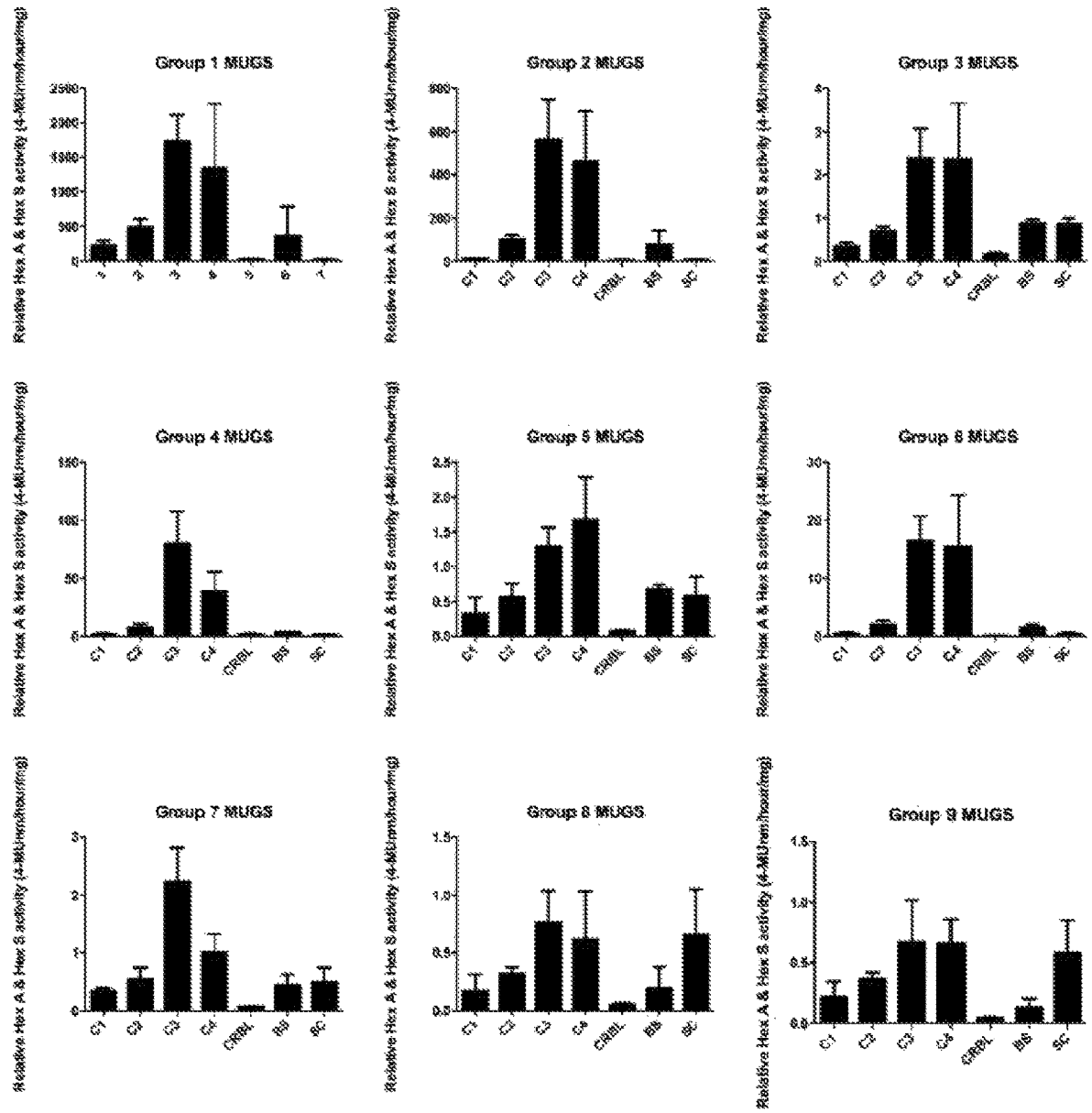
FIG. 37 shows the relative HexA and HexS activity in athymic nude mice injected intracranially with AAV vectors encoding cynomolgus Hexa and Hexp. The in vitro enzymatic activity of HexA and HexS measured by MUGS substrate, normalized to naïve (C1: olfactory bulbs and first 3 mm coronal slice of cerebrum, C2: following 2 mm coronal slice of cerebrum, C3: following 3 mm coronal slice of cerebrum which contain injection sites, C4: following 2 mm coronal slice of cerebrum, CRBL: cerebellum, BS: brain stem, SC: spinal cord) is shown.

Hex activity was measured in 4 coronal brain blocks, cerebellum, brainstem and spinal cord using the artificial substrates MUG (FIG. 36) and MUGS (FIG. 37). Hex activity in the coronal brain block containing the injection site is shown in Table 4 to summarize the findings. The original AAV vector pair (Group 1) generated Hex activities 400-1,700 fold above normal. Similar to the results in cell culture other AAV vector pairs generated Hex activities in the brain 3-fold (Group 2), 20-30-fold (Group 4), and 50-100-fold (Group 6) lower than the original AAV vector formulation (Group 1), providing with the anticipated range of 1-2 log of activities in AAV-mediated Hex expression in brain. Other AAV vectors pairs (Groups 3 and 5) did not generate Hex activity above normal levels present in athymic nude mouse brain. The control groups (Groups 7, 8, and 9) did not show significant changes in Hex activity.

Figure 31:
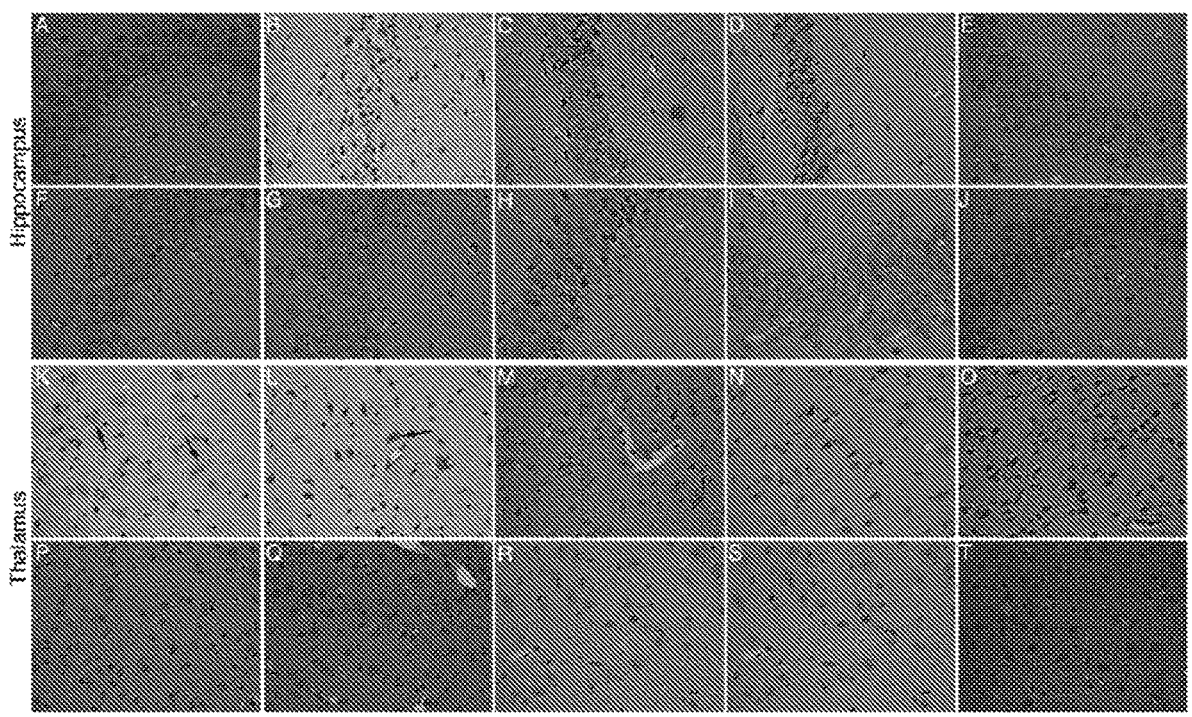
FIGS. 31A-31T show mice brains expressing highest levels of cynomolgus Hex protein contain eosinophilic neurons. H&E stain indicates the presence of neurons containing eosinophillic granules that correlate with cynomolgus Hex expression levels in the hippocampus and thalamus (40×). Group 1 (FIGS. 31A, 31K), Group 2 (FIGS. 31B, 31L), Group 3 (FIGS. 31C, 31M), Group 4 (FIGS. 31D, 31N), Group 5 (FIGS. 31E, 31O), Group 6 (FIGS. 31F, 31P), Group 7 (FIGS. 31G, 31Q), Group 8 (FIGS. 31H, 31R), Group 9 (FIGS. 31I, 31S), and Group 10 (FIGS. 31J, 31T) mice.

Neuropathological examination of the brains revealed numerous thalamic neurons containing eosinophilic granules in Group 1 animals (FIG. 31K). This finding is identical to observations in monkeys injected with these AAV vectors used in Group 1, but the number of these abnormal neurons appears considerably lower in mice than monkeys. This observation was also made in Group 2 animals, but the number of abnormal neurons was considerably lower than in Group 1 (FIG. 31L). The same neurons were observed in the hippocampus of Group 2 animals (FIG. 31B). There was no evidence of such neurons in any other group of animals.

Immunofluorescence staining with an antibody to alpha-subunit of HexA revealed numerous cells expressing the enzyme in the hippocampus and thalamus of animals in Groups 1 (FIGS. 31A, 31K), 2 (FIGS. 31B, 31L), 4 (FIGS. 31D, 31N), and 6 (FIGS. 31F, 31P). There was no evidence of Hex-alpha subunit expression in control groups, possibly because the species specificity of the antibody used in this study which detects human and cynomolgus macaque enzyme, but not the mouse protein.

Figure 32:
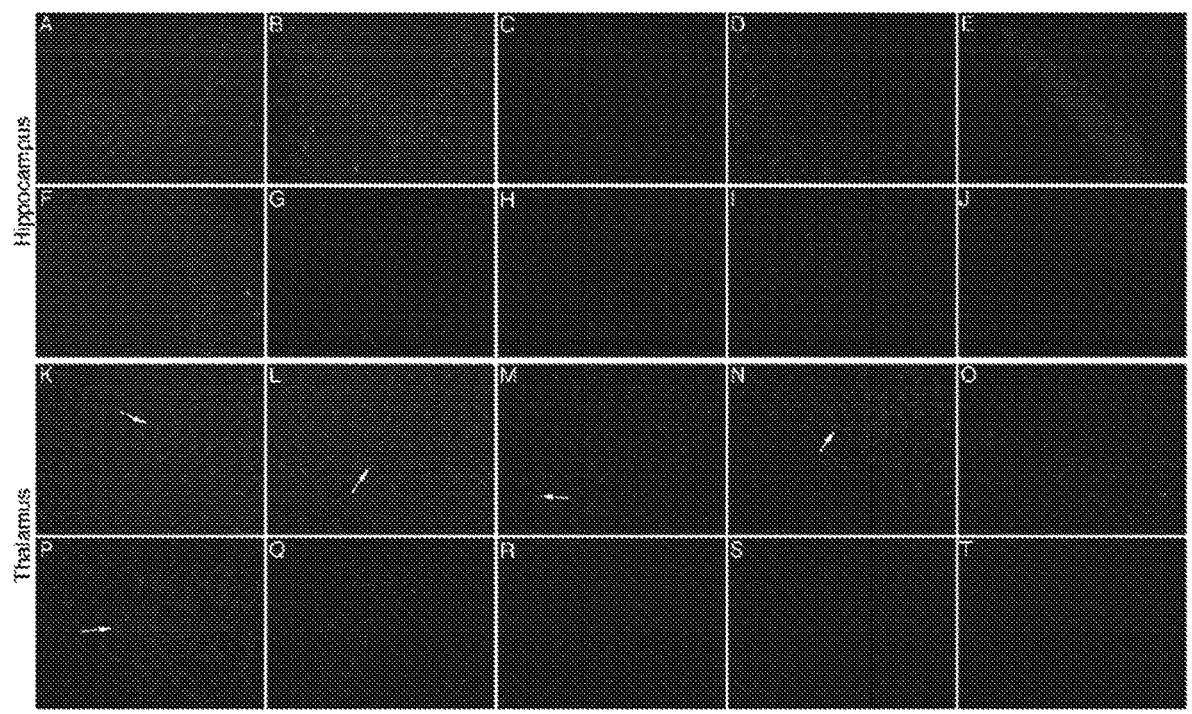
FIGS. 32A-32T show that cynomolgus macaque Hexa expression in athymic nude mouse brain varies among AAV vectors. Hexa staining (green) in the thalamus and hippocampus of Group 1 (FIGS. 32A, 32K), Group 2 (FIGS. 32B, 32L), Group 3 (FIGS. 32C, 32M), Group 4 (FIGS. 32D, 32N), Group 5 (FIGS. 32E, 32O), Group 6 (FIGS. 32F, 32P), Group 7 (FIGS. 32G, 32Q), Group 8 (FIGS. 32H, 32R), Group 9 (FIGS. 32I, 32S), and Group 10 (FIGS. 32J, 32T) mice; Nuclei counterstained with DAPI (blue). Arrows indicate enzyme positive cells.
Figure 33:
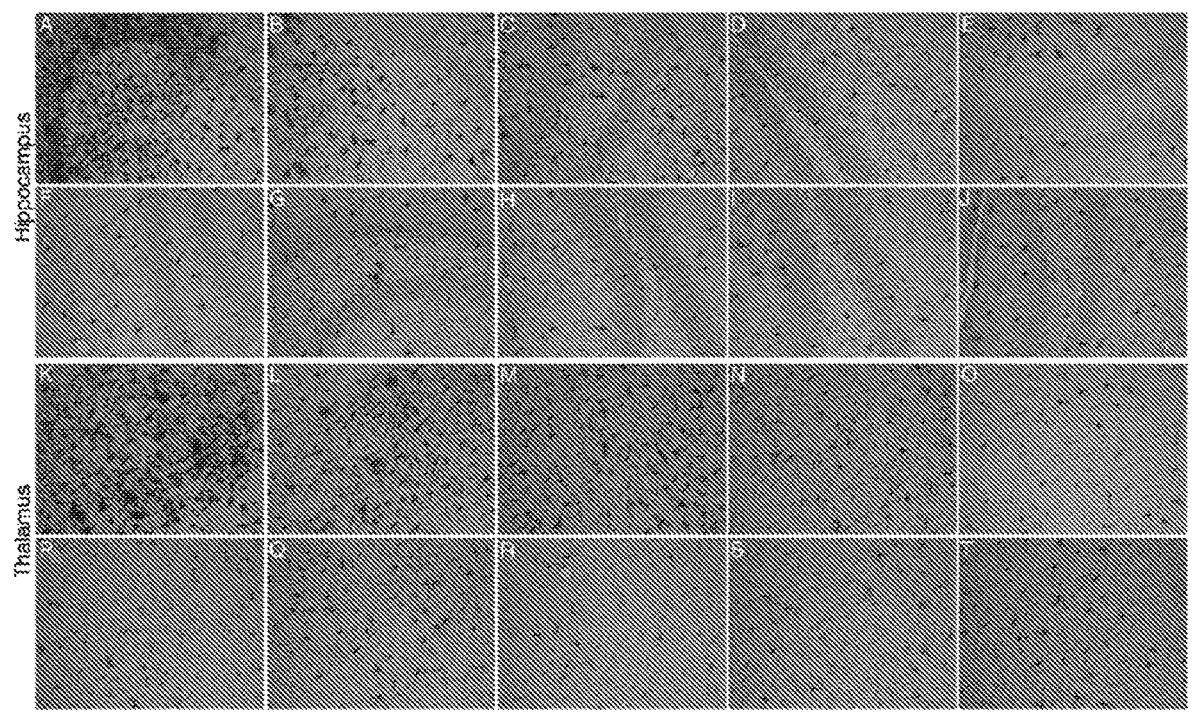
FIGS. 33A-33T show that decreased expression of cynomolgus Hex protein leads to a reduction in microglia activation. Iba-1 staining indicates reduced inflammation in groups with reduced cynomolgus Hex protein expression in the hippocampus and thalamus (20×). Group 1 (FIGS. 33A, 33K), Group 2 (FIGS. 33B, 33L), Group 3 (FIGS. 33C, 33M), Group 4 (FIGS. 33D, 33N), Group 5 (FIGS. 33E, 33O), Group 6 (FIGS. 33F, 33P), Group 7 (FIGS. 33G, 33Q), Group 8 (FIGS. 33H, 33R), Group 9 (FIGS. 33I, 33S), and Group 10 (FIGS. 33J, 33T).

A dramatic increase in Iba-1 staining (microglia activation) was observed in the hippocampus and thalamus in animals injected with the original AAV vector formulation (group 1) (FIGS. 33A, 33K) compared to controls (FIGS. 33I, 33J, 33S, 33T). This evidence for microglia activation was localized to the sites where HexA-positive cells were detected by immunofluorescence staining (FIGS. 32A, 32K), with no apparent changes in microglia elsewhere in the brain. The increase in Iba-1 staining in hippocampus and thalamus was considerably milder in groups 2 and 3 (FIGS. 33B-33C, 33L-33M), and essentially indistinguishable from controls in groups 4-7 (FIGS. 33D-33G; 33N-33Q).

Figure 34:
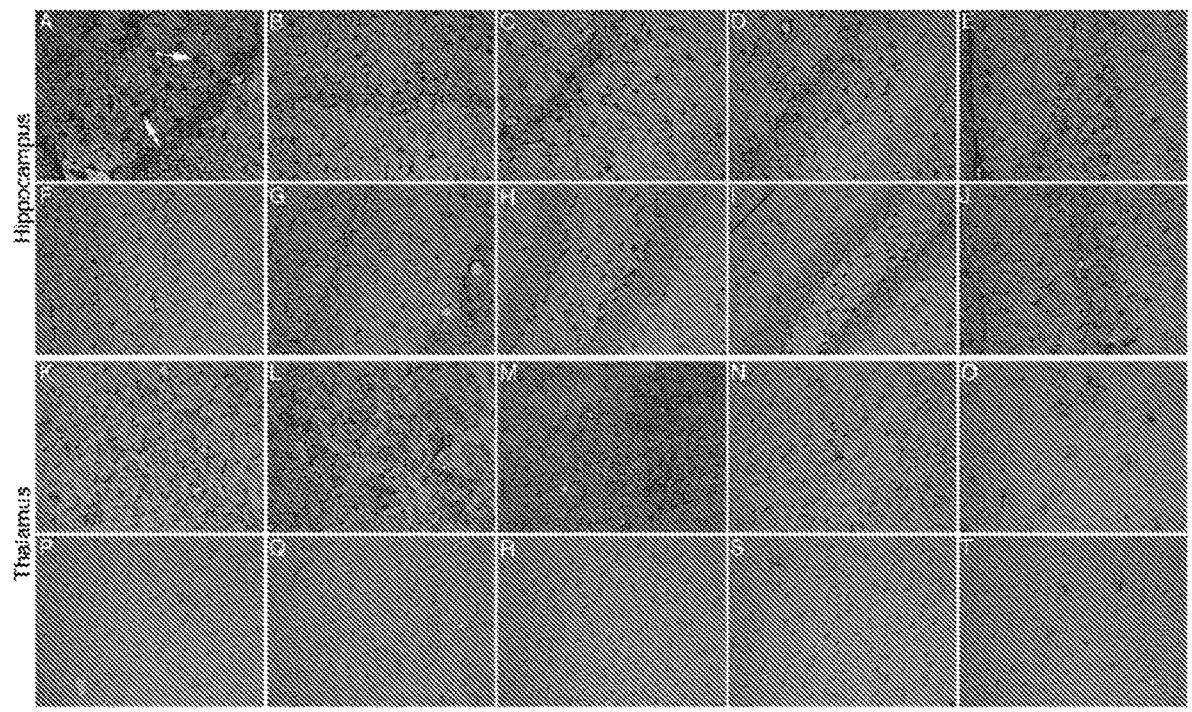
FIGS. 34A-34T show that the decreased expression of cynomolgus Hex protein leads to a reduction in reactive astrogliosis. GFAP staining indicates reduced inflammation in groups with reduced cynomolgus Hex protein expression in the hippocampus and thalamus (20×). Group 1 (FIGS. 34A, 34K), Group 2 (FIGS. 34B, 34L), Group 3 (FIGS. 34C, 34M), Group 4 (FIGS. 34D, 34N), Group 5 (FIGS. 34E, 34O), Group 6 (FIGS. 34F, 34P), Group 7 (FIGS. 34G, 34Q), Group 8 (FIGS. 34H, 34R), Group 9 (FIGS. 34I, 34S), and Group 10 (FIGS. 34J, 34T).

The brain was also analyzed for evidence of reactive astrogliosis using GFAP immunostaining (FIG. 34). In the hippocampus, evidence of reactive astrogliosis was only found in animals injected with the original AAV vector formulation (group 1) (FIG. 34A). All others were indistinguishable from controls. In the thalamus, there appeared to be some degree of astrogliosis in groups 1-3 (FIGS. 34K-34M), and mild or indistinguishable levels from the controls in groups 4-7 (FIGS. 34N-Q). There was no evidence of astrogliosis in other areas of the brain in any of the groups.

Two new AAV vectors (FIG. 35), AAV-CB6-I-cmHex (promoter represented by SEQ ID NO: 4) and AAVP2-I-cmHex (promoter represented by SEQ ID NO: 5, construct represented by SEQ ID NO: 6), met all presently testable criteria defined prior to the initiation of the experiments (absence of gross behavioral alterations, rotarod performance comparable to control groups, constant or increasing body weight between 0 and 30 days post-injection, absence of neuropathology, and enzyme expression above normal in thalamic block and rostral non-injected block). These new AAV vector formulations (groups 4 and 6) yielded increased Hex expression in the brain with little or no evidence of neuropathological changes (absence of eosinophilic neurons, microgliosis or astrogliosis) compared to controls.

The new AAV-CBA-I-cmHex vector (FIG. 35) where the wore element was removed from the original AAV vector, but the expression elements (promoter and artificial intron) remain the same was also tested. This AAV vector (group 2) showed ~3-fold lower Hex activity levels compared to the original AAV vector and decreased microgliosis compared to the original AAV vector. Considering that the expression elements are the same as in the AAV vectors used in long-term experiments in Sandhoff mice and cats, it is thought that the AAV vector may also mediate long-term expression. Given the reduction in Hex expression level and milder activation of microglia, this new AAV vector is unlikely to significantly impact the behavior of NHPs at the dose (3E11 vg) and duration of the experiment in Example 9.

TABLE 4

Experimental groups and Hex activity (MUG and MUGS) in injection block

| Group | Vector | Relative Enzyme Activity | |
|---|---|---|---|
| | | MUG | MUGS |
| 1 | pAAV-CBA-CI-cmHexA-WPRE Δ6ATGs<br>pAAV-CBA-CI-cmHexB-WPRE Δ6ATGs | 419.07 | 1732.31 |

TABLE 4-continued

Experimental groups and Hex activity (MUG and MUGS) in injection block

| Group | Vector | Relative Enzyme Activity | |
|---|---|---|---|
| | | MUG | MUGS |
| 2 | pAAV-CBA-CI-cmHexA<br>pAAV-CBA-CI-cmHexB | 122.96 | 563.12 |
| 3 | pAAV-CB6-cmHexA<br>pAAV-CB6-cmHexB | 1.08 | 2.38 |
| 4 | pAAV-CB6-CI-cmHexA<br>pAAV-CB6-CI-cmHexB | 13.43 | 79.97 |
| 5 | pAAV-P2-cmHexA<br>pAAV-P2-cmHexB | 1.46 | 1.29 |
| 6 | pAAV-P2-CI-cmHexA<br>pAAV-P2-CI-cmHexB | 7.10 | 16.51 |
| 7 | pAAV-cmHexA<br>pAAV-cmHexB | 1.25 | 2.24 |
| 8 | pAAV-CBA-CI-WPRE Δ6ATGs | 0.92 | 0.76 |
| 9 | PBS | 0.61 | 0.67 |
| 10 | Naïve | 1.00 | 1.00 |

Note:
Relative enzyme activity refers to fold elevation in Hex activity above normal in the brain of athymic nude mice.

Example 9

Three AAV vector designs (FIGS. 19 and 35) were selected in athymic nude mice to increase beta-hexosaminidase expression in brain, and reduced inflammatory response (astrogliosis and microglia activation) compared to the original AAV vector formulation. AAVrh8 vectors were injected into NHPs (Table 5) screened for absence or very low titers of neutralizing antibodies to AAVrh8 capsid.

Figure 38:
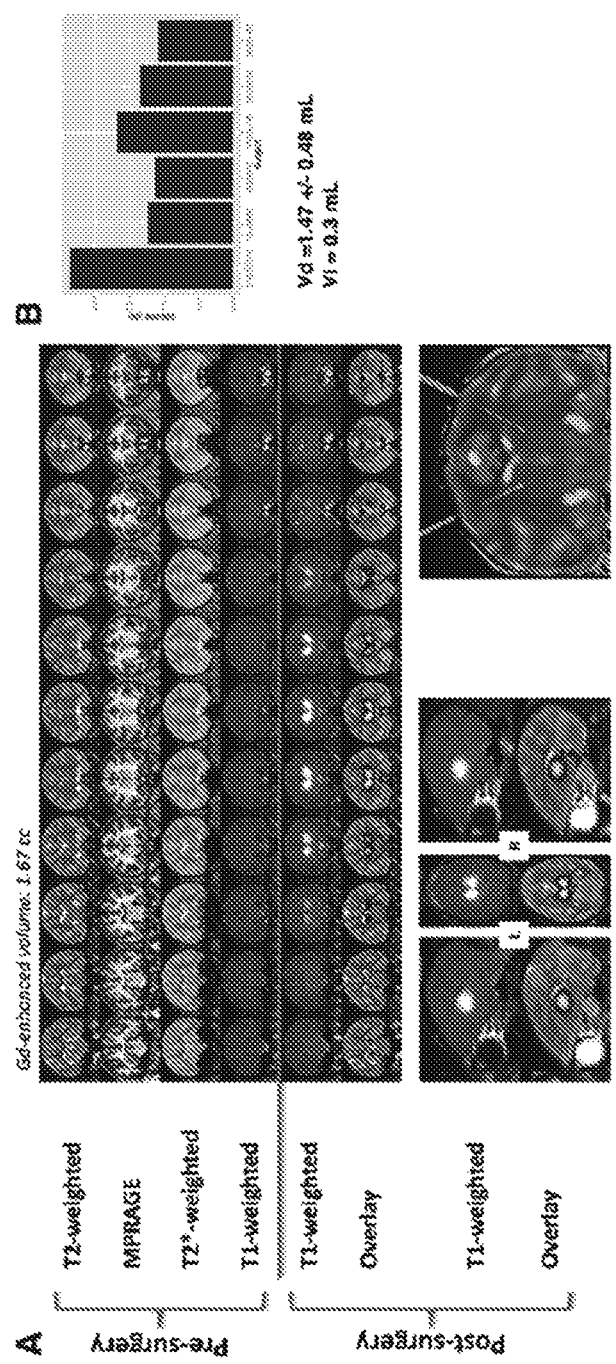
FIGS. 38A-38B show MRI analysis of targeting and distribution after intraparenchymal injections.

A total dose of $3.2 \times 10^{11}$ vg was infused bilaterally into the thalamus (50% dose, 2×150 µl) and left cerebral lateral ventricle (50% dose in 300 µl). The vector formulations also contained 2 mM gadolinium to determine targeting accuracy and distribution by brain MRI immediately following injection (FIG. 38A). All NHP tolerated the surgical procedure well with no complications. The average volume of gadolinium distribution (Vd) in the thalamus was 1.47±0.48 mL (FIG. 38B), which corresponds to a Vd/Vi ratio of 4.9, since the injected volume in the thalamus (Vi) was 0.3 mL.

Figure 39:
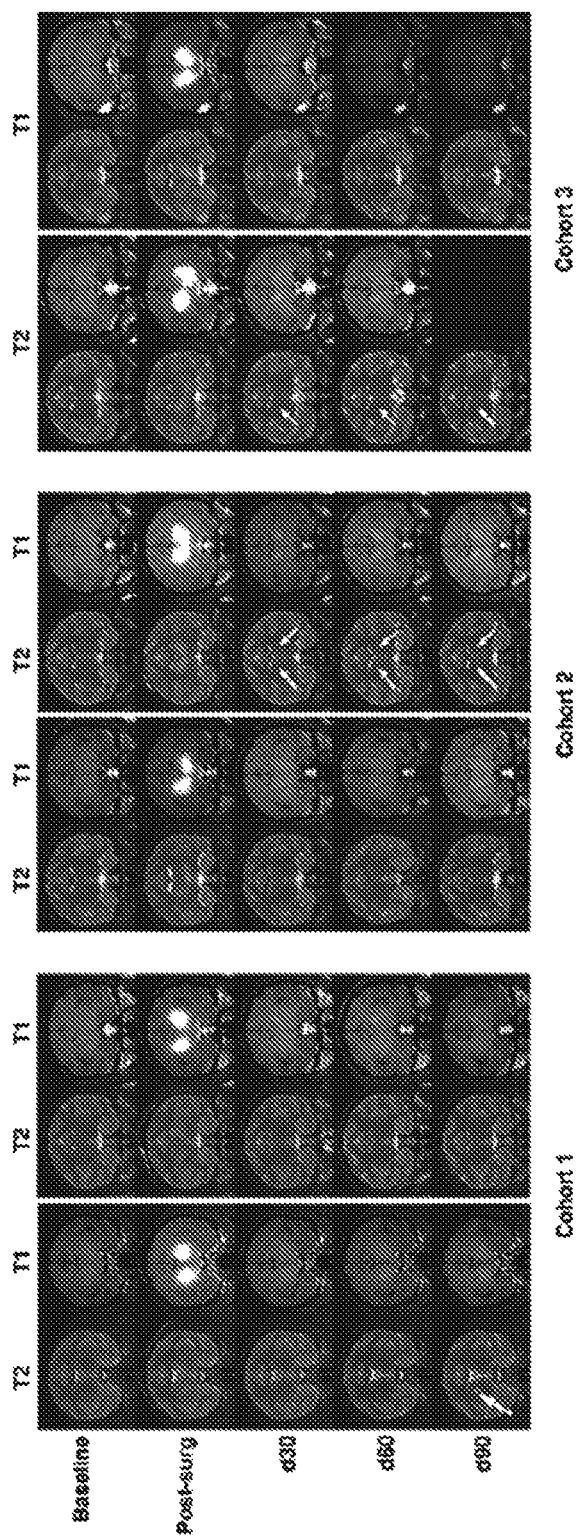
FIG. 39 shows the brain MRI of AAVrh8-injected NHPs throughout the course of the 90 day experiment. Arrows indicate regions of hyperintense signal in the thalamus in three NHPs.
Figure 40:
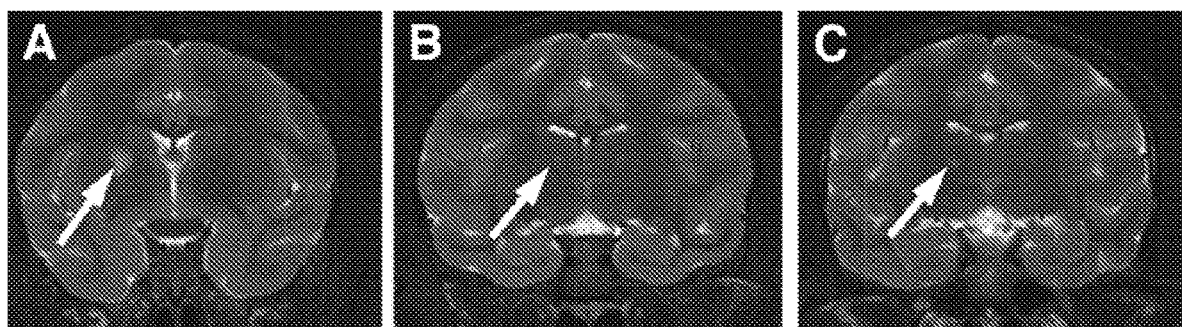
FIGS. 40A-40C show the hyperintensities in brain MRIs detectable in the thalamus of some AAVrh8-injected NHP at 90 days post-injection. One NHP in cohort 1 (FIG. 40A) showed a large hyperintensity in the left thalamus at the 90 day imaging time, although it was undetectable at earlier imaging time points.

The behavior of all six AAVrh8-injected NHPs remained normal throughout the 90-day study. As planned, brain MRI was carried out monthly (FIG. 39). Signal changes at the injection sites were documented in two monkeys from cohorts 2 and 3 from day 30 onward, but with no apparent change over time (FIGS. 40B, 40C). In one monkey in cohort 1 there was no signal changes in brain MRI at days 30 and 60 post-injection, but a large signal change was detected in the left thalamus at day 90 (FIG. 40A). Despite this abnormal signal at day 90 the overall behavior of this monkey remained unchanged throughout the study.

Figure 41:
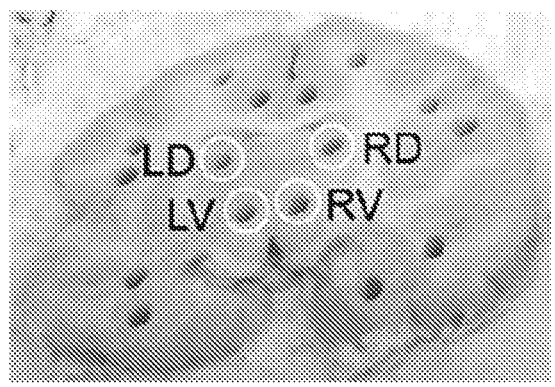
FIG. 41 shows the biopsy sampling of coronal brain sections. Higher than normal hexosaminidase was measured in the dorsal (D) and ventral (V) samples in the right (R) or left (L) thalamus.

The brain was cut into 4 mm coronal blocks and used to map hexosaminidase (Hex) activity and assess neuropathology. Biopsy punches (3 mm diameter) were used to sample the brain to generate a map of enzyme distribution (FIG. 41). Total Hex activity (HexA, HexB, and HexS) above normal was detected only in punches of the thalamus in all cohorts (Table 6). In agreement with studies in athymic nude mice, the total Hex activity in thalamic punches was highest in cohort 1 (up to 87-fold above normal), and similar in cohorts 2 and 3 (up to 9-fold above normal). Total Hex activity in most other sampled brain regions were similar to that in non-injected control monkeys.

Figure 42:
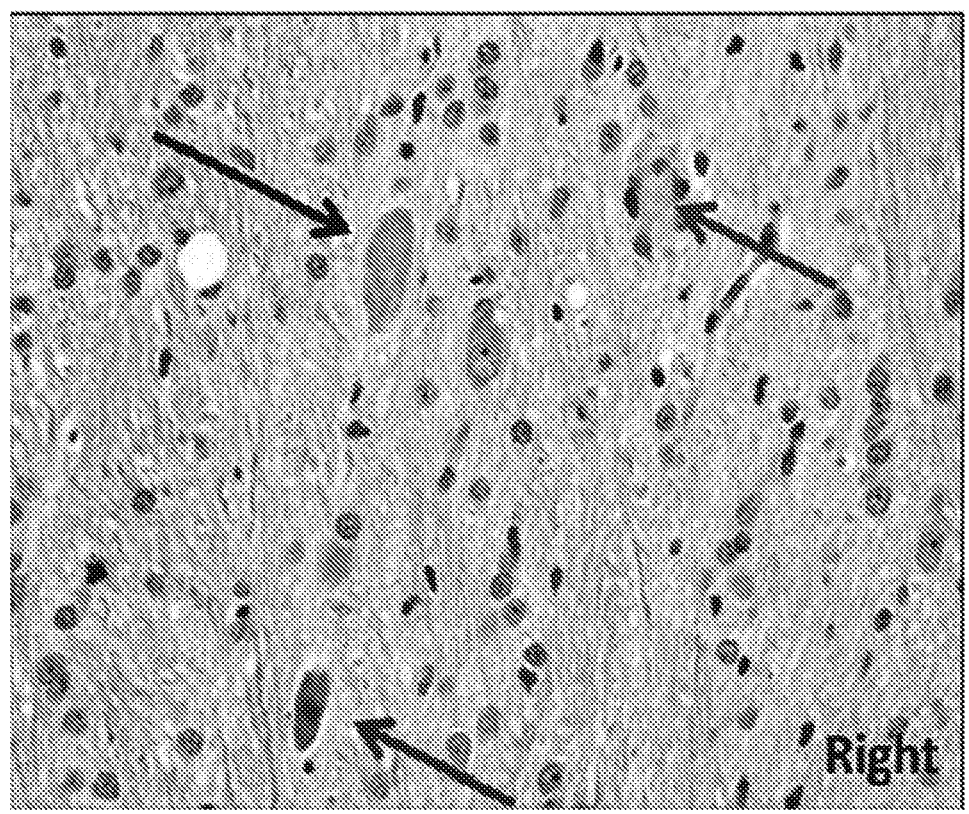
FIG. 42 shows the neuropathological findings in the brain of cohort 1 NHPs, including intraneuronal accumulation of eosinophilic granules, neurodegeneration, and neuronophagia.
Figure 43:
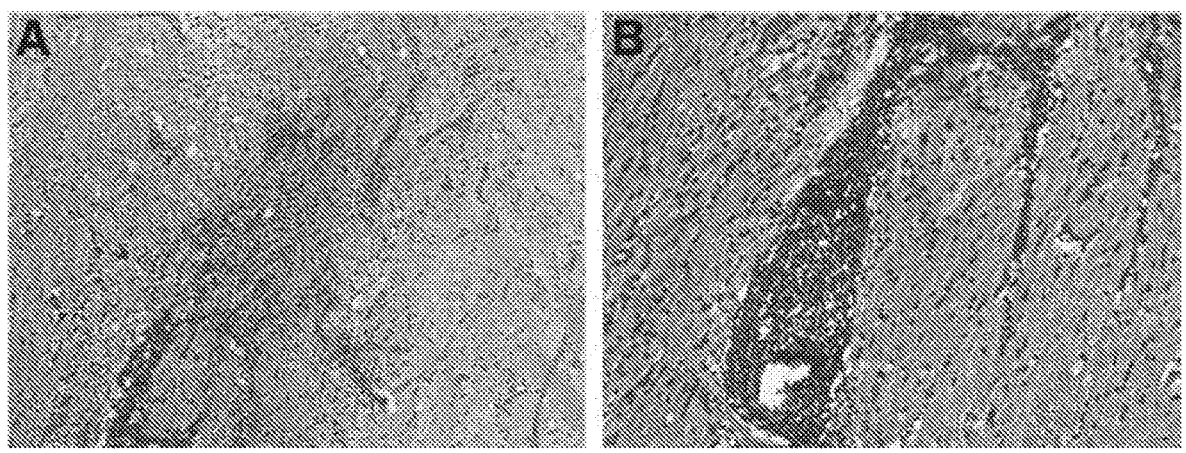
FIGS. 43A-43B show severe focal spongiosis with perivascular cuffing in the left thalamus of one AAVrh8-injected monkey in cohort 1.

Neuropathological evaluation of the brains revealed abundant accumulation of intraneuronal eosinophilic material in monkeys in cohort 1 (FIG. 42, black arrow). Moderate to severe neuronal degeneration was seen in cohort 1 animals. In the left thalamus of one monkey (ID 295851) in cohort 1 there was severe focal spongiosis and perivascular cuffing (FIGS. 43A, 43B). This lesion corresponded to the abnormal MRI signal that became evident in the left thalamus of one monkey in cohort 1 at 90 days post-injection (FIG. 40A).

In cohort 2, there was no accumulation of eosinophilic material, rare neuronal degeneration and satellitosis. Focal inflammation of white matter with neuronal degeneration most likely associated with injection site/track trauma was noted in one monkey (ID 295847).

Figure 44:
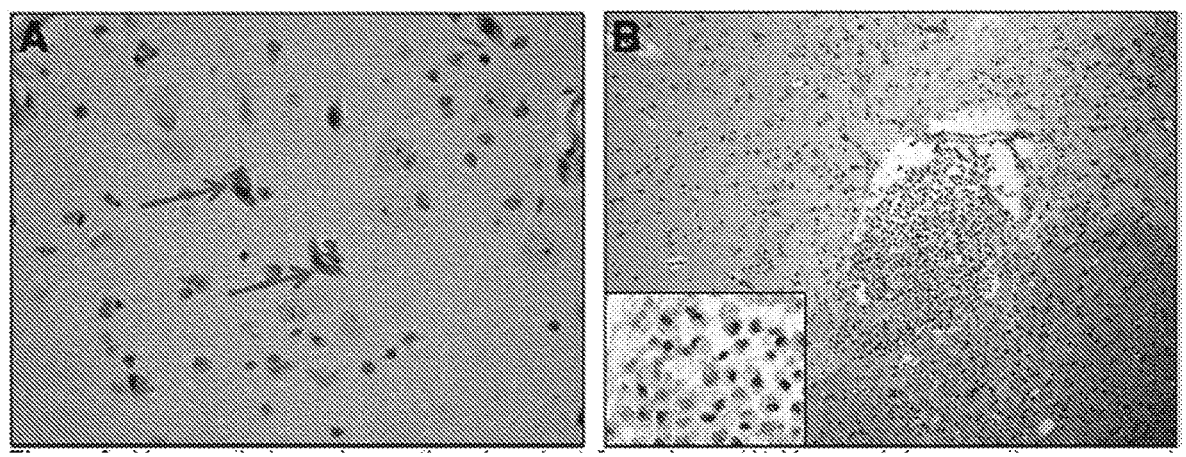
FIGS. 44A-44B show neuropathology observations in cohort 3 monkeys. While neuronal degeneration was rare in these monkeys (FIG. 44A), in monkey 295709, there was evidence of perivascular gitter cells (FIG. 44B), likely associated with injection track.
Figure 45:
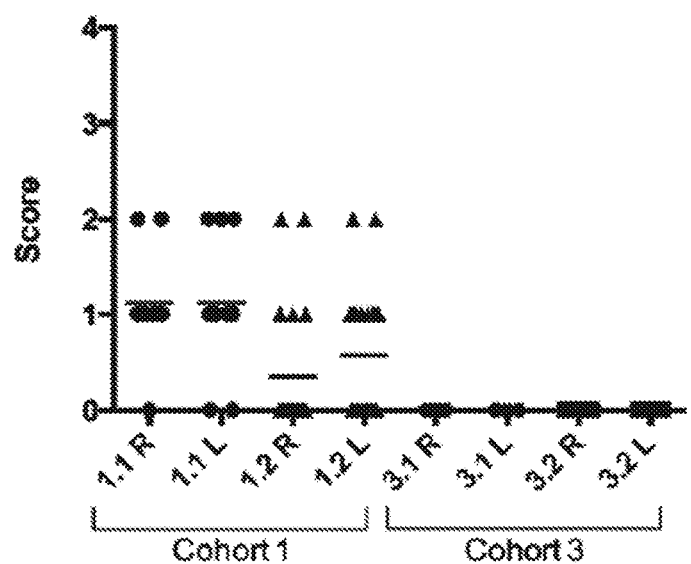
FIG. 45 shows the scoring of intraneuronal accumulation of eosinophilic material in the right and left thalamus of monkeys in cohorts 1 and 3.
Figure 46:
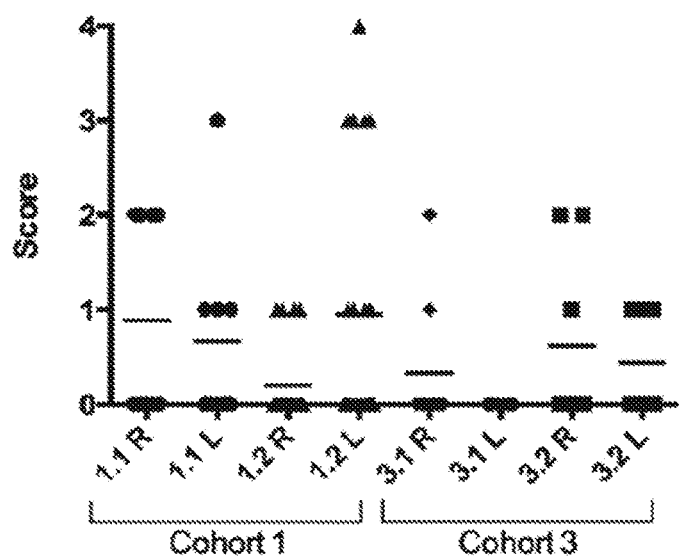
FIG. 46 shows the scoring of neuronal degeneration and necrosis in the right and left thalamus of monkeys in cohorts 1 and 3.
Figure 47:
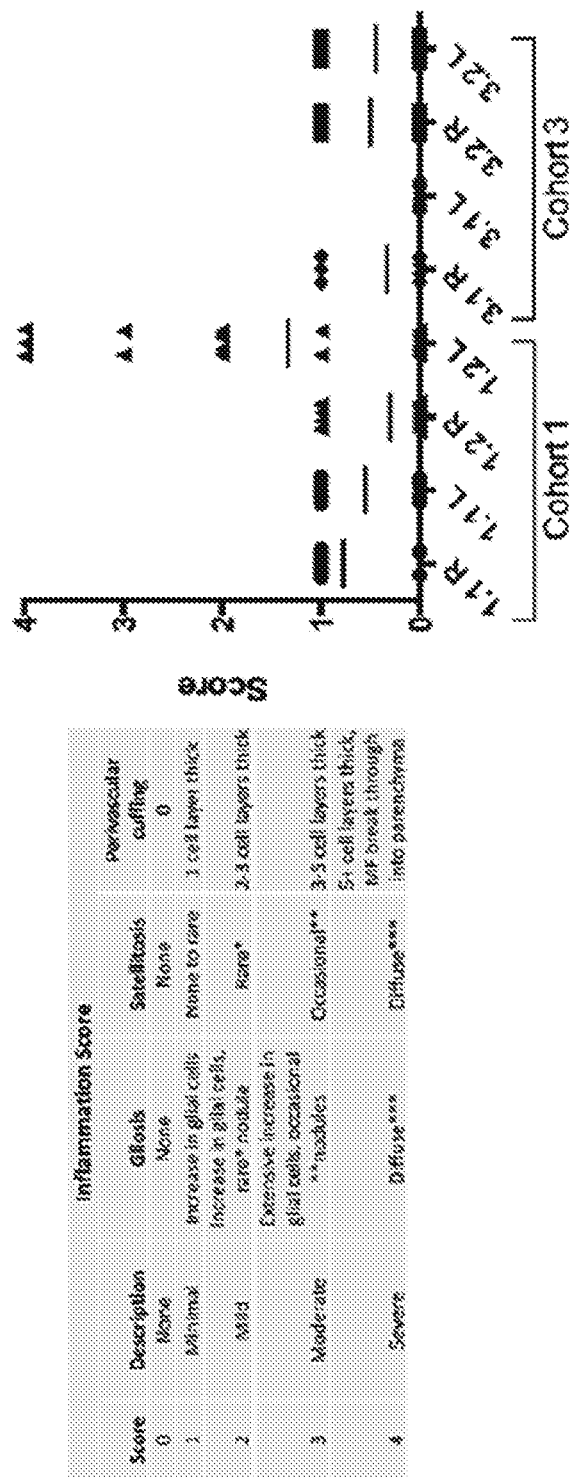
FIG. 47 shows the scoring of inflammation in the right and left thalamus of monkeys in cohorts 1 and 3.

In cohort 3, there was no accumulation of intraneuronal eosinophilic material, rare neuronal degeneration, and satellitosis (FIG. 44A). In one monkey (ID 295709), there was a focus of perivascular gitter cells likely associated with cannulization (FIG. 44B). Serial sections 150 µm apart spanning the entire left and right thalamus of monkeys in cohorts 1 and 3 were prepared for quantification of histological findings namely intraneuronal accumulation of eosinophilic material (FIG. 45), neuronal degeneration and necrosis (FIG. 46), as well as inflammation (FIG. 47). These findings indicate that formulations 1 and 3 have comparable impact in the brain, with the exception of the left injection site in one animal in cohort 1 where there was considerable neuronal degeneration, necrosis, spongiosis and corresponding inflammation. These findings match quite well with the day 90 brain MRI (FIG. 40A).

Figure 48:
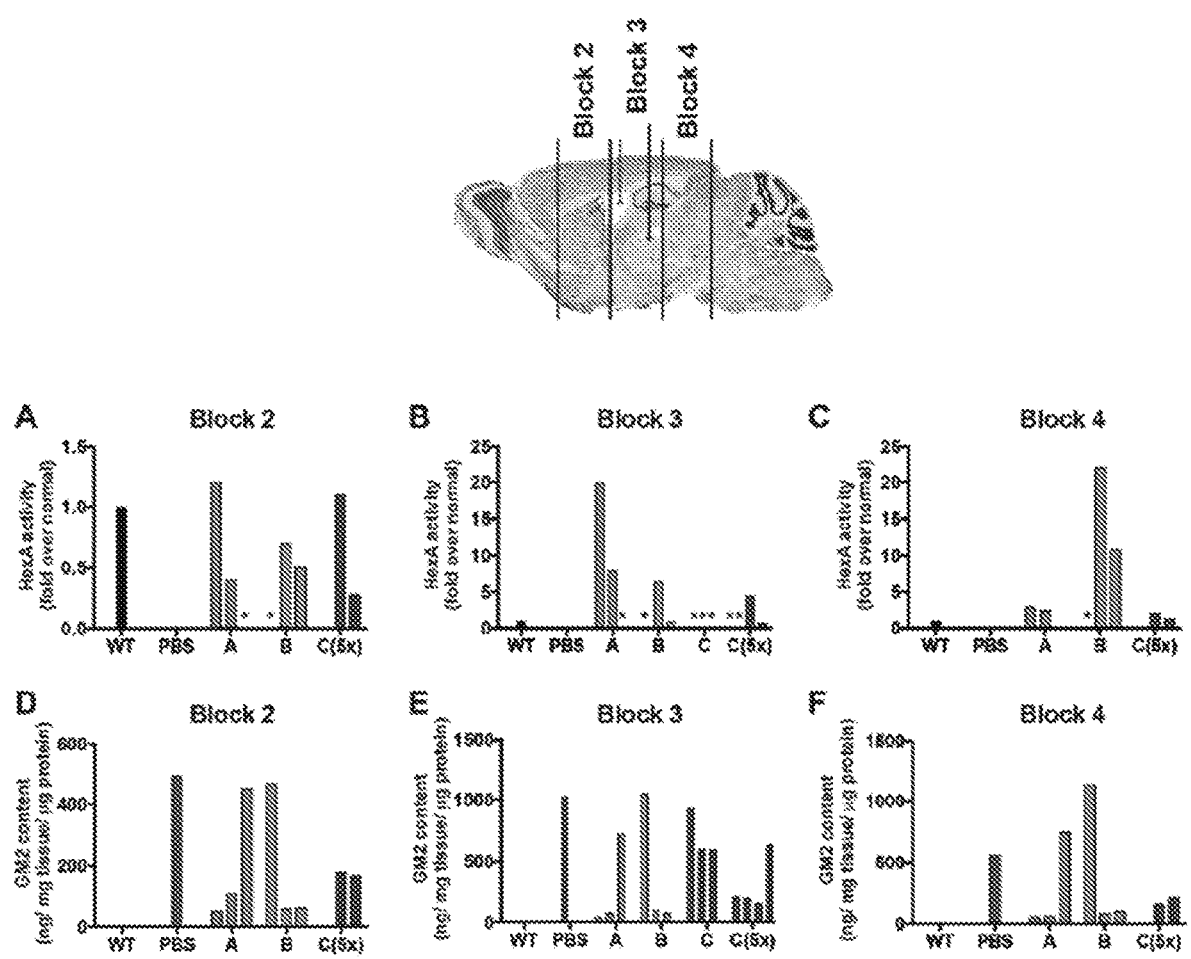
FIGS. 48A-48F show that the intracranial injection of AAVrh8-cmHex vectors results in increased Hex expression and reduction in GM2 ganglioside content in the brain of Sandhoff mice. Six to eight week-old Sandhoff mice received intracranial injections of PBS (n=1; purple bars; n=1), AAVrh8-CBA-cmHex-W (green bars (A), n=3, 4.68× $10^9$ vg), AAVrh8-CBA-cmHex (orange bars (B), n=3, 4.68× $10^9$ vg), or AAVrh8-CB-I-cmHex (blue bars (C), 4.68×$10^9$ vg-n=3; C(5×): 2.34×$10^{10}$ vg-n=4) vectors. The brain was collected at 4 weeks post-injection and divided in 2-3 mm coronal blocks as shown in the top schematic; vertical arrows indicate the injection sites.
Figure 49:
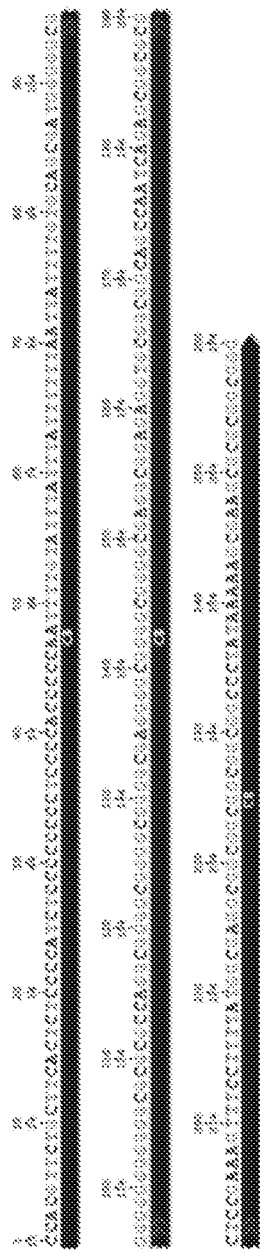
FIGS. 49A-C show structural renderings of promoters described by the disclosure.
Figure 49:
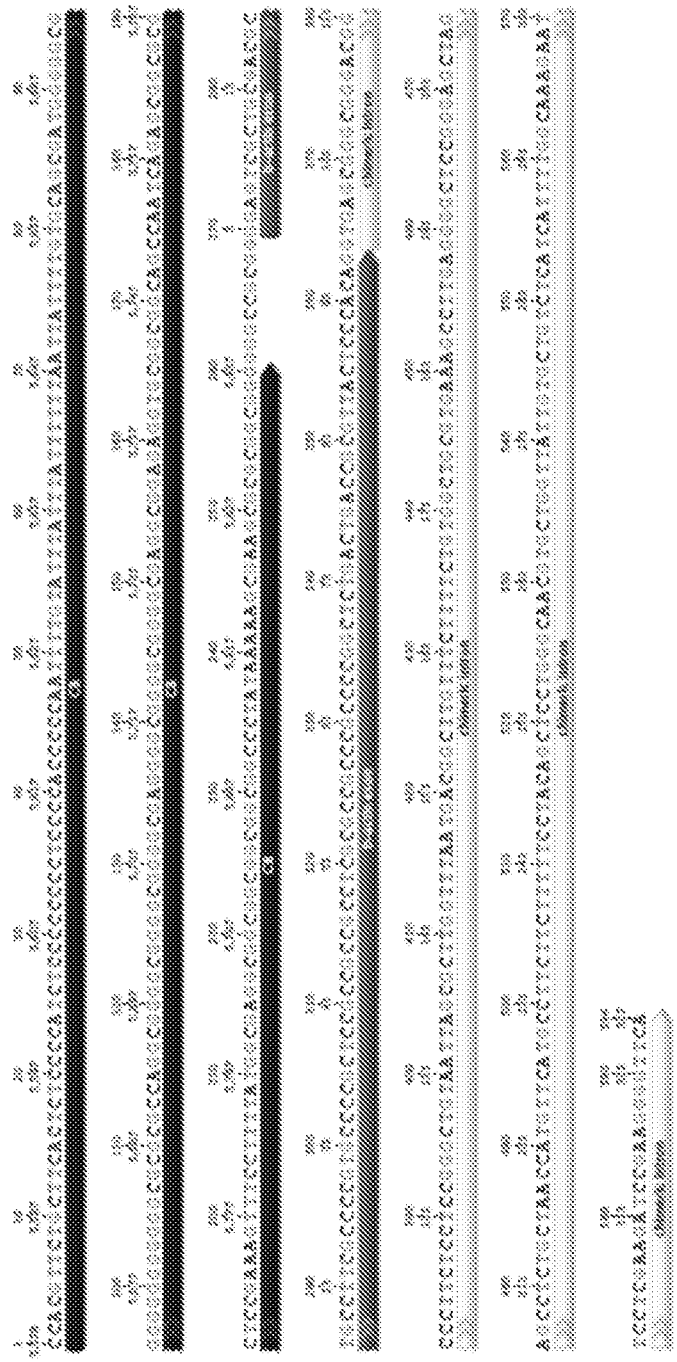
Figure 49:
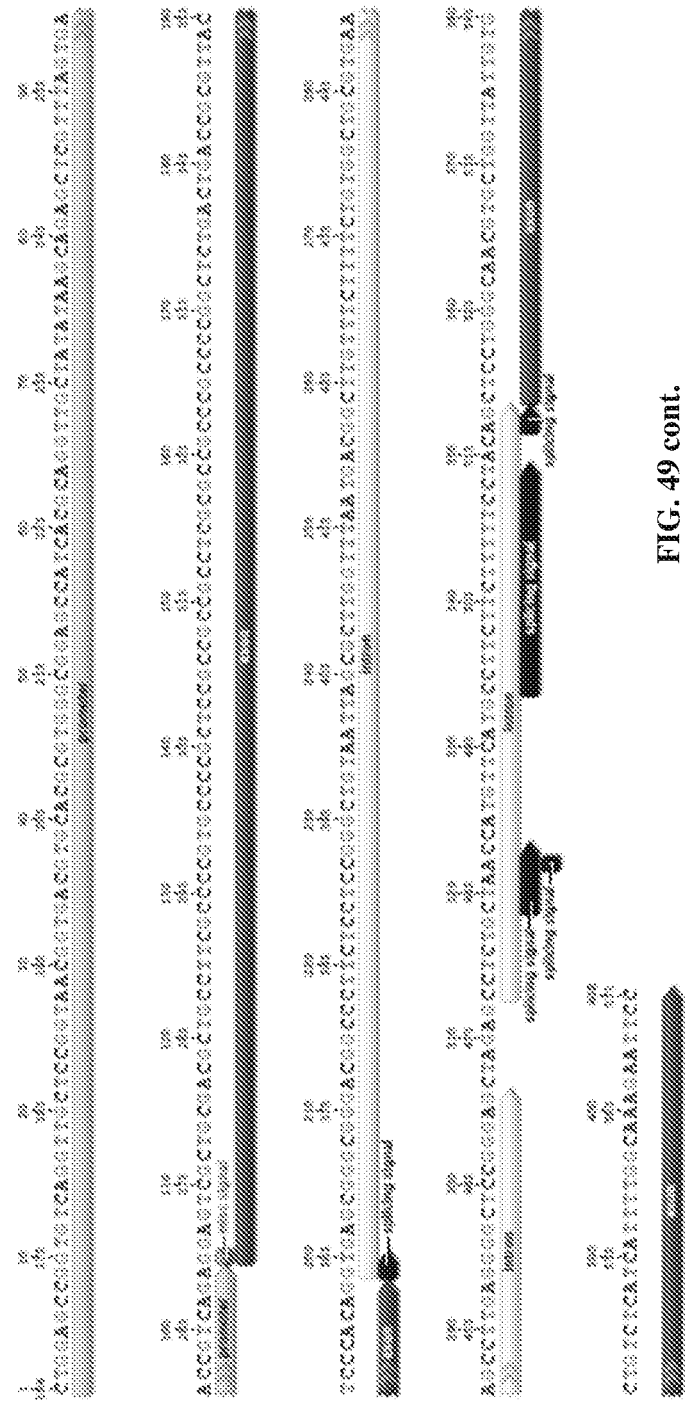

A small pilot study was carried out to determine the effectiveness of the new vectors AAVrh8-CBA-cmHex (FIG. 19) and AAVrh8-CB-I-cmHex (FIG. 19) to reduce the GM2 content in the CNS of Sandhoff disease (SD) after intracranial delivery. The original AAVrh8-CBA-cmHex-$W^{A6ATG}$ vector was used as an efficacy reference since all previous studies in SD mice and cats were carried out with this vector. AAV vectors were infused in 4-6 week old SD mice bilaterally into the thalamus and left cerebral lateral ventricle at a total dose/mouse of $4.68 \times 10^9$ vg. This was the 1× dose tested in therapeutic efficacy studies in SD mice injected with the original AAVrh8-CBA-Hex-W vector. Since the total Hex activity in the thalamus of NHP injected with AAVrh8-CB-I-cmHex (cohort 2 in Table 6) was ~20-fold lower than in NHP injected with AAVrh8-CBA-cmHex (cohort 1 in Table 6) an additional cohort of SD mice injected with a 5-fold higher dose (5× dose: $2.34 \times 10^{10}$ vg) of AAVrh8-CB-I-cmHex vector was also included. The mice were sacrificed at 1 month post-injection and the brain divided in 4 coronal blocks ~2 mm to measure Hex activity as well as GM2 ganglioside content (FIG. 48). Hexosaminidase was not detectable in 1/3 SD mice injected with AAVrh8-CBA-cmHex-$W^{A6ATG}$ (green bars, FIG. 48) and AAVrh8-CBA-cmHex vectors (orange bars, FIG. 48). In mice injected with AAVrh8-CBA-I-cmHex vector (blue bars in FIG. 12) Hex activity was not detected in 3/3 and 2/4 animals in the 1× and 5× cohorts respectively. In the comparative studies in athymic nude (nu/nu) mice, the AAVrh8 vectors tested here in SD mice generated considerable Hex overexpression in some instances by 2- to 3-orders of magnitude above normal. This indicates the possibility that the lack of Hex expression in a subset of SD mice may be related to an immune response against the cynomolgus macaque Hex alpha(A)- or beta(B)-subunits that either limits enzyme distribution through a humoral response, or results in transduced cell loss mediated by an adaptive response. Although the number of mice per group is small, there appears to be a direct correlation between Hex activity levels and reduction in GM2 ganglioside. In block 3, a reduction of up to 96% in GM2 ganglioside content in SD mice injected with AAVrh8-CBA-cmHex-$W^{A6ATG}$ vector was observed, up to 92% for AAVrh8-CBA-cmHex, 42% and 85% reduction in mice injected with 1× and 5× doses, respectively, of AAVrh8-CB-I-cmHex vector.

TABLE 5

Cohorts of NHP injected with new AAV vectors

| Cohort | AAV vector | N |
|---|---|---|
| 1 | AAVrh8-CBA-cmHex | 2 |
| 2 | AAVrh8-CB-I-cmHex | 2 |
| 3 | AAVrh8-P2-I-cmHex | 2 |

TABLE 6

Increase in total Hexosaminidase (HexA + HexB + HexS) activity in the thalamus of AAVrh8-injected NHP

| Total Hex activity (fold over control) | Location in thalamus | Animal | Group |
|---|---|---|---|
| 87.6 | Left dorsal | 295851 | Cohort 1 |
| 14.7 | Left ventral | | |
| 2.0 | Right ventral | | |
| 86.8 | Right dorsal | | |
| 82.1 | Left dorsal | c107015 | Cohort 1 |
| 12.9 | Left ventral | | |
| 2.9 | Right ventral | | |
| 53.5 | Right dorsal | | |
| 4.3 | Left dorsal | 295748 | Cohort 2 |
| 1.1 | Left ventral | | |
| 0.9 | Right ventral | | |
| 4.7 | Right dorsal | | |
| 4.7 | left dorsal | 295847 | Cohort 2 |
| 0.7 | Left ventral | | |
| 2.5 | Right ventral | | |
| 1.1 | Right dorsal | | |
| 5.2 | Left dorsal | 295483 | Cohort 3 |
| 1.0 | Left ventral | | |
| 1.6 | Right ventral | | |
| 8.9 | Right dorsal | | |
| 4.5 | Left dorsal | 295709 | Cohort 3 |
| 0.8 | Left ventral | | |
| 1.9 | Right ventral | | |
| 2.1 | Right dorsal | | |

Example 10

Figure 50:
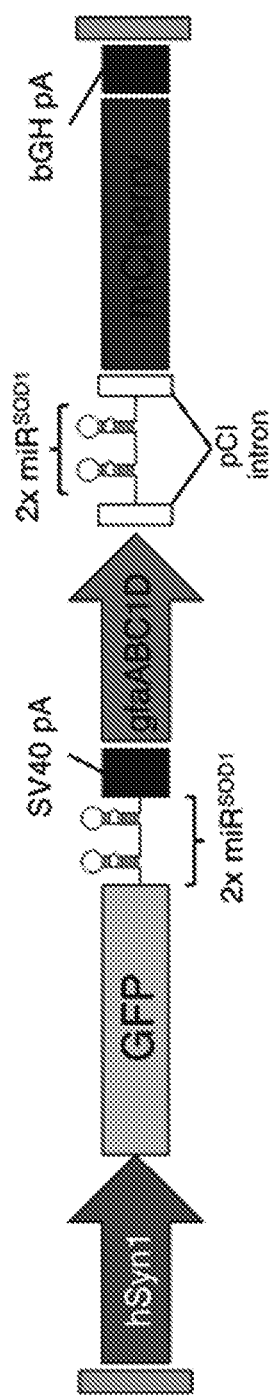
FIG. 50 shows a schematic depiction of dual promoter AAV9-Syn1-GFP-2xmiR$^{SOD1}$/GFAP-2xmiR$^{SOD1}$-mCherry vector.

An AAV vector carrying human synapsin-1 (also referred to as "Syn1") and GfaABC$_1$D (also referred to as "GFAP") promoters for simultaneous dual expression of transgenes of interest in both neurons and astrocytes, respectively, was produced. The vector, referred to as Syn1-GFP-2xmiR$^{SOD1}$/GFAP-2xmiR$^{SOD1}$-mCherry, contains GFP driven by the neuronal Synapsin1 promoter, and mCherry driven by the astrocytic GFAP promoter; two anti-human SOD1encoding miRNA are located between the last codon and polyadenylation signal of each of GFP and mCherry (FIG. 50). The vector was packaged using AAV9 capsid protein (FIG. 50). In some embodiments, the vector Syn1-GFP-2xmiR$^{SOD1}$/GFAP-2xmiR$^{SOD1}$-mCherry is represented by SEQ ID NO: 12.

Figure 51:
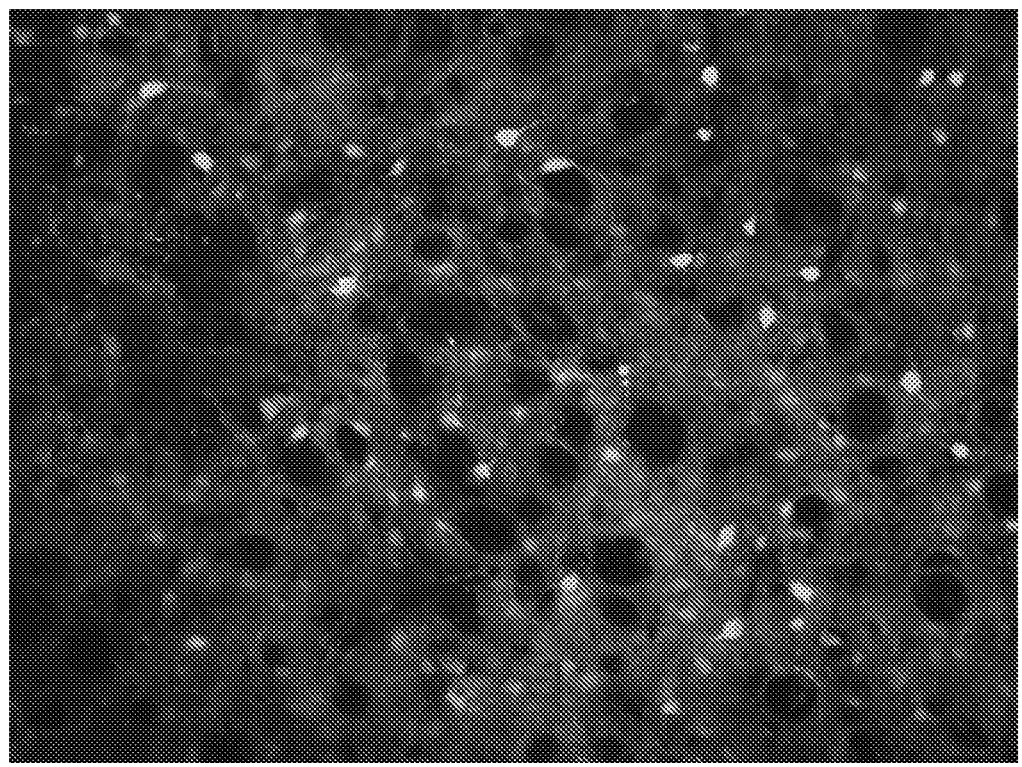
FIG. 51 shows the transduction profile of dual promoter AAV9-Syn1-GFP-2xmiR$^{SOD1}$/GFAP-2xmiR$^{SOD1}$-mCherry after intrastriatal injection in adult SOD1$^{G93A}$ mice. The AAV9 vector contained GFP driven by the neuronal Synapsin1 promoter, and mCherry driven by the astrocytic GFAP promoter. The morphology of GFP (green) and mCherry (red) expressing cells is consistent with neurons and astrocytes, respectively.

The transduction profile of the dual promoter vector was examined. AAV9-Syn1-GFP-2xmiR$^{SOD1}$/GFAP-2xmiR$^{SOD1}$-mCherry was intrastriatally injected into SOD1$^{G93A}$ adult mice and fluorescence microscopy was performed. Data indicate that the morphology of GFP (green) and mCherry (red) expressing cells is consistent with neurons and astrocytes, respectively (FIG. 51).

Figure 52:
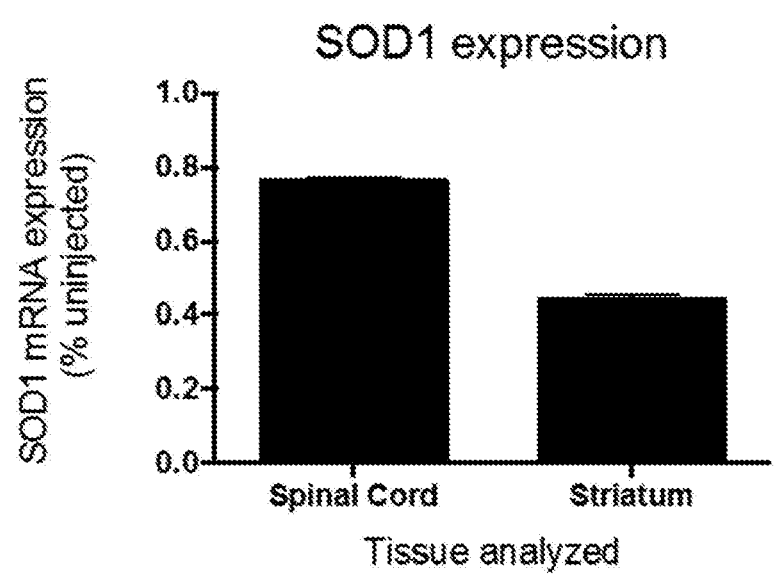
FIG. 52 shows human SOD1 mRNA levels are reduced in adult SOD1$^{G93A}$ mice after injection of a dual promoter AAV9-Syn1-GFP-2xmiR$^{SOD1}$/GFAP-2xmiR$^{SOD1}$-mCherry vector. The artificial microRNAs (miRs) target human SOD1. A decrease in human SOD1 mRNA expression of up to 25% in the spinal cord was observed after an intravenous injection of 1×$10^{12}$ total vector genomes. A decrease in human SOD1 mRNA expression of up to 55% in the striatum was observed after a direct intra-striatal injection of 8×$10^9$ total vector genomes.

SOD1 mRNA expression was measured. Data indicate that human SOD1 mRNA levels are reduced in adult SOD1$^{G93A}$ mice after injection of a dual promoter AAV9-Syn1-GFP-2xmiRSOD1/GFAP-2xmiRSOD1-mCherry vector (FIG. 52). A decrease in human SOD1 mRNA expression of up to 25% in the spinal cord was observed after an intravenous injection of $1 \times 10^{12}$ total vector genomes. A decrease in human SOD1 mRNA expression of up to 55% in the striatum was observed after a direct intra-striatal injection of 8×10⁹ total vector genomes.

Data indicate that this dual promoter construct results in greater widespread transduction of specific cell types (e.g., neurons and astrocytes) in the CNS than current approaches using ubiquitous promoters (e.g., CBA, U6), with reduced toxicity to non-CNS tissues.

Example 11

Figure 53:
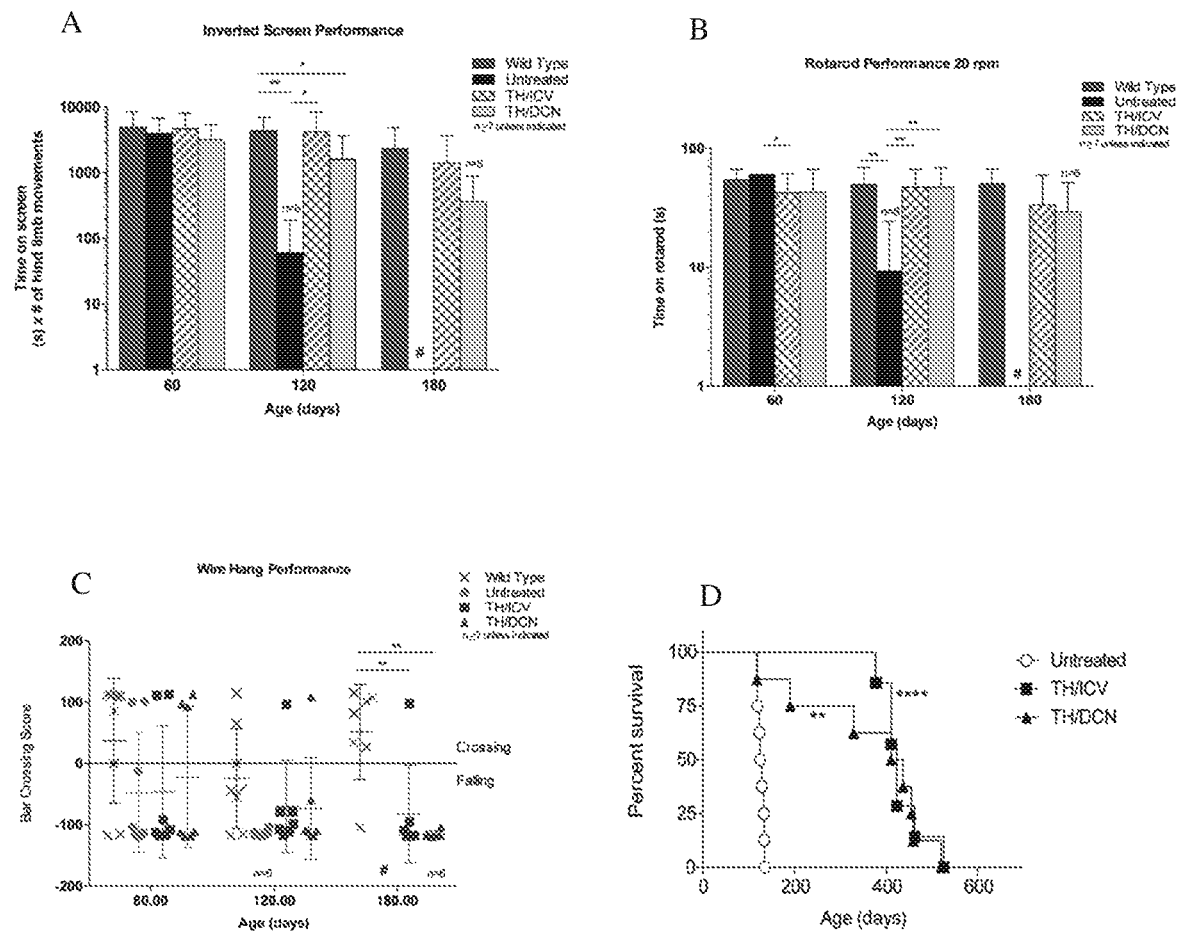
FIGS. 53A-53D show that intracranial AAVrh8-mHEXA/B treatment increases the lifespan of Sandhoff disease (SD) mice and results in retained motor performance. The performance of SD mice treated with 4.68×$10^9$ vg of AAVrh8-mHexA/B vector formulation via TH/ICV or TH/DCN delivery in (FIG. 53A) inverted screen, (FIG. 53B) rotarod, and (FIG. 53C) wire hang tests was evaluated at 60, 120, and 180 days of age.

A 1:1 formulation of rAAVrh8 encoding Hexosaminidase A and B subunits (SEQ ID NOs: 20 and 21, respectively) was injected intracranially in 4-weeks old SD mice via two approaches, either a combination of bilateral thalamic (TH) and deep cerebellar nucleic (DCN) injections (TH/DCN), or bilateral thalamic injections combined with a single intracerebroventricular injection (TH/ICV). The behavioral performance of AAVrh8 treated SD mice (4.68×10⁹ vg), and controls (untreated SD and wild type littermates) was assessed over time starting at 60 days of age (one month post-injection) (FIG. 53). The inverted screen performance o TH/ICV AAVrh9 treated SD mice was significantly better than untreated SD mice at 120 days of age ($P<0.05$), and both TH/ICV and TH/DCN AAVrh8 treated mice performed comparable to that of wild type controls at 180 days (FIG. 53A). In the rotarod test, both cohorts of AAVrh8 treated SD mice performed better than untreated SD controls ($P<0.01$) at 120 days of age, and their performance was comparable to wild type controls to at least 180 days of age (FIG. 53B). No significant improvement was measured in the wire hang test (FIG. 53C) compared to untreated SD mice. Untreated SD mice treated with TH/DCN or TH/ICV at a dose of 4.68×10⁹ vg had a median survival of 424 days and 423 days, respectively, FIG. 53D. Thus, both intracranial delivery approaches resulted in similar extensions of lifespan compared to untreated SD mice ($P≤0.001$ TH/DCN, $P≤0.0001$ TH/ICV) and were not significantly different from each other ($P>0.05$).

Figure 54:
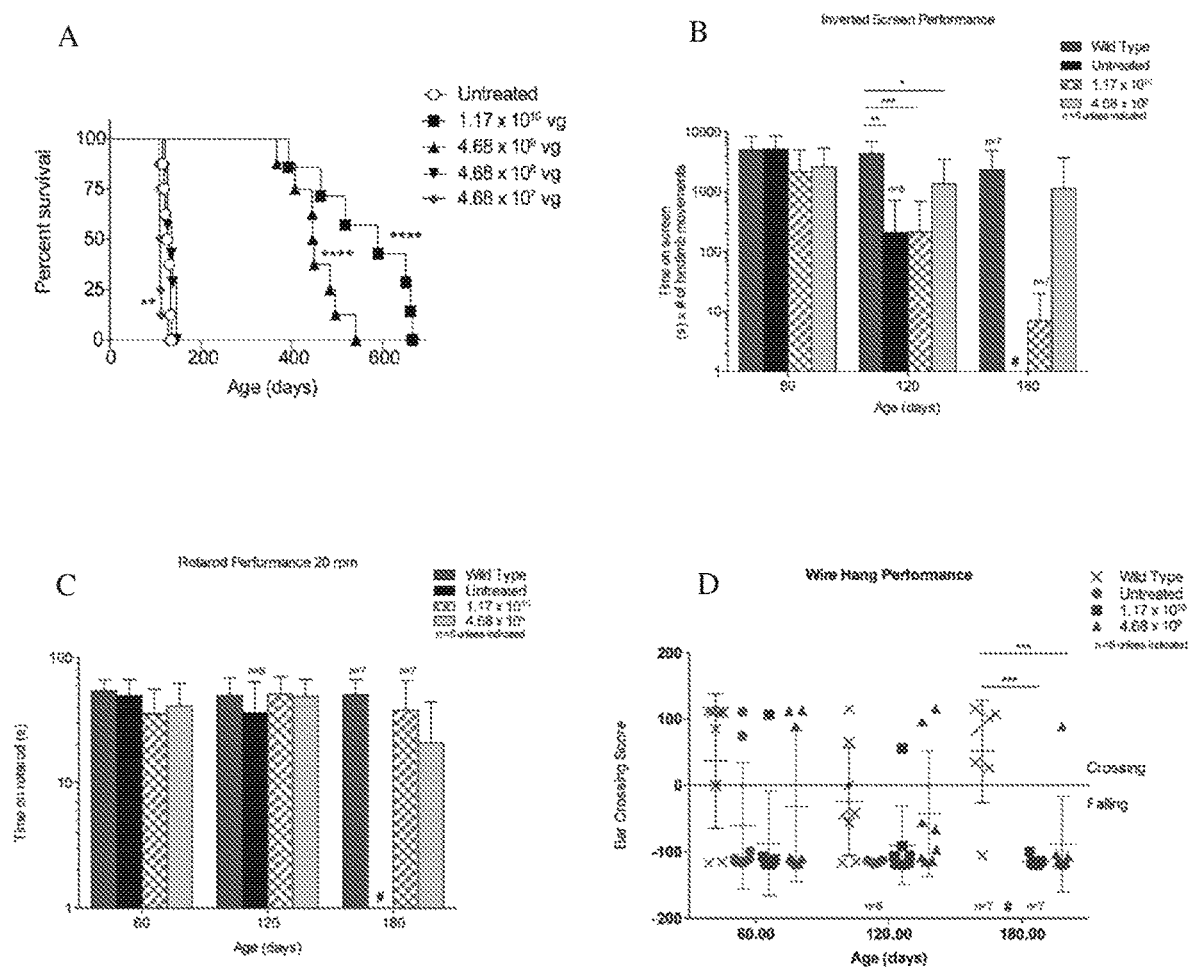
FIGS. 54A-54D shows that intracranial AAVrh8-mHexA/B treatment in SD mice provides a dose-dependent extension in lifespan and prolongs motor performance.

To determine if increasing the dose of AAVrh8 further extends survival in SD mice, a dose-escalation study was performed. Two days prior to intracranial TH/ICV infusion of AAVrh-mHexA/B, SD mice were infused intravenously with AAV8-TRG-mHexB (3×10¹¹ vg). Systemic injection of AAV8-TBG-mHexB alone did not enhance survival of SD mice (median survival for untreated SD mice was 127 days while for SD mice treated with AAV8-TBG-mHexB was 128.5 days; FIGS. 53D and 54A). Systemic-mediated tolerization combined with intracranial therapy did not significantly enhance median survival compared to intracranial delivery alone at 4.68×10⁸ vg (median survival of combination therapy 448.5 days, TH/ICV alone 423 days; FIGS. 53D and 54A). Dose escalation of intracranially delivered AAV (4.68×10⁷ vg, 4.68×10⁸ vg, 4.68×10⁹ vg, 1.17×10¹⁰ vg) in combination with the same intravenously delivered tolerization protocol (AAV8-TBG mHexB before TH/ICV delivery of AAVrh8-mHexA/B vectors) resulted in extension in survival at the two highest doses (4.68×10⁹ vg and 1.17×10¹⁰ vg, $P<0.0001$; median survival of systemic-only treated SD mice was 128.5 days; 4.68×10⁷: 110.5 days, 4.68×10⁸ vg: 135 days, 4.68×10⁹ vg: 448.5 days, 1.17×10¹⁰ vg: 591 days; FIG. 54A). Despite living a maximum of 666 days, the highest dose (1.17×10¹⁰ vg dose) treated animals did eventually presented with hind limb weakness and ataxia at time of euthanasia and some lost body weight and/or the ability to right themselves when placed on their back.

No significant differences in behavioral performance was seen in the dose escalation combination therapy mice at 4.68×10⁹ vg or 1.17×10¹⁰ vg (intracranial TH/ICV doses) compared to untreated SD mice at 120 days when measured by inverted screen performance (FIG. 54B), rotarod performance (FIG. 54C), or wire hang test (FIG. 54D). However, AAVrh8-treated SD mice retained motor performance and at 180 days of age TH/ICV treated SD mice performed comparable to wild type mice in inverted screen performance at both doses (FIG. 54B). Also at 180 days of age, TH/ICV treated SD mice at both doses performed comparable to wild type mice in rotarod performance FIG. 54C). No significant improvement was measured in the wire hang test (FIG. 54D) compared to intracranially untreated SD mice around the median survival age of untreated SD mice (120 days). However, mice were still able to perform the test at 180 days when no untreated SD mice were surviving.

Figure 55:
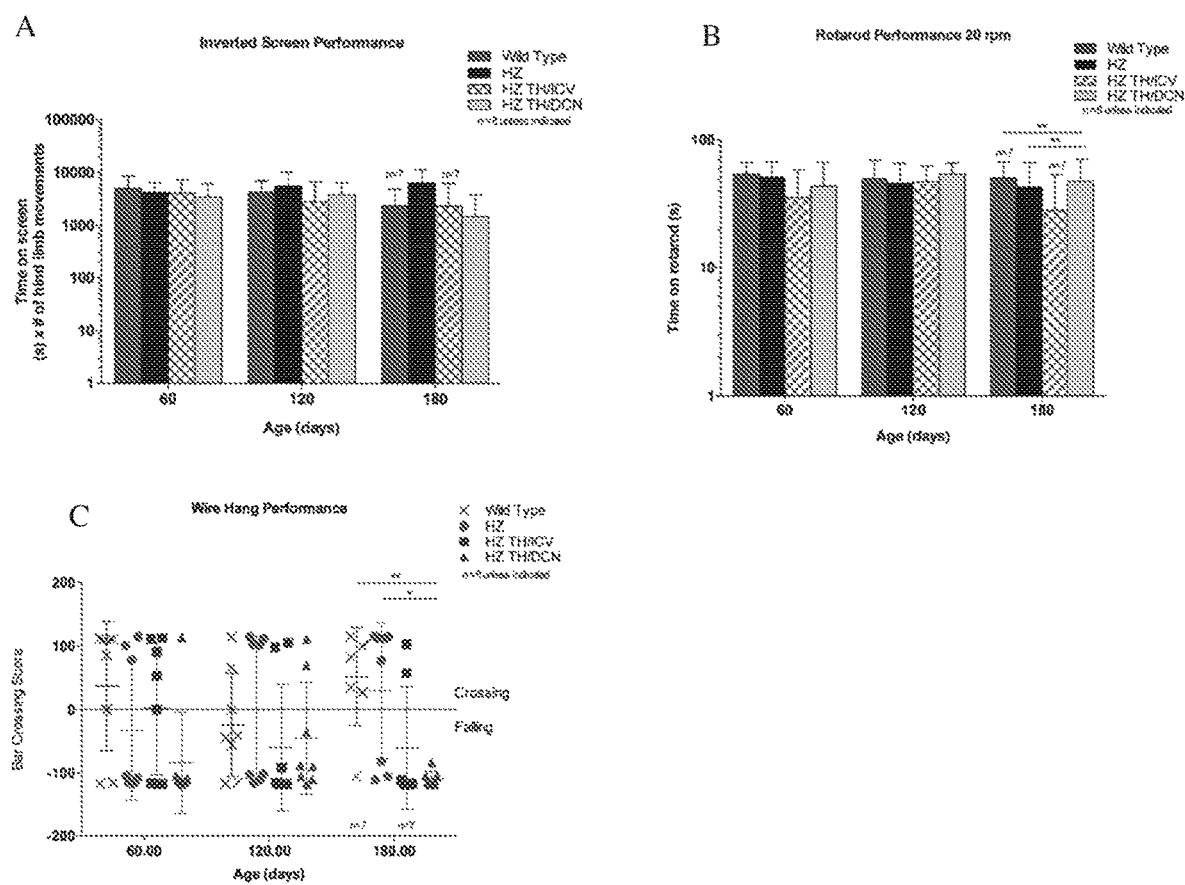
FIGS. 55A-55C shows that the intracranial delivery of AAVrh8-mHexA/B has minimal impact on the motor performance of normal mice. The performance of heterozygous (HexB$^{+/-}$, HZ) mice treated by intracranial injection of 4.68×$10^9$ vg AAVrh8-mHexA/B through TH/ICV or TH/DCN delivery was assessed at 60, 120, and 180 days of age on the (FIG. 55A) inverted screen, (FIG. 55B) rotarod, and (FIG. 55C) wire hang tests.

To assess the potential impact of intracranial AAVrh8 vector infusion in the absence of an underlying neurodegenerative process, age matched heterozygote (HZ) littermate (HexB+/−) mice received intracranial injection of 4.68×10⁹ vg AAVrh8 vector formulation via TH/ICV or TH/DCN. AAVrh8 treated HZ mice and untreated controls (wild type and HZ) were assessed in different behavioral tests over time (FIG. 55). There were no apparent gross alterations in the behavior of AAVrh8 injected HZ mice compared to controls, or any impact on survival. No differences among cohorts were apparent in the inverted screen test (FIG. 55A). TH/DCN injected HZ mice performed slightly worse than untreated HZ and WT controls at 180 days in the rotarod test (FIG. 55B). There were no significant differences in wire hang performance (FIG. 55C) among cohorts at both 60 and 120 days of age. However, at 180 days TH/DCN injected HZ mice performed worse than untreated HZ animals ($P<0.05$) and untreated WT animals ($P<0.01$). There was no significant difference in performance of TH/ICV injected animals compared to untreated HZ or WT animals at 180 days of age.

Figure 56:
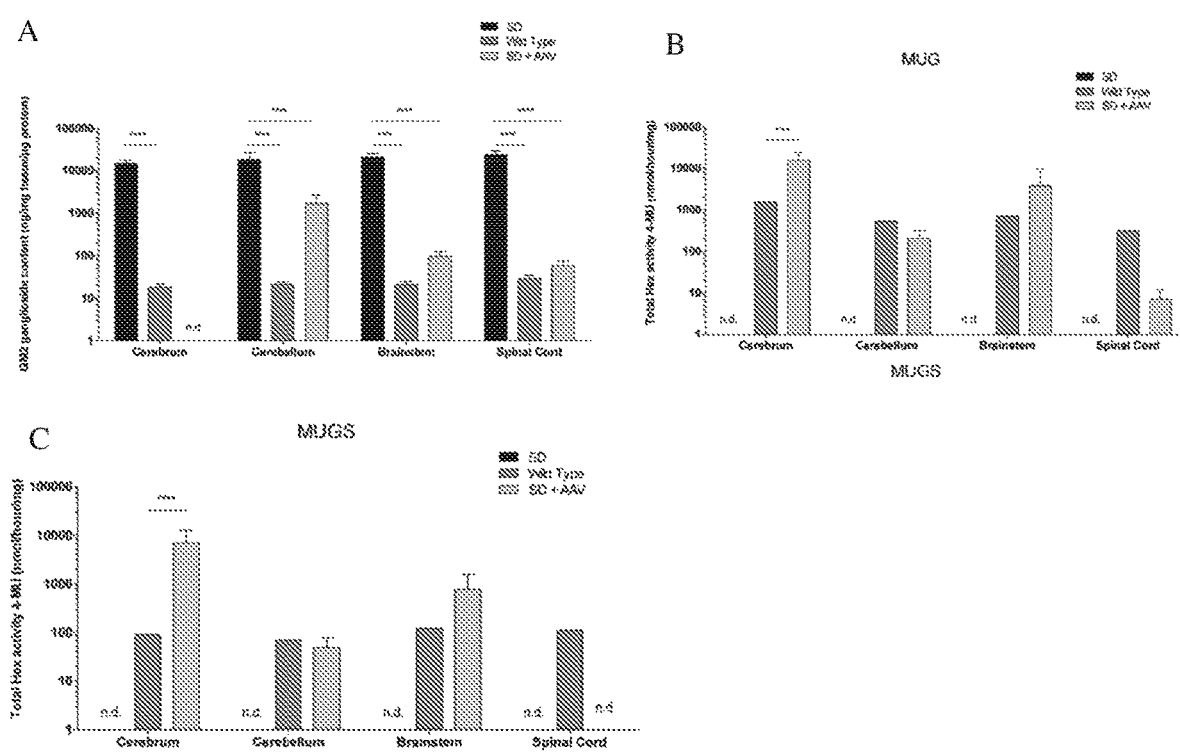
FIGS. 56A-56B show that intracranial delivery of AAVrh8-mHexA/B treatment reduces GM2 ganglioside storage and results in widespread Hexosaminidase expression in the central nervous system of SD mice. SD mice were treated by TH/ICV injection of 1.17×$10^{10}$ vg AAVrh8-mHexA/B and neurochemistry assessed at the same age as the humane endpoint of untreated SD mice. The cerebrum, cerebellum, and spinal cord were analyzed for (FIG. 56A) GM2 ganglioside content and (FIG. 56B) Hexosaminidase activity using two artificial substrates: MUG (cleaved by HexA, HexB, and HexS isozymes) and MUGS substrate (cleaved by HexA and HexB isozymes).

GM2 ganglioside content and Hexosaminidase expression in the CNS were measured in TH/ICV AAVrh8 treated (1.17×10¹⁰ vg) SD mice, in untreated SD mice, and in untreated WT controls (FIG. 56). GM2 ganglioside, measured by LC-MS/MS, was not detected in the cerebrum of AAVrh8 treated animals and significant reduction of GM2 ganglioside was seen in the cerebellum (91.1%), brainstem (99.6%), and spinal cord (99.8%) ($P<0.0001$, FIG. 56A). Total Hexosamindiase activity was restored to the central nervous system of AAVrh8 treated SD mice. Enzyme activity levels were above that of wild type in the cerebrum and comparable in the cerebellum, brainstem, and spinal cord. Animals were taken to a predetermined endpoint equivalent to untreated SD mice, and were indistinguishable from wild type controls (data not shown).

Example 12

All SD cat experiments utilized AAVrh8-CBA-mHexA/B-WPRE, which is slightly different from the vector construct to be used for human application (AAVrh8-CB-CI-hHexA/B). Therapeutic efficacy studies were conducted in a naturally occurring SD feline model, where disease progresses rapidly with average survival to 4.3±0.2 months of age. In these studies, a 1:1 formulation of two AAVrh8 vectors encoding separately wild-type feline hexosaminidase alpha and beta subunits was used.

Figure 57:
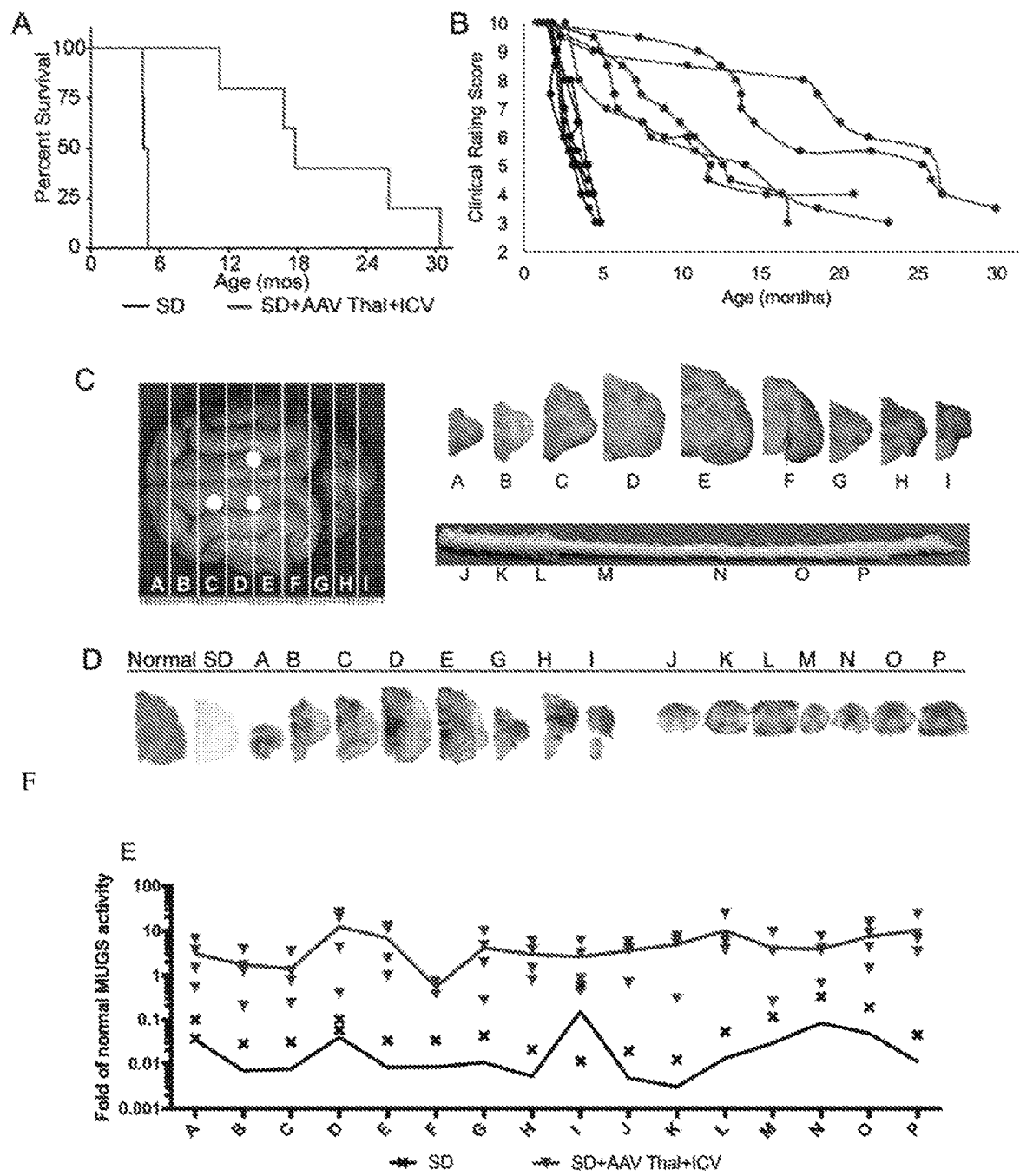
FIGS. 57A-57E shows the survival and biodistribution in SD cates after TH+ICV injection of AAV.

Long-term therapeutic efficacy data is reported here. SD cats were treated by bilateral thalamic injection combined with unilateral ICV injection (ICV; n=5) at a dose of 4.6E¹¹ vg total (1:1 ratio both vectors Table 7). Gene therapy significantly increased survival of SD cats ($p<0.0001$; FIG. 57A) with the oldest cat surviving to 29.9 months. Untreated SD cats experience profound cerebellar disease, with overt whole body resting and intention tremors that become debilitating with a loss ambulation and subsequent euthanasia at ~4 months of age. After AAV gene therapy, there was a marked improvement of neurologic signs (FIG. 57B). The tremor was completely ameliorated in all treated cats and most cats retained the ability to walk throughout course of the study and were euthanized due to musculoskeletal or gastrointestinal disease, which are not a part of the traditional neurologic disease phenotype of the SD cat (Table 7).

TABLE 7

Summary of cohort, dose, and route of administration information for SD cat models

| Cat number | Treatment Age, wk | Survival Age, mos | Total Vector dose (α + β) | Bilateral Thalamic dose | ICV dose | Reason for euthanasia |
|---|---|---|---|---|---|---|
| 7-760 | 5.1 | 25.9 | 7.6E12 vg | 3.1E12 vg | 4.5E12 vg | Elbow dysplasia and contraction; died suddenly |
| 11-900 | 4.0 | 30.4 | 8.0E12 vg | 3.3E12 vg | 4.7E12 vg | Slight hind limb weakness; gastrointestinal atony |
| 11-907 | 4.0 | 11.2 | 8.0E12 vg | 3.3E12 vg | 4.7E12 vg | Bowed Femur, bilateral patella luxation; inability to stand on hind legs |
| 7-943 | 4.6 | 23.4 | 8.0E12 vg | 3.3E12 vg | 4.7E12 vg | Bowed Femur, severe bilateral patella luxation; inability to stand on hind legs |
| 7-945 | 4.7 | 16.8 | 8.0E12 vg | 3.3E12 vg | 4.7E12 vg | |

Thalamic combined with ICV injection (Th+ICV) of both AAV vectors resulted in widespread Hexosaminidase distribution throughout the cortex, cerebellum and spinal cord (FIGS. 57B and 57C) and the only area of the brain with lower distribution was the temporal lobe (FIG. 57D lateral aspect of FIG. 57D and FIG. 57E). HexA levels were near or above normal throughout the brain, cerebellum and spinal cord, and reached near 50-fold of normal at the thalamic injection site (FIG. 57E). Despite supra-physiologic levels of Hex at the injection site, no histopathologic abnormalities were noted in AAV treated cats.

Figure 58:
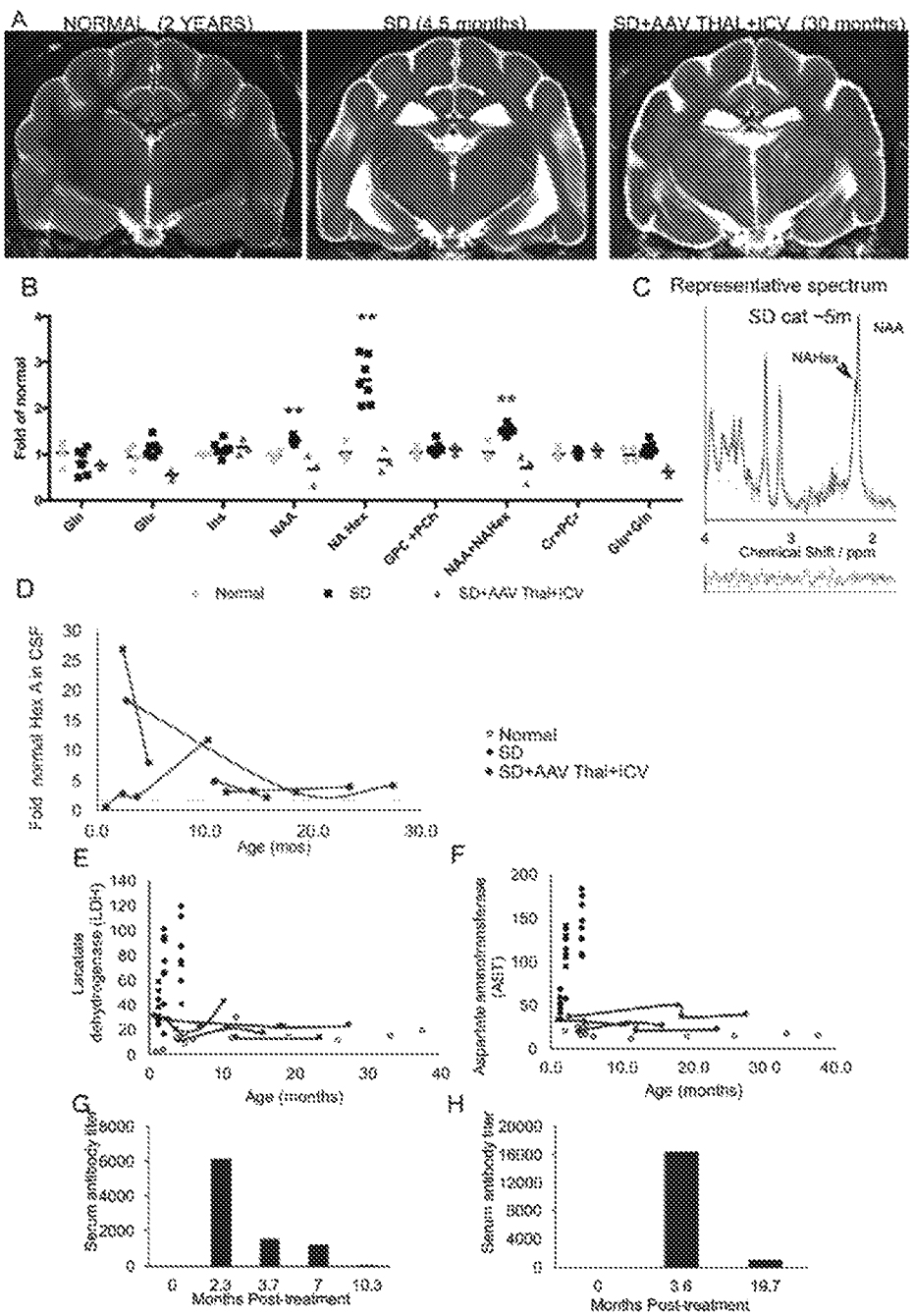
FIGS. 58A-58H are the biomarkers of therapeutic efficacy of AAV mediated gene therapy.

MRI (T2W) at humane endpoint of SD cats shows darkening of the gray matter (storage of GM2) and lightening of the white matter (demyelination) throughout the brain (FIG. 58A). After AAV gene therapy there was normalization of gray and white matter intensities throughout the brain, with the exception of the temporal lobe, which appeared to have reduced distribution of Hex (FIG. 58D). Despite normalization of gray and white matter intensities, cortical atrophy persisted in AAV treated SD cats as illustrated by increased CSF in the lateral ventricles and in sulci surrounding the brain. Using MR spectroscopy, a significant increase in the toxic metabolite, N-acetylhexosamine (NA-Hex), was detected in the thalamus of untreated SD cats, which has been previously reported in mice and humans with SD. NA-Hex was completely reduced to normal levels in call cats after AAV gene therapy (FIG. 58B). HexA levels were elevated in AAV treated cats at normal or above normal levels and HexA elevations persisted throughout the life of the cats (FIG. 58D). Aspartate aminotransferase and lactate dehydrogenase, markers of cytotoxicity, were elevated in the CSF of SD cats and after AAV gene therapy the levels of these enzymes returned to normal (FIGS. 58D and 58E). Serum antibody titers to the capsid were present 1-2 months after treatment but tapered over time (FIGS. 58G and 58H). The only cat (11-907) to reach humane endpoint prior to one year of age had a maximum serum antibody titer of 1:6 at approximately 2 months post-treatment and an endpoint titer of just 1:16 (FIG. 58G). In contrast, the cat (7-760) that lived to 26 months of age had a maximum titer of 1:16 at 3.6 months post-surgery (FIG. 58H). All time points could not be analyzed due to limiting quantities of vector stock; however, at approximately 20 months post-treatment serum titers had decreased to 1:1 (FIG. 58H).

Despite CNS directed delivery of AAV, HexA enzymatic activity of peripheral organs was increased in SD+AAV TH/ICV cats. The sciatic nerve achieved a 203% increase over normal, whereas normal liver and muscle increased to 53 and 20% of normal (Table 8).

TABLE 8

Hexosaminidase activity in peripheral tissues

| Tissue | HexA % Normal (S.A. ± SD) | HexT % Normal (S.A. ± SD) | β-Gal % Normal (S.A. ± SD) | Mann % Normal (S.A. ± SD) |
|---|---|---|---|---|
| Sciatic Nerve | 230.3 | 171.6 | 217.0 | 358.1 |
| | (104.6 ± 39.9) | (1149.2 ± 430.5) | (29.7 ± 15.4) | (196.3 ± 105.6) |
| Liver | 53.8 | 60.5 | 103.5 | 120.5 |
| | (81.2 ± 26.3) | (1105.2 ± 296.4) | (79.1 ± 32.2) | (794.4 ± 374.7) |
| Muscle | 20.7 | 13.3 | 762.7 | 641.2 |
| | (1.4 ± 0.1) | (21.1 ± 14.9) | (11.7 ± 7.6) | (148.5 ± 56.3) |
| Heart | 16.9 | 5.5 | 133.9 | 112.6 |
| | (6.3 ± 8.72) | (140.4 ± 134.4) | (10.0 ± 2.3) | (98.3 ± 17.1) |
| Small Intestine | 4.3 | 0.9 | 148.8 | 222.0 |
| | (5.9 ± 2.0) | (41.1 ± 29.6) | (264.4 ± 88.4) | (2642.3 ± 1144.6) |

HexA = MUGS activity; HexT = total Hex activity; MUG; β-gal - β-galactosidase enzymatic activity; Mann-mannosidase enzymatic activity.

Figure 59:
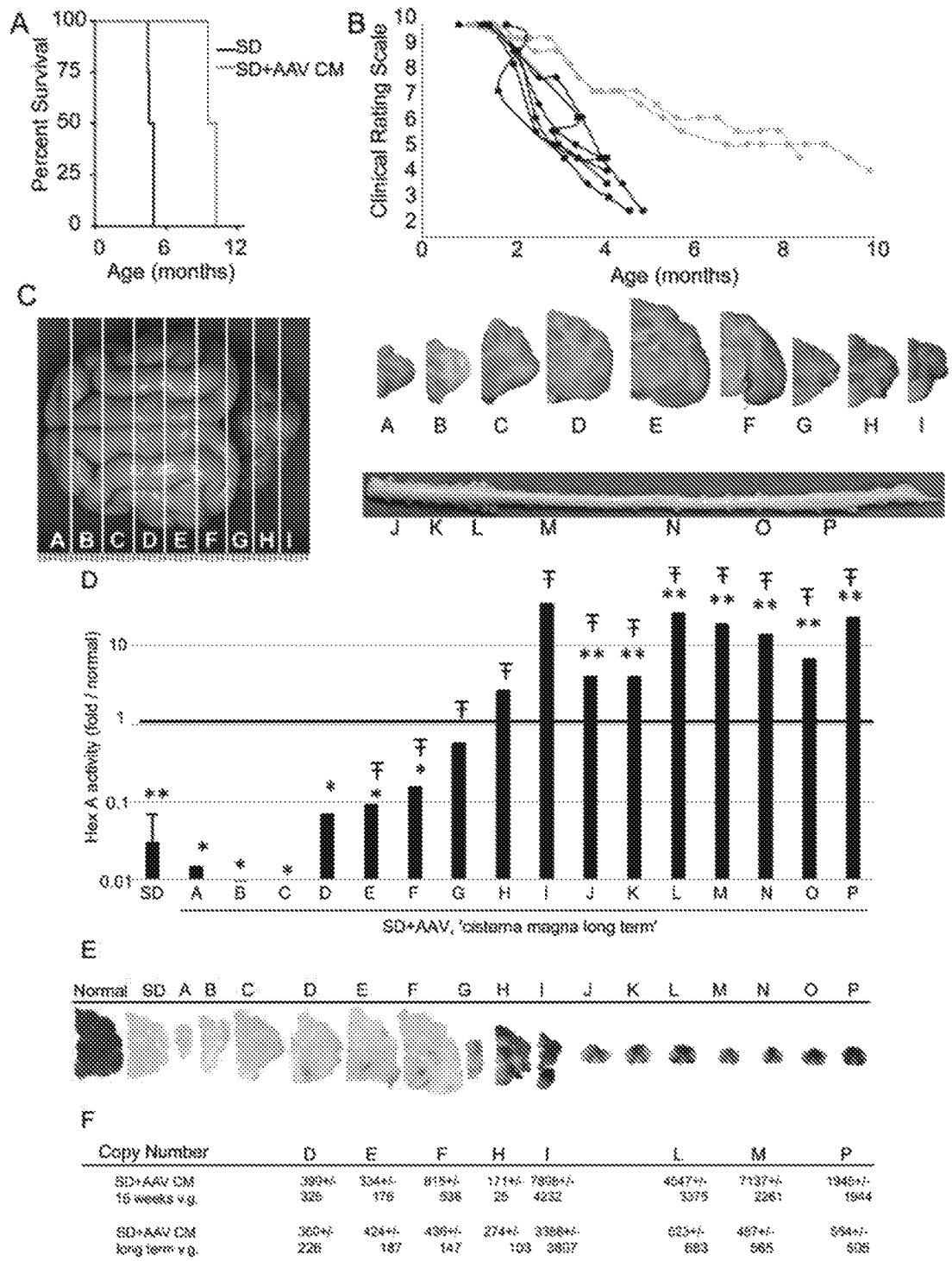
FIGS. 59 A-F show the clinical therapeutic effect and biodistribution in SD+AAV cisterna magna (CM) cats.
Figure 60:
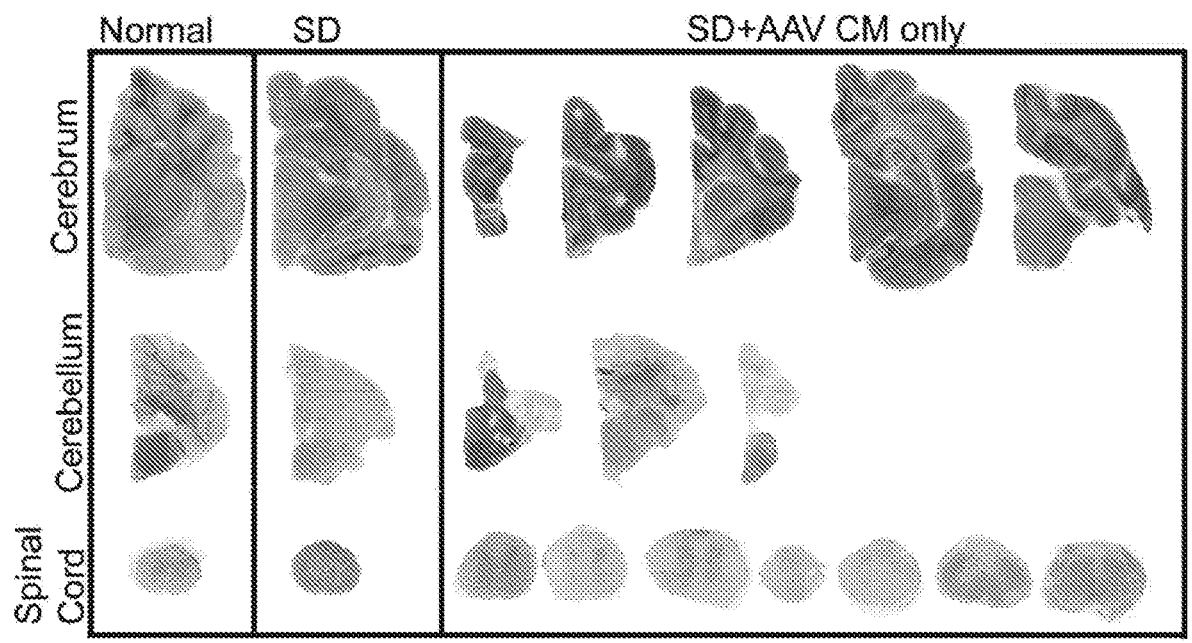
FIG. 60 show the storage clearance in SD+AAV cisterna magna (CM) cats. Representative Periodic acid-Schiff (PAS) staining of normal (left) SD (middle) and SD+AAV CM long term treated cats. Normal cats have darker PAS staining in white matter than gray matter in the brain and cerebellum and the inverse is true in the spinal cord. The SD cat has darker staining in gray matter than white matter and areas of loss of staining in the white matter (especially evident in the spinal cord). SD+AAV cats treated by injection via the cisterna magna showed increased storage and demyelination in the cortex with normalization in the cerebellum, brainstem, and spinal cord.

In this study, AAVrh8 delivery of two monocistronic vectors encoding feline HEXA or HEXB flanked by a chicken beta actin (CBA) promoter and a woodchuck post regulatory element (WPRE) was tested. Cats were treated by cisterna magna injection (6.4E$^{11}$ vg, ~0.5 kg at time of injection) and a subset of animals were euthanized 16 weeks post-treatment to assess biodistribution (n=3); a second cohort was followed to humane endpoint (n=2). Untreated SD cats experience profound cerebellar disease, with progressively debilitating overt whole body resting and intention tremors, loss of ambulation, and subsequent euthanasia at 4.4+/−0.6 months of age (FIG. 59A). SD cats treated with AAV gene therapy via cisterna magna injection (SD+AAV CM) at 16-weeks post-treatment, a time point equivalent to that of humane endpoint in untreated SD cats, have mild neurologic signs, which include a wide based-stance and slight hind limb weakness (FIG. 59B). The two cats followed to humane endpoint survived until 9.9+/−0.5 months and retained the ability to stand and walk, but were unresponsive to visual or auditory stimuli.

Biodistribution of Hex in the SD+AAV CM cats was widespread throughout the spinal cord and cerebellum, but was reduced in anterior brain areas (FIGS. 59C, 59D, 59E). In the SD+AAV CM short-term (data not shown) and long term treated SD cats, hexosaminidase A (HexA) activity reached or exceeded normal levels in the cerebellum and spinal cord, but was comparable to untreated in the blocks containing the rostral thalamus, striatum and frontal cortex (brain blocks D-A, respectively). Vector biodistribution trended similarly, with brain block D (the most anterior block analyzed) containing the lowest vg copy number (FIG. 59F); however qPCR did not reflect the magnitude of Hex expression differences between the spinal cord and brain.

Storage in the SD cat is represented by periodic acid-Shiff (PAS; grayscale) staining, which stains for glycolipids (e.g., GM2). Areas with darker staining, e.g., PAS positive, indicate increased ganglioside storage. In the SD cat, there was increased PAS staining in the gray matter and reduced staining white matter, this is consistent with ganglioside storage in cell bodies and demyelination. In the SD+AAV CM cats (long-term) storage clearance inversely reflected Hex biodistribution, with effective storage clearance in the spinal cord and cerebellum, but not the cortex. PAS positive material persisted in the cerebral cortex and deep brain structures. Demyelination, as represented by loss of PAS positive material, is also clearly represented in white matter of the cerebral cortex of treated cats.

Figure 61:
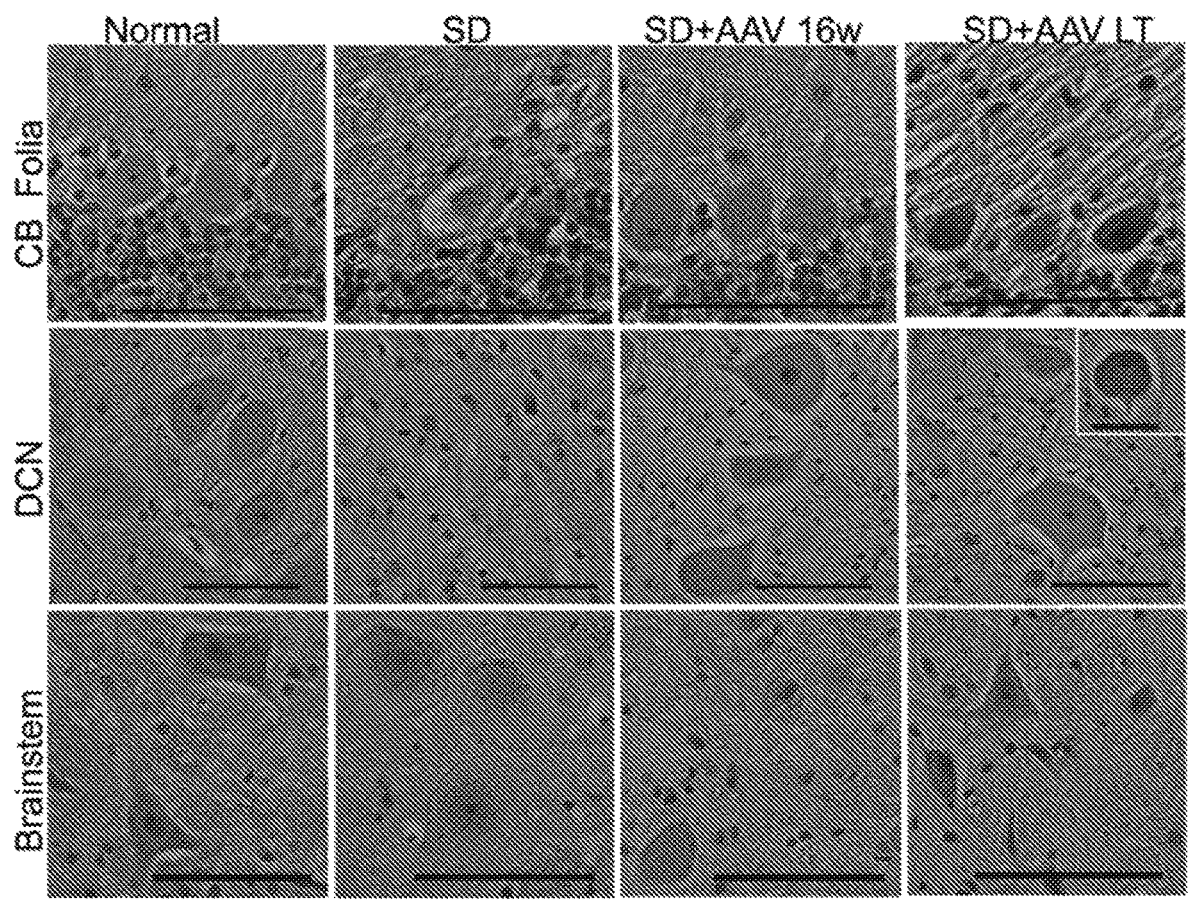
FIG. 61 shows the normalization of histopathology after AAV gene therapy. The SD cats exhibit degenerate neurons in the cerebellar folia, DCN, and brainstem. Sixteen weeks after AAV gene therapy, the SD cats have normalized morphology in all these regions and is retained in the long-term AAV treated animals, with the exception of Purkinje cell degeneration. Interestingly, there were a subset of neurons within the dentate nucleus that had botriod eosinophilic inclusions (inset, scale bar 5 µm). Scale bars 10 µm.

In the SD cat cerebellum there was widespread neurodegeneration, which was evident on H&E staining (FIG. 61). The Purkinje cells, deep cerebellar neurons, and brainstem neurons showed signs of severe degeneration, cell loss, and large quantities of foamy, vacuolated intracellular storage. Sixteen weeks after gene therapy, the AAV-CM treated SD cats had normalization of Purkinje cell, deep cerebellar nuclei and brainstem cellular morphology (FIG. 61). In animals followed to humane endpoint, normalization of morphology was noted in the DCN and brainstem, but degeneration and loss of Purkinje cells persisted. Interestingly, the long-term AAV treated cats exhibited botriod eosinophilic inclusions in the dorsomedial aspect of fastigial nucleus of the cerebellum (inset) (FIG. 61). These inclusions have previously been shown immunopositive for Hex after parenchymal injection of AAV.

Figure 62:
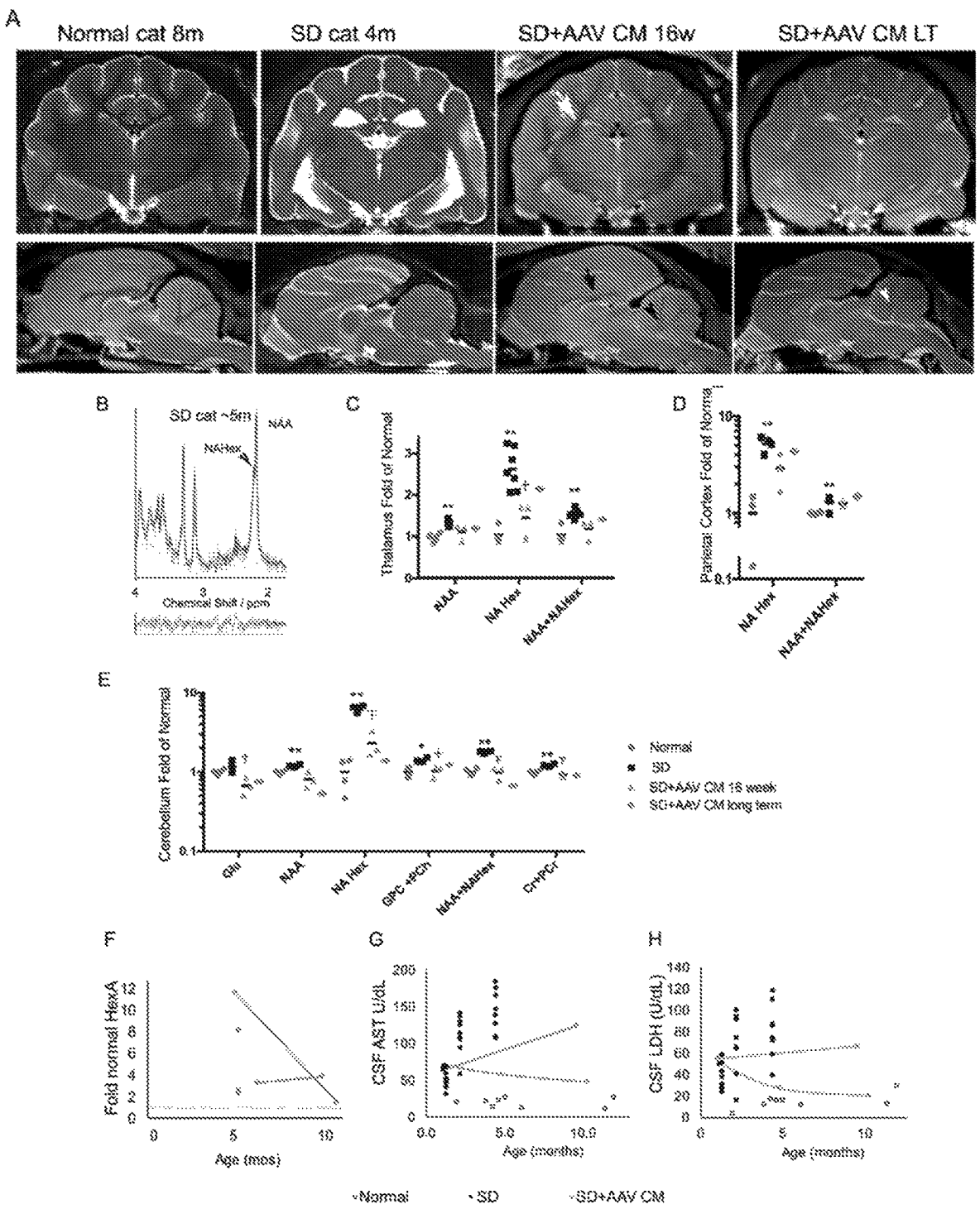
FIGS. 62A-62H shows the biomarkers for disease progression and amelioration in SD+AAV CM cats.

Ultra-high field MRI (7 Tesla) T2 weighted MRI shows normalization of MRI architecture in the AAV treated animals, which reflects the distribution of Hex (FIG. 62A). In the untreated SD cat, there is inversion of the gray and white matter intensities, which is due to increased water in the white matter (demyelination) and increased lipid (GM2 storage) in the gray matter. Sixteen weeks after cisterna magna injection, there was partial normalization of the MRI intensities, with darkening of white matter intensities of the corpus callosum (FIG. 62A; black arrow), corona *radiata* (FIG. 62A; white arrow) and cerebellar white matter (FIG. 62A; black arrowhead). At humane endpoint of the SD+AAV CM cat, pathologic intensity inversions of the gray and white matter in the cerebral cortex persisted, but cortical atrophy was attenuated and cerebellar white matter intensities were partially restored (black arrowhead). MR spectroscopy of the thalamus (FIG. 62C), parietal cortex (FIG. 62D), and cerebellum (FIG. 62D) of the SD cat had elevations of the toxic metabolite N-acetyl hexosamine (NA-Hex, FIG. 62B). In SD+AAV CM cats at 16 weeks, NA-Hex is reduced in the thalamus (FIG. 62C) and cerebellum (FIG. 62E), but continued to increase in the parietal cortex (FIG. 62D) of one SD+AAV CM long-term cats that was assessed at humane endpoint (FIG. 62E). Other metabolite changes support partial correction of myelination (choline+phosphocholine) and metabolic activity (creatine+phosphocreatine Cr+PCr) in the cerebellum after AAV treatment (FIG. 62E).

CSF levels of HexA were above normal in all SD+AAV cats (FIG. 62F), with one cat (11-1042) experiencing a precipitous decline in CSF HexA activity from 5 months to humane endpoint. CSF markers of cytotoxicity, aspartate aminotransferase (AST; FIG. 62G) and lactate dehydrogenase (LDH; FIG. 62H) were reduced to near normal levels in one long-term SD+AAV CM cat (11-1042) and moderately increased in the other (11-1148).

Example 13

Mice

Figure 35:
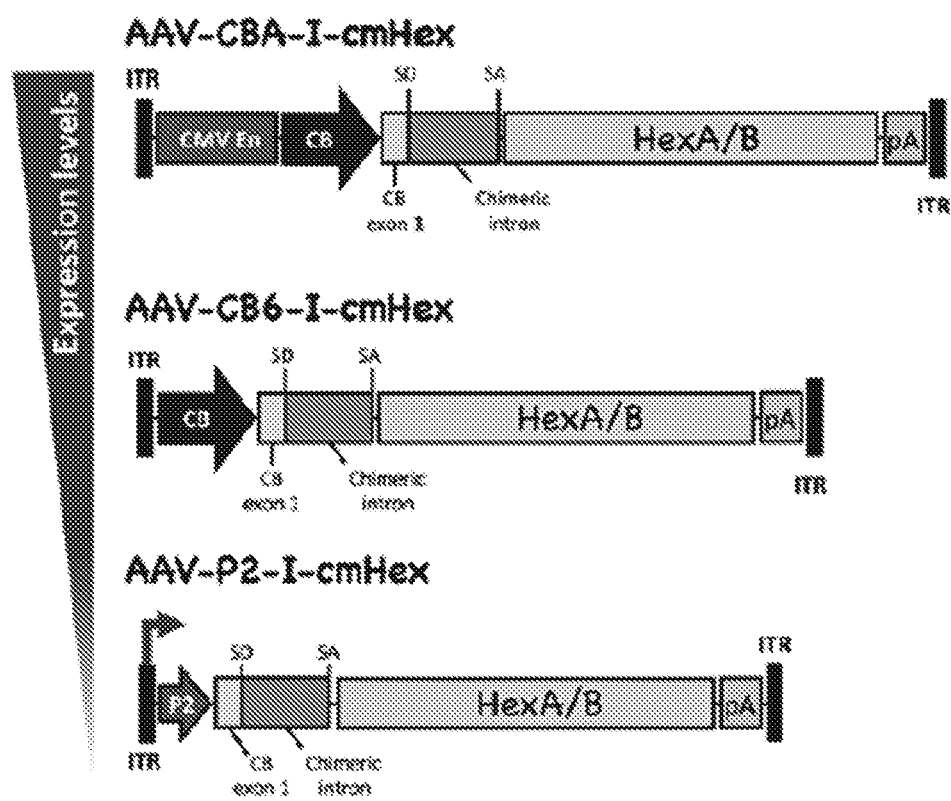
FIG. 35 shows new AAV vectors selected for further testing in non-human primates.
Figure 63:
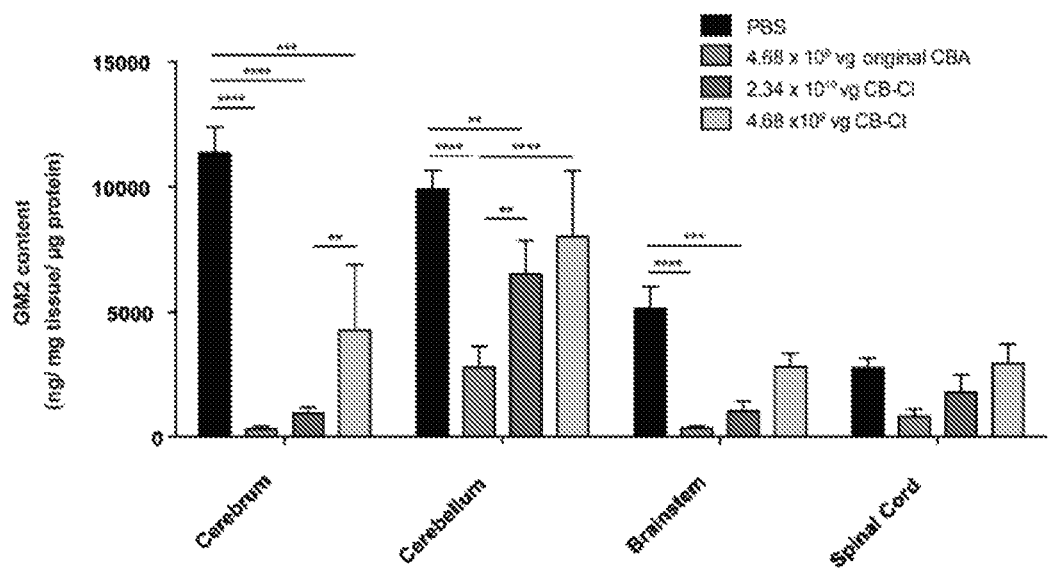
FIGS. 63A-63C show the intracranial injection of AAVrh8-CB-CI-mHexA/B vector reduces GM2 ganglioside storage in CNS with a concomitant increase in hexosaminidase activity leads to improved survival of SD mice. SD mice received intracranial injection of AAVrh8-CH-CI-mHexA/B vector at total doses of $4.68 \times 10^9$ vg or $2.34 \times 10^{10}$ vg, or of the original vector ($4.68 \times 10^9$ vg), or PBS.
Figure 63:
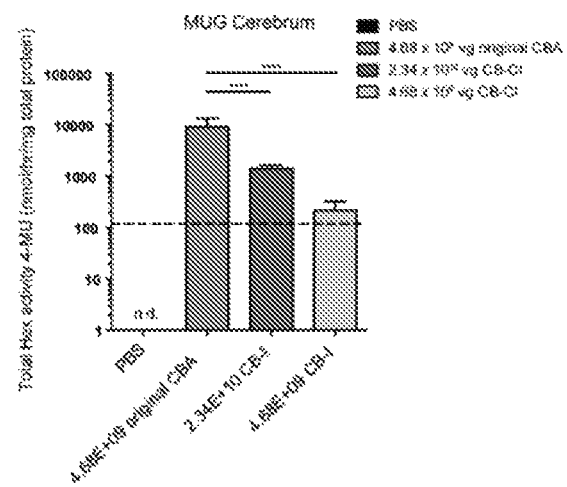

For short-term biochemical analysis of the effect in CNS GM2 ganglioside content, SD mice were infused with AAVrh8-CB-CI-mHexA/B vector formulation encoding mouse HexA/B (mHexA/B) subunits at two doses, 4.68×10$^9$ vg and 2.34×10$^{10}$ vg and compared to the original AAVrh8 vector (AAVrh8-CBA-mHexA/B-WPREmut6ΔATG) injected at 4.68×10$^9$ vg. GM2 ganglioside content was significantly lower in the cerebrum of SD mice injected with either dose of AAVrh8-CB-CI-mHexA/B vector compared to PBS-injected SD mice, and the 92% reduction observed for the highest dose (2.34×10$^{10}$ vg) of AAVrh8-CB-CI-mHexA/B vector was comparable to that documented in SD mice injected with the original AAVrh8 vector (97%). Significant reduction in GM2 ganglioside content in cerebellum and brainstem was also observed in SD mice injected with AAVrh8-CB-CI-mHexA/B vector compared to PBS-injected SD mice, however, to a lesser extent than the original AAVrh8 vector. The degree of GM2 reduction in the CNS of SD mice injected with AAVrh8-CB-CI-mHexA/B vector was dose dependent (FIG. 63A). Hexosaminidase activity in the brain of SD mice treated with AAVrh8-CB-CI-mHexA/B vector was dose dependent and lower than the original AAVrh8 vector by 7-43 fold, but nonetheless 2-12 fold above normal (FIG. 63B). Another set of SD mice (n=8) was injected with 2.34×10$^{10}$ vg AAVrh8-CB-CI-mHexA/B to test therapeutic efficacy using survival to 5 months of age (one month past the median survival of untreated SD mice) as outcome measure. The majority of AAV-treated SD mice (6 of 8) survived to 5 months of age. However, only 2/6 animals appeared asymptomatic at 5 months (FIG. 63C). The remaining four mice presented with varying degrees of hind limb impairment or weakness. The hind limb impairment may be explained by the more modest reduction in spinal cord GM2 ganglioside content with the new AAVrh8 vector formulation compared to the original CBA vector (FIG. 63A, 35% vs. 70%).

Figure 64:
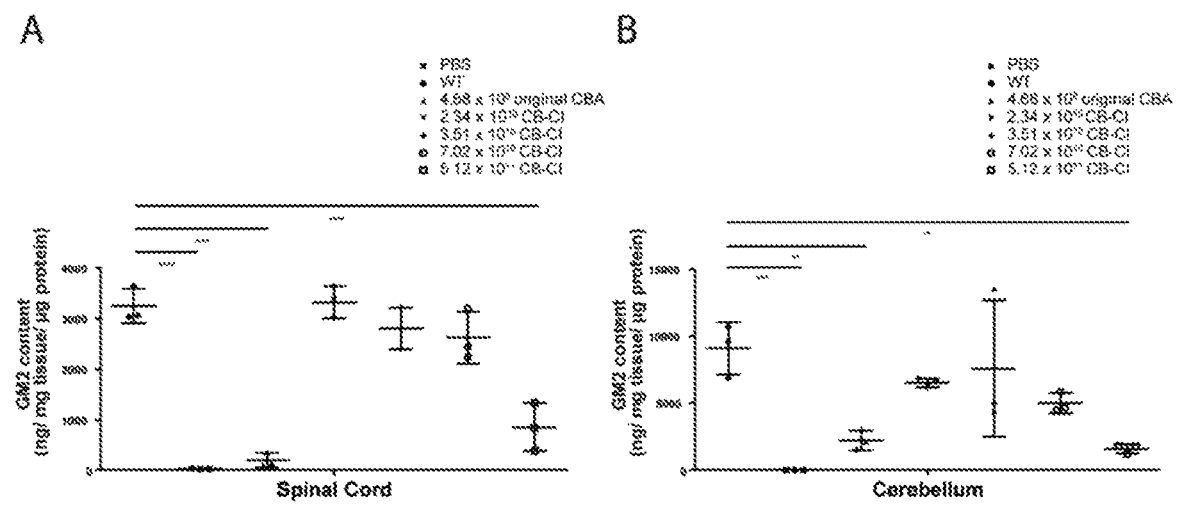
FIGS. 64A-64B show that increasing doses of CSF delivered AAVrh8-CB-CI-mHexA/B vector further reduce GM2 ganglioside storage in spinal cord and cerebellum. SD mice were injected with $1.17 \times 10^{10}$ vg of AAVrh8-CB-CI-mHexA/B into the thalamus with increasing CSF doses ($1.17 \times 10^{10}$ vg, $2.34 \times 10^{10}$ vg, $5.85 \times 10^{10}$ vg, and $5.5 \times 10^{11}$ vg). Four weeks after injection, GM2 ganglioside content was measured by LC-MS/MS in the spinal cord (FIG. 64A) and cerebellum (FIG. 64B). Results are shown as mean+/−SD, Dunnet's multiple comparisons test, * ($P<0.05$),  ($P<0.01$), * ($P<0.0001$), n=3.

In order to improve the effect on GM2 ganglioside storage in the spinal cord and cerebellum the dose delivered to CSF via the lateral ventricles was increased while maintaining the thalamic dose ($1.17 \times 10^{10}$ vg) constant. SD mice were injected with increasing CSF doses of AAVrh8-CB-CI-mHexA/B—$1.17 \times 10^{10}$ vg, $2.34 \times 10^{10}$ vg, $5.85 \times 10^{10}$ vg, $5.00 \times 10^{11}$ vg (n=3 per cohort). The reduction in GM2 ganglioside content in the spinal cord (FIG. 64A) and cerebellum (FIG. 64B) at one month after injection was dose dependent with the highest dose ($5.2 \times 10^{11}$ vg total) showing an effect similar to the original AAVrh8 vector injected at $4.68 \times 10^9$ vg.

Example 14

A compassionate use study was designed for a single subject with Tay Sachs disease. rAAVrh8-HexA/B was administered based on the pre-clinical data presented above and the lack of treatment available to patients with Tay Sachs disease.

In the three weeks prior to treatment, the subject with advanced infantile Tay-Sachs disease (about 30 months old) was administered several clinical safety tests and was administered an immunosuppression regimen for approximately 7 days pre-treatment. The subject has two mutant HexA alleles: 1) HexA, 4-BP insertion (c.1274-1278) most common Ashkenazi mutation; and 2) HexA, c.82 C→T (p.Gln28). Additionally, the subject previously exhibited the following disease progression:

8 mo—exaggerated startle reflex
12 mo—macrocephaly with abnormal myelination on MRI, abnormal MRS biomarkers
14 mo—first afebrile seizure→Diagnosis
17 mo—G-tube insertion
20 mo—emergency visit due to recurrent seizures The subject's seizures were under reasonable control with baseline medication and rectal midazolam as needed. The subject was G-tube fed on a ketogenic diet, Miglustat, Keppra, Prevacid, and Clonazepam.

A composition comprising the rAAVrh8-HexA/B rAAV biological products was infused into the subject at a rate dictated by the CSF pressure of the subject. The target dose of rAAVrh8-HexA/B formulation that was administered was $1.0 \times 10^{14}$ vector genomes (vg) or $1.0 \times 10^{14}$ vg/kg brain weight.

Figure 74A:
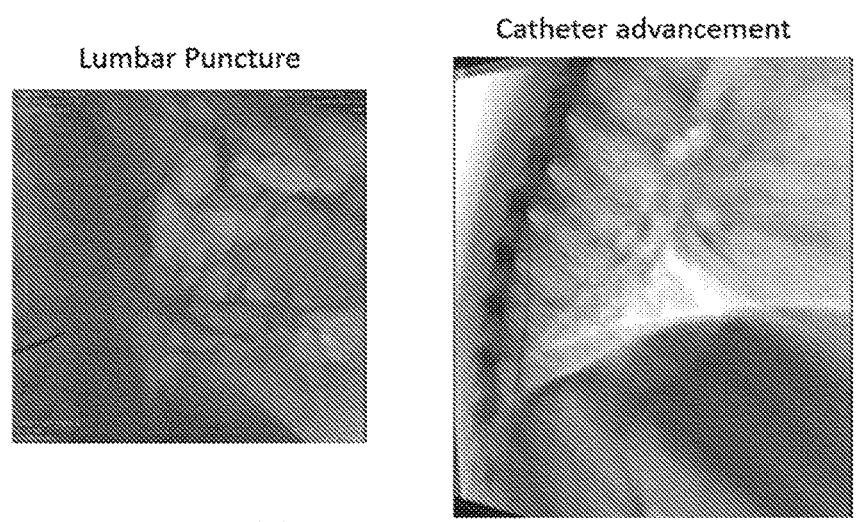
FIGS. 74A-74C show examples of catheter based administrations of AAVrh8 vector at cisterna magna and lumbar L2 levels.
Figure 74B:
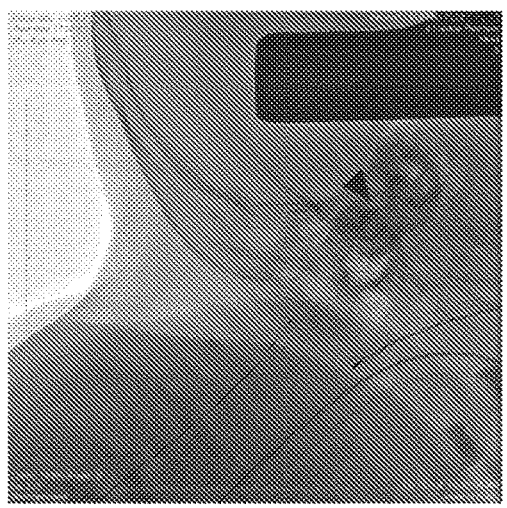
Figure 74B:
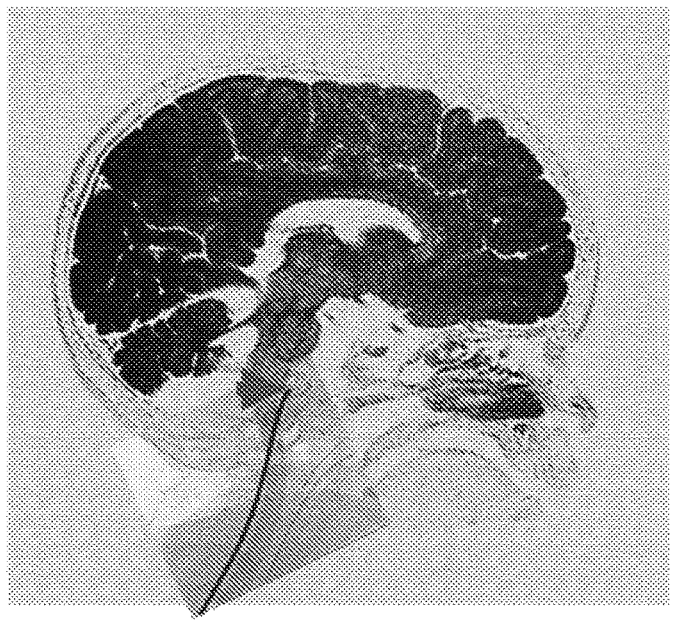
Figure 74C:
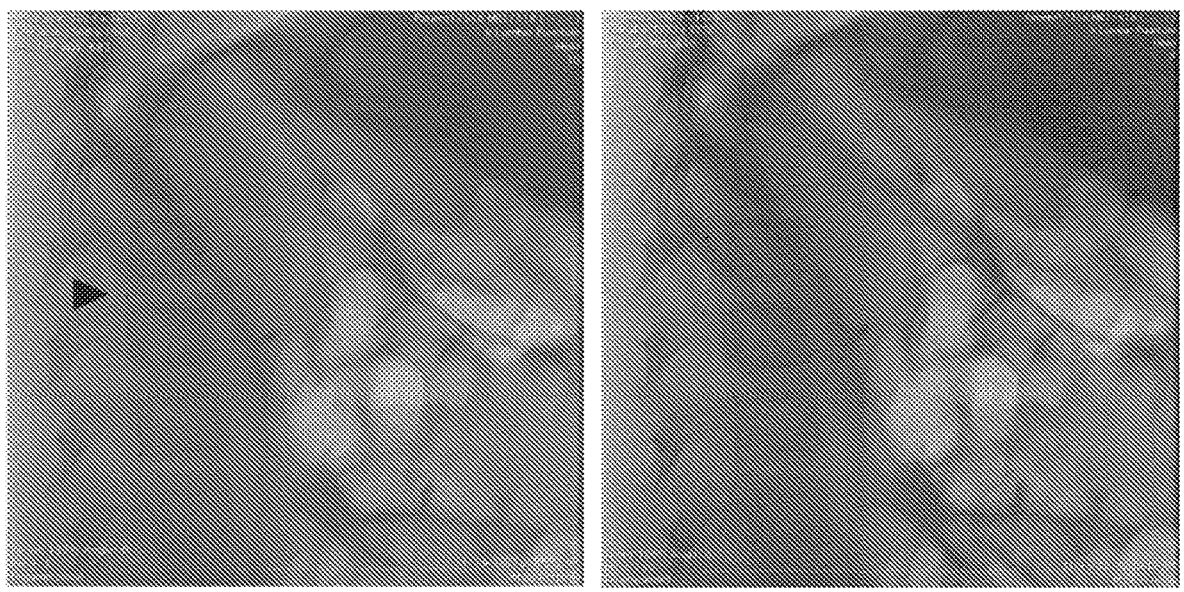

The total dose administered to the patient was calculated based on 1040±130 g brain weight in female infants aged 19-30 months. The total dose was administered with approximately 75% delivered to the cisterna magna and approximately 25% into the spinal canal through a fluoroscopic-guided lumbar intrathecal catheter (FIG. 74A). 14 mL of CSF was removed by passive flow, followed by administration of 9 ml of AAVrh8 vector at −1 mL/min at cisterna magna level (FIG. 74B). 3 ml of AAVrh8 vector was infused at L2 level (FIG. 74C). Due to the subject's advanced disease, a co-delivered intrathalamic injection of rAAVrh8-HexA/B was not administered to the subject.

Figure 65:
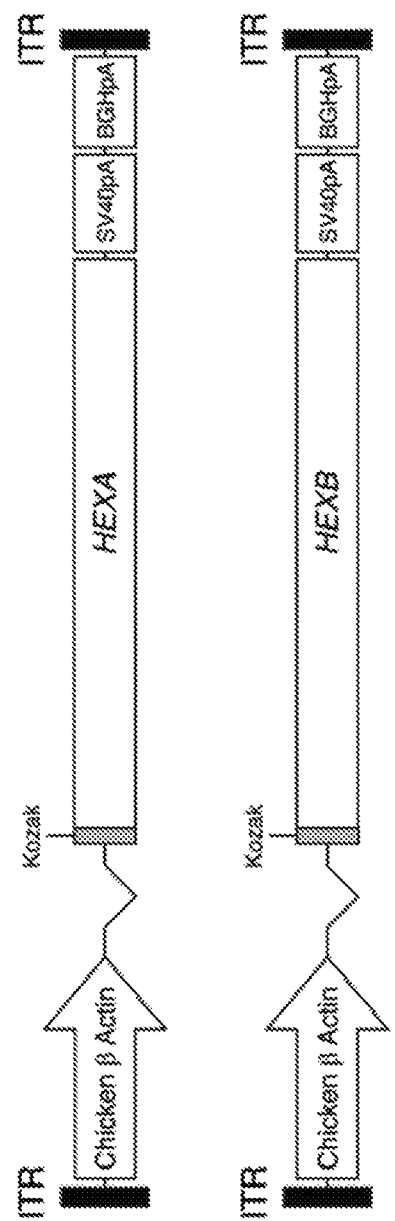
FIG. 65 are illustrations of the structure of AAV-HexA and AAV-HexB vector genomes.
Figure 66:
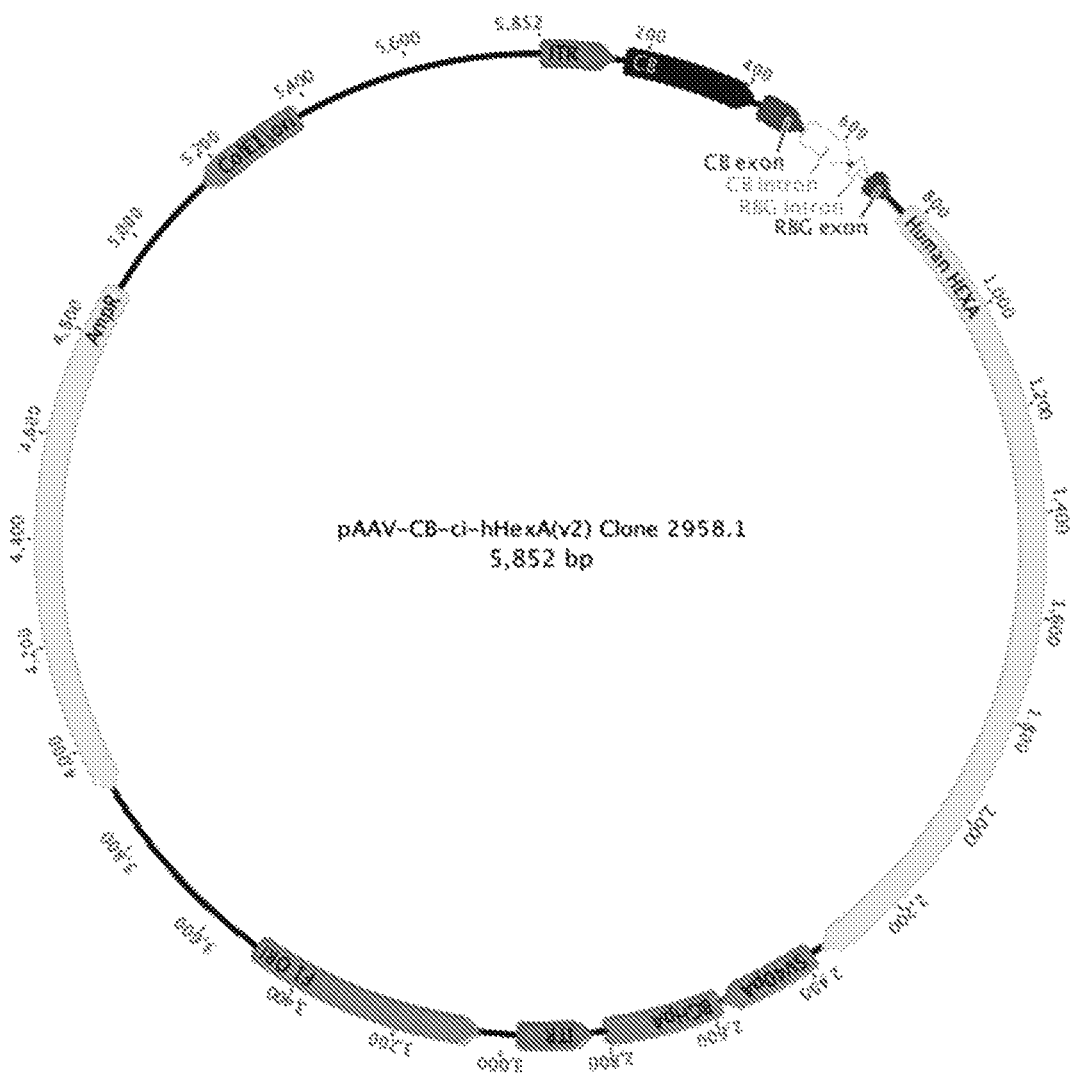
FIG. 66 shows a plasmid map of a pAAV-CB-ci-hHexA (v2) vector.
Figure 67:
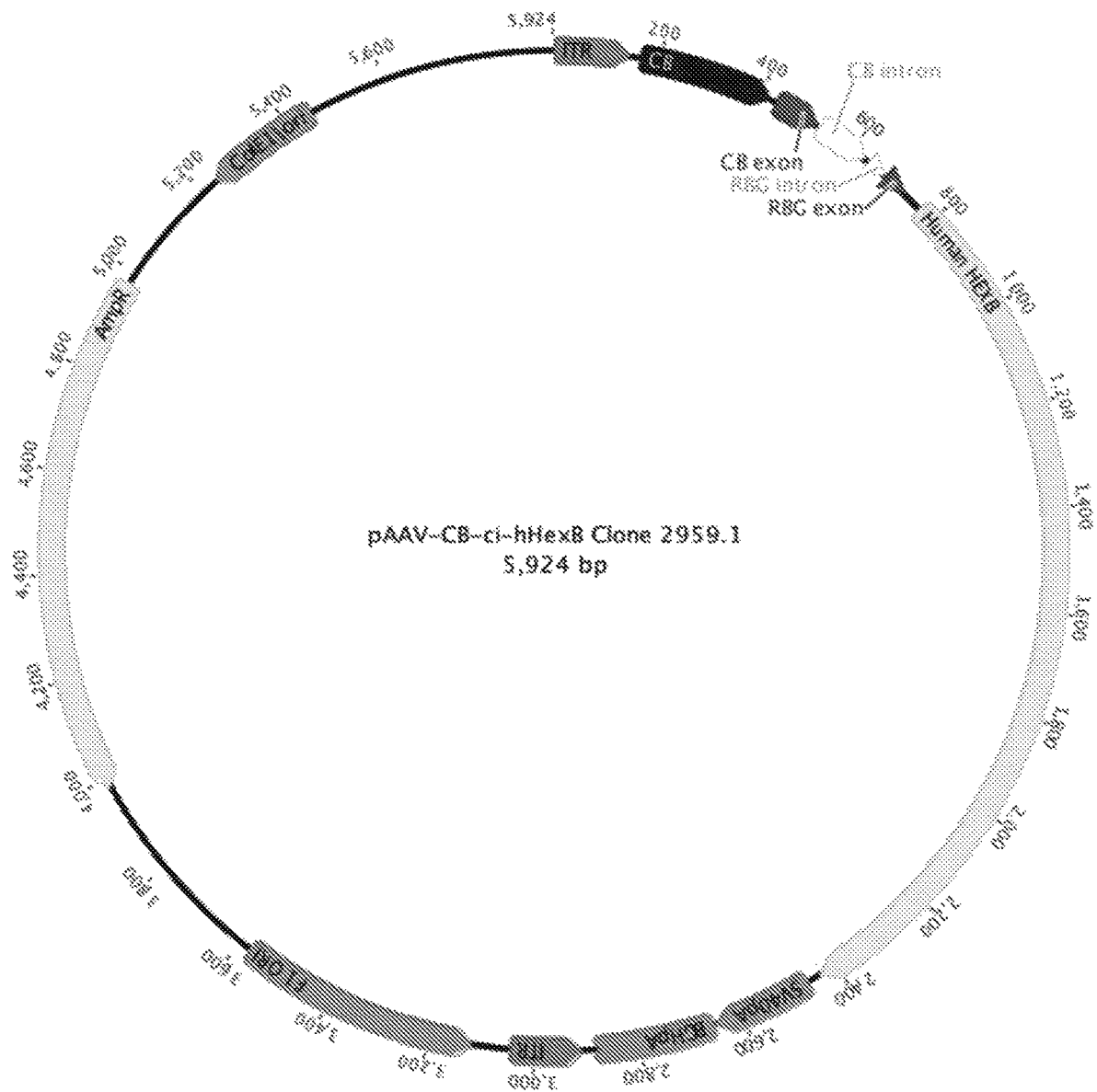
FIG. 67 shows a plasmid of a pAAV-CB-ci-hHexB vector.

The biological products used in the study were two non-replicating, single stranded adeno-associated virus vectors termed AAVrh8-CB-ci-HEXA and AAVrh8-CB-ci-HEXB (rAAVrh8-HexA/B), which were produced separately. Molecular features of the vectors are described in Tables 9 and 10. The AAVrh8 vectors encode human HEXA and HEXB under the chicken beta-actin promoter. The AAV vector plasmids used are depicted in FIGS. 65-67.

Figure 69:
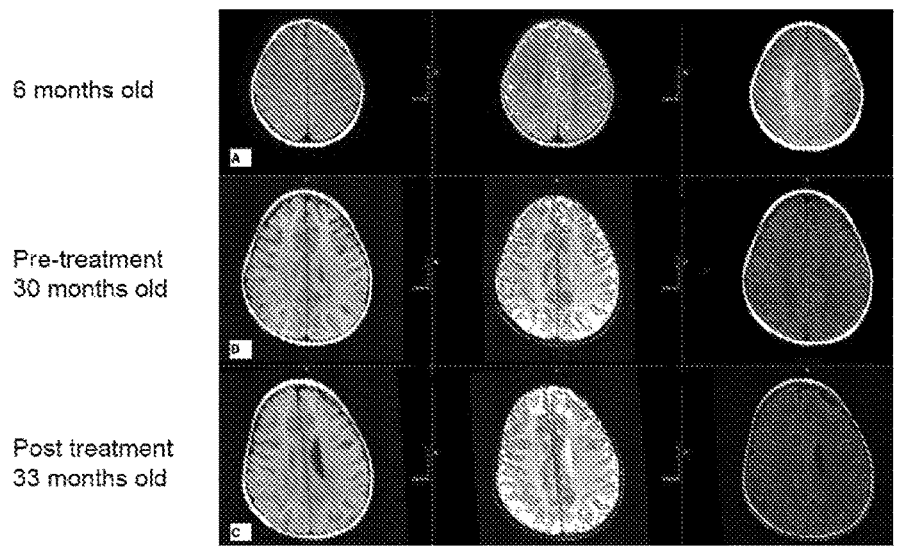
FIG. 69 shows pre-treatment and post-treatment MRI scans showing white matter in the frontal and parietal lobes as compared to the baseline MRI (approximately 2 years difference).

The vectors were formulated in phosphate buffered saline without Mg2+ and Ca2+. rAAVrh8-HexA/B was generally well-tolerated with no serious adverse events related to the administration being reported as of the three month clinical update. At three months, no clinically relevant laboratory abnormalities were observed following treatment, and there was no significant immune response observed following treatment. The subject's clinical condition was stable from baseline to month 3 without deterioration observed on neurological exam. Furthermore, no evidence of deterioration from baseline was apparent on magnetic resonance imaging (MRI) of the brain at 3 months when compared to pre-treatment MRI of the brain at baseline. These data are shown in FIG. 69.

Figure 70:
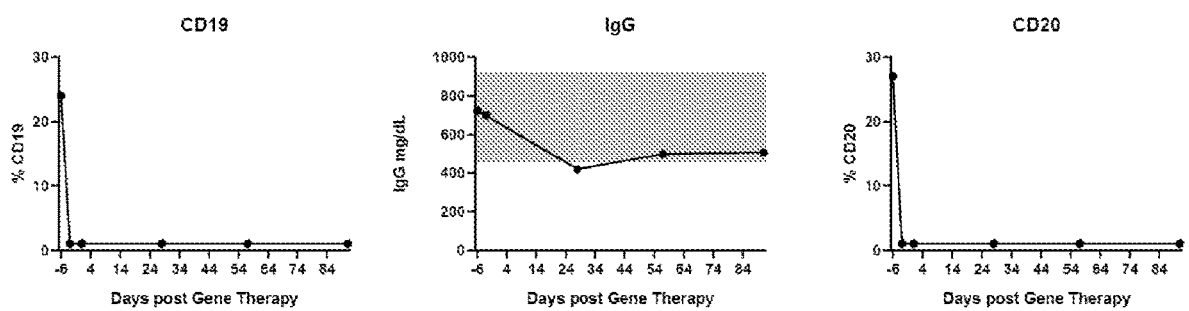
FIG. 70 shows a subject's CD19 and CD20 counts after administration of one dose of Rituximab, and that IgG count after IVIg infusions.
Figure 71:
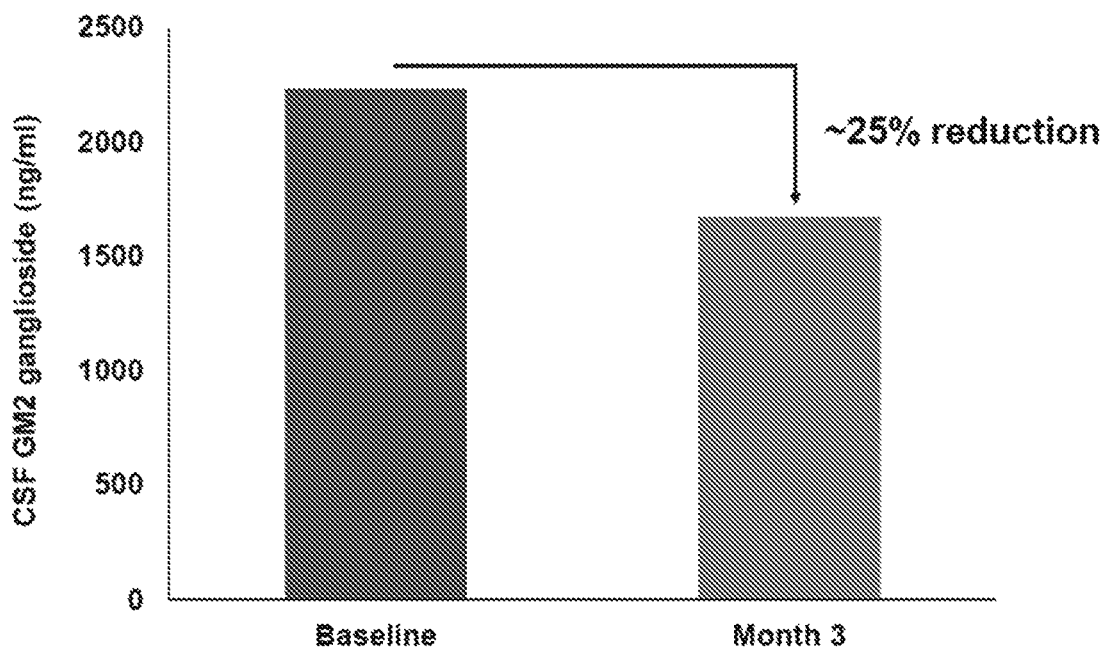

Data collection at 3 months also indicated that the subject's CD19 and CD20 counts were both fully suppressed (<1% of peripheral T cells) by one dose of Rituximab, and that IgG was maintained in a safe range by IVIg infusions. These data are shown in FIG. 70.

The subject had a near baseline level of neutralizing antibodies against AAVrh8 capsid after 3 months, and no neutralizing antibodies against the transgene products were seen after 3 months. Additionally, no T-cell response to the transgene products nor cytotoxic T cell response to the capsid was seen after 3 months. The stimulation of the $T_{regulatory}$ response demonstrates successful induction of long-term immune tolerance to the capsid, which prevents future immune responses.

Figure 68:
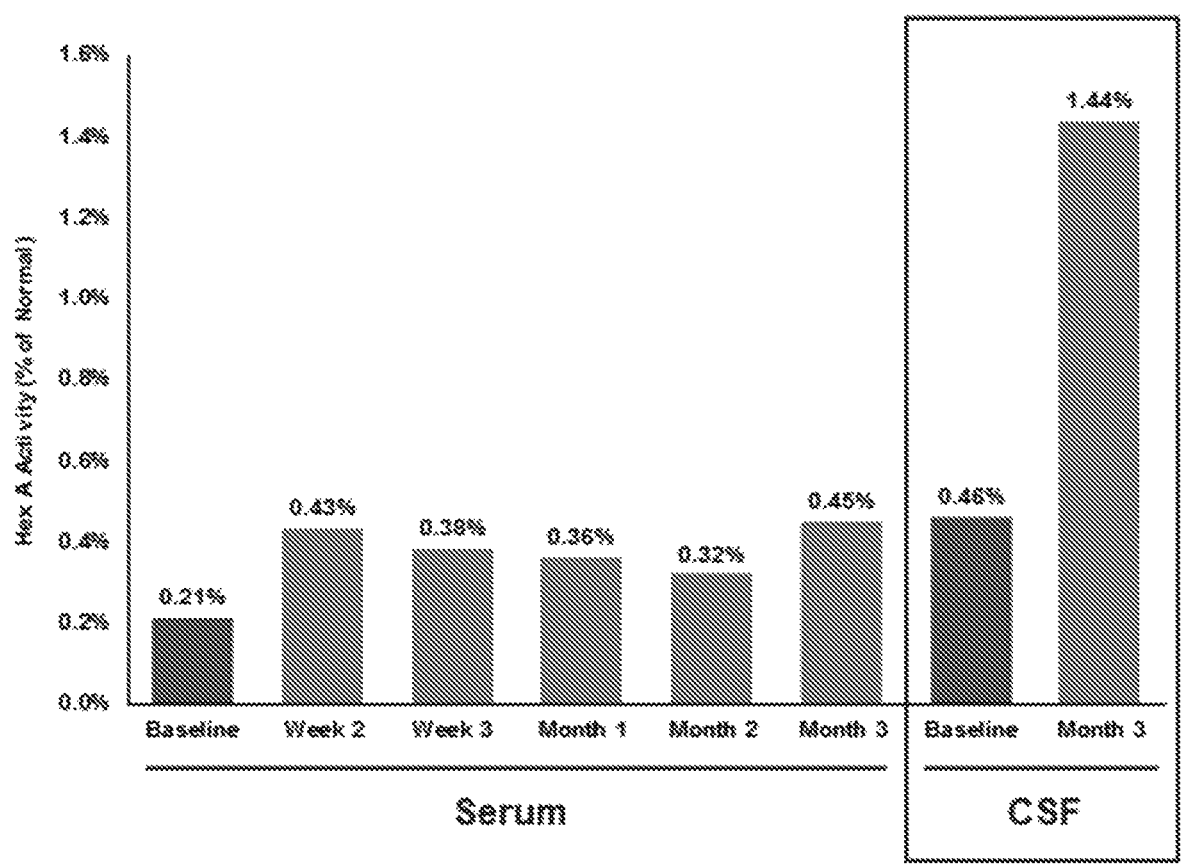
FIG. 68 shows HexA enzyme activity in serum and CSF before and after rAAVrh8-HexA/B administration to a single advanced Tay-Sachs subject.

A very slight increase in enzymes AST (less than 2×baseline) and ALT (less than 2× upper limit of normal) were seen over the first 21 days, and was resolved spontaneously. No indication of systemic inflammation based on hs-CRP or total complement activity was seen. Liver ultrasound and a pediatric GI consult showed no specific pathology.

β-Hexosaminidase A activity was determined using 4MUGS assay. At baseline, the subject's β-Hexosaminidase A activity in the CSF was 0.46% of normal. At three months, there was an apparent increase in the subject's β-Hexosaminidase A activity in the CSF to 1.44% of normal enzyme activity, representing an increase of over three-fold from baseline. HexA enzyme activity in serum and CSF before and after rAAVrh8-HexA/B administration up to three months is shown in FIG. 68.

Figure 7:
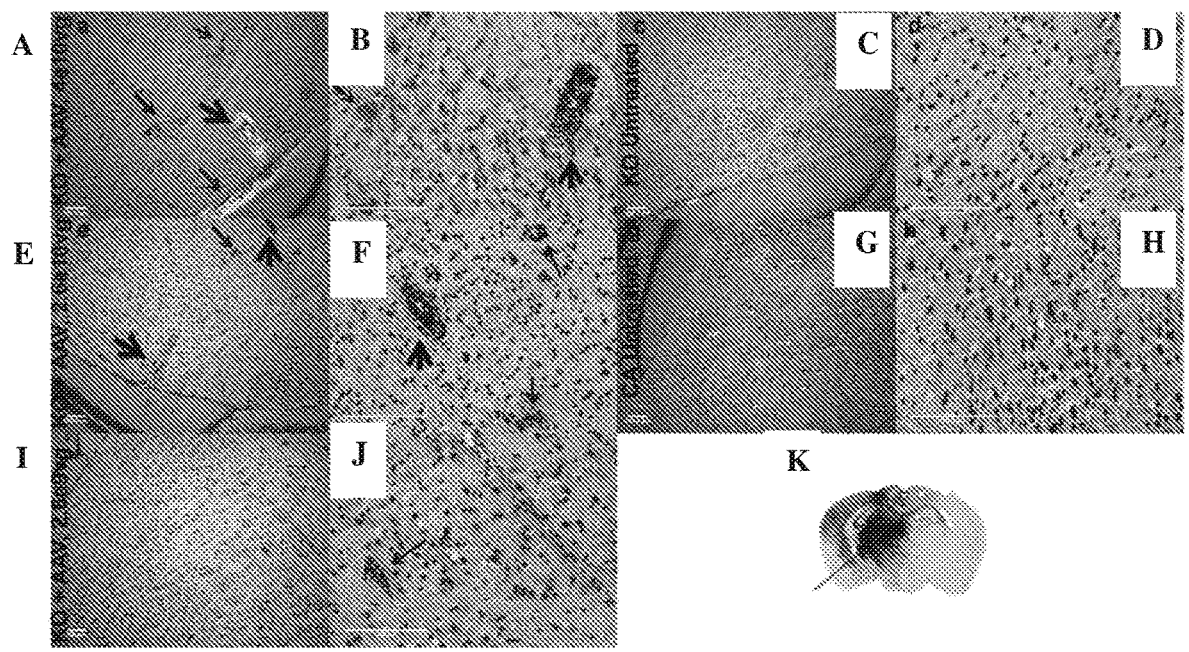
FIGS. 7A-7K show intracranial injections of AAV in βgal$^{-/-}$ mice result in morphological changes at the site of injection in the thalamus. Intracranially injected βgal$^{-/-}$ mice were analyzed at 2 week (4e10 vg) or 3 months (2.6e10 vg and 2.6e9 vg) post-injection by H&E staining of 20 ™ coronal brain sections. Morphological changes in the injected region of the thalamus: thick arrow denotes vascular cuffing, thin arrow indicates inflammation. Left panel taken at 10×, right panel a 40× picture (from regions on the left panel). Morphological changes and neuronal loss appear to lessen at lowest inject dose.
Figure 8:
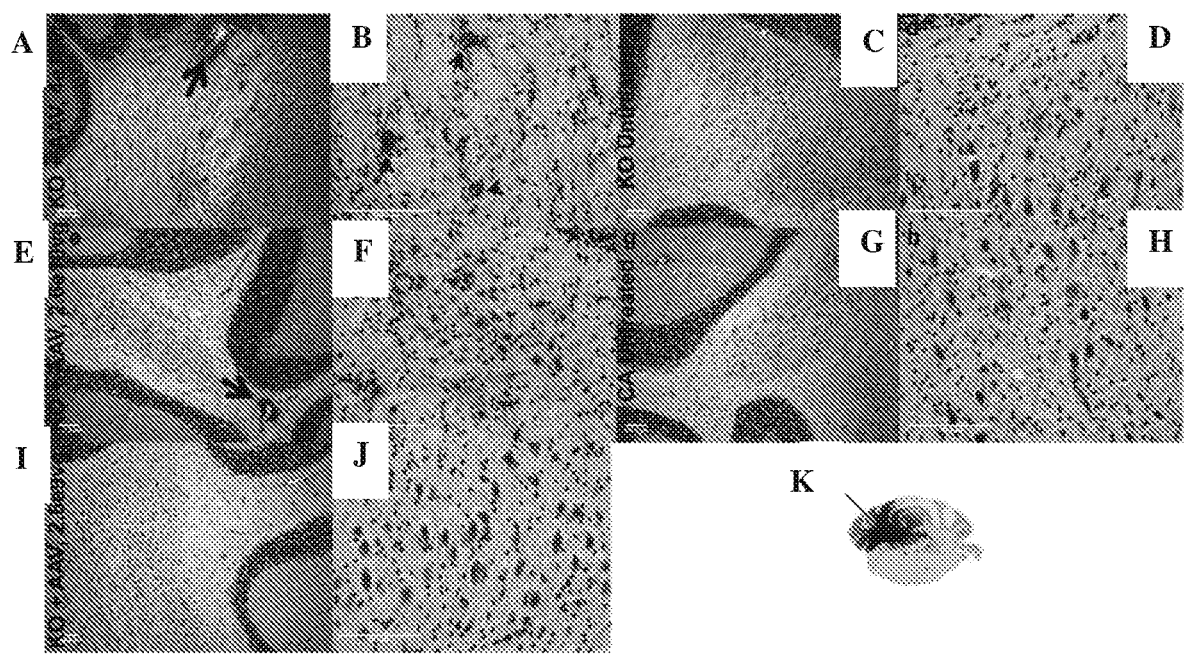
FIGS. 8A-8K show intracranial injections of AAV in βgal$^{-/-}$ mice result in morphological changes at the site of injection in the deep cerebellar nuclei. Intracranially injected βgal$^{-/-}$ mice were analyzed at 2 week (4e10 vg) or 3 months (2.6e10 vg and 2.6e9 vg) post-injection by H&E staining of 20 µm coronal brain sections. Morphological changes noted in the injected region of the DCN. Thick arrow denotes vascular cuffing. Arrowhead indicates suspected neuronal engulfment. Left panel taken at 10×, right panel at 40× (from regions depicted on the left panel). Morphological changes and neuronal loss appear to lessen at lowest inject dose.
Figure 72:
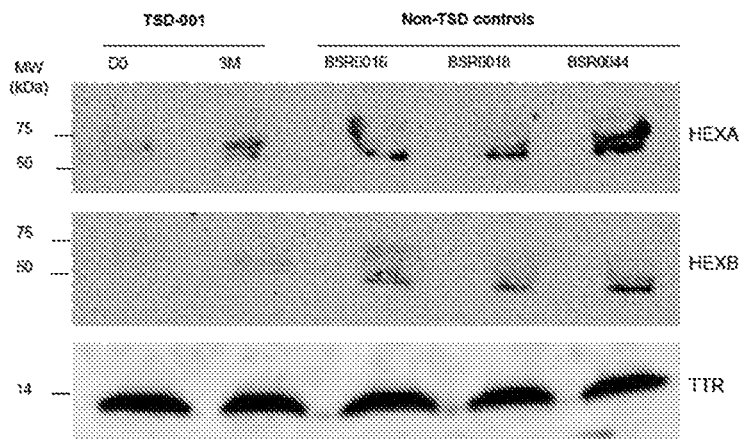
FIG. 72 shows western blot staining of HEXA, HEXB, AND TTR at the day 0 and at 3-months post treatment.

There was a reduction of approximately 25% in GM2 ganglioside from baseline in the cerebral spinal fluid (CSF) as show in FIG. 7I. This indicates that the 3-fold increase from baseline in β-Hexosaminidase A enzyme activity in the CSF was associated with a decrease in GM2 ganglioside, which accumulates in Tay-Sachs disease patients and is believed to cause disease progression. Additionally, β-Hexosaminidase A protein expression as measured by Western blot increased from baseline to month 3. These data are shown in FIG. 72.

TABLE 9

Molecular features in the plasmid pAAV-CB-ci-hHexA(v2)

| Type | Start | End | Name | Description |
|---|---|---|---|---|
| Inverted terminal repeat | 1 | 145 | ITR | 5'ITR |
| Promoter | 164 | 423 | CB | Chicken beta-actin promoter |
| Exon | 435 | 528 | CB exon | Chicken beta-actin exon 1; non-coding |
| Intron | 579 | 636 | CB intron | Chicken beta-actin intron 1 (partial) |
| Intron | 643 | 683 | RBG intron | Rabbit beta-globin intron 1 (partial) |
| Exon | 684 | 737 | RBG exon | Rabbit beta-globin exon 2 (partial); non-coding |
| cDNA | 774 | 2,363 | Human HEXA | Human hexosaminidase A coding sequence |
| polyA signal | 2,384 | 2,580 | SV40pA | Simian virus 40 polyadenvlation signal |
| polyA signal | 2,581 | 2,810 | BGHpA | Bovine growth hormone polyadenylation signal |
| Inverted terminal repeat | 2,970 | 2,826 | ITR | 3'ITR |
| Gene (complement) | 3,903 | 4,903 | AmpR | Ampicillin resistance sene |
| Origin of replication | 5,153 | 5,378 | ColE1\ori | Origin of plasmid DNA replication |
| Origin of replication | 3,039 | 3,499 | F1 ORI | Origin of single stranded DNA replication |

TABLE 10

Molecular features in the plasmid pAAV-CB-ci-hHexB

| Type | Start | End | Name | Description |
|---|---|---|---|---|
| Inverted terminal repeat | 1 | 145 | ITR | 5'ITR |
| Promoter | 164 | 423 | CB | Chicken beta-actin promoter |
| Exon | 435 | 528 | CB exon | Chicken beta-actin exon 1; non-coding |
| Intron | 529 | 636 | CB intron | Chicken beta-actin intron 1 (partial) |
| Intron | 643 | 683 | RBG intron | Rabbit beta-globin intron 1 (partial) |
| Exon | 684 | 737 | RBG exon | Rabbit beta-globin exon 2 (partial); non-coding |
| cDNA | 771 | 2,438 | Human HEXB | Human hexosaminidase B coding sequence |
| polyA signal | 2,462 | 2,658 | SV40pA | Simian virus 40 polyadenylation signal |
| polyA signal | 2,659 | 2,888 | BGHpA | Bovine growth hormone polyadenylation signal |
| Inverted terminal repeat | 3,047 | 2,903 | ITR | 3'ITR |
| Gene (complement) | 3,980 | 4,980 | AmpR | Ampicillin resistance gene |
| Origin of replication | 5,230 | 5,455 | ColE1\ori | Origin of plasmid DNA replication |
| Origin of replication | 3,116 | 3,576 | F1 ORI | Origin of single stranded DNA replication |

Example 15

A second subject (about 3 months old) with advanced infantile Tay Sachs disease was administered rAAVrh8-HexA/B. In the three weeks prior to treatment, the subject was administered several clinical safety tests and was administered an immunosuppression regimen for approximately 7 days pre-treatment. The subject has two mutant HexA alleles: 1) HexA, 1.75 kb deletion of exons 11-13; and 2) HexA, p.Val381* a truncation mutation in exon 10.

Prior to administration of rAAVrh8-HexA/B, the subject was clinically well with normal exam, normal growth and development, and no evidence of seizures or exaggerated startle responses. The subject had about 1% Hexosaminidase activity as compared to wild-type activity.

Example 16

A clinical study was designed for (rAAVrh8-HEXA/B). The study was designed as a two-stage, dose-escalation and safety & efficacy study of bilateral intraparenchymal thalamic and intrathecal administration of AAVrh8 vectors encoding HEXA and HEXB, separately, in infantile-onset Tay-Sachs (TSD) or Sandhoff Disease (SD). The clinical study is outlined as described below. Due to the rapidly progressing and fatal nature of GM2 gangliosidoses, and lack of approved therapies, the study will not utilize a placebo or active control group. Treatment will not be blinded.

Subjects in this study will be male and female infants less than 18 months of age at the time of gene transfer (adjusted for infants born prematurely (<37 weeks gestation)) with infantile-onset TSD or SD based on gene mutation analysis and symptom onset. TSD and SD subjects must have mutations of either HEXA gene encoding the α subunit or mutations in HEXB gene encoding the β subunit, respectively. Subjects will demonstrate the ability to sit without support for 5 seconds, be considered to be appropriate surgical candidates (confirmed by the study neurosurgeon, based on examination and MRI findings), have serum Hex A activity less than 5% of normal, and not carry a G269S or W574C mutation. Subjects will also be seronegative for AAVrh8 neutralizing antibodies based on lab assay threshold. Other inclusion/exclusion criteria may also apply.

Figure 73:
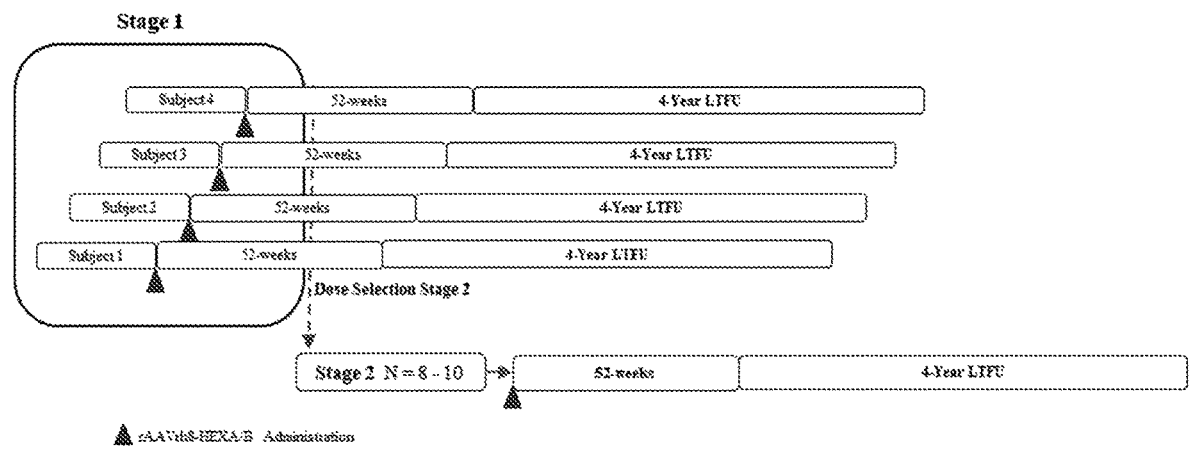
FIG. 73 shows a clinical study treatment design.

The study will be open-label, non-randomized, single administration of viral, vectors rAAVrh8-HEXA/B, by bilateral thalamic (BiTh) and intrathecal (IT) administration. Subjects will be enrolled in study in two stages (FIG. 73), as follows: Stage 1: Four subjects will be treated sequentially, in a dose-escalation manner, with the objective to determine the optimal dose. Dose selection will be determined from safety, biomarker, and additional data; Stage 2: Up to ~10 subjects will be treated with the optimal dose identified in Stage 1, with the objective to determine safety & efficacy.

All subjects will participate in a long-term follow-up (LTFU), planned for up to 4 years, to determine on-going safety and efficacy of the treatment.

The study treatment will be given over the course of 2 days to minimize the risks of extended anesthesia time, as follows: At Visit 1a/Day 0, subjects will receive bilateral intraparenchymal injections of rAAVrh8-HEXA/B into the thalamus on each side of the brain; and at Visit 1b/Day 1, subjects will receive IT infusion of rAAVrh8-HEXA/B. All infusions will be comprised of a 1:1 mixture of rAAVrh8-HEXA and rh8AAV-HEXB.

To prevent the risks of an inflammatory response and to protect AAV-transduced cells from immune response to the AAVrh8 capsid, subjects will be immunosuppressed prior to administration of AAVrh8-HexA/B treatment. The immunosuppression regimen will be maintained long-term as predefined.

Starting on Day −16 of the Study, the Following Will be Initiated:
Rituximab at 375 mg/m$^2$ BSA
Solu-Medrol at 10 mg/kg
Sirolimus at 1 mg/m$^2$ BSA
Prednisolone at 2 mg/kg/day
Lansoprazole at 1-1.5 mg/kg/day
trimethoprim/sulfamethoxazole given 3× per week (M, W, F) at 10 mg/kg/dose Day −7:
Continuation of sirolimus, prednisolone, and lansoprazole dosing
Continuation of trimethoprim/sulfamethoxazole
Rituximab infusion, as needed for persistent CD20 count greater than or equal to 5%

Day −2:
Continuation of sirolimus, prednisolone, and lansoprazole dosing
Continuation of trimethoprim/sulfamethoxazole Day 0/BiTh Infusion Day
Continuation of sirolimus, prednisolone, and lansoprazole dosing
Continuation of trimethoprim/sulfamethoxazole Day 1 IT Infusion Day
Continuation of sirolimus, prednisolone, and lansoprazole dosing
Continuation of trimethoprim/sulfamethoxazole Day 2-7:
Continuation of sirolimus, prednisolone, and lansoprazole dosing
Continuation of trimethoprim/sulfamethoxazole
Intravenous immunoglobulin (IVIG) administration—immunoglobulin levels must be below 700 mL/dL. Dose will be adjusted to maintain serum trough levels of 700-1000 mg/dL. Will occur after vector infusion.

Day 14:
Continuation of sirolimus, prednisolone, and lansoprazole dosing
Continuation of trimethoprim/sulfamethoxazole Day 21:
Continuation of sirolimus, prednisolone, and lansoprazole dosing
Continuation of trimethoprim/sulfamethoxazole Week 4/Month 1:
Continuation of sirolimus, prednisolone, and lansoprazole dosing
Continuation of trimethoprim/sulfamethoxazole
Administration of IVIG Week 4/Month 2:
Continuation of sirolimus, prednisolone, and lansoprazole dosing
Continuation of trimethoprim/sulfamethoxazole
Administration of IVIG Week 12/Month 3:
Continuation of sirolimus
Continuation of trimethoprim/sulfamethoxazole
Administration of IVIG Week 24/Month 6
Weaning of sirolimus with the guidance of a consulting hospital pharmacist Intrathalamic (ITh) Dose A proposed clinical dose and infusion volume to be delivered to thalamus (Th) for Stage 1 is 2.8e12 to 1.1e3 vg/ml, e.g., as shown in Table 11.

TABLE 11

| | Human Th vol$^2$ | Human Th dose (vg) |
|---|---|---|
| Low Dose | 4,332 mm$^3$ | 2.8e12 |
| High Dose | 4,332 mm$^3$ | 1.1e13 |

The amount of the thalamus that is filled with vector, or the volume of distribution (Vd) can be calculated based on the volume of infusion (Vi), volume of the target brain region (thalamus), multiplied by a correction factor for how far the vector spreads from the point source of delivery. From other AAV IPa infusion studies, the ratio of Vd:Vi was assumed to be 3.0 (Yin, Richardson et al. 2010) (Yin et al, 2010). The volume to the human thalamus was calculated as a Vi of 1.08 mL and Vd of 4.35 ml$^3$ (77% of total thalamus volume per side) as shown in Table 12.

TABLE 12

| Human Th vol | Distribution Factor | Human infusion vol$^1$ | Target Loading |
|---|---|---|---|
| 4,332 mm$^3$ | 3.0 | 1.08 mL | 77% |

The Th infusion volume of 1.08 ml is at or above the proposed volume of infusion for subjects 1 to 3 in Stage 1 of the clinical trial. The adjusted proposed clinical doses for intrathalamic administration of low, medium and high dose is 7.2e12 to 1.4e13 vg.

Intrathecal (IT) Dose

A proposed human dose for intrathecal administration is a dose ranging from 2.03e13 to 8.13e13 vg and up to an 8 mL infusion volume (see table below). The latter values are proposed to be used in the clinical study with a set IT dose of 8.0e13 vg across all treated subjects.

TABLE 13

| Human CSF vol | Scaled Human dose (vg)$^1$ | Human Infusion vol |
|---|---|---|
| 100 mL | 2.03e13 | 2.0 mL |
| 100 mL | 8.13e13 | 8.1 mL |

The subjects will be placed under general anesthesia with intubation throughout the procedure. The right sided infusion cannula and attached line which has been primed with the vector and attached to the delivery syringe and pump is then stereotactically placed into the target region in the right thalamus while running the infusion at 0.1 μL/min to prevent any occlusion of the cannula tip. The flexible catheter tubing is secured on the scalp with anchoring sutures and adhesive dressing. The same steps are then repeated for the placement of the second catheter on the left side. Continuous ICP monitoring will be done throughout the procedure.

Infusion rate starts at 0.5 μL/min and increased every 5 minutes (1.0 μl/min→2.0 μl/min→5 μl/min). Study drug is infused into each catheter via a microinfusion pump and syringe containing the study drug as a 1:1 mixture of HexA and HexB vector.

IT Administration:

The IT drug infusion will be infused at a rate dictated by CSF pressure. A total of 6.0 ml into the high cervical level/cisterna magna and 2.0 ml at a thoracolumbar level will be delivered. A Tuohy spinal needle will be inserted in the subarachnoid space under fluoroscopic guidance. Entry into the subarachnoid space will be verified with spontaneous CSF flow. A total of 6-7 mL of CSF will be drained by gravity, and then a flexible *Excelsior*® SL-10@microcatheter (Stryker Neurovascular, Stryker) will be threaded close to, or into the cisterna magna under direct fluoroscopic guidance. A syringe containing the study drug (1:1 mixture of HexA and Hex B) will be attached to the catheter and 6.0 ml administered at a high cervical/cisterna magna level followed by retraction of the microcatheter to a thoracolumbar level lower where a second bolus of 2.0 ml will be administered. Upon completion of the injection the microcatheter (dead volume ~0.3 mL) will be flushed with 0.5 mL saline and then removed. At surgeon discretion based on spinal anatomy and other considerations, the dose may be administered by two separate IT infusions at a high cervical/cisterna magna and thoracolumbar level.

Primary Endpoint(s):
Stage 1: The incidence, severity, seriousness and relatedness to treatment of treatment emergent adverse events (TEAEs) as graded NCI CTCAE v5.0

Stage 2:
Surrogate Biologic Marker: Serum/CSF HexA activity change from baseline to Visit 7 (Month 3)
Clinical Function: Proportion of subjects achieving the ability to sit without support for 5 seconds as assessed in Item 22 of the Bayley Scales of Infant and Toddler Development, Third Edition (BSID-III) at Visit 9/Month 12

LTFU: Adverse Events
Secondary Endpoint(s):
Stage 1:
Changes in vital signs including weight
Changes in physical and neurologic examination
Changes in clinical laboratory tests including complete blood count with auto-differential, comprehensive metabolic panel, and hs-CRP
CD20 count
ECG, EEG,
Cellular responses and neutralizing antibody titers to the AAVrh8 capsid and HEXA and HEXB proteins as well as antibody levels to HEXA and HEXB proteins Stage 2:
Biologic Markers of Disease:
CSF HexA activity levels change from baseline to Visit 9 (Month 12)
Serum HexA activity levels change from baseline to Visits 4, 5, 6, 7, 8, and 9
CSF GM2 ganglioside levels change from baseline (by LC-MS/MS) to Visit 9 (Month 12)
CSF levels of lactate dehydrogenase (LDH) and aspartate aminotransferase (AST) change from baseline to Visits 7 (Month 3) and 9 (Month 12)

Clinical Function:
1. Proportion of subjects achieving the ability to sit without support for 5 seconds as assessed in Item 22 of the BSID-III at 5, 7, and 8
2. CHOP-INTEND Total Score change from baseline to Visits 5, 7, 8 and 9
3. Proportion of subjects who achieve a score of 40 or higher, 50 or higher and 64 in the CHOP INTEND motor function scale at Visits 5, 7, 8 and 9
4. BSID-III Composite score change from baseline to Visits 5, 7, 8 and 9
5. Proportion of subjects that achieved any new motor milestones as assessed in the Hammersmith Infant Neurological Examination-2 (HINE-2) at Visits 7, 8, and 9 New motor milestones are defined as sitting without support, hands-and-knees crawling, standing with assistance, walking with assistance, standing alone and walking alone
6. Proportion of subjects taking at least five steps independently displaying coordination and balance using BSID-III—Gross Motor Subset #43

Exploratory Endpoint(s)—Stage 2:
Change from baseline in brainstem auditory evoked response (BAER) and visual evoked responses (VER) from baseline to Visits 7, 8 and 9
MRI brain volume and Diffusion Tensor Imaging (DTI) indices of myelination and brain water change from baseline to Visits 7 and 9
MRS indices of metabolite accumulation change from baseline to Visits 7 and 9
Eye tracking assessment change from baseline to Visits 4, 5, 6, 7, 8, and 9

The following will be assessed at Screening through to end of treatment:
Adverse events will be evaluated and graded according to NCI CTCAE v5.0
Physical examination
Vital signs
Standard clinical laboratory tests: hematology, clinical chemistry, coagulation and urinalysis
Adverse Events of Special Interest (AESI):
Surgical related complications
Device related complications
Acute hypersensitivity reactions
Liver function test elevations (AST/ALT, GGT)
Hematologic parameter disorders with special attention to platelet count
Delayed adverse events including but not limited to autoimmune-like reactions and malignancies Example 17

Additional details relating to the disclosure are provided in Appendix A of U.S. Provisional Application 62/840,359, filed Apr. 29, 2019, the entire contents of which are incorporated herein by reference.

Figure 75A:
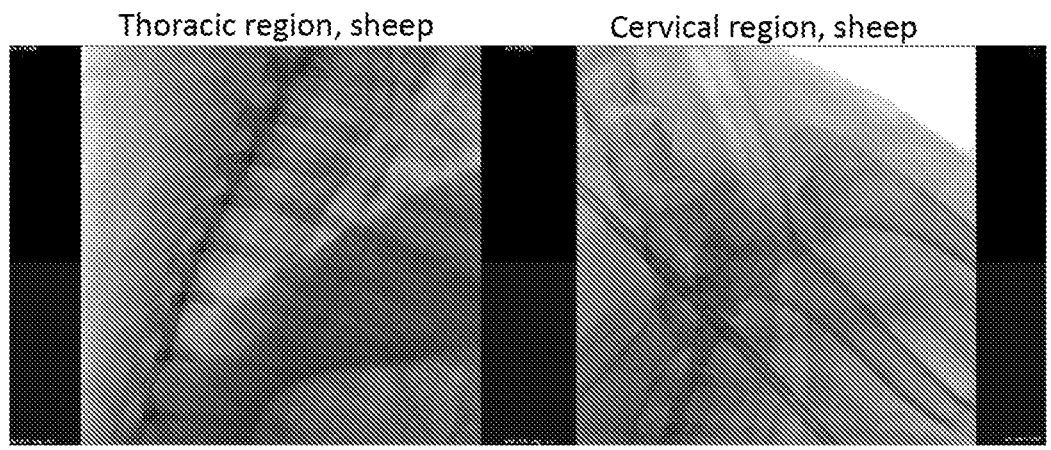
FIGS. 75A-75G shows one embodiment of a method of rAAV administration by fluoroscopy guided intravascular microcatheter to cisterna magna of a sheep.
Figure 75B:
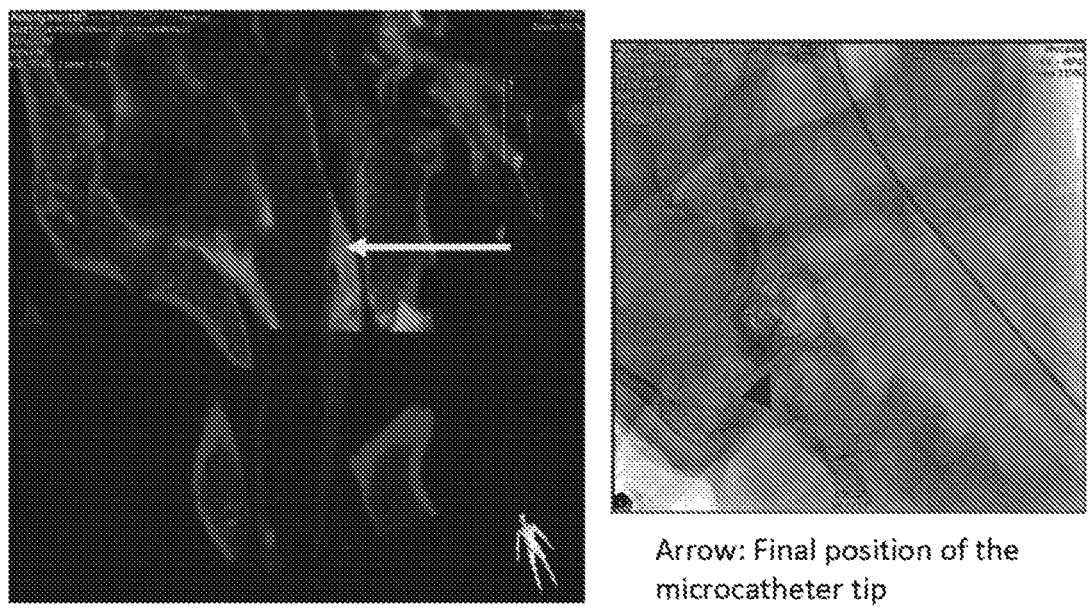
Figure 75C:
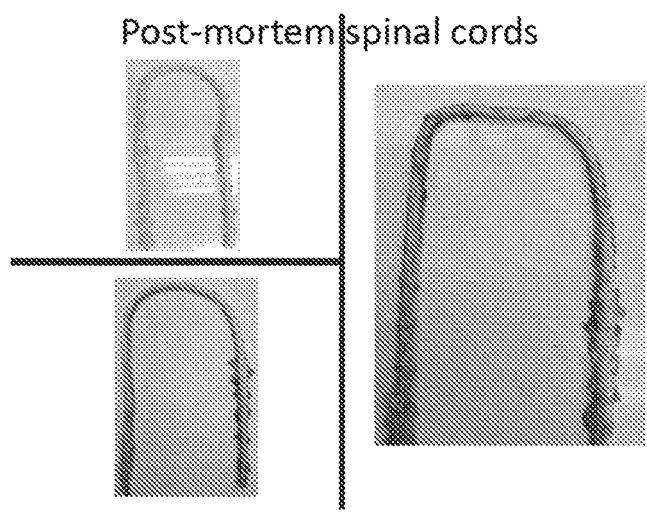
Figure 75D:
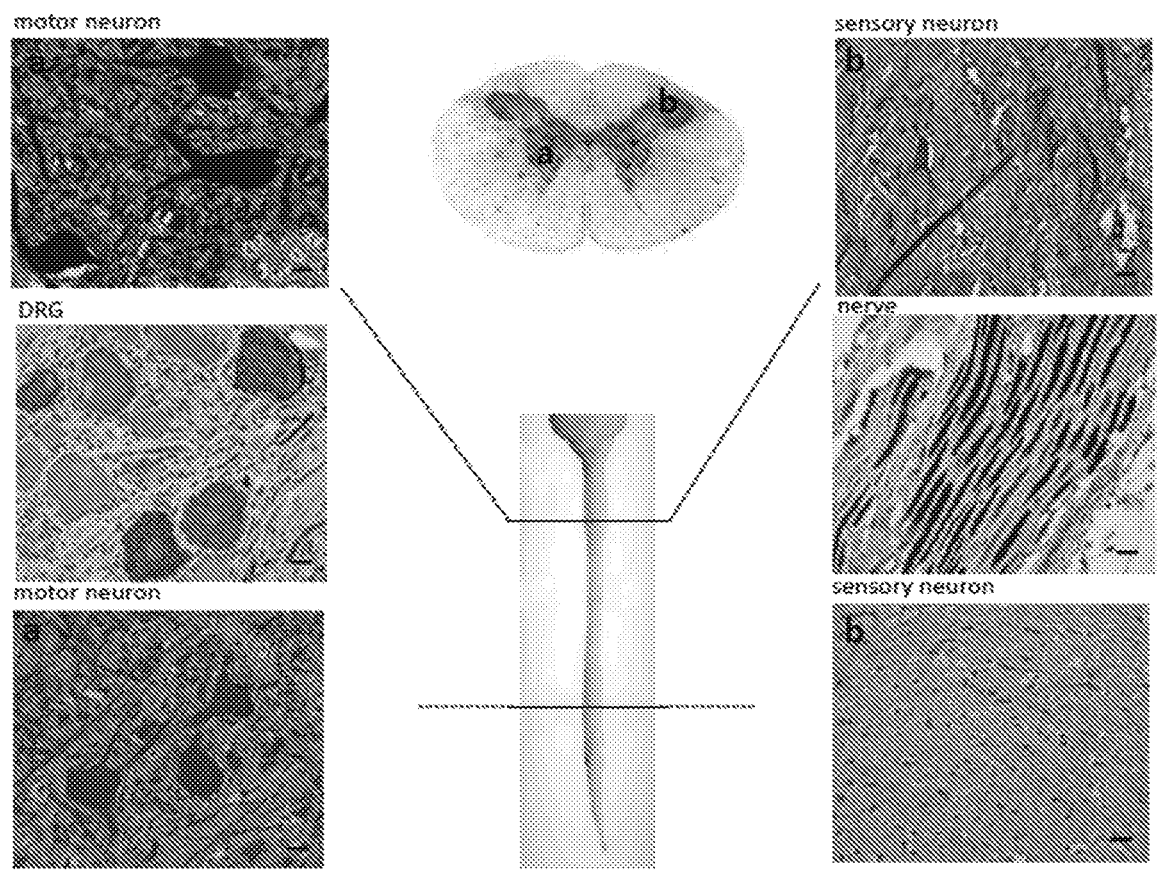
Figure 75E:
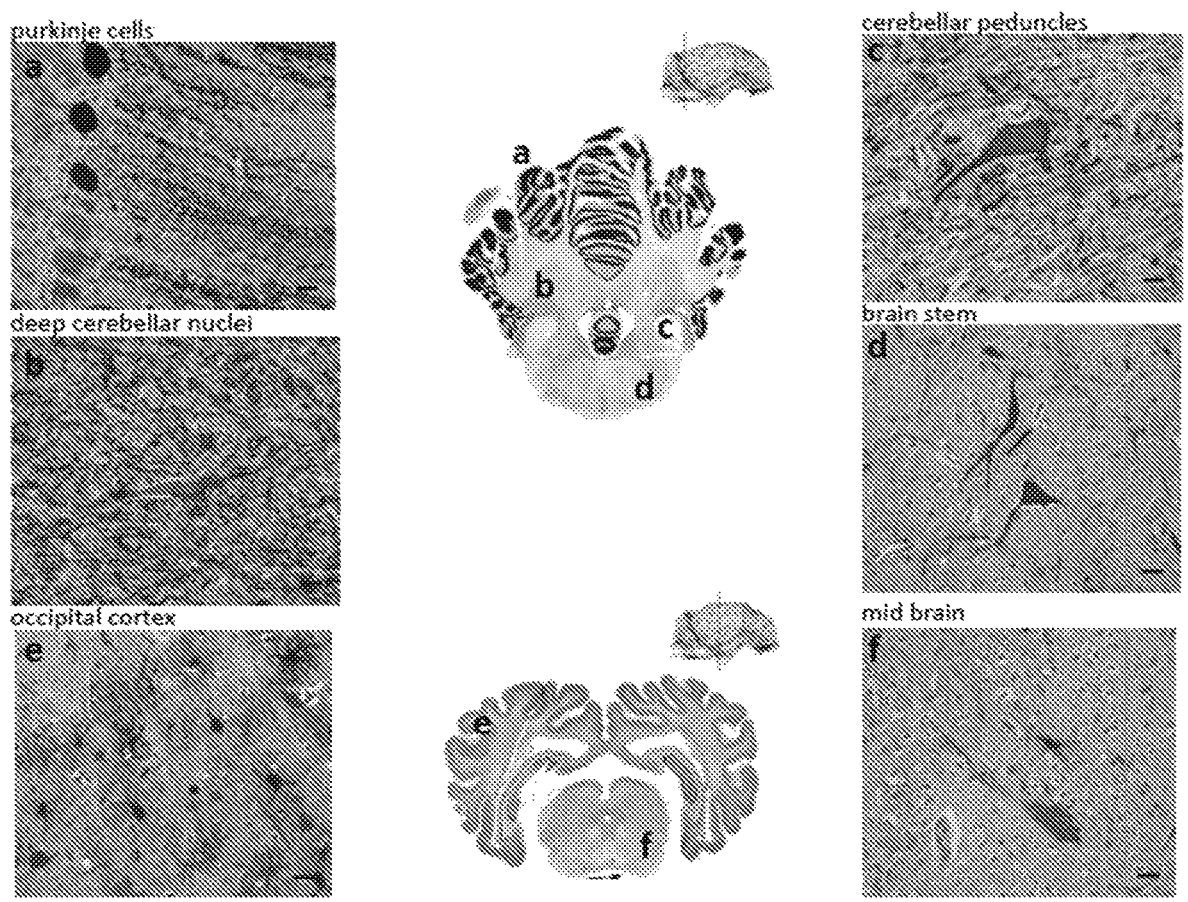
Figure 75F:
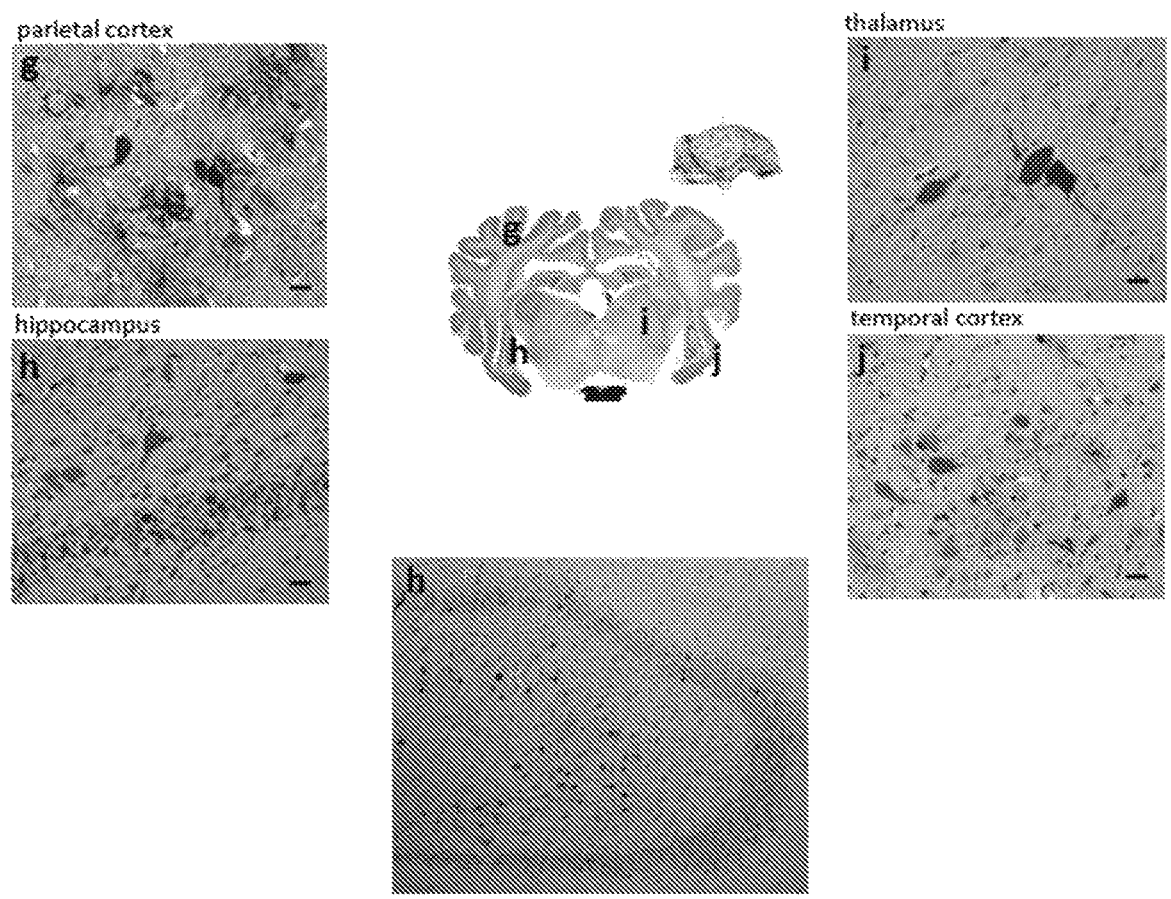
Figure 75G:
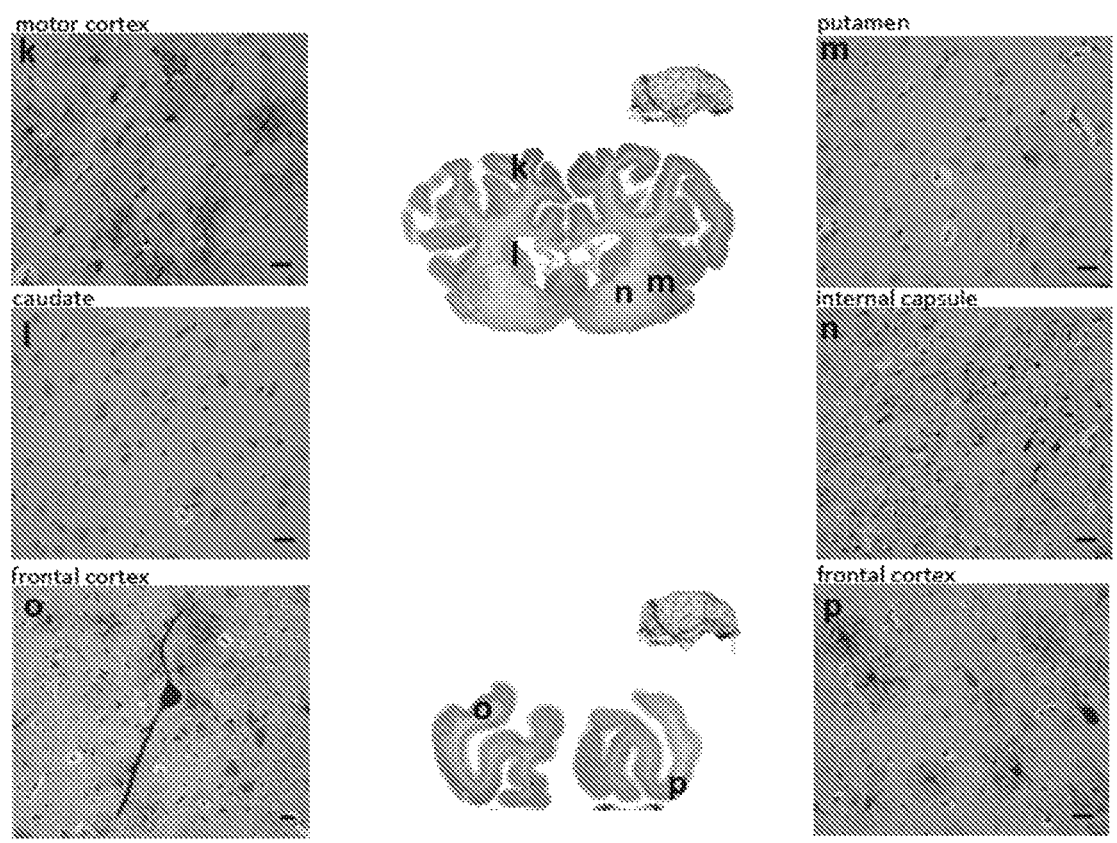

The method of AAV administration to cisterna magna via the microcatheter was tested. scAAV9-CB-GFP was injected to sheep (30 kg, n=3) at $1\times10^{14}$ vg via intravascular microcatheter. The microcatheter was guided by fluoroscopy through the thoracic and cervical region of the sheep (FIG. 75A) until the microcatheter tip was finally placed (FIG. 75B, right panel, arrow). Following contrast injection, 15 ml of scAAV-CB-GFP was infused at 1 ml/min, and the pattern of distribution around the cerebellum was imaged. The sheep were then sacrificed and the gross image of spinal cord post-mortem was observed (FIG. 75C). Immunohistochemistry staining show that GFP was expressed in motor neuron, sensory neuron of the spinal cord (FIG. 75D), and in purkinje cells, cerebellar peduncles, deep cerebellar nuclei, brain stem, occipital cortex, parietal cortex, thalamus, hippocampus, temporal cortex, motor cortex, internal capsule, and frontal cortex of the brain (FIGS. 75E-G). These result indicate that AAV administration to cisterna magna via the microcatheter can be used to efficiently deliver a transgene of interest (e.g., GLB1, HEXA, HEXB, etc.).

This disclosure is not limited in its application to the details of construction and the arrangement of components set forth in this description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A recombinant adeno-associated virus (rAAV) comprising:
    a capsid containing a nucleic acid, wherein the nucleic acid is an adeno-associated virus vector AAVrh8-CB-ci-HEXA and the nucleic acid comprises a sequence as set forth by SEQ ID NO: 18, or the nucleic acid is an adeno-associated virus vector AAVrh8-CB-ci-HEXB and the nucleic acid comprises a sequence as set forth by SEQ ID NO: 19.

2. The rAAV of claim 1, wherein the rAAV comprises a capsid protein of a serotype selected from: AAV1, AAV2, AAV3, AAV4, AAV5, AAV6, AAV7, AAV8, AAVrh8, AAV9, AAV10 and AAVrh10.

3. The rAAV of claim 1, wherein the isolated nucleic acid comprises a sequence as set forth by SEQ ID NO: 18.

4. The rAAV of claim 1, wherein the isolated nucleic acid comprises a sequence a set forth by SEQ ID NO: 19.

5. A pharmaceutical composition comprising:
    (i) a first recombinant adeno-associated virus (rAAV) comprising a capsid containing a first nucleic acid, wherein the first nucleic acid is an adeno-associated virus vector AAVrh8-CB-ci-HEXA and comprises a sequence as set forth by SEQ ID NO: 18; and
    (ii) a second rAAV comprising a capsid containing a second nucleic acid, wherein the second nucleic acid is an adeno-associated virus vector AAVrh8-CB-ci-HEXB and comprises a sequence as set forth by SEQ ID NO: 19, optionally wherein the pharmaceutical composition further comprises a pharmaceutically acceptable carrier.

6. A method for treating a lysosomal storage disorder comprising administering the pharmaceutical composition of claim 5 to a subject having a lysosomal storage disorder, wherein the lysosomal storage disorder is Tay Sachs disease or Sandhoff disease.

7. The method of claim 6, wherein the administration comprises injection into the CSF via the cisterna magna and/or the intrathecal space.

8. The method of claim 6, wherein the administration comprises administering to the intrathecal space through a microcatheter.

9. The method of claim 6, wherein the total rAAV administered to the subject is between about $1 \times 10^{11}$ to $1 \times 10^{15}$ vector genome (vg) copies.

10. The method of claim 6, wherein (i) the subject has less than 0.5% of normal β-Hexosaminidase A activity in the subject's CSF prior to administration of the pharmaceutical composition;
   (ii) the subject has an increase in β-Hexosaminidase A enzyme activity in the CSF that is at least 0.5%, at least 1.0%, or at least 1.4% of normal enzyme activity at about three months after administration of the pharmaceutical composition; and/or
   (iii) the subject has at least a 2-fold increase or at least a 3-fold increase in β-Hexosaminidase A enzyme activity in the CSF compared to the subject's baseline prior to administration.

11. The method of claim 6, wherein the GM2 ganglioside is reduced by at least at least 15%, at least 20%, or at least 25% from baseline in the cerebral spinal fluid (CSF) of the subject at about three months after administration of the rAAV or the pharmaceutical composition.

12. The pharmaceutical composition of claim 5, wherein the first nucleic acid comprises a sequence as set by SEQ ID NO: 18 and the second nucleic acid comprises a sequence as set forth by SEQ ID NO: 19.

13. A recombinant AAV (rAAV) comprising:
   a capsid containing a nucleic acid, wherein the nucleic acid comprises a sequence as set forth by SEQ ID NO: 16.

14. The rAAV of claim 13, wherein the rAAV comprises a capsid protein is of a serotype selected from the group consisting of: AAV1, AAV2, AAV3, AAV4, AAV5, AAV6, AAV7, AAV8, AAVrh8, AAV9, AAV10 and AAVrh10.

15. A pharmaceutical composition comprising:
   the rAAV of claim 13, and a pharmaceutically acceptable carrier.

16. A method for treating GM1 gangliosidosis comprising administering the pharmaceutical composition of claim 15 to a subject having a GM1 gangliosidosis.

17. The method of claim 16, wherein the dose is between about $10^{11}$ to $10^{14}$ rAAV vector genome (vg) copies per kilogram (kg) of the subject's body weight.

18. The method of claim 4, wherein the pharmaceutical composition is administered to the cisterna magna is between about $1 \times 10^{11}$ to $1 \times 10^{15}$ vg.

19. The method of claim 5, wherein the GLB1 activity in the subject having GM1 gangliosidosis is increased by 200%-500%.

* * * * *